Oct. 23, 1951     H. A. GIROUD ET AL     2,572,132

TRANSCRIBING AND SUMMARIZING SYSTEM

Filed April 27, 1949     74 Sheets-Sheet 1

INVENTORS
H. A. GIROUD
G. C. IRWIN
L. A. PILLE
J. B. RETALLACK
G. RIGGS
W. B. STRICKLER

BY

ATTORNEY

Oct. 23, 1951     H. A. GIROUD ET AL     2,572,132
TRANSCRIBING AND SUMMARIZING SYSTEM
Filed April 27, 1949     74 Sheets-Sheet 2
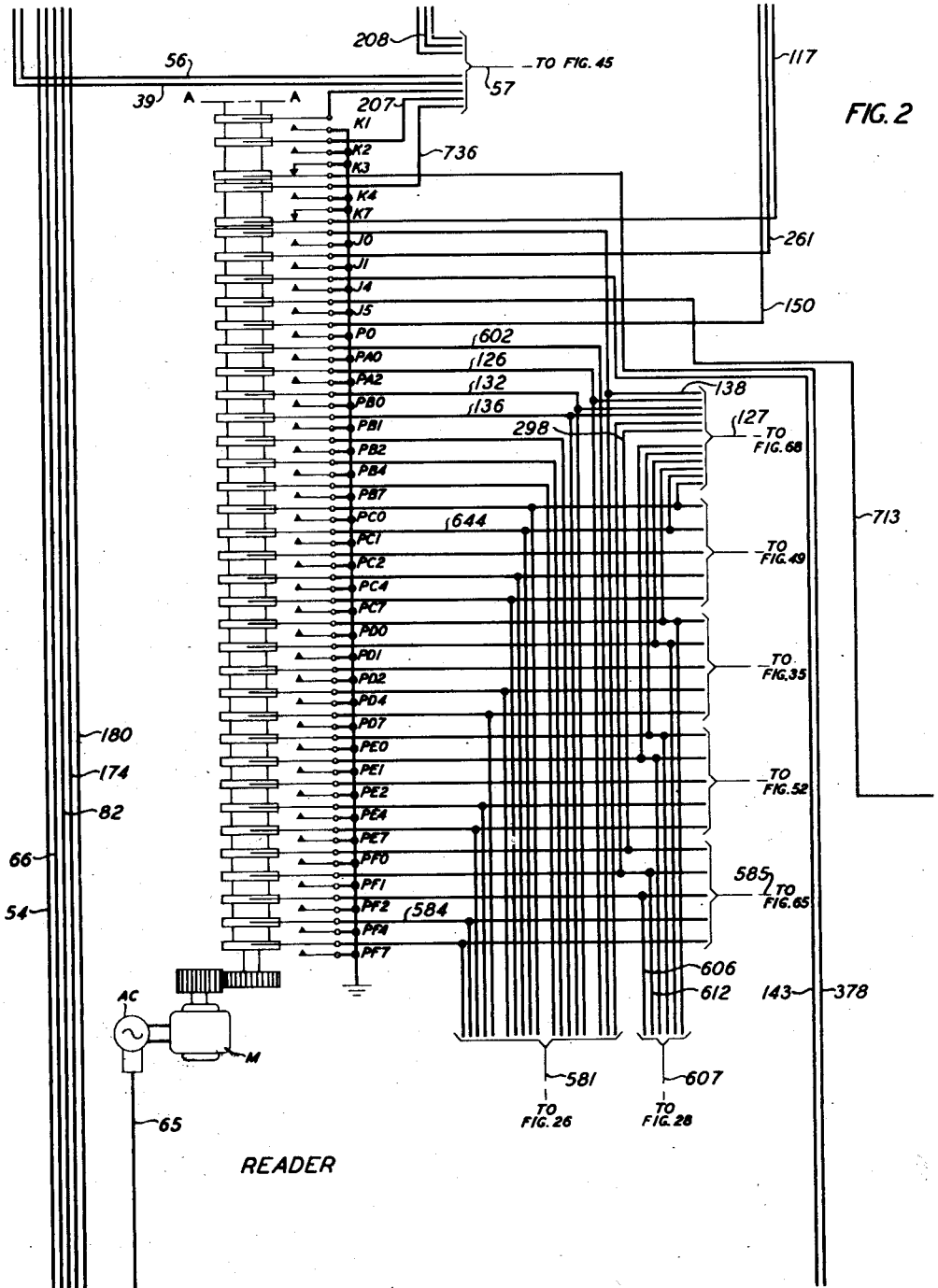
FIG. 2
INVENTORS
H. A. GIROUD
G. C. IRWIN
L. A. KILLE
J. B. RETALLACK
G. RIGGS
W. B. STRICKLER
BY 
ATTORNEY Oct. 23, 1951     H. A. GIROUD ET AL     2,572,132
TRANSCRIBING AND SUMMARIZING SYSTEM
Filed April 27, 1949     74 Sheets-Sheet 16
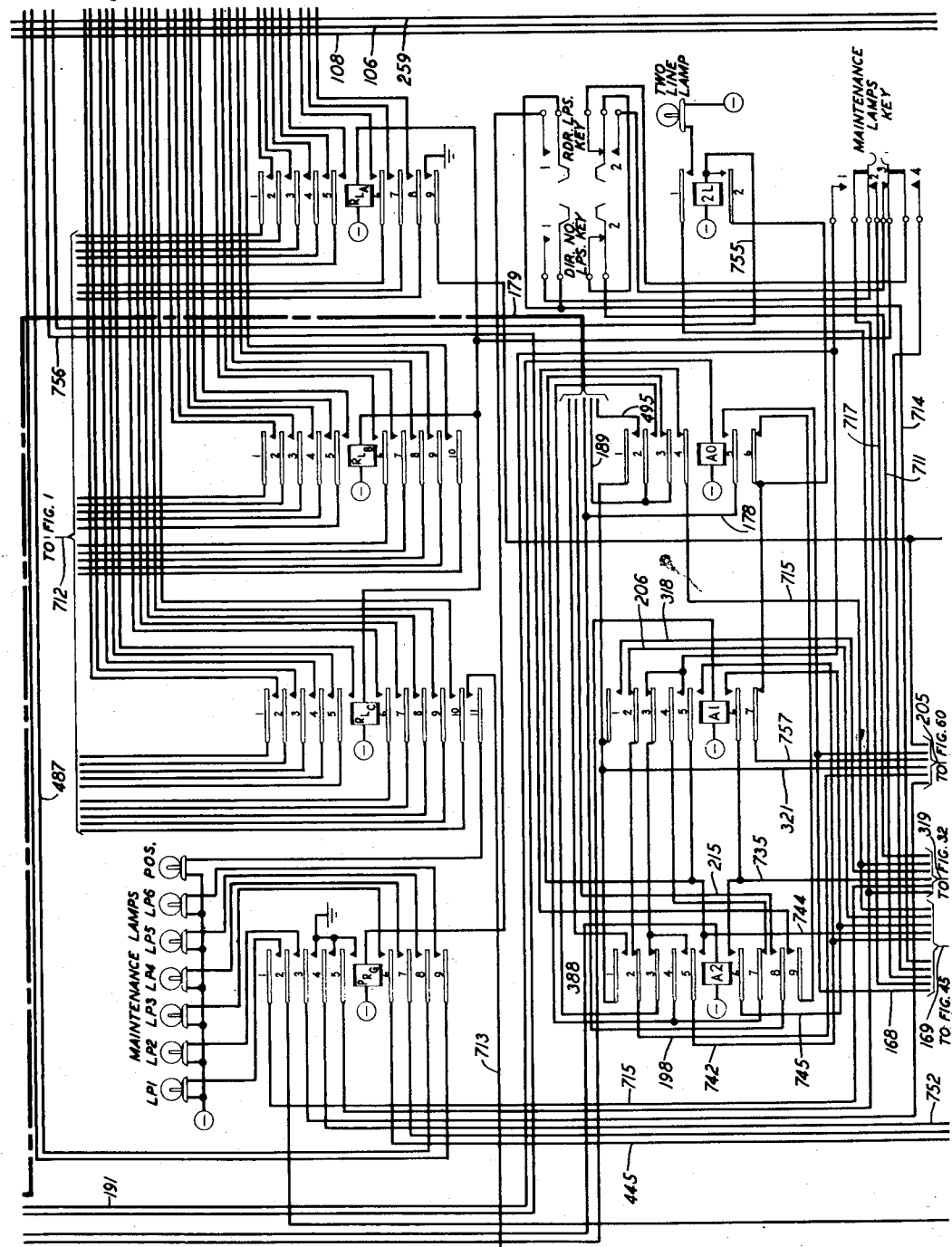
FIG. 16
INVENTORS
H. A. GIROUD
G. C. IRWIN
L. A. KILLE
J. B. RETALLACK
G. RIGGS
W. B. STRICKLER
BY 
ATTORNEY Oct. 23, 1951     H. A. GIROUD ET AL     2,572,132
TRANSCRIBING AND SUMMARIZING SYSTEM
Filed April 27, 1949     74 Sheets—Sheet 34

INVENTORS
H. A. GIROUD
G. C. IRWIN
L. A. KILLE
J. B. RETALLACK
G. RIGGS
W. B. STRICKLER

BY

ATTORNEY

Oct. 23, 1951   H. A. GIROUD ET AL   2,572,132
TRANSCRIBING AND SUMMARIZING SYSTEM
Filed April 27, 1949   74 Sheets-Sheet 51

INVENTORS
H. A. GIROUD
G. C. IRWIN
L. A. KILLE
J. B. RETALLACK
G. RIGGS
W. B. STRICKLER

BY

ATTORNEY

Oct. 23, 1951 H. A. GIROUD ET AL 2,572,132
TRANSCRIBING AND SUMMARIZING SYSTEM
Filed April 27, 1949 74 Sheets-Sheet 53

INVENTORS
H. A. GIROUD
G. C. IRWIN
L. A. KILLE
J. B. RETALLACK
G. RIGGS
W. B. STRICKLER
BY
ATTORNEY

Oct. 23, 1951   H. A. GIROUD ET AL   2,572,132
TRANSCRIBING AND SUMMARIZING SYSTEM
Filed April 27, 1949   74 Sheets-Sheet 54

INVENTORS
H. A. GIROUD
G. C. IRWIN
L. A. KILLE
J. B. RETALLACK
G. RIGGS
W. B. STRICKLER
BY
ATTORNEY

Oct. 23, 1951     H. A. GIROUD ET AL     2,572,132
TRANSCRIBING AND SUMMARIZING SYSTEM
Filed April 27, 1949     74 Sheets-Sheet 72

INVENTORS   H. A. GIROUD
G. C. IRWIN
L. A. KILLE
J. B. RETALLACK
G. RIGGS
W. B. STRICKLER

BY

ATTORNEY

Oct. 23, 1951        H. A. GIROUD ET AL        2,572,132

TRANSCRIBING AND SUMMARIZING SYSTEM

Filed April 27, 1949        74 Sheets-Sheet 73

FIG. 73

INVENTORS
H. A. GIROUD
G. C. IRWIN
L. A. KILLE
J. B. RETALLACK
G. RIGGS
W. B. STRICKLER

BY

ATTORNEY

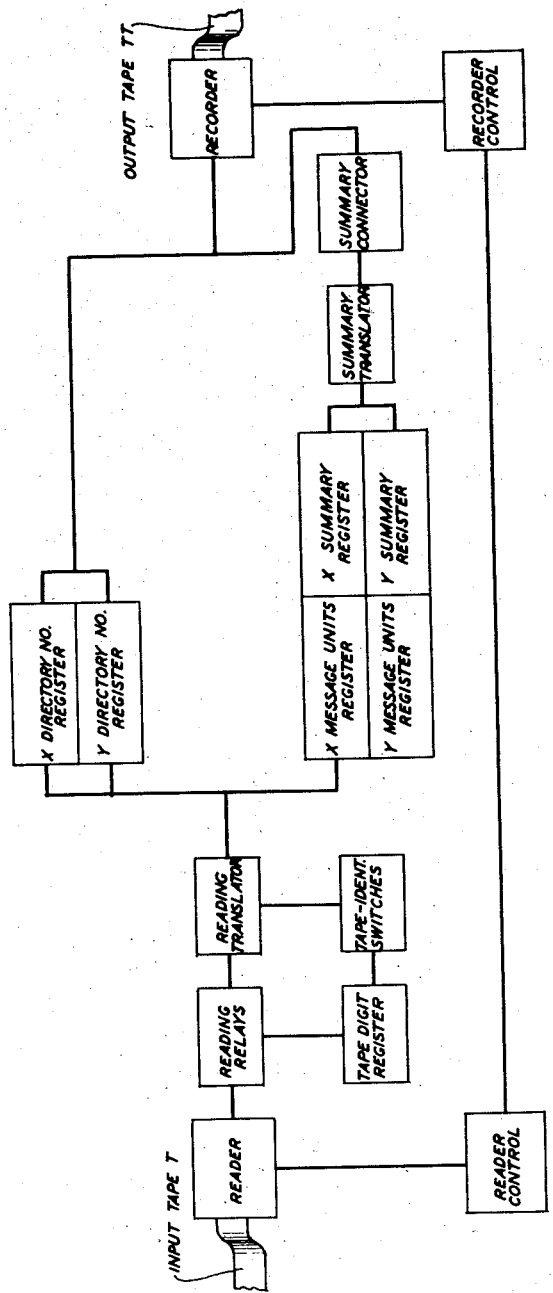

Patented Oct. 23, 1951

2,572,132

UNITED STATES PATENT OFFICE 2,572,132

TRANSCRIBING AND SUMMARIZING SYSTEM

Henry A. Giroud, New York, N. Y., and Gordon C. Irwin, Fair Haven, and Lindley A. Kille, Morristown, N. J., and John B. Retallack, New York, and George Riggs, Port Washington, N. Y., and Walter B. Strickler, East Orange, N. J., assignors to Bell Telephone Laboratories, Incorporated, New York, N. Y., a corporation of New York Application April 27, 1949, Serial No. 89,922

20 Claims. (Cl. 235—61.7)

This invention relates to systems for transcribing and summarizing accounting records.

A common operation performed in accounting systems is the summarizing, from a detailed record, of the various individual items chargeable to the various accounts, and the making of a new record showing all of the accounts with the total amount chargeable to each. This work is performed more rapidly and with less labor if the detailed record is read by mechanical means rather than visually, the summarizing done automatically, and the new record also produced by a machine rather than by hand.

In some accounting systems, records of items of account are made by impressing a paper tape or similar medium, with depressions in rows or lines across the tape, the relative positions of adjacent depressions representing, in accordance with a code, digits or characters. Each digit thus recorded may have an individual significance or data may be represented by the combinations of adjacent digits in a line. Each entry may consists of one line or several successive lines. The type of data recorded in each line and the association of the various lines of an entry may be indicated by additional digits or characters in each line. The copending application of W. W. Carpenter and R. E. Collis, Serial No. 759,402, filed July 7, 1947 shows a system for recording, in this manner, data relating to telephone service.

While this kind of record cannot, like a typed record, be read visually, it has the advantage that it is adapted to be read by mechanical reading or sensing devices, and copies or transcriptions of the original record in the same form may be produced mechanically.

The present invention discloses a novel system for transcribing records of this type and summarizing the data thereon, which reads a record and produces a new record in the form of the original record (and, therefore, adapted for further operations of a similar character) in which the individual entries of the original record are summarized and additional data useful in further accounting operations is recorded.

Some of the features of this invention are means for summarizing the entries in accordance with indices in the original record; for reproducing on the new record the indices in accordance with which the entries are summarized; for comparing each index with subsequently encountered indices; for comparing each index with a common index in each section of the original record; for summarizing entries either of one line or of more than one line; for checking the completeness of an entry containing more than one line; for recording a fixed quantity, when the summarized amount exceeds that quantity, and carrying the remainder into the succeeding summary; for recording a significant entry at the end of each series of related indices encountered in the original record; for arresting the operation of the system without losing data already computed; for arresting the operation of the system in case of failure to produce a correct record or in case the record read is mutilated; and for restarting the correct operation of the system after such arrest.

These and other features of the invention will be more readily understood from the accompanying description, the appended claims, and the drawings, in which:

Figs. 1 and 2 show the reader;

Figs. 16 and 17 show the maintenance lamp circuit;

Fig. 73 is a diagrammatic representation of the record tape; and

Fig. 74 is a block diagram of the principal elements of the invention showing the relation of the elements to one another.

Figure 1:
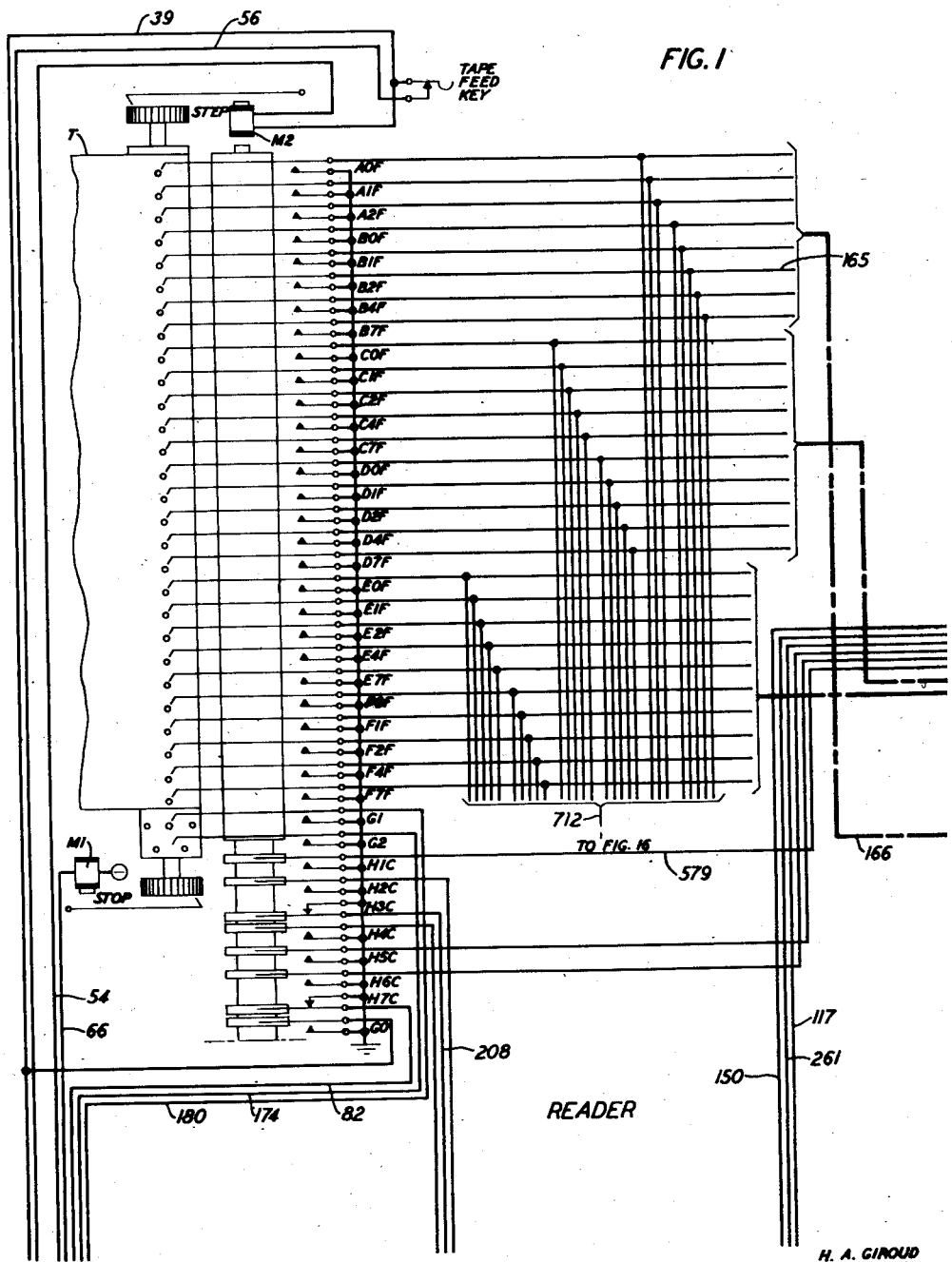

The invention is illustrated in its application to records of data relating to telephone calls. In one form of accounting system for telephone service, records relating to telephone calls chargeable in message units are made on long paper tapes, each tape containing records of calls chargeable to a particular thousand or a particular hundred subscribers' directory numbers. The records are in the form of successive entries, each entry containing a directory number and a number of message units chargeable thereto. The entries are in the numerical order of the directory numbers, but there may be and usually are several entries for each directory number which appears, while some directory numbers do not appear at all. These records are of the impressed type mentioned above.

In its present embodiment, the invention is adapted to read these record tapes and to produce new record tapes in the same form on which the directory numbers and other data are reproduced, but on which the sum total of message units chargeable to each directory number is recorded with that directory number. For a clear understanding of the invention, a more detailed description of the record tapes, which are the input tapes in the present embodiment of the invention, appears desirable.

The records on these tapes are made by a recorder of the punching type, such, for example, as the one disclosed in the copending application of W. W. Carpenter, Serial No. 558,401, filed April 14, 1945, and now abandoned. This has a row of twenty-eight punches extending across the tape, each of which, when operated, produces a small, round depression in the tape. Only one of the first three punches is operated at a time, the depression produced representing "0" if the first punch is operated, "1" if the second punch is operated, and "2" if the third punch is operated. The remaining twenty-five punches are divided into five groups of five, the punches of each group being operated in combinations of two to record a digit. Five more digits may thus be recorded in one line. For convenience, the five punches in each of the latter groups are designated (0), (1), (2), (4), and (7), respectively. The combinations of operated punches and the depressions produced by them, represent digits according to the following code:

| Digit | Punches Operated In Group of Five |
|---|---|
| 1 | (0) (1) |
| 2 | (0) (2) |
| 3 | (1) (2) |
| 4 | (0) (4) |
| 5 | (1) (4) |
| 6 | (2) (4) |
| 7 | (0) (7) |
| 8 | (1) (7) |
| 9 | (2) (7) |
| 0 | (4) (7) |

When one line has been recorded, the tape is advanced and the next line recorded in a similar manner by the same set of punches.

Fig. 73 is a representation of such a tape with data recorded thereon. An actual reproduction of the tape would be unintelligible, as the actual tape displays only a pattern of depressions which is not readily susceptible of visual interpretation. In the interest of clarity, therefore, Fig. 73 is a diagrammatic rather than an actual representation of the record tape. The black dots represent depressions in the tape which record data, and these dots have been more widely spaced than in the actual tape in order that they may be more clearly seen. With each group of dots has been placed the digit which the dots represent and the significance of the digits is indicated by legends. The vertical lines divide the dots into digit groups. The digits, the legends, and the vertical lines do not appear on the actual tape.

Starting at the bottom of the figure and proceeding upward, which is the direction in which the record is to be read (although it is made in the opposite direction), there appears at the bottom, several lines (lines 1 to 4) each representing the digits "081010." These merely form a "splice" pattern, providing space for joining the tape to another similar tape. There follows thereafter a tape-identity entry of nine lines (lines 5 to 13) which, together, identify the particular tape. In each of these lines, the first three digits are "index" digits indicating the character of the data. The fourth digit in each line is the number of the line of the entry. The last digit of the bottom line of this entry indicates the type of record tape. In line 6, the last two digits are the number of the marker group with which the recorder, which recorded the original information, is associated. The last two digits of lines 7 and 8 have no significance. In line 9 the next-to-last digit represents the central office of the subscribers whose records are on the tape. The last digit is a zero having no significance but used merely to fill out the line. The last two digits of lines 10 and 11 have no significance. In line 12, the next-to-last digit is the thousands digit of the directory numbers which appear on the section of the tape preceding the next group of tape-identity lines, and the last digit is the number of the "round," a billing period. In the last line of the tape-identity entry, the last two digits are the number of the month to which the charges apply.

Following the tape-identity entry appear the entries of message units chargeable to the subscribers. The entries shown are representative of the various types of these entries. Line 14 shows a single-line entry for a number of message units not exceeding nine. The first digit is an index. The next digit is the number of message units. The last four digits are the directory number of the subscriber to whom the message units are chargeable. Lines 15 and 16 show a two-line entry for 10 to 99 message units. The first two digits of the lower line are index digits. The next four digits are the directory number of the subscriber to whom the message units are chargeable. The four zeros of the upper line have no significance, being used merely to complete the line, and the last two digits are the number of message units. Lines 17 and 18 show a two-line entry for up to 999 message units. This entry differs from the previous type of entry in the second digit of the second line and in the fact that the message units occupy three digits. Lines 19 and 20 show a two-line entry for 1,000 message units, the second digit of the second line being again distinctive. It will be observed that the first digit of a single-line entry is "1," while the first digit of the first line of a two-line entry is "2" and the first digit of the second line of a two-line entry is "0."

On the actual tape, the directory numbers appearing in the message-unit entries are in ascending numerical order, with a tape-identity entry between the thousands digit groups. Of course, there may be, and usually are, several entries for each directory number, which may be of any of the types shown, and these follow one another. Also the directory numbers are not necessarily numerically consecutive, as some directory numbers may not appear at all.

Following the entries of message units chargeable, the tape-identity entry is repeated. There follows a line (line 25) the last two digits of which represent the number of the machine which made the record. The first four digits of this line are an indication that the lines following are to be disregarded. Following this line is a splice pattern for joining the tape to another similar tape.

In using the present embodiment of the invention, a number of record tapes, such as described above, may be joined together, end for end, in the numerical order of the thousands digits of the directory numbers appearing on them, and run through the reader shown diagrammatically in Figs. 1 and 2, the input tape being represented at T. The reader may be any suitable type, such as the one disclosed, for example, in the previously-mentioned copending application of W. W. Carpenter, Serial No. 558,401. It has, in the present embodiment of the invention, twenty-eight sensing fingers adapted to sense the twenty-eight positions where depressions may appear in one line of the tape T. These fingers are repeatedly raised and lowered by a cam operated by the motor M and each finger which encounters a depression in the tape when lowered, closes its associated contacts. The motor M also operates a mechanism (not shown) which normally steps the drum to advance the tape each time the sensing fingers are raised, so that the sensing fingers normally fall once on each line of the record tape. When the step magnet M2 is energized, or when the stop magnet M1 (which is energized during normal operation) is deenergized, however, this tape advance is arrested and the sensing fingers fall repeatedly on the same line of the record. Magnet M1 is used merely to prevent the reader drum from being accidentally rotated while the reader motor is not running and during the process of starting the reader. Magnet M2, however, is maintained operated during the time a line of the tape T is being processed and is released only when operations of the system in connection with said line are completed. Magnet M2, therefore, prevents the reader from advancing faster than the operations of the system are performed and, in the event of failure in the system, prevents tape T from being advanced beyond the line of the record being read when the failure occurred. The motor M also rotates the cams shown in Figs. 1 and 2 which actuate contacts for controlling the circuits, as described later. These cams are so arranged that contacts H3C, H1C, K3 and K7 are closed when the sensing fingers are raised and opened when the sensing fingers are lowered. Contacts J0 . . . J5 close slightly after the closure of any of the sensing finger contacts, and open slightly after the sensing finger contacts open. The remainder of the contacts controlled by the cams open and close in synchronism with the sensing finger contacts. Other details of the reader will be described later when their purpose and functions will be more clearly understood.

Figure 3:
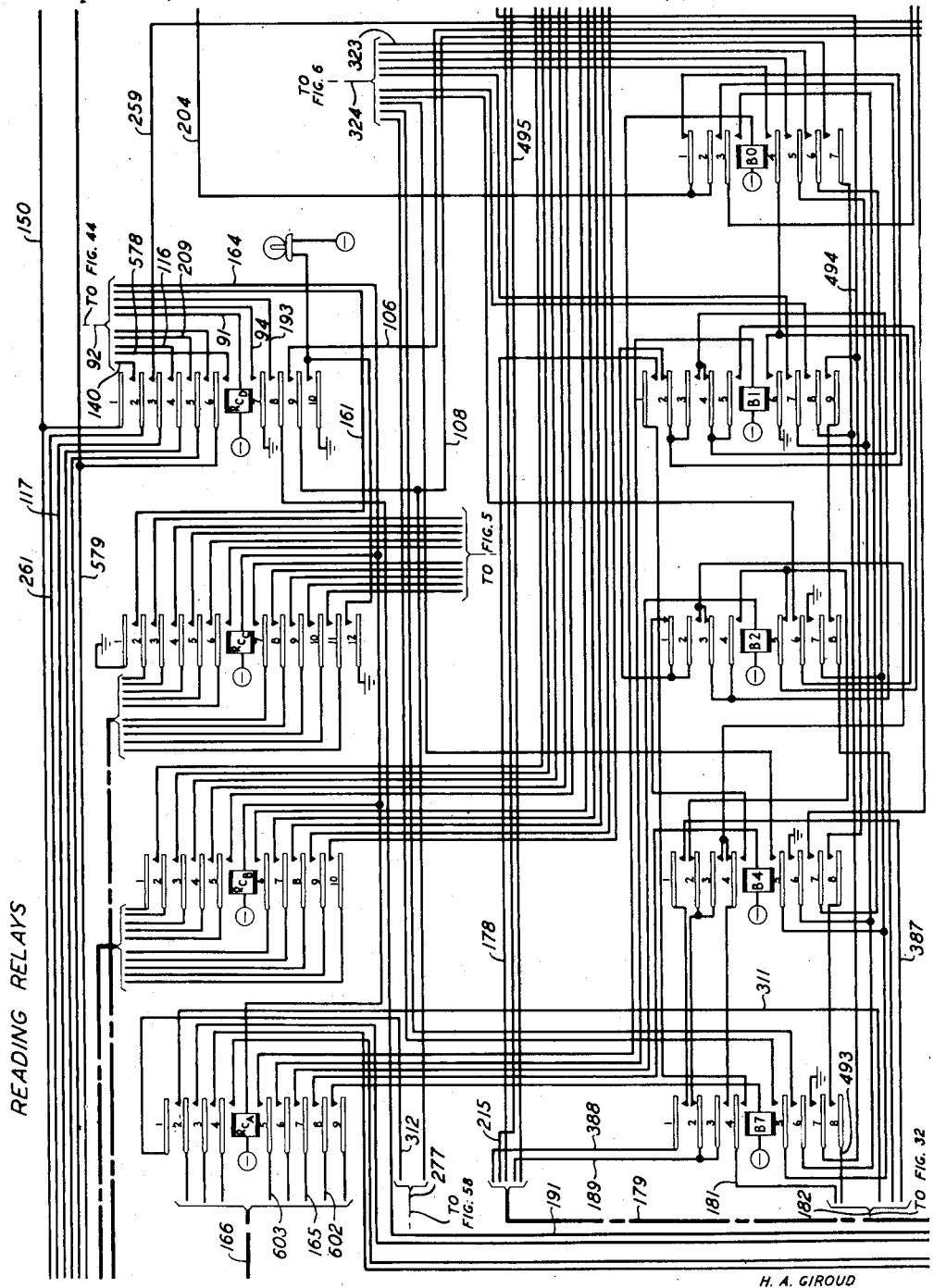
Figs. 3, 4 and 5 show the reading relay circuit.
Figure 43:
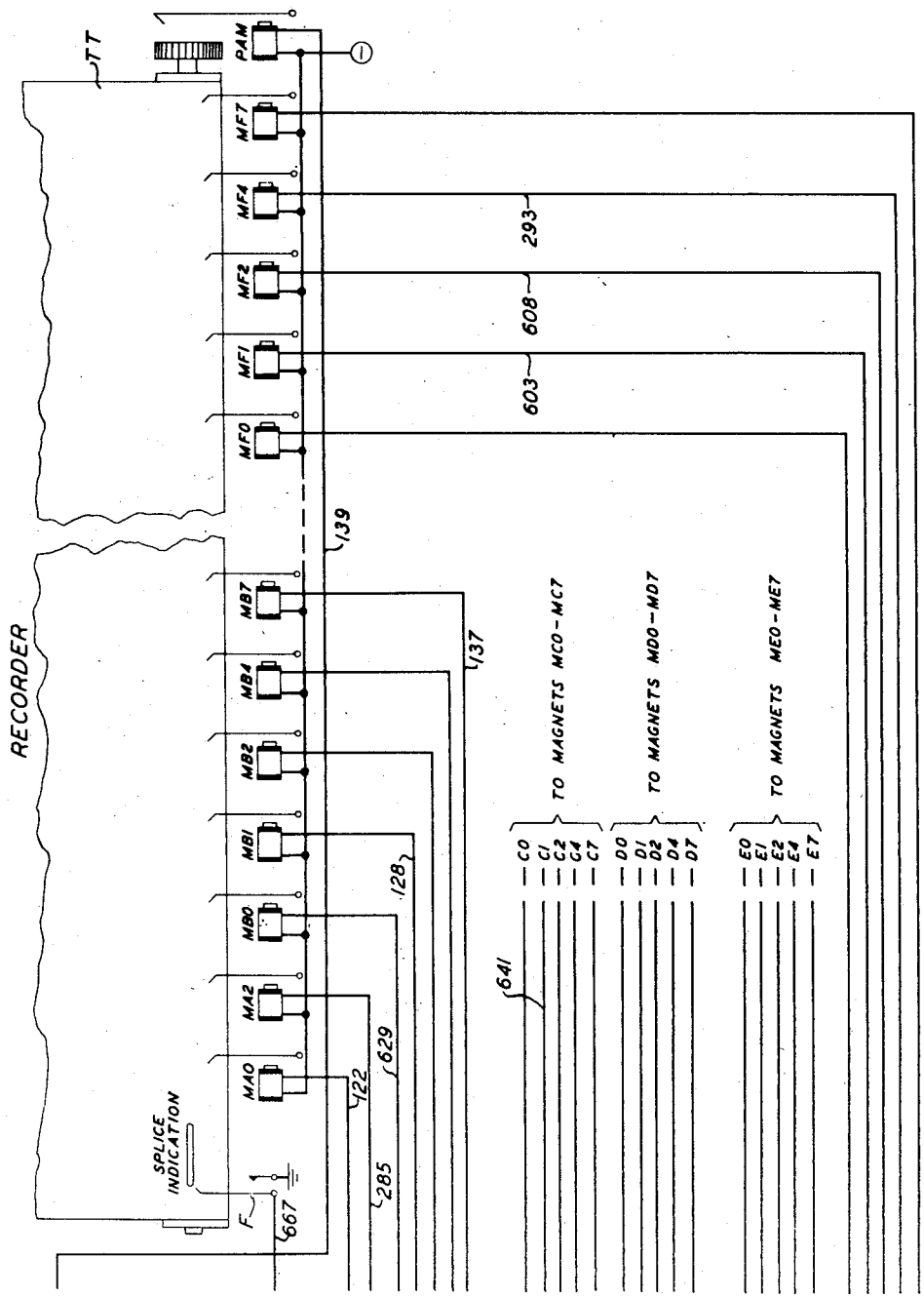
Fig. 43 shows the recorder.
Figure 71:
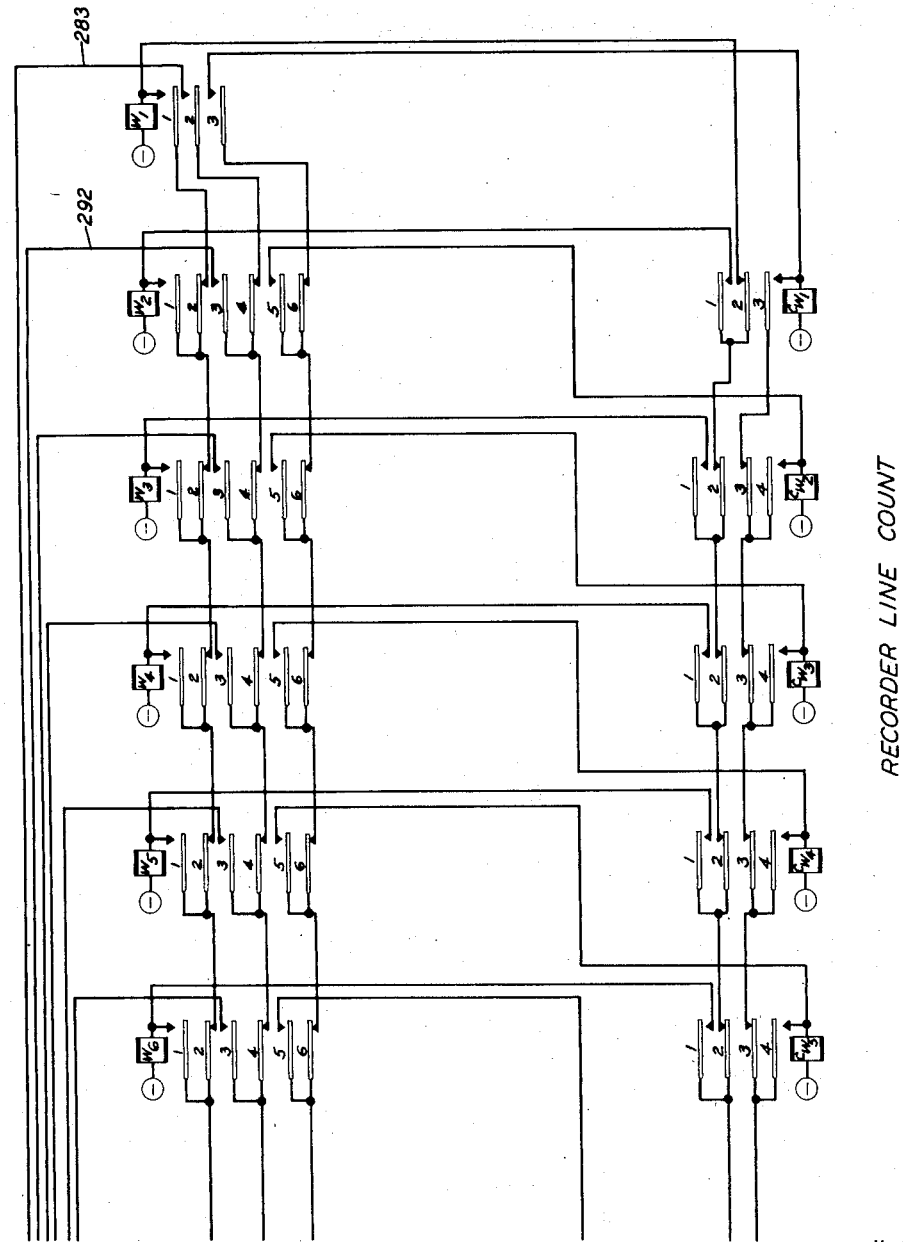
Figure 72:
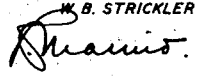
Fig. 72 shows how the above figures should be placed in relation to one another to completely disclose the invention.

Through the circuits shown in Figs. 3 to 71, the reader controls the recorder of Fig. 43 which, in the present embodiment of the invention, is similar to the recorder by which the input tapes (Fig. 73) were made and produces a record similar in form to the input tapes. It has twenty-eight punches operated individually by the magnets MA0 . . . MF7 respectively. A magnet PAM, when operated and released, advances the tape TT one line.

Fig. 73 will serve as a representation also of the record produced by the recorder of the present invention, if the entry shown for not more than nine message units is omitted. Different index digits are, in some cases, recorded but the record on the summary (output) tape TT is similar, with these exceptions, to the record on the input tape T. However, on the summary tape TT only one entry appears for each directory number to which 999 or less message units are chargeable, and the number of message units shown on this tape for each directory number is the sum total of all the message units shown on the input tape T as chargeable to that directory number. Where the total number of message units chargeable to a directory number exceeds 1,000, there is one entry on tape TT for each full thousand and an additional entry for the remainder.

GENERAL ARRANGEMENT AND FUNCTIONS OF THE SYSTEM

The functioning of the system will be best understood by reference to the block diagram Fig. 74 which shows diagrammatically the general arrangement of the principal parts. The tape-identity switches are manually set in accordance with the type and characteristics of the record on the input tape T to be passed through the reader. Before said tape is inserted in the reader, the reader is started by the manual operation of a key and the recorder is then caused to impress a splice pattern on the output tape TT in response to the manual operation of another key. The input tape T is then inserted in the reader and the reading circuits put into operation. The reader reads the lines of the record on tape T successively. As each line is read, reading relays and relays of the reading translator are operated which correspond to the depressions in tape T encountered by the sensing fingers of the reader. The reader automatically passes over the successive lines of the splice pattern at the beginning of tape T, without causing any record thereof to be made. When the tape-identity entry on tape T is encountered, the significant digits in said entry indicated by the reading relays operated are compared with the setting of the tape-identity switches. If any of these digits do not check with the setting of the tape-identity switches, an alarm is given to indicate that the wrong tape has been inserted in the reader or that the tape-identity switches are incorrectly set. If the digits check, a corresponding tape-identity entry is caused to be impressed on the output tape TT.

The reader then proceeds to read the lines of the message-unit entries on tape T. The thousands digit of the directory number in each entry is checked against the setting of a switch positioned in accordance with the tape-identity switches to make sure that the directory numbers are those that should appear on the particular section of the input tape T being read. The hundreds, tens, and units digits of the directory number in the first entry encountered are registered in the X directory number register, and the number of message units is registered in the X message-units register and transferred to the X sum register, the X message-units register being then cleared. The directory number in the next entry encountered is registered in the Y directory number register and the number of message units is registered in the Y message-units register. The two registered directory numbers are then compared. If they are the same, the two amounts of message units registered are added and the sum is transferred to the Y sum register, the X directory number and sum registers being cleared. The directory number of the next entry is registered in the X directory number register and the message units of the entry in the X message-units register. Again the registered directory numbers are compared and, if they are the same, the two amounts of message units registered are added and the total transferred to the X sum register, the Y sum register being cleared. So long as the two registered directory numbers agree, this process continues, a registration of the directory number and the total number of message units chargeable to it being maintained. When, however, two registered directory numbers do not agree, the recorder is caused, through the summary translator and summary connector, to record an entry containing the first directory number and the accumulated total of message units chargeable to it. These registrations are then cleared and the summarizing operation proceeds in the same manner with the succeeding registered directory number and the registered message units severally chargeable to them.

If the accumulated total of message units for one directory number reaches or exceeds one thousand, the recorder is caused to impress on tape TT an entry for one thousand message units, with the directory number. Any excess above one thousand message units is retained in one of the sum registers and the message units in succeeding entries for the same directory number are added to it.

When another tape-identity entry is encountered on the input tape T, it is checked against the setting of the tape-identity switches. If the check is satisfactory, a corresponding tape-identity entry is impressed on the output tape TT. The registered digit, for comparison with the thousands digit of directory numbers in the message-unit entries, is automatically changed as each new section of the input tape T is reached. Splice patterns encountered in the input tape T are automatically passed over. When the end of the input tape T is reached, the reader stops automatically. A splice pattern is then caused to be impressed on the output tape TT by manual operation of a key and this tape is thus completed. The completed output tape is in the same form as the input tape and is suitable for use in further operations of the character described above.

At any point in the above summarizing and transcribing operations, the operation of the system may be arrested, by operating a key, for examination of the equipment or for other purposes. When the system is restarted, the operations are resumed without loss of any partial total of message unit accumulated when the key was operated to arrest the equipment.

Referring now to Figs. 1 through 71, each of the reading relays, referred to above, is associated with a correspondingly designated sensing finger of the reader and operates whenever said sensing finger falls on a depression in the record being read, releasing when the sensing fingers are raised. These relays, therefore, temporarily register in two-out-of-five code (except for the first digit) the digits represented in the same code in each line of the input record. These relays are shown in the drawing as follows:

*Reading relays*

| Digit | Relays | Fig. No. |
|---|---|---|
| 1st | A0 . . . A2 | 16 |
| 2nd | B0 . . . B7 | 3 |
| 3rd | C0 . . . C7 | 4 |
| 4th | D0 . . . D7 | 4 |
| 5th | E0 . . . E7 | 5 |
| 6th | F0 . . . F7 | 5 |

The operation of the reading relays for the 2nd, 4th, 5th, and 6th digits causes the operation of relays of the reading translator which register the same digits in decimal code, one of the translator relays being operated for each of said digits. The relays of the reading translator are shown in the drawings as follows:

*Reading translator relays*

| Digit | Relays | Fig. No. |
|---|---|---|
| 2nd | TB0 . . . TB9 | 6 |
| 4th | TD0 . . . TD9 | 6 |
| 5th | TE0 . . . TE9 | 7 |
| 6th | TF0 . . . TF9 | 7 |

Each of the X and Y directory number registers, whose functions are described above, comprises relays for registering, in two-out-of-five code, the hundreds, tens, and units digits of a directory number, and similar relays for registering a comparison of the directory number with the directory number registered in the other of said registers. These relays are shown in the drawing as follows:

*Directory number registers*

X REGISTER

| Digit | Register Relays | Comparison Relays | Fig. No. |
|---|---|---|---|
| Hundreds | XD0...XD7 (and XD2S) | DX0...DX7 | 35 |
| Tens | XE0...XE7 (and XE2S) | EX0...EX7 | 52 |
| Units | XF0...XF7 (and XF2S) | FX0...FX7 | 65 |

Y REGISTER

| Digit | Register Relays | Comparison Relays | Fig. No. |
|---|---|---|---|
| Hundreds | YD0...YD7 (and YD2S) | DY0...DY7 | 36 |
| Tens | YE0...YE7 (and YE2S) | EY0...EY7 | 53 |
| Units | YF0...YF7 (and YF2S) | FY0...FY7 | 66 |

In the message-units registers, the number of message units is registered, in biquinary code, by the operation of one of five relays (and a relay in parallel therewith) to represent a quantity "0" ... "4" and the operation of one of two other relays to represent a quantity above or below "5." Relays are provided in each register for registering, in this manner, hundreds, tens, and units digits. These relays are shown in the drawing as follows, each of the relays having a designation with a prime being in parallel with the relay having a like designation without a prime:

*Message-units registers*

X REGISTER

| Digit | 0...4 | Fig. No. | 0...4 | Fig. No. | Below 5 | Above 5 | Fig. No. |
|---|---|---|---|---|---|---|---|
| Hundreds | XH0 ... XH4 | 24 | XH0' ... XH4' | 22 | XHL | XHH | 21 |
| Tens | XT0 ... XT4 | 40 | XT0' ... XT4' | 38 | XTL | XTH | 37 |
| Units | XU0 ... XU4 | 57 | XU0' ... XU4' | 55 | XUL | XUH | 54 |

Y REGISTER

| Digit | 0...4 | Fig. No. | 0...4 | Fig. No. | Below 5 | Above 5 | Fig. No. |
|---|---|---|---|---|---|---|---|
| Hundreds | XH0 ... XH4 | 24 | YH0' ... YH4' | 23 | YHL | YHH | 21 |
| Tens | YT0 ... YT4 | 40 | YT0' ... YT4' | 39 | YTL | YTH | 37 |
| Units | YU0 ... YU4 | 57 | YU0' ... YU4' | 56 | YUL | YUH | 54 |

To register the digit "2" as the hundreds digit in the X register, for example, relay XH2 (and XH2') representing the digit "2," would be operated, and relay XHL would be operated to indicate that the registered digit is below "5." To register the digit "7," relay XH2 (and XH2') would likewise be operated, but relay XHH would be operated to indicate that the registered digit is above "5."

In the sum registers, the quantities are also registered in biquinary code. The relays of these registers are shown in the drawings as follows:

*Sum registers*

X REGISTER

| Digit | 0...4 | Fig. No. | Below 5 | Above 5 | Fig. No. |
|---|---|---|---|---|---|
| Hundreds | HX0 ... HX4 | 23 | HXL | HXH | 21 |
| Tens | TX0 ... TX4 | 39 | TXL | TXH | 37 |
| Units | UX0 ... UX4 | 56 | UXL | UXH | 54 |

Y REGISTER

| Digit | 0...4 | Fig. No. | Below 5 | Above 5 | Fig. No. |
|---|---|---|---|---|---|
| Hundreds | HY0 ... HY4 | 22 | HYL | HYH | 21 |
| Tens | TY0 ... TY4 | 38 | TYL | TYH | 37 |
| Units | UY0 ... UY4 | 55 | UYL | UYH | 54 |

The relays of the X message-units register whose designations have primes, and the corresponding relays of the Y sum register (for example, relay XT1' and relay TY1) form "adder" circuits for adding the message units registered in the X message-units register and those registered in the Y sum register, the sum obtained being registered in the X sum register. Similarly, the relays of the Y message-units register and of the X sum register form adder circuits for adding the message units registered in the Y message-units register to those registered in the X sum register and registering the sum in the Y sum register.

Figure 4:
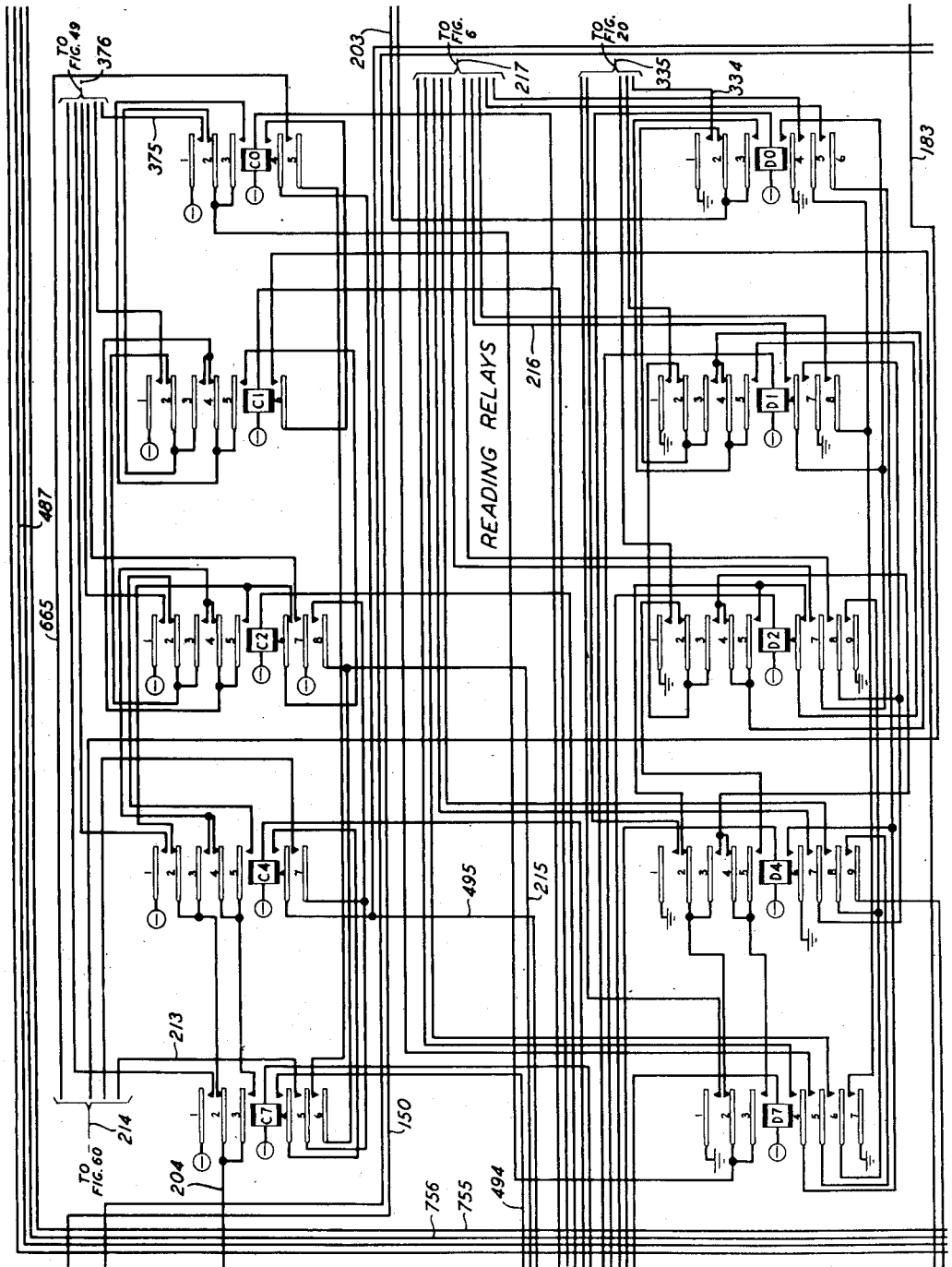
Figure 15:
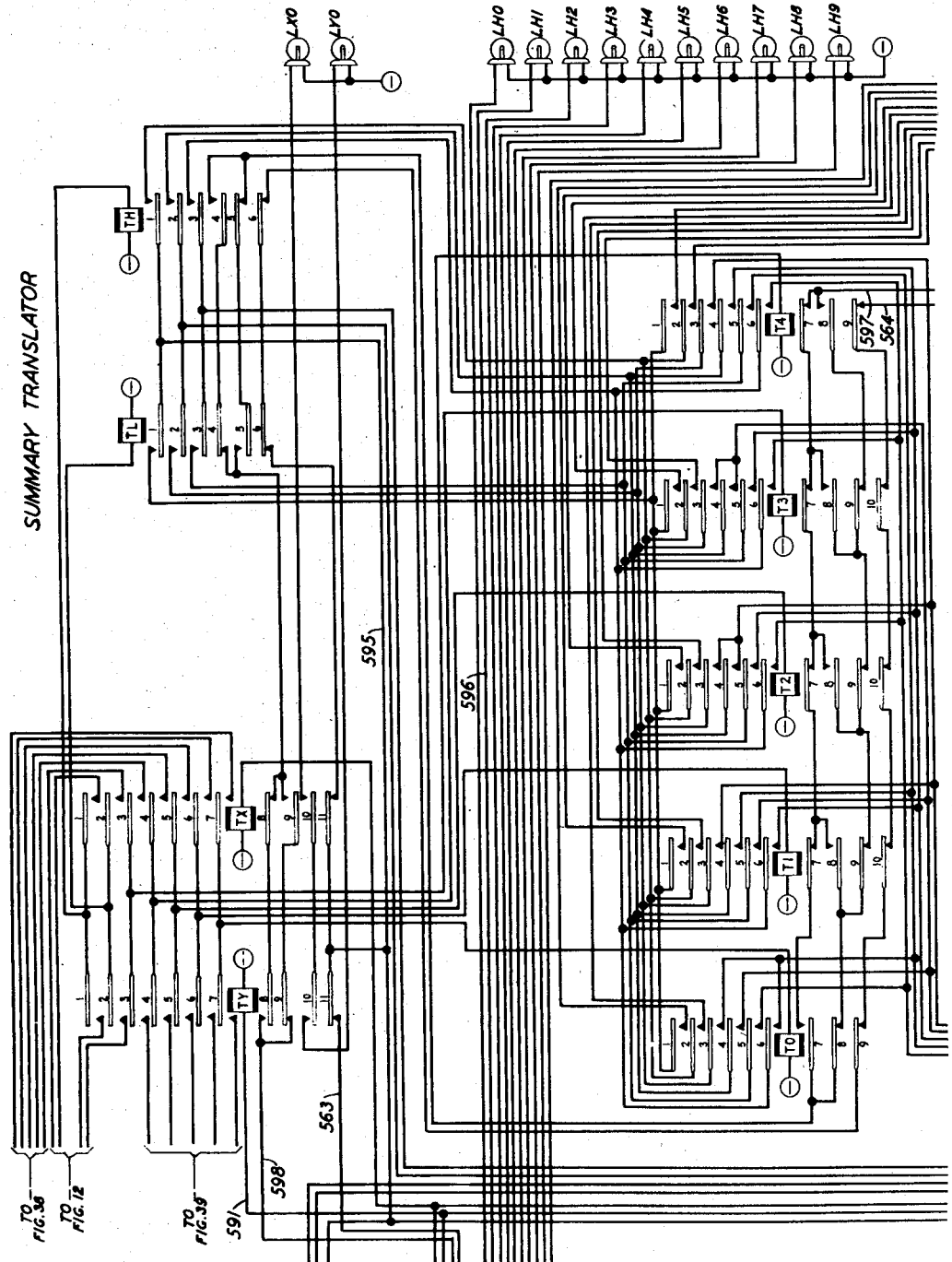
Figure 28:
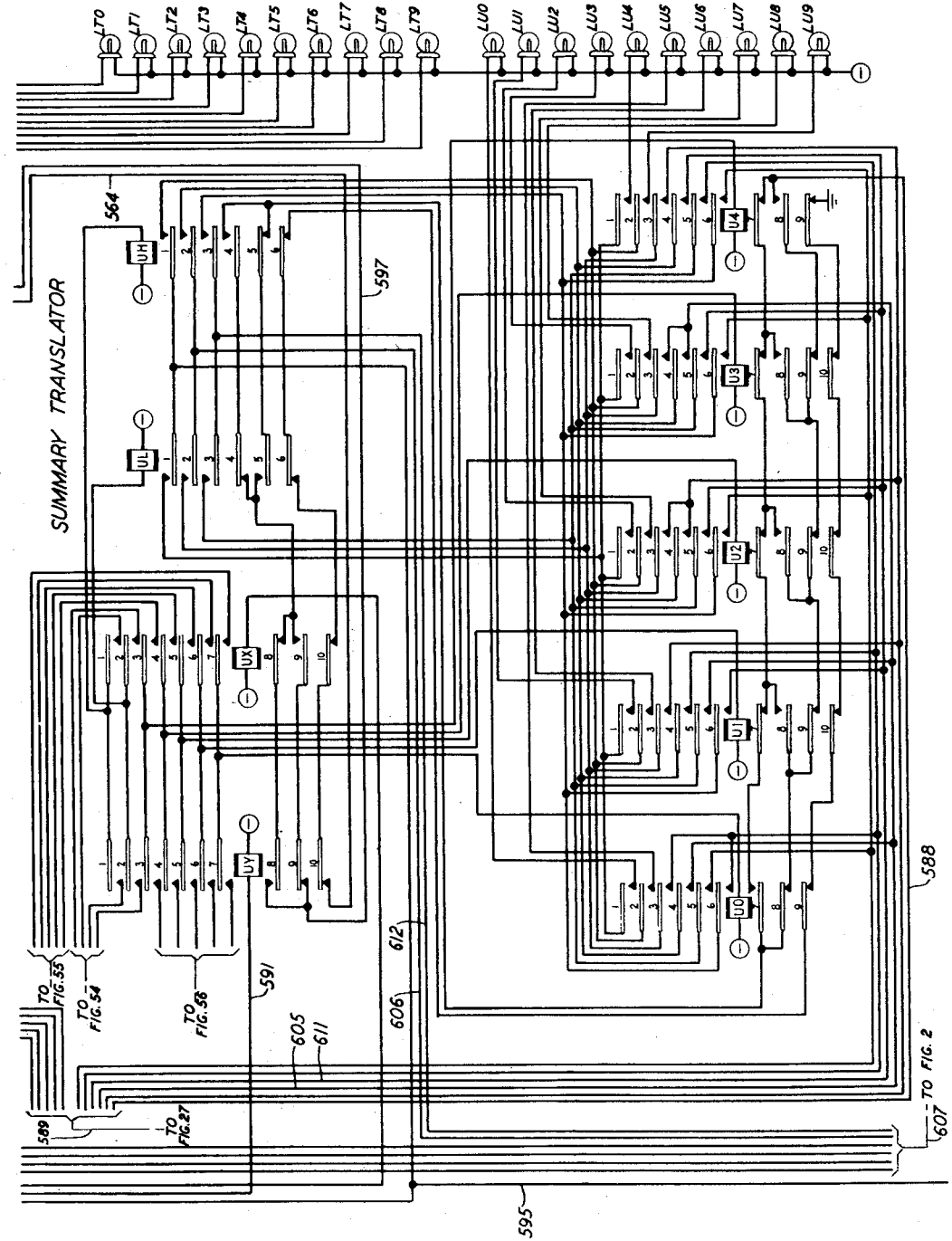

When a sum total of message units is to be recorded, each digit of the sum, registered in one of the sum registers in biquinary code, is registered in the same code by the relays of the summary translator, which are shown in Figs. 4, 15, and 28. These latter relays, however, control punch magnets of the recorder to record the sum in two-out-of-five code.

Directory numbers are recorded in two-out-of-five code from the registrations in the directory number registers, which are in this code. With the exception of the first digit of each line, all digits are recorded in two-out-of-five code, and the record on the output tape TT is, therefore, in the same form as that on the input tape T.

OPERATION IN DETAIL

For a more complete understanding of the invention, the operations of the system in reading, summarizing, and transcribing data from input record tapes will now be described.

Input record tapes may be fed into the reader individually or several of them may be joined together, end to end, the splice patterns at the ends of these tapes affording space for joining the tapes, and the matching depressions of the splice patterns assuring alignment of the joined tapes. Each tape contains directory numbers of a single thousand or a single hundred, and when tapes are joined together the thousands or hundreds are in consecutive ascending numerical order. The operations for the two kinds of input tapes are similar. It will be assumed, for the purpose of illustration, that two "thousands" tapes are joined together, the first tape having directory numbers from 1000 to 1999, and the second having directory numbers from 2000 to 2999.

SWITCH SETTING

The tape-identity switches of Figs. 61 through 64 are first set manually in accordance with the type of information which will be encountered in the input tapes. It will be assumed that the tape-identity entries of these tapes have items recorded as follows:

| Item | Line of Tape-Identity Entry | Digits Recorded |
| --- | --- | --- |
| Marker Group | Second | 25 |
| Office | Fifth | 2 |
| Round | Eighth | 7 |
| Thousands Digit, First Tape | Eighth | 1 |
| Thousands Digit, Last Tape | Eighth | 2 |
| Month | Ninth | 12 |

The Tape Type switch (Fig. 61) is, therefore, set at THS for this type of input tape (position HUNDS of this switch being for records by hundreds of directory numbers rather than by thousands). The other switches are set as follows:

Switch:                                  Set at
    Marker group tens _____ 2
    Marker group units _____ 5
    Office _____ 2
    Round _____ 7
    First thousand _____ 1
    Last thousand _____ 2
    Month tens _____ 1
    Month units _____ 2

READER START

Figure 29:
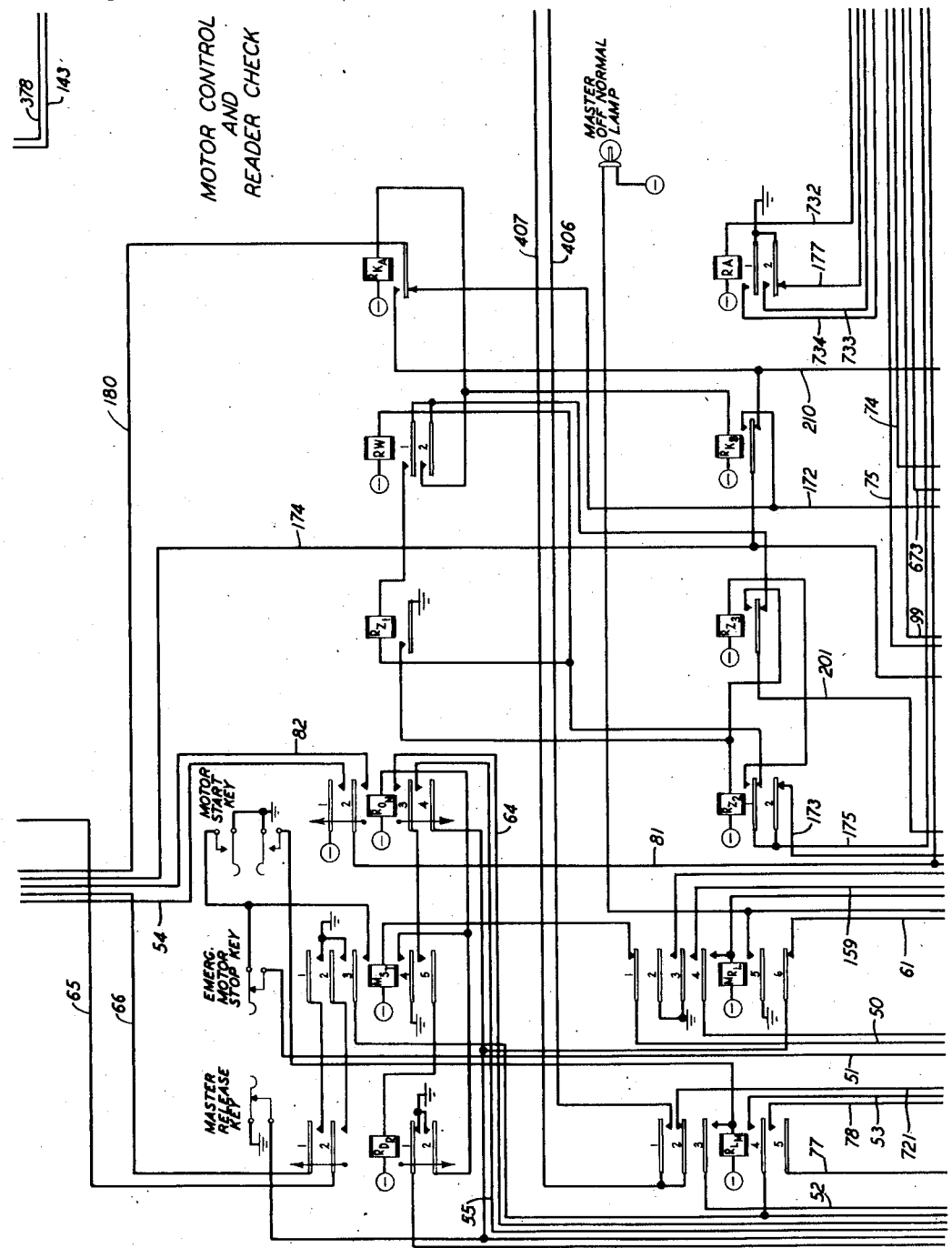
Fig. 29 shows the motor control and reader check circuits.

The Motor Start key (Fig. 29) is now operated to start the reader motor. When this key is operated, relay RLM operates over an obvious circuit. Relay MST also operates over a circuit extending from battery through the winding of said relay, No. 1 contacts of relay MRL, conductor 50, No. 2 contacts of relay AL, conductor 51, contacts of the Emerg. Motor Stop key, and upper contacts of the Motor Start key to ground.

Relay RON operates over a circuit extending from battery through the winding of said relay and No. 4 contacts of relay MST to ground, energizing the step magnet M2 over a circuit extending from battery through No. 1 contacts of relay RON, conductor 54, the winding of magnet M2, contacts of Tape Feed key, conductor 56 within bracket 57, No. 5 contacts of relay RS, conductor 58, No. 2 contacts of relay S2Y, No. 2 contacts of relay S1Y, No. 2 contacts of relay S2X, and No. 2 contacts of relay S1X to ground. With relay RON operated, the step magnet M2 is energized whenever contacts G0 are closed over an obvious circuit, preventing the reader drum from advancing beyond the position where the sensing fingers fall on one line of the record on tape T, unless said magnet is de-energized when said contacts open. From the above-traced circuit, it will be evident that relay RS, S2Y, S1Y, S2X, or S1X must operate to open the circuit of magnet M2 to allow the reader to advance, or the circuit may be opened by operation of the Tape Feed key. This key is used, therefore, to permit the reader drum to advance when feeding tape into the reader. When relay ST5 operates, as described later, the No. 1 contacts of said relay short-circuit the contacts of the Tape Feed key and this key is ineffective when said relay is operated.

Figure 8:
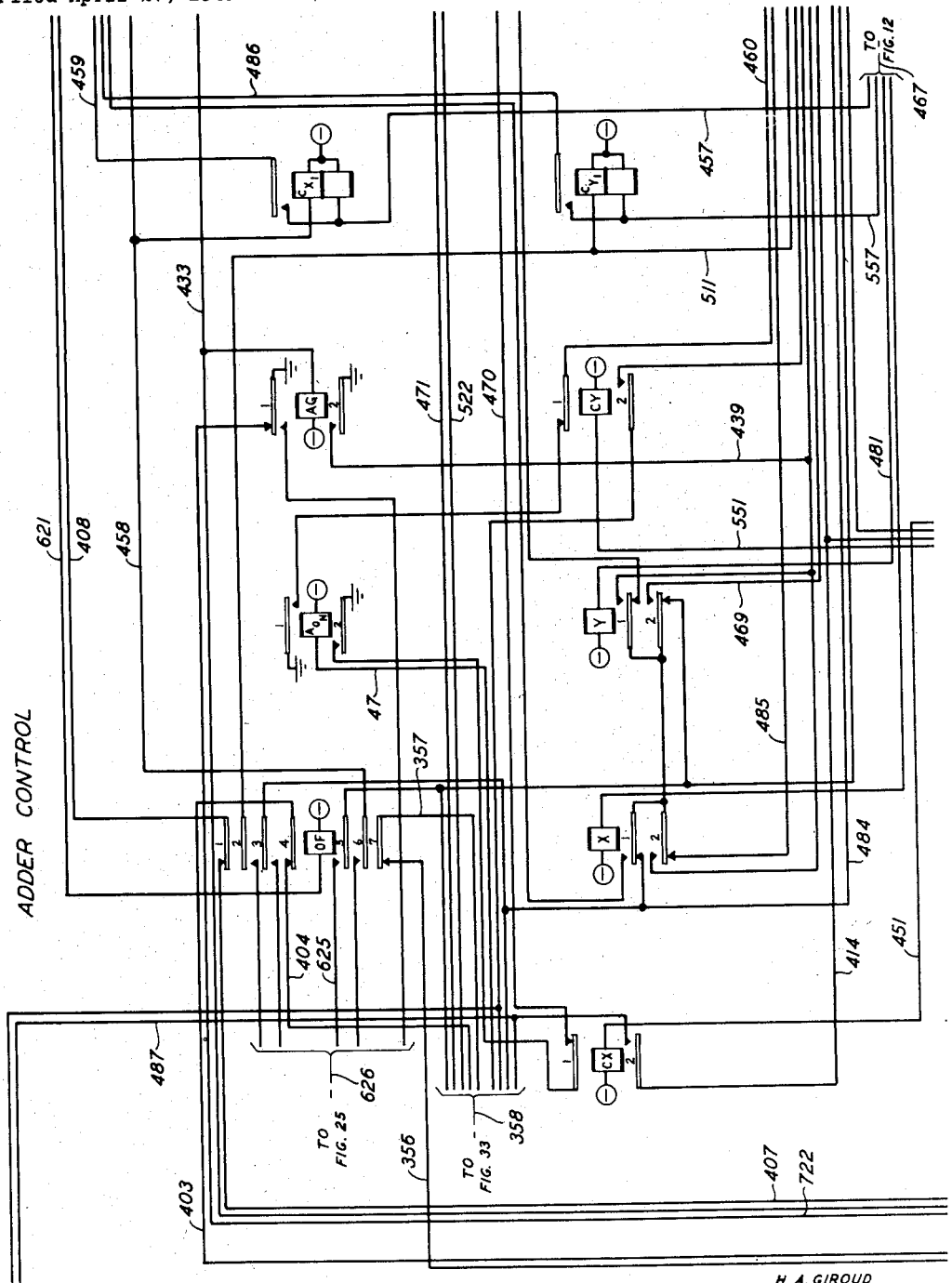
Figs. 8 through 13 show the adder control circuit.
Figure 33:
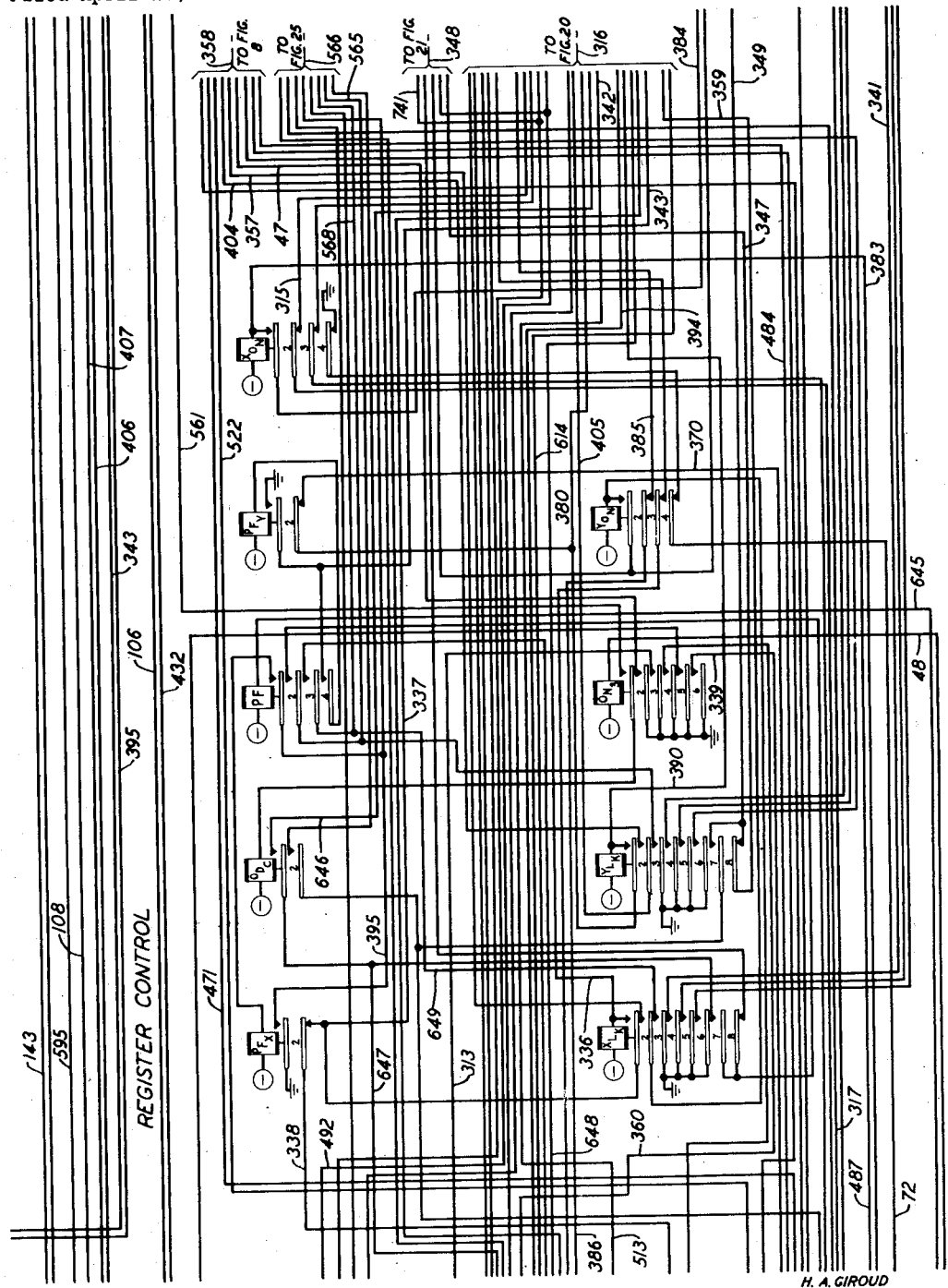
Fig. 33 shows the register control circuit.
Figure 45:
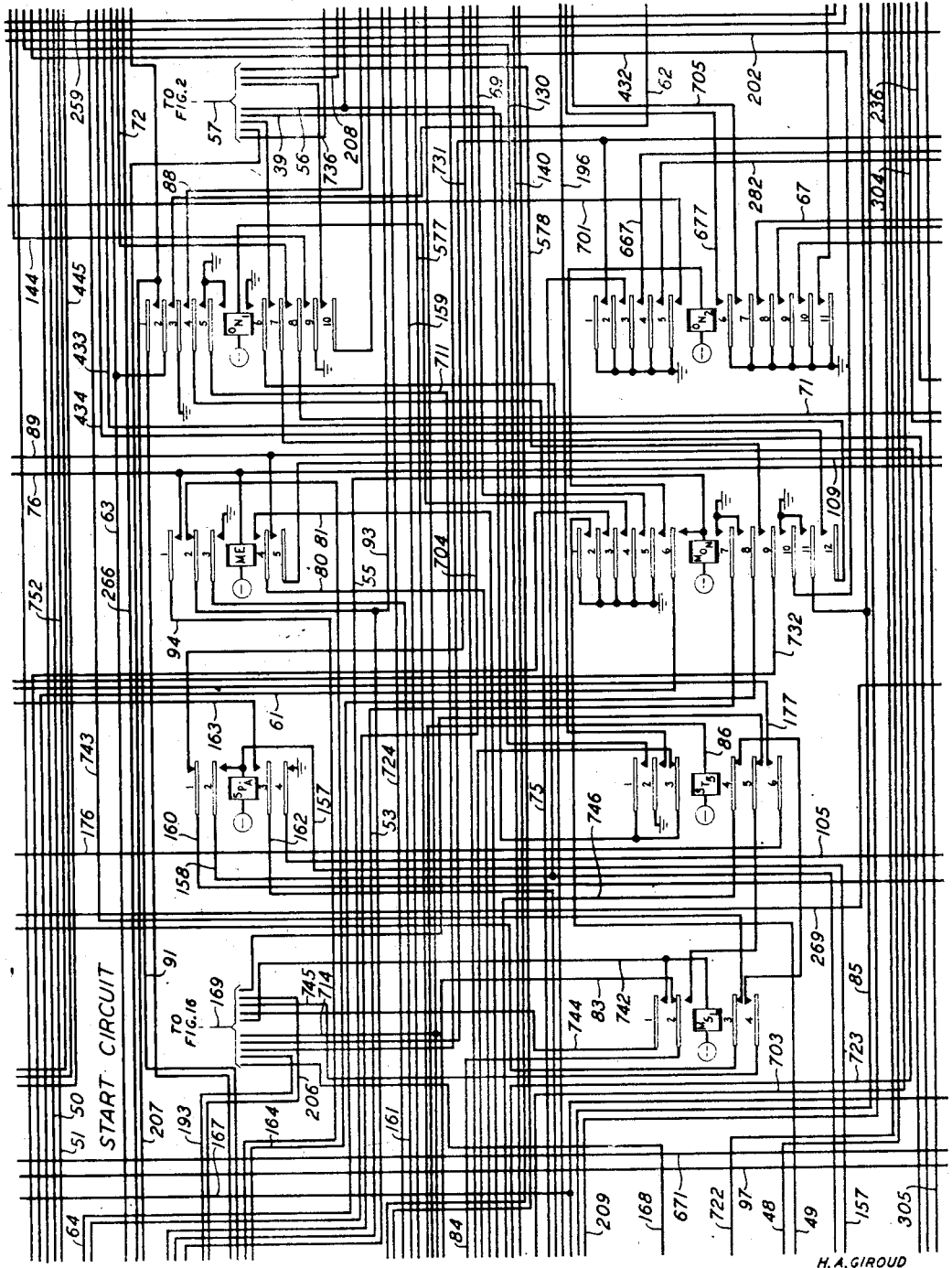
Figure 47:
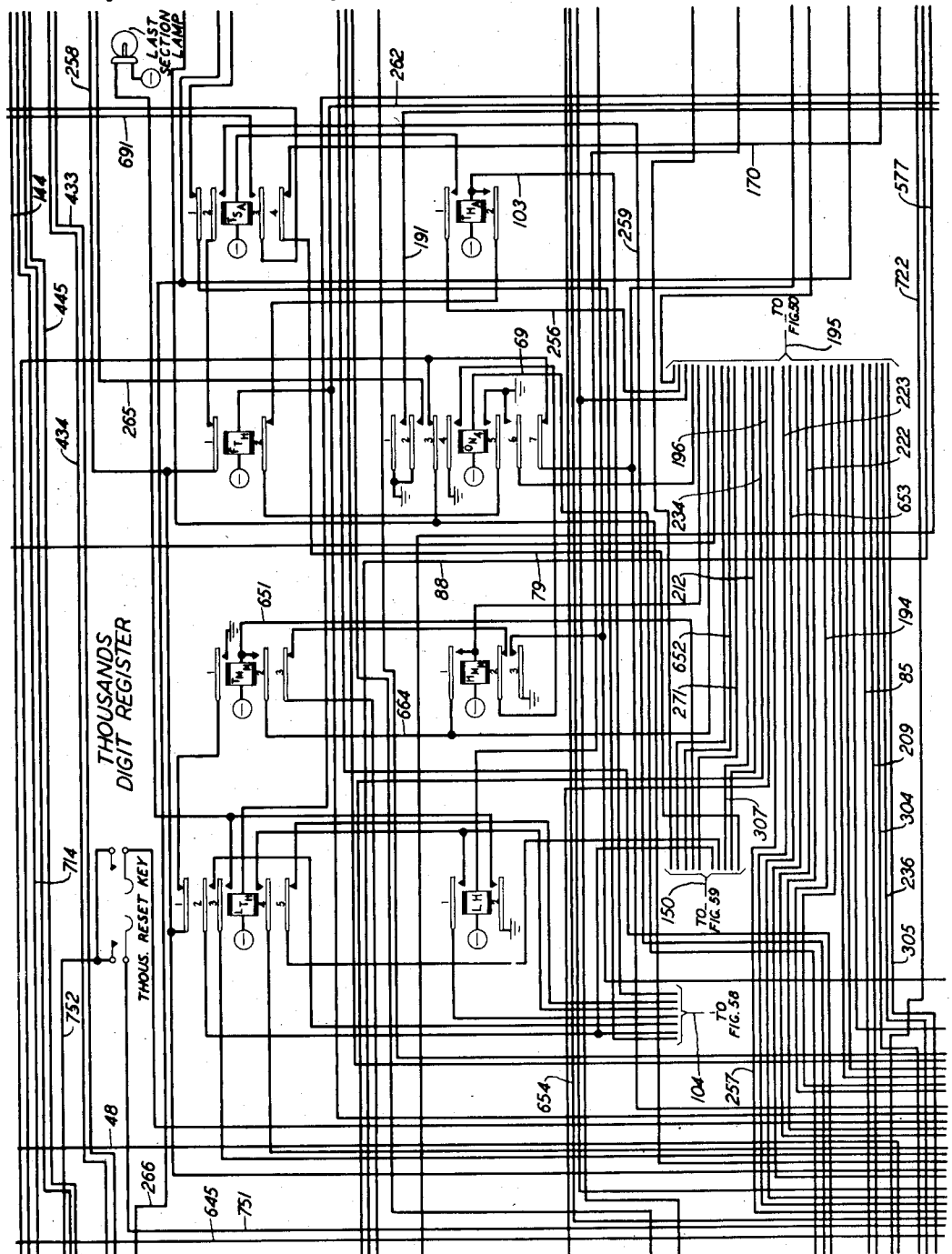
Figs. 47 through 49 show the tape-digit register circuits.

Relay MON (Fig. 45) operates over a circuit extending from battery through the winding of said relay, conductor 55, No. 4 contacts of relay RON, and contacts of Master Release key to ground, and locks up through its No. 6 contacts, conductor 61, and No. 6 contacts of relay MRL to the same ground. The Master Off-Normal lamp (Fig. 29) is lighted by relay MON over an obvious circuit. Operation of relay MON also provides a locking path for relay MST over the circuit traced above to conductor 51, thence through contacts of the Emerg. Motor Stop key, No. 3 contacts of relay MST, No. 4 contacts of relay RLM, conductor 53, and No. 7 contacts of relay MON to ground, and a locking circuit for relay RLM through its No. 3 contacts, conductor 52, upper contacts of Release key, conductor 53, and No. 7 contacts of relay MON to ground. Relays ON1 and ON2 (Fig. 45) operate over obvious circuits through contacts of relay MON to ground. Relay ON3 (Fig. 33) operates over a circuit extending from battery through the winding of said relay, conductor 48, No. 2 contacts of relay AGN, conductor 49, and No. 1 contacts of relay MON to ground, completing a circuit from battery through the winding of relay AON (Fig. 8), conductor 47 within bracket 358, and No. 2 contacts of relay ON3 to ground, over which relay AON operates. Relay ON4 (Fig. 47) operates over a circuit extending from battery through the winding of said relay, conductor 69, and No. 4 contacts of relay MON to ground. Relay RDR (Fig. 29) operates over a circuit extending from battery through the winding of said relay, No. 5 contacts of relay MST, No. 3 contacts of relay RON, conductor 64, and No. 8 contacts of relay MON to ground.

Relay RDR connects ground through No. 2 contacts of relay MST, No. 2 contacts of relay RDR, and conductor 65 to a suitable control for the power supply AC, which thereupon energizes motor M to drive the mechanism of the reader. A circuit is also completed from battery through the winding of the stop magnet M1, conductor 66, No. 1 contacts of relay RDR, and No. 1 contacts of relay MST to ground, energizing said stop magnet which permits the reader drum to be stepped by the motor M.

SPLICE PATTERN

Figure 58:
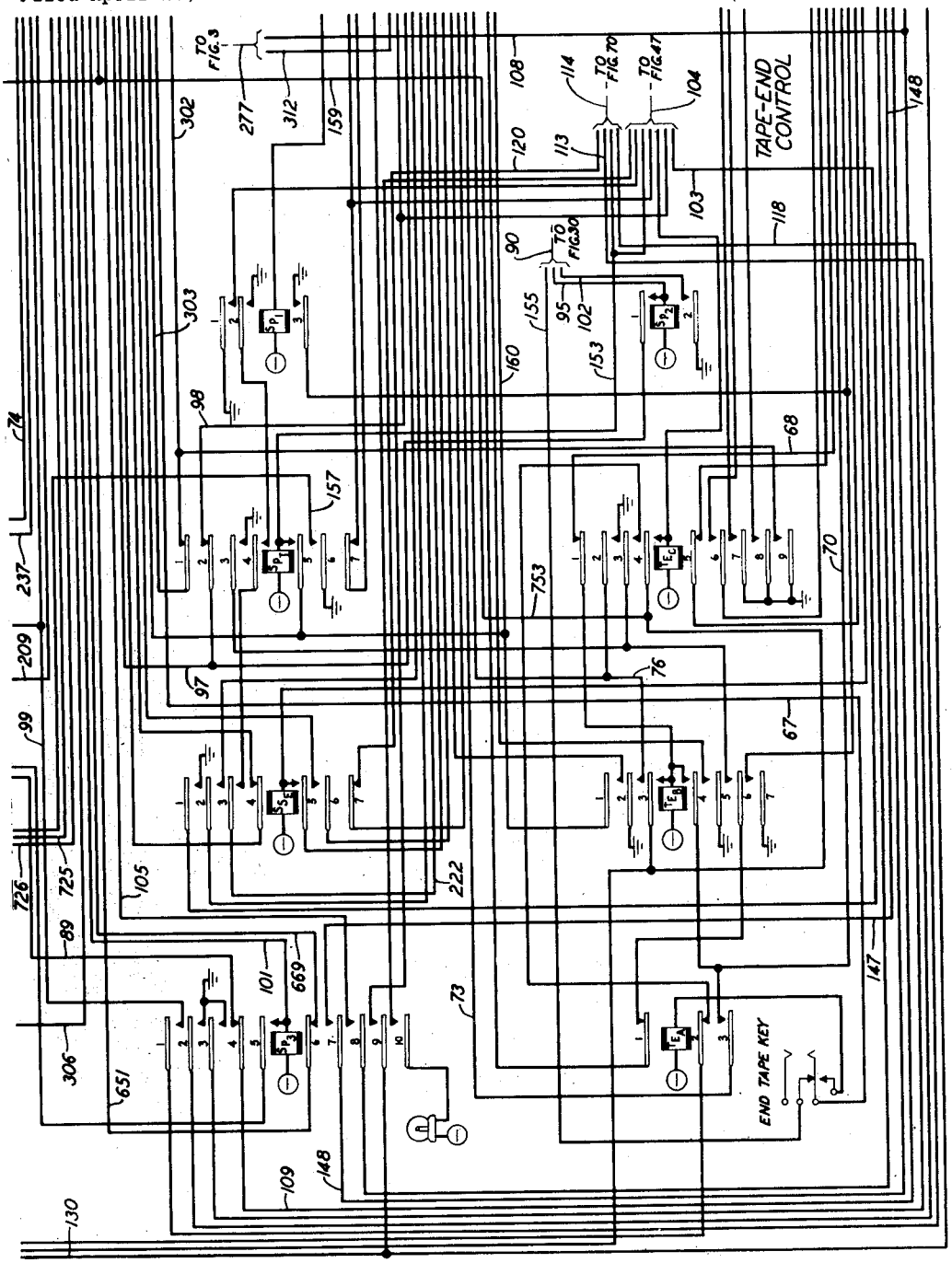
Figs. 58 through 60 show the tape-end control circuits.
Figure 59:
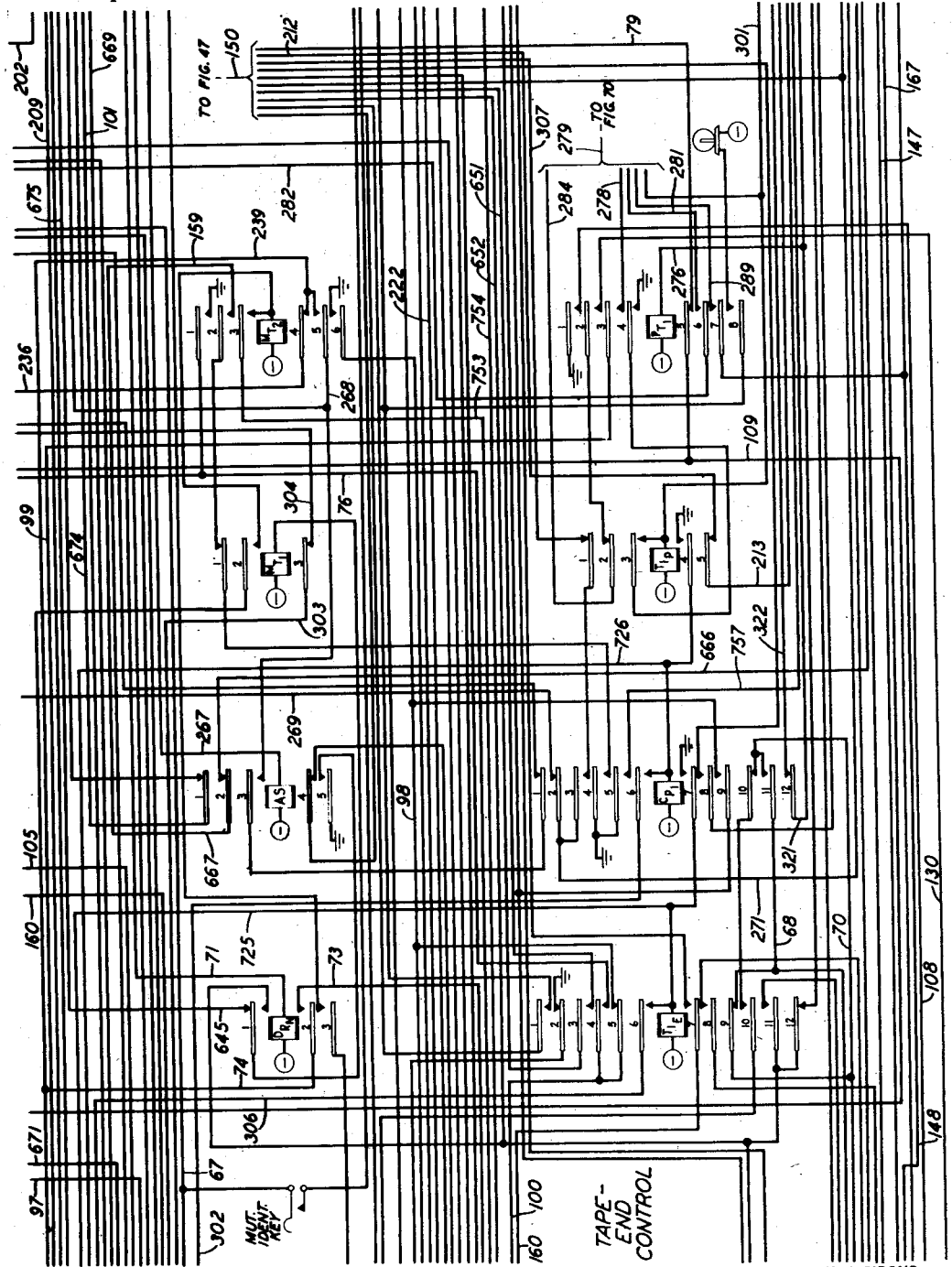

The End-Tape key (Fig. 58) is now operated to record an initial splice pattern on the output tape TT, a blank tape having been inserted in the recorder. When this key is operated, relay TEA (Fig. 58) operates over a circuit extending from battery through the winding of said relay, front contacts of the End Tape key, conductor 67, and No. 8 contacts of relay ON2 to ground. When relay ON1 operated, as described above, relay DRN (Fig. 59) operated over a circuit extending from battery through the winding of said relay, conductor 71, No. 8 contacts of relay ON1, conductor 72, No. 4 contacts of relay YON, and No. 4 contacts of relay XON to ground. Relay TEB (Fig. 58) now operates over a circuit extending from battery through the winding of said relay, No. 1 contacts of relay TEC, conductor 68, No. 9 contacts of relay TIE, conductor 70, No. 3 contacts of relay TEA, conductor 73, No. 2 contacts of relay DRN, conductor 74, No. 7 contacts of relay ST4, conductor 75, and No. 4 contacts of relay ON1 to ground, completing a circuit from battery through the winding of relay ME (Fig. 45) conductor 76, and No. 2 contacts of relay TEB to ground, over which relay ME operates.

When contacts H7C close, relay ST1 (Fig. 44) operates over a circuit extending from battery through the winding of said relay, conductor 77, No. 5 contacts of relay RLM, conductor 78, No. 1 contacts of relay RLS, No. 1 back contacts of relay ST2, conductor 80, No. 4 contacts of relay ME, conductor 81, No. 2 contacts of relay RON, conductor 82, and contacts H7C to ground. When said contacts open, relay ST2 (Fig. 44) operates in series with relay ST1 over a circuit extending from battery over the path traced above through No. 1 contacts of relay RLS, thence through the winding of relay ST2 and No. 4 contacts of relay ST1 to ground. When contacts H7C again close, relay ST3 (Fig. 44) operates over a circuit extending from battery through the winding of said relay, conductor 83, No. 2 contacts of relay MSL, conductor 84, and No. 1 front contacts of relay ST1 to the ground previously traced on conductor 80, and locks up through its No. 6 contacts, No. 4 contacts of relay RLS, No. 1 contacts of relay AGN, conductor 85, and No. 11 contacts of relay MON to ground. Relay ST4 (Fig. 44) operates over an obvious circuit through No. 5 contacts of relay ST3 to ground, and relay ST5 (Fig. 44) operates over a circuit extending from battery through the winding of said relay, conductor 86, and No. 10 contacts of relay ST3 to ground. Relay RCD (Fig. 3) operates over a circuit extending from battery through the winding of said relay, conductor 91 within bracket 92, No. 1 contacts of relay AL, conductor 93, and No. 4 contacts of relay ST3 to ground. Relay ME is now locked up over a circuit extending from battery through the winding and No. 1 contacts of said relay, conductor 94 within bracket 92, and No. 7 contacts of relay RCD to ground.

Relay SP2 (Fig. 58) operates over a circuit extending from battery through the winding of said relay, conductor 95 within bracket 96, No. 2 contacts of relay LAS, conductor 97, No. 2 contacts of relay SPT, conductor 98, No. 5 contacts of relay TIE, conductor 100, and No. 5 contacts of relay TEB to ground, and locks up through its No. 1 contacts to the same ground, completing a circuit from battery through the winding of relay SP3, conductor 101, No. 1 contacts of relay WS5, No. 2 contacts of relay WS2, No. 2 contacts of relay SP2 to ground, over which relay SP3 operates. Relay THA (Fig. 47) operates over a circuit extending from battery through the winding of said relay, conductor 103 within bracket 104, No. 8 contacts of relay SP3, conductor 105, and No. 4 contacts, No. 2 contacts of relay FTH, and No. 5 contacts of relay ON4 to ground.

Figure 42:
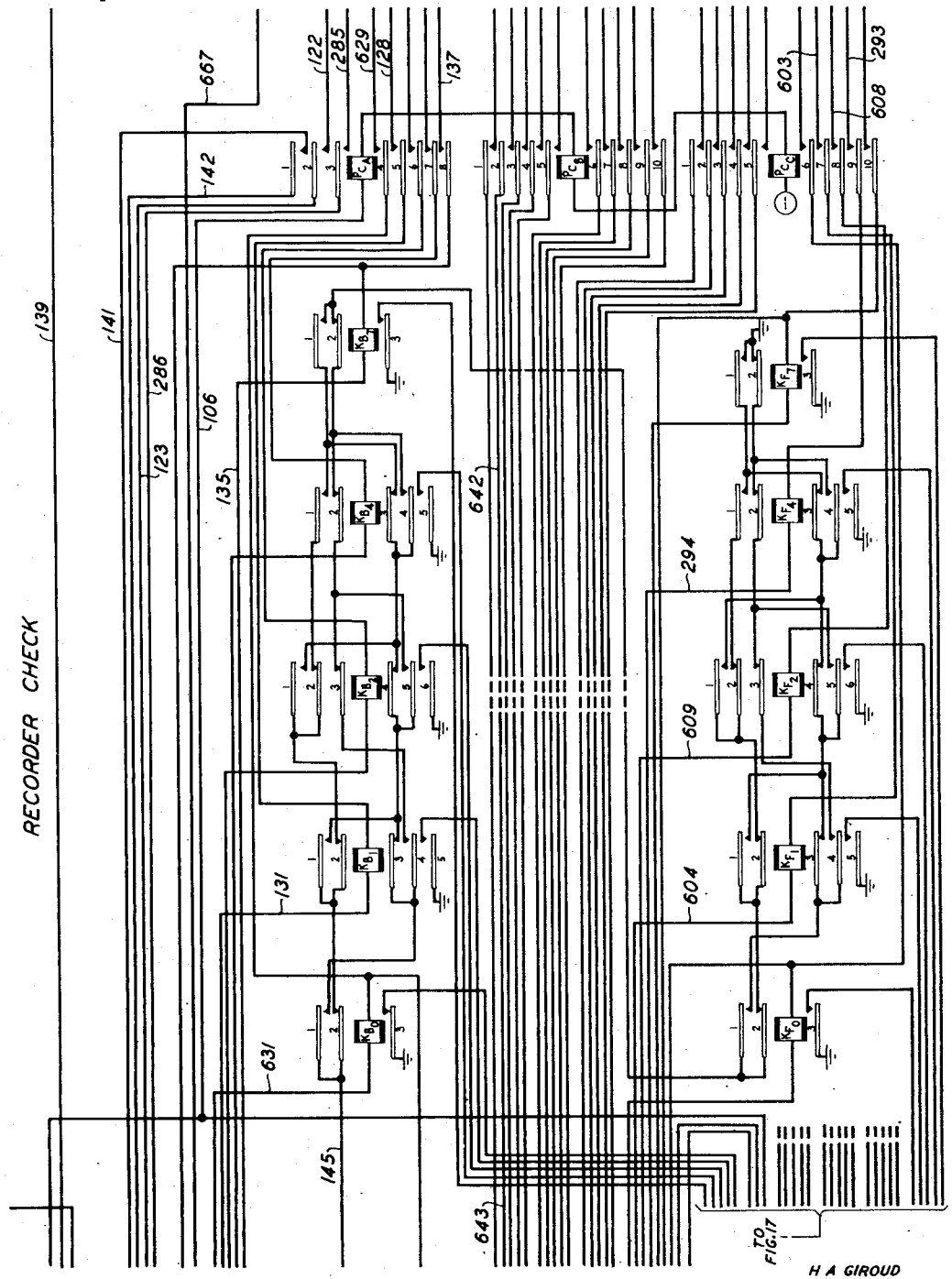
Figure 68:
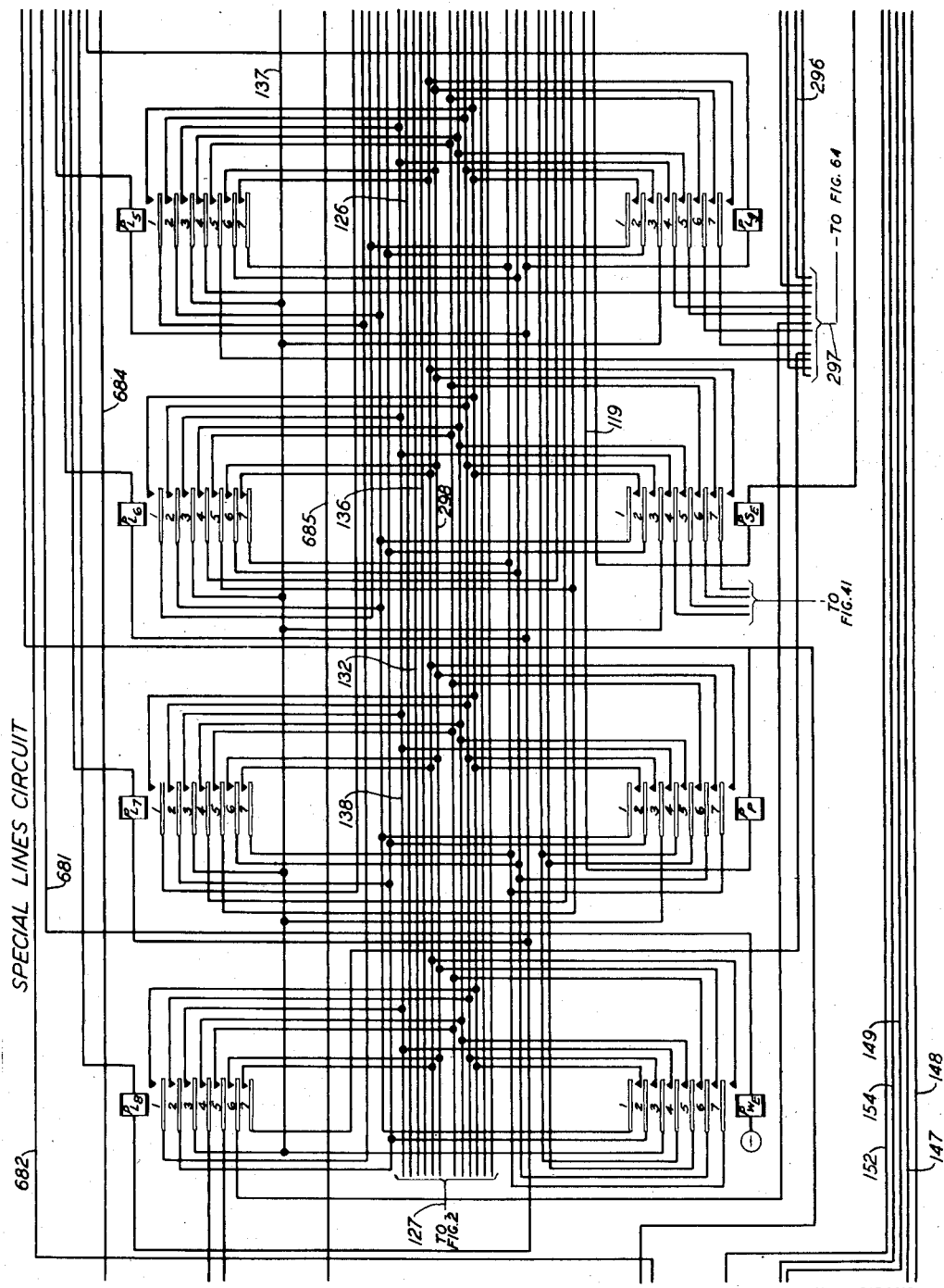
Figure 69:
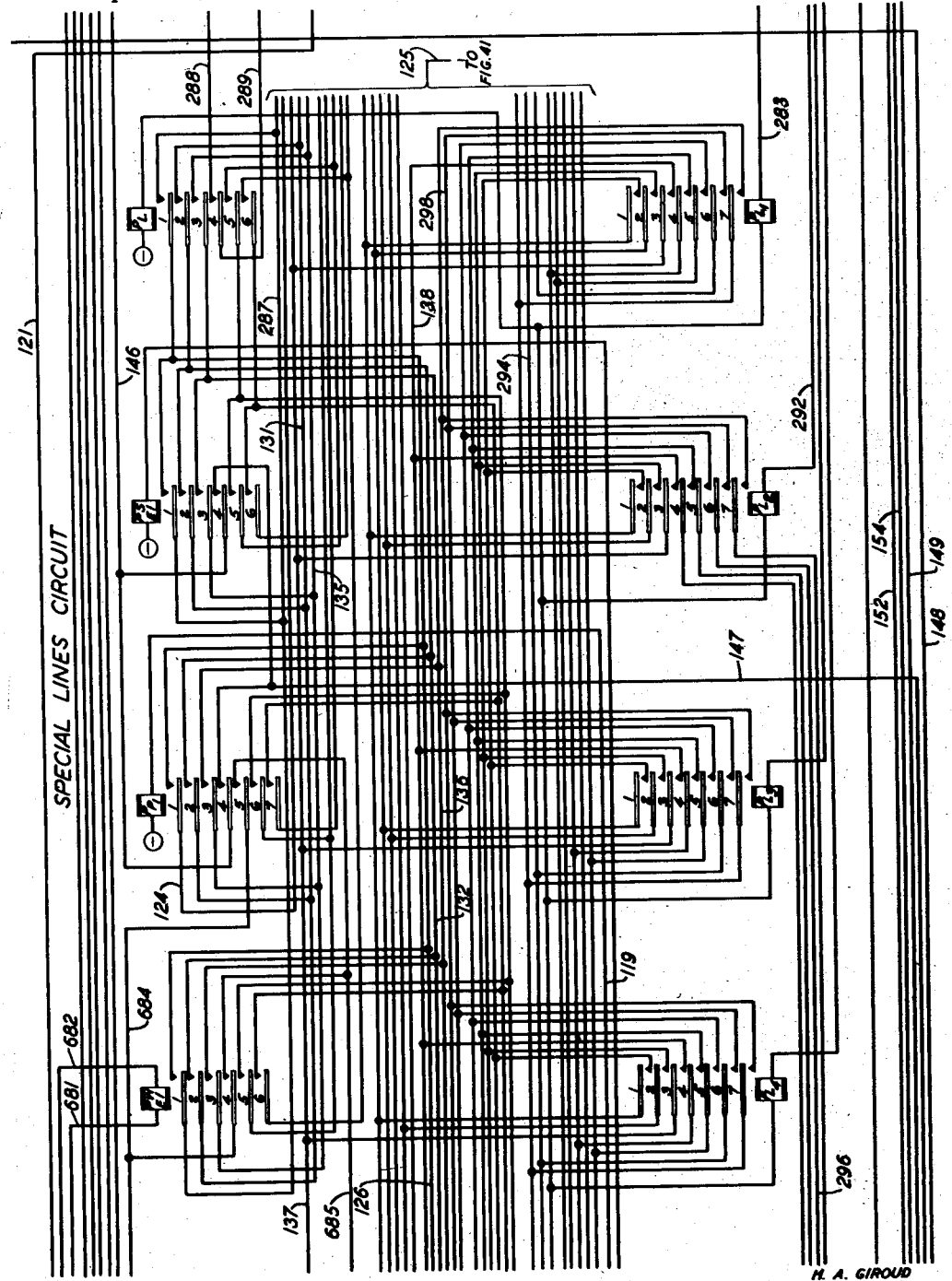
Figure 70:
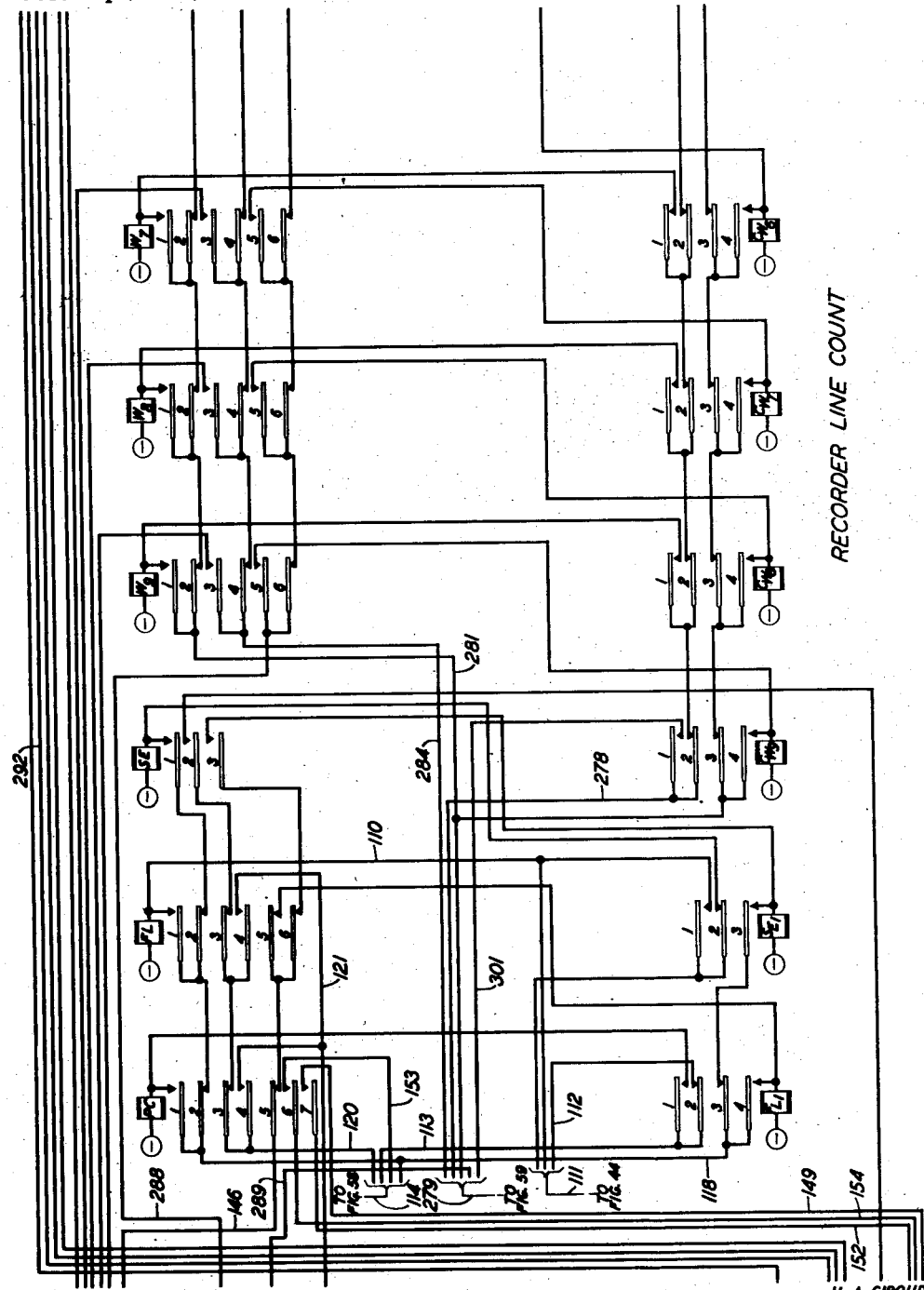
Figs. 70 and 71 show the recorder line-count circuit.

Relays PCA, PCB, and PCC (Fig. 42) now operate over a circuit extending from battery through the windings of said relays in series, conductor 106 within bracket 107, No. 9 contacts of relay RCD, conductor 108, and No. 3 contacts of relay SP3 to ground. Relays PCA, PCB and PCC connect magnets of the recorder to the control circuits for recording. When contacts K7 close, relay FL (Fig. 70) operates over a circuit extending from battery through the winding of said relay, conductor 110 within bracket 111, No. 9 back contacts of relay MLK, conductor 112 within bracket 111, No. 2 contacts of relay FL1, conductor 113 within bracket 114, No. 1 contacts of relay SP3, conductor 99, No. 6 contacts of relay ST4, conductor 116 within bracket 92, No. 3 contacts of relay RCD, conductor 117, and contacts K7 to ground, and locks up through its No. 1 contacts, No. 2 contacts of relay PC, conductor 118 within bracket 114, and No. 2 contacts of relay SP3 to ground. When contacts PO now close, relays PP (Fig. 68) and PP1 (Fig. 69) operate over a circuit extending from battery through the winding of relay PP1, conductor 119, winding of relay PP, conductor 121, No. 4 contacts of relay FL, No. 3 contacts of relay PC, conductor 120 within bracket 114, No. 9 contacts of relay SP3, No. 11 contacts of relay ST3, conductor 140 within bracket 92, No. 1 contacts of relay RCD, conductor 150, and contacts P0 to ground. Relays PP and PP1 in conjunction with relays PCA, PCB and PCC connect cam contacts of the reader to magnets MA0 ... MF7 (Fig. 43) of the record to operate said magnets to record the digits "081010" on the tape TT. For example, when cam contacts of the reader close, magnet MA0 operates over a circuit extending from battery through the winding of said magnet, conductor 122, No. 2 contacts of relay PCA, conductor 123, the winding of relay KA0, conductor 124 within bracket 125, No. 1 contacts of relay PP1, conductor 126 within bracket 127, and contacts PA2 to ground, punching a depression in tape TT whose position indicates the digit "0." Magnet MB1 operates over a circuit extending from battery through the winding of said magnet, conductor 128, No. 5 contacts of relay PCA, the winding of relay KB1, conductor 131 within bracket 125, No. 2 contacts of relay PP1, conductor 132 within bracket 127, and contacts PB0 to ground. Magnet MB7 operates over a circuit extending from battery through the winding of said magnet, conductor 133, No. 8 contacts of relay PCA, the winding of magnet KB7, conductor 135 within bracket 125, No. 2 contacts of relay PP1, conductor 136 within bracket 127, and contacts PB1 to ground. These two magnets punch depressions which, by their positions according to the code previously given, record the digit "8." Other magnets of the recorder operate in a similar manner to record, in the same code, the digits "1010."

Figure 41:
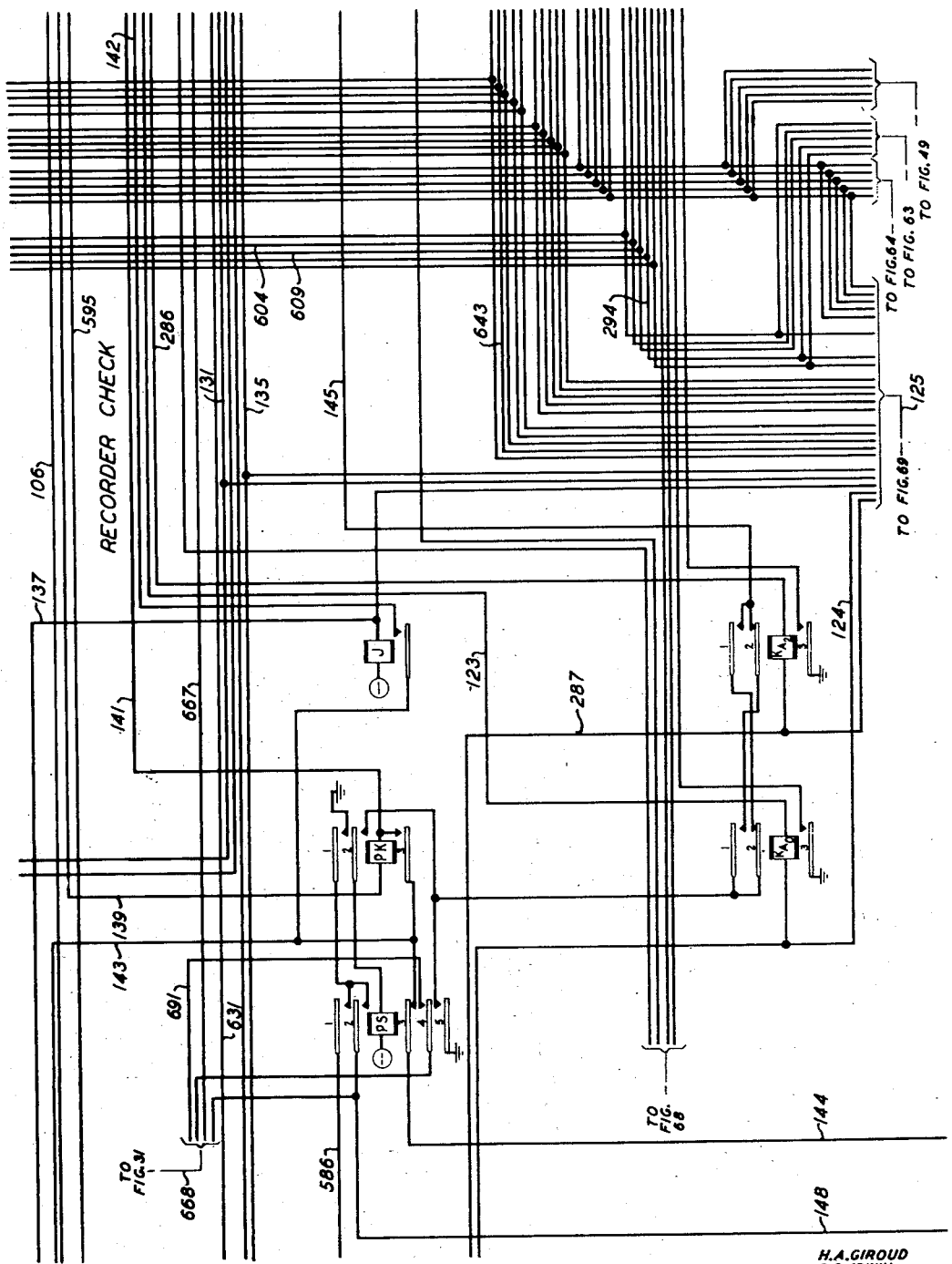
Figs. 41 and 42 show the recorder check circuit.

The checking relays KA0, KB1 and KB7 also operate over the circuits traced above. Similar checking relays (not shown) for the third, fourth, and fifth digits recorded and relays KF4 and KF7 for the last digit, operate in a similar manner. When the late-make contacts J0 close, a circuit is completed from battery through the winding of relay J (Fig. 41), conductor 137 within bracket 125, No. 3 contacts of relay PP, conductor 138 within bracket 127, and contacts J0 to ground, over which relay J operates. The paper-advance magnet PAM of the recorder and relay PK (Fig. 41) now operate in series over a circuit extending from battery through the winding of magnet PAM, conductor 139, winding of relay PK, conductor 141, No. 1 contacts of relay PCA, conductor 142, contacts of relay J, conductor 143 within the bracket 107, and contacts J4 (which are now closed) to ground. Said relays lock up from conductor 143 through No. 3 contacts of relay PS, conductor 144, and No. 9 contacts of relay ON1 to ground.

If all the proper check relays have been operated, as described above, which should be the case if all the proper punch magnets of the recorder have been operated, a path is closed from battery through the winding of relay PS (Fig. 41), No. 2 contacts of relay PK, No. 1 contacts of relay KA0, No. 2 contacts of relay KA2, conductor 145, No. 2 contacts of relay KB0, No. 1 contacts of relay KB1, No. 4 contacts of relay KB2, No. 3 contacts of relay KB4, No. 1 contacts of relay KB7, through similar contacts of other check relays not shown, No. 2 contacts of relay KF0, No. 1 contacts of relay KF1, No. 4 contacts of relay KF2, No. 3 contacts of relay KF4, and No. 1 contacts of relay KF7 to ground, over which relay PS operates. The contacts of the check relays are so arranged that unless either relay KA0 or relay KA2, but not both, and exactly two of each of the other sets of relays KB0 . . . KB7 to KF0 . . . KF7, are operated, this path is not closed through, and relay PS does not operate. Operation of relay PS, therefore, constitutes a check on the operation of the proper punch magnets of the recorder.

Figure 30:
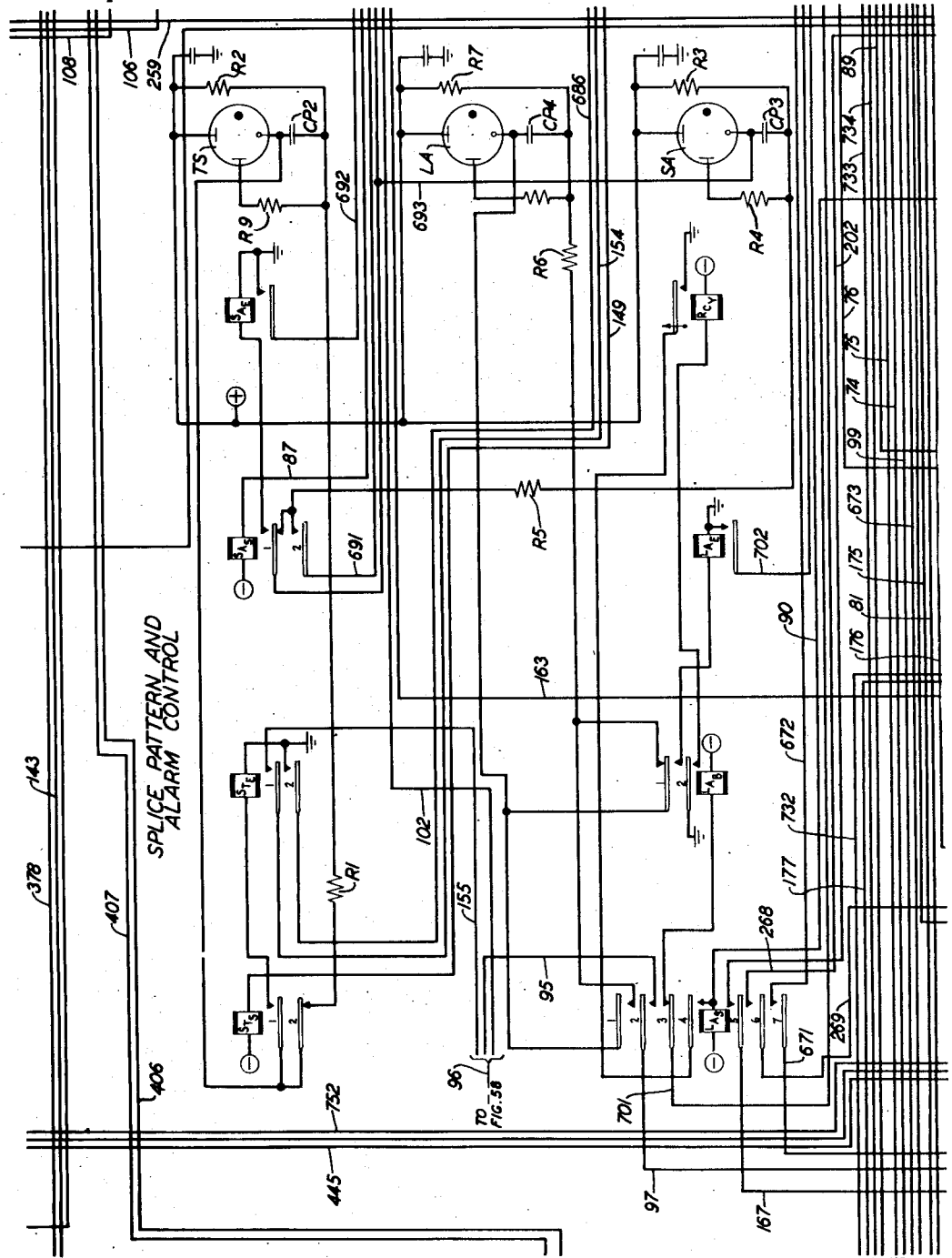
Figs. 30 and 31 show the splice pattern and alarm control circuits.

Assuming that relay PS operates, this relay locks up through No. 2 contacts of relay PK and its own No. 5 contacts to ground. Relay FL1 (Fig. 70) then operates over a circuit extending from battery through the winding of said relay, No. 5 contacts of relay FL, No. 5 contacts of relay PC, conductor 146, No. 4 contacts of relay PP1, conductor 147, No. 7 contacts of relay SP3, conductor 148, No. 2 contacts of relay PS, and No. 1 contacts of relay PK to ground, and locks up through its No. 4 contacts and No. 2 contacts of relay PC to the previously-traced ground on conductor 118. When the cam contacts of the reader open, the circuits of the operated punch magnets and the associated check relays are thereby opened and said magnets and relays released. Relays PP and PP1 release when contacts P0 open, releasing relay J. When contacts K7 again close, relay PC (Fig. 70) operates over a circuit extending from battery through the winding of said relay, No. 1 contacts of relay FL1, conductor 113 within bracket 114, No. 1 contacts of relay SP3, conductor 99, No. 6 contacts of relay ST4, conductor 116 within bracket 92, No. 3 contacts of relay RCD, conductor 117, and contacts K7 to ground, and locks up through its No. 1 contacts to the previously-traced ground on conductor 118, opening the locking circuit of and releasing relay FL. Relay STS (Fig. 30) operates over a circuit extending from battery through the winding of said relay, conductor 149 within bracket 151, No. 7 contacts of relay PC, conductor 152 within bracket 151, and No. 5 contacts of relay WS1 to ground. Relay STS starts a timing circuit described below.

Figure 5:
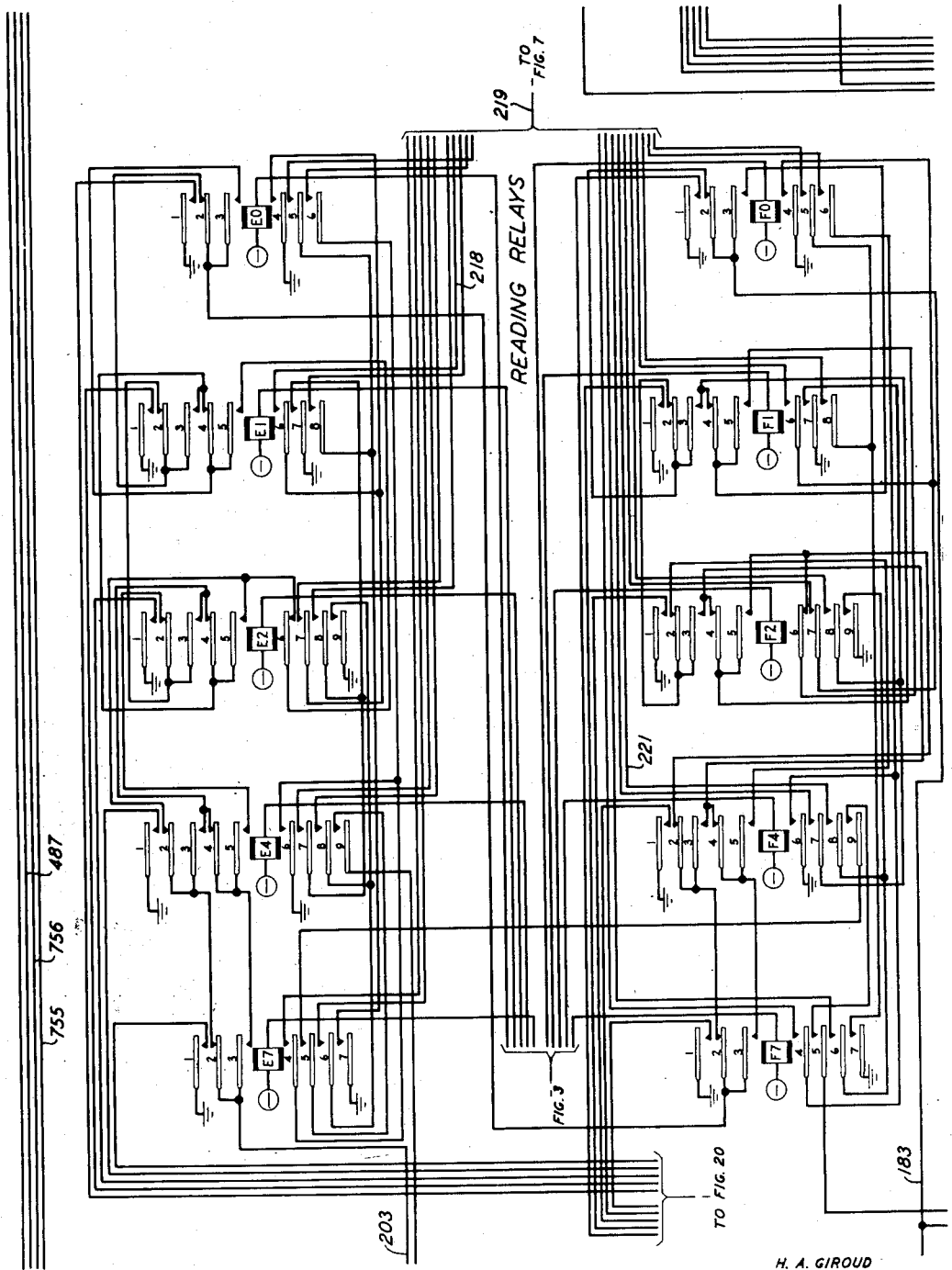
Figure 6:
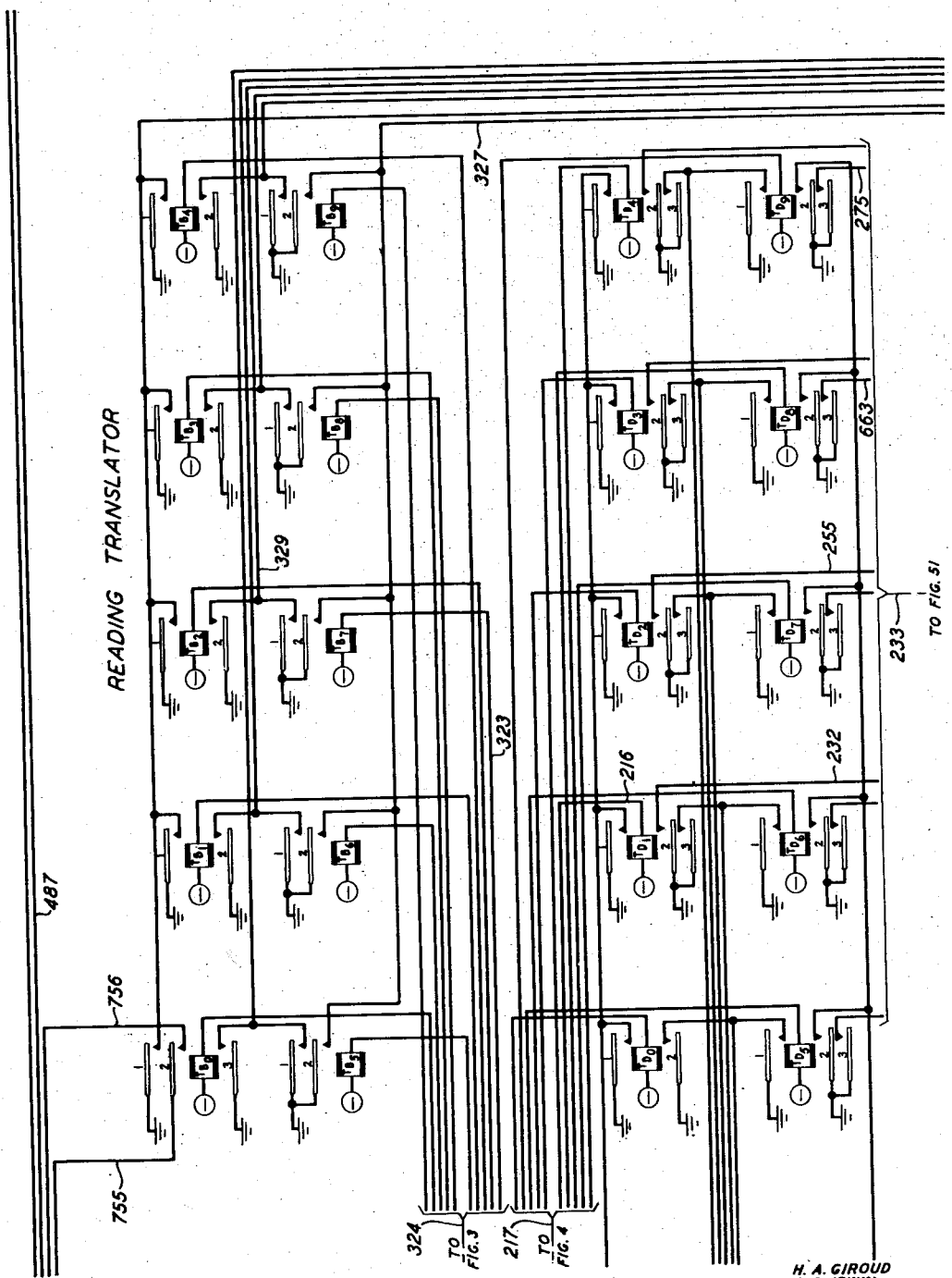
Figs. 6 and 7 show the reading translator circuit.
Figure 7:
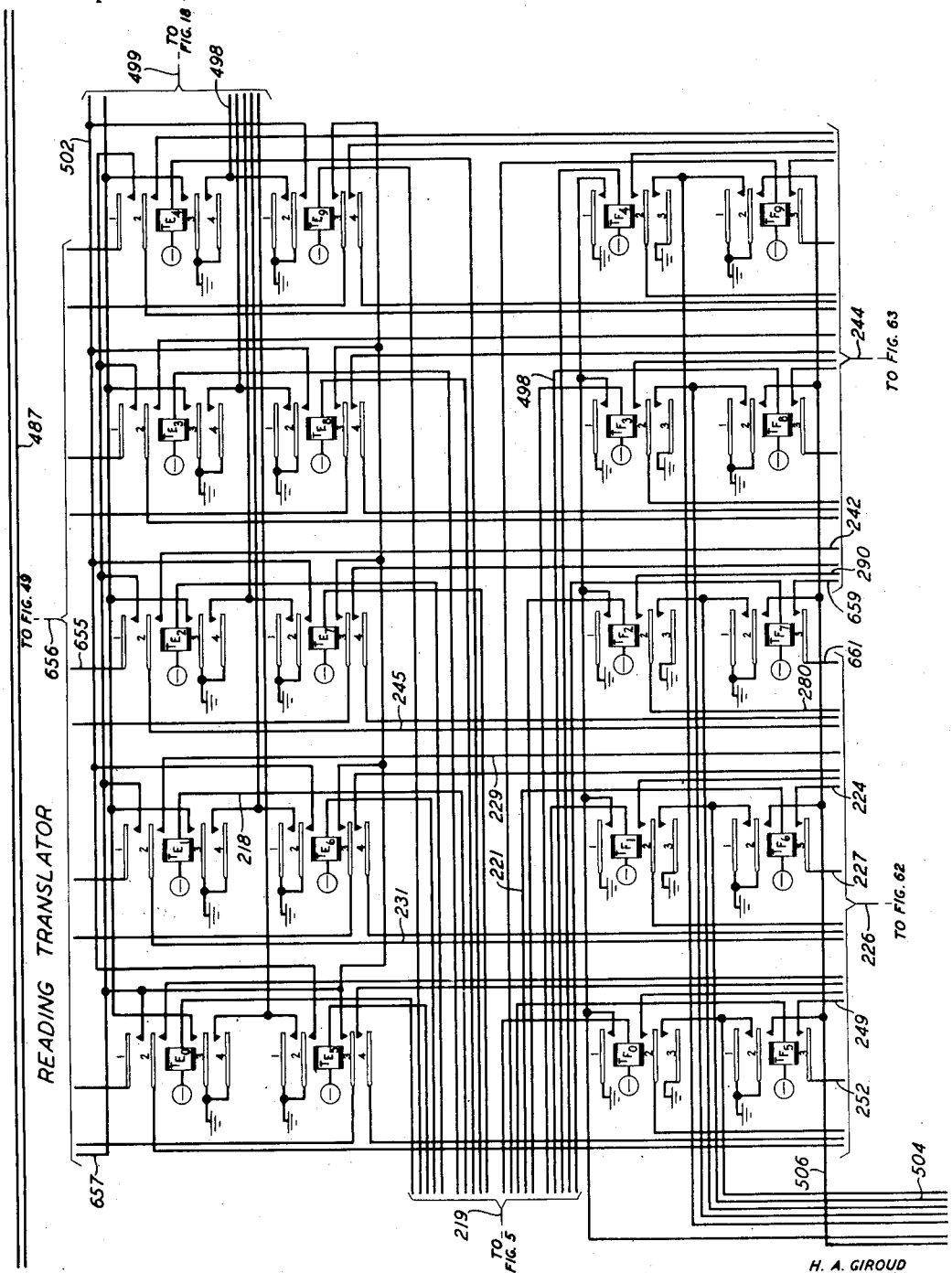

When contacts J4 open, the circuit of the paper-advance magnet PAM and relay PK is thereby opened, releasing said magnet and said relay. The release of the paper-advance magnet PAM advances tape TT to a position for recording another line. By the release of relay PK, the locking circuit of relay PS is opened and said latter relay released. Whenever contacts P0 again close, relays PP and PP1 reoperate, as described above, and the recording operations described above are repeated, recording on tape TT successive lines of the digits "081010." When relay STS operates, however, as described above, its No. 2 contacts open the short circuit through resistor R1 around capacitor CP2, and the No. 1 contacts of said relay connect the cathode of the gas tube TS to ground through the winding of relay STE. Capacitor CP2 then charges from positive battery through resistor R2, and to ground through No. 1 contacts of relay STS and the winding of relay STE. When the potential at capacitor CP2 and through resistor R9 at the starting element of tube TS reaches the starting potential of said tube, said tube fires to its starting element and then across its anode-cathode path through No. 1 contacts of relay STS and the winding of relay STE to ground, operating the latter relay. If the End Tape key has been released, relay SPT (Fig. 5) then operates over a circuit extending from battery through the winding of said relay, conductor 153 within bracket 114, No. 6 contacts of relay PC, conductor 154 within bracket 151, No. 1 contacts of relay STE, conductor 155 within bracket 96, back contacts of End Tape key, conductor 87, and No. 8 contacts of relay ON2 to ground, and locks up through its No. 5 contacts, No. 1 contacts of relay TEB, conductor 156 and No. 1 contacts of relay ON2 to ground, opening the locking circuit of and releasing relay SP2. If the End Tape key has not been released, operation of relay SPT awaits the release of said key while the recording of successive lines of the digits "081010" continues, as described above. Operation of relay SPT completes a circuit from battery through the winding of relay SPA (Fig. 45), conductor 157, and No. 6 contacts of relay SPT to ground, over which relay SPA operates, and said relay locks up through its No. 2 contacts, conductor 158, and No. 2 contacts of relay ON2 to ground. When the End Tape key is released, relay TEA is thereby released and relay RLS (Fig. 44) now operates over a circuit from battery through the winding of said relay, conductor 159, No. 1 contacts of relay TEA, No. 6 contacts of relay TEB, and No. 3 contacts of relay SPT to ground, and locks up through its No. 2 contacts, conductor 161, and No. 3 contacts of relay ME to ground. When contacts K1 now open, the circuit of relay SP3 is thereby opened and said relay released, said contacts serving to hold said relay operated until the punch magnets are released after punching a line in tape TT. Release of relay SP3 releases relays FL1 and PC, which in turn, release relay STS. The circuit of tube TS is thereby opened and relay STE released, while capacitor CP2 discharges through resistor R1. Operation of relay RLS, described above, opens the circuits of and releases relays ST1 . . . ST5. Relay ST1 opens the circuit of and releases relay TEB which, in turn, releases relay SPT. When contacts H5C now open, the circuit of relay RCD is thereby opened and said relay released, opening the locking circuit of and releasing relay ME, which, in turn releases relay RLS. These operations terminate the recording of splice pattern and prepare the circuits for further operations.

START

The input record tape T is now fed into the reader and the Start key (Fig. 44) operated. When the contacts H7C thereafter close, relay ST1 operates over a circuit extending from battery through the winding of said relay, conductor 77, No. 5 contacts of relay RLM, conductor 78, No. 1 contacts of relay RLS, No. 1 contacts of relay ST2, upper contacts of Start key, conductor 162, No. 3 contacts of relay SPA, conductor 163, No. 3 contacts of relay WS1, conductor 81, No. 2 contacts of relay RON, conductor 82, and contacts H7C to ground. Relays RCA, RCB and RCC (Fig. 3) then operate over a circuit extending from battery through the windings of said relays in parallel, conductor 164 within bracket 92, No. 2 contacts of relay ME, conductor 93, and No. 3 contacts of relay ST1 to ground. Relay RCD operates over a circuit extending from battery through the winding of said relay, conductor 91 within bracket 92, and No. 1 contacts of relay AL to the same ground on conductor 93. When contacts H7C open, relay ST2 operates in series with relay ST1, causing the operation of relays ST3, ST4 and ST5 as previously described.

READER STEP CHECK

The fingers G1 and G2 of the reader are similar to sensing fingers. They are lifted and lowered in unison with the sensing fingers by the mechanism operated by motor M. They do not fall, however, on the tape T, but upon a portion of the drum which has a hole in alignment with finger G1 at every odd position of the drum and a hole in alignment with the finger G2 at every even position of the drum. When the reader drum steps normally, finger G1 encounters a hole and closes its contacts when finger G2 does not encounter a hole and does not close its contacts, while on the next step of the drum, the contacts of finger G2 close but not the contacts of finger G1. These contacts, therefore, normally close alternately and are used, in conjunction with relays RW, RKA, RKB, RZ1, RZ2, and RZ3 (Fig. 29) to check the stepping operations of the reader drum. The circuit is so arranged, as described below, that, when the drum steps normally, relays RKA and RKB are not operated when the contacts of finger G1 close and are operated when the contacts of finger G2 close. However, if the drum fails to step, the contacts of finger G1 close when relays RKA and RKB are operated, or the contacts of finger G2 close when said relays are not operated, which is an indication of failure of the drum to step. The results of this and other indications of the circuit are described below.

At the start of the reading of tape T, relays RKA and RKB are not operated. If then the contacts of finger G1 close, conductor 172 is grounded through back contacts of relay RKA, conductor 180, and contacts of finger G1 to ground, indicating normal operation of the reader drum. The grounding of conductor 172 causes, in a manner described later, the grounding of conductor 175 when the sensing fingers are raised and contacts of finger G1 thereby opened. Relay RW then operates over a circuit extending from battery through the winding of said relay and No. 1 back contacts of relay RZ2 to said ground on conductor 175. Relays RKA and RKB operate over a circuit extending from battery through the windings of said relays in parallel, No. 2 contacts of relay RW, back contacts of relay RZ3, conductor 201, and No. 2 contacts of relay ST1, or No. 3 contacts of relay ST3, to ground. When ground is removed from conductor 175, relay RZ1 operates in series with relay RW through No. 1 contacts of the latter relay and back contacts of relay RZ3 to the ground on conductor 201, operating relay RZ2 over an obvious circuit. If the drum now fails to step, the contacts of finger G1 again close when the sensing fingers are lowered. Conductor 172 is not grounded thereby but conductor 210 is grounded through front contacts of relay RKA, conductor 180, and contacts of fingers G1 to ground, indicating failure of the drum to step. If, however, the drum steps and the contacts of finger G2 close, conductor 172 is grounded through front contacts of relay RKB, conductor 174, and contacts of finger G2 to ground. Ground on conductor 172, when contacts of finger G2 open, causes the grounding of conductor 175, as before, operating relay RZ3 over a circuit extending from battery through the winding of said relay and No. 1 front contacts of relay RZ2 to said ground on conductor 175. Operation of relay RZ3 opens the circuit of and releases relays RW, RZ1, RKA, and RKB. When ground is removed from conductor 175, relay RZ3 releases, which in turn releases relay RZ2. The circuit is now in its original condition. Should the drum fail to step, however, the contacts of finger G2 would again close. Conductor 172 would not then be grounded but conductor 210 would be grounded through back contacts of relay RKB, conductor 174, and contacts of finger G2 to ground, indicating failure of the drum to step.

At the start of the reading of tape T, when relays RKA and RKB are not operated, the reader may be started in such a position that the contacts of finger G2 close first. This is the condition which normally indicates failure of the drum to step, as described above. However, under these circumstances, when relay ST1 is operated and relay ST3 is not yet operated, relay RW operates over a circuit extending from battery through the winding of said relay, No. 1 back and No. 2 contacts of relay RZ2, conductor 173, No. 1 contacts of relay ST1, No. 2 contacts of relay ST3, conductor 174, and contacts of finger G2 to ground. As described above, operation of relay RW causes the operation of relays RKA and RKB. Conductor 172 is then grounded through front contacts of relay RKB, conductor 174, and contacts of finger G2 to ground, indicating that the drum is operating normally. When relay ST3 operates, the operating circuit of relay RW, traced above, is opened and normal operation of the circuits is resumed.

READER INPUT TAPE

When the sensing fingers of the reader fall on a line of the record of tape T, each sensing finger which encounters a depression in said tape closes its associated contacts and thereby operates a corresponding reading relay, as mentioned above. Thus, for example, if sensing finger B2F falls on a depression in tape T and closes its contacts, relay B2 operates over a circuit extending from battery through the winding of said relay, No. 7 contacts of relay RCA, conductor 165 within bracket 166, and contacts of finger B2F to ground. One of the reading relays is thus operated in response to each sensing finger which encounters a depression in tape T and, in consequence, closes its contacts. The reading relays thus operated for the second fourth, fifth, and sixth digits of the line sensed operate corresponding relays of the reading translator, as mentioned above.

Thus, if reading relays B0 and B7 representing the digit "7" in two-out-of-five code operate, translator relay TB7 representing the digit "7" in decimal code, operates over a circuit extending from battery through the winding of said relay, conductor 323 within bracket 324, No. 7 contacts of relay B0 and No. 7 contacts of relay B7 to ground.

SKIPPING THE SPLICE PATTERN

Figure 60:
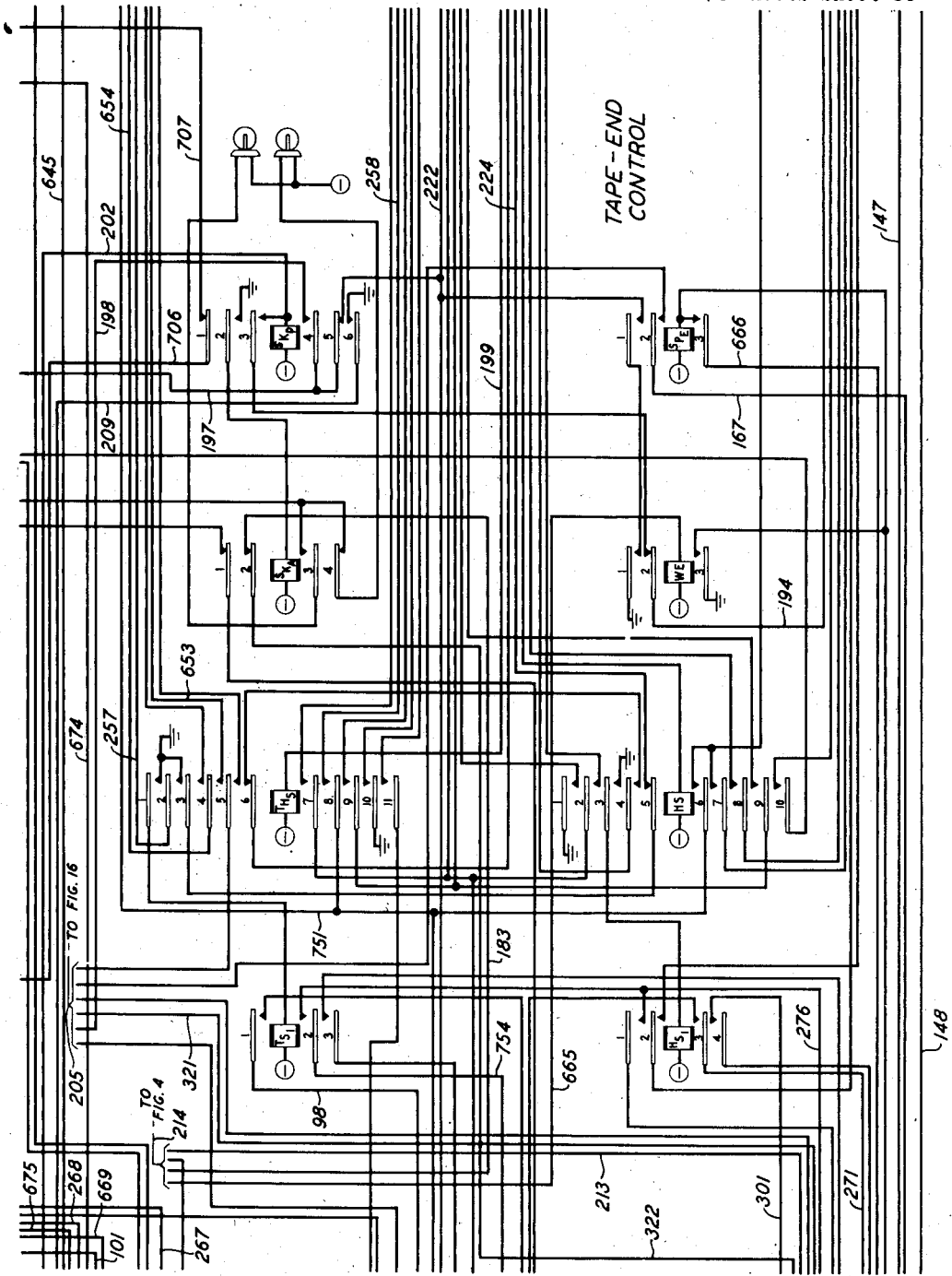
Figure 61:
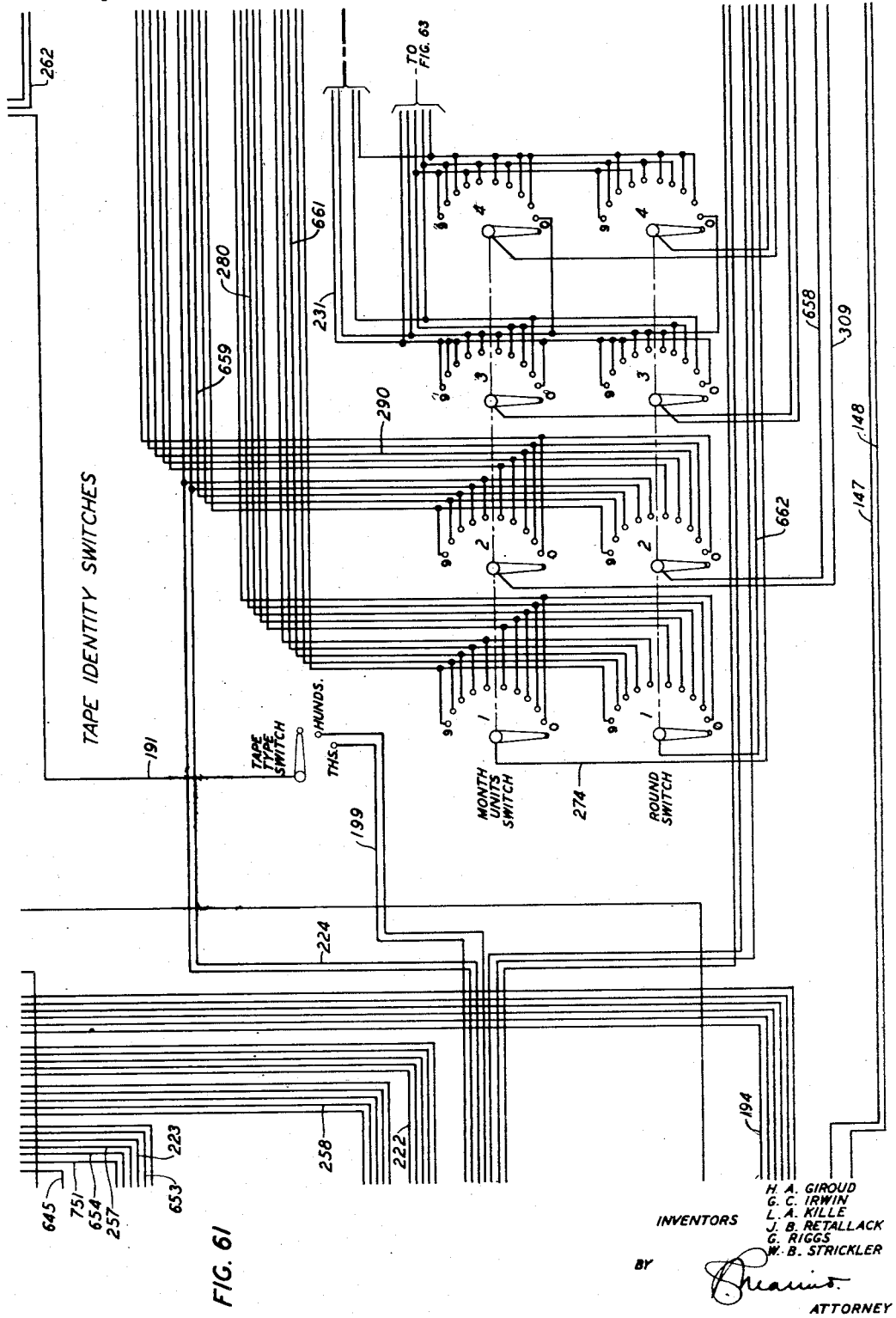
Figs. 61 through 64 show the tape-identity switch circuits.
Figure 62:
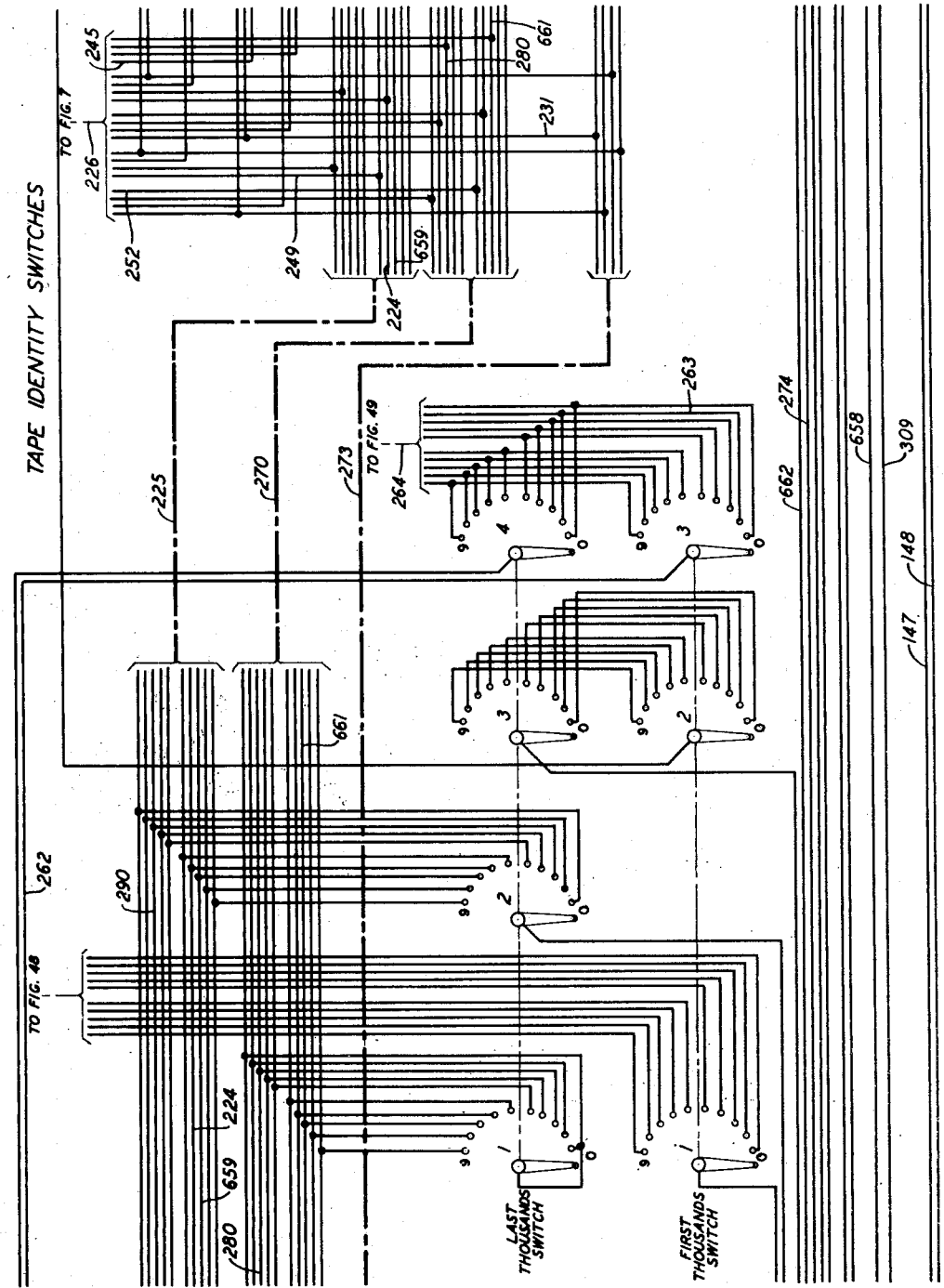
Figure 63:
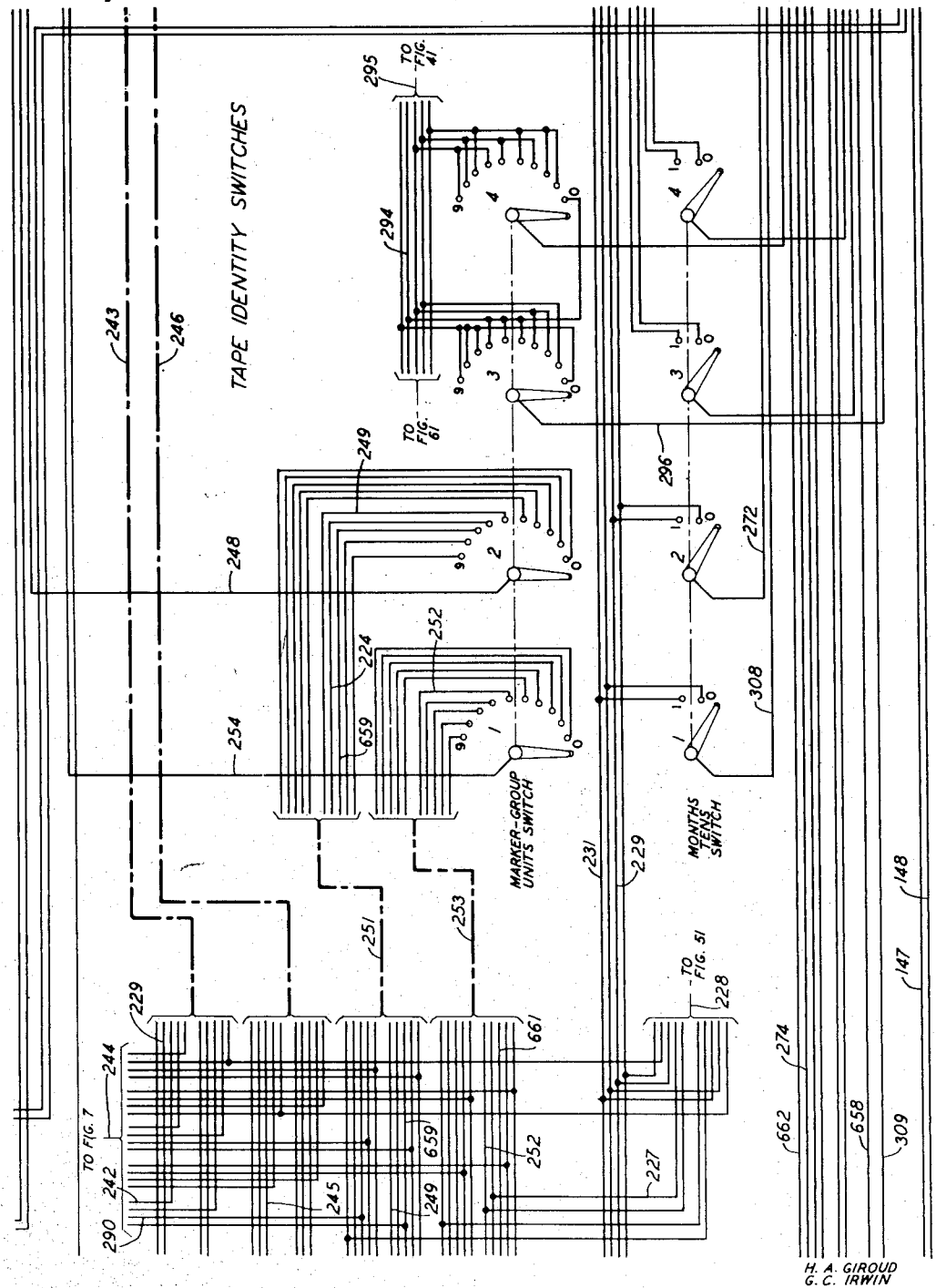
Figure 64:
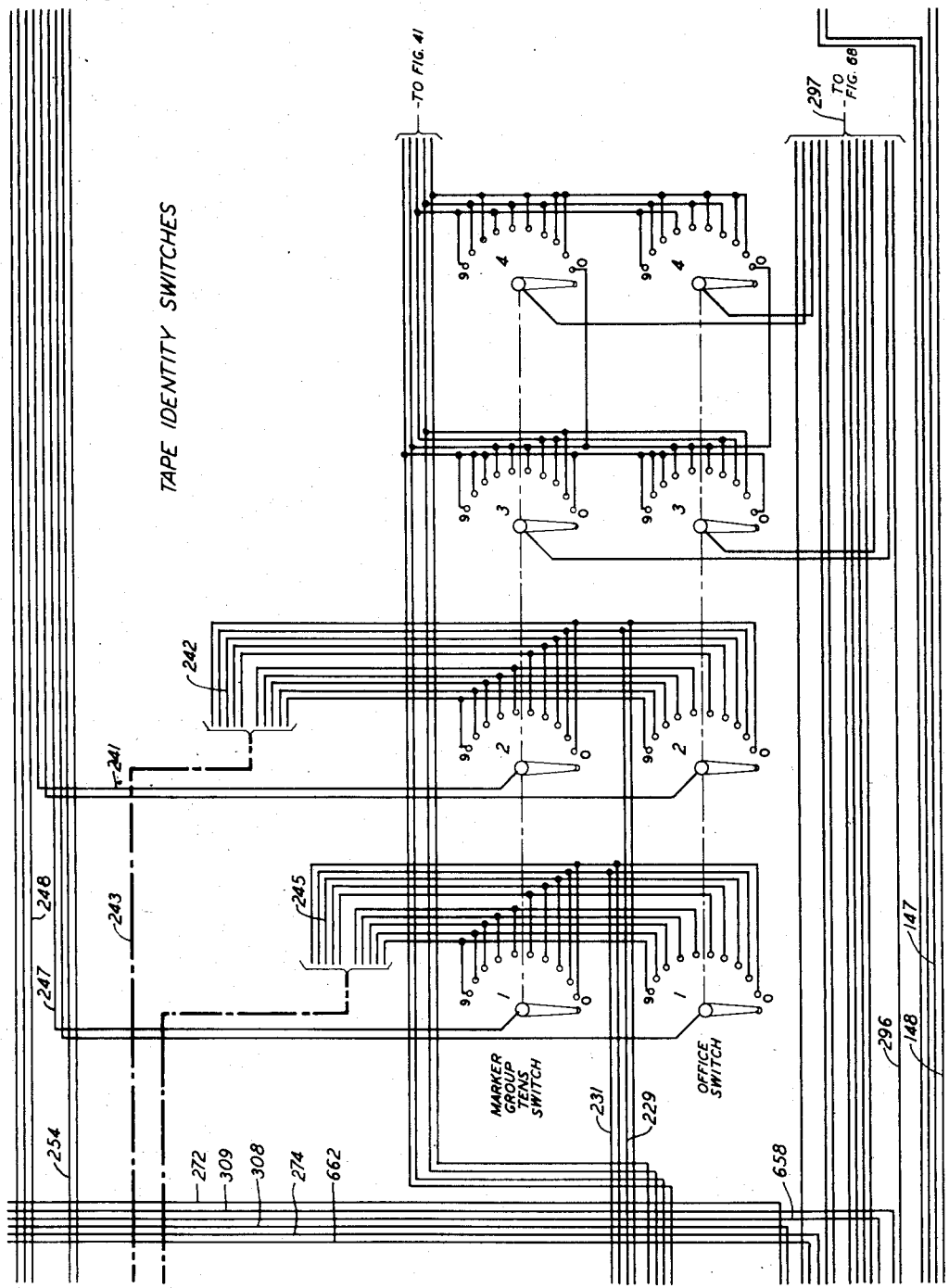
Figure 65:
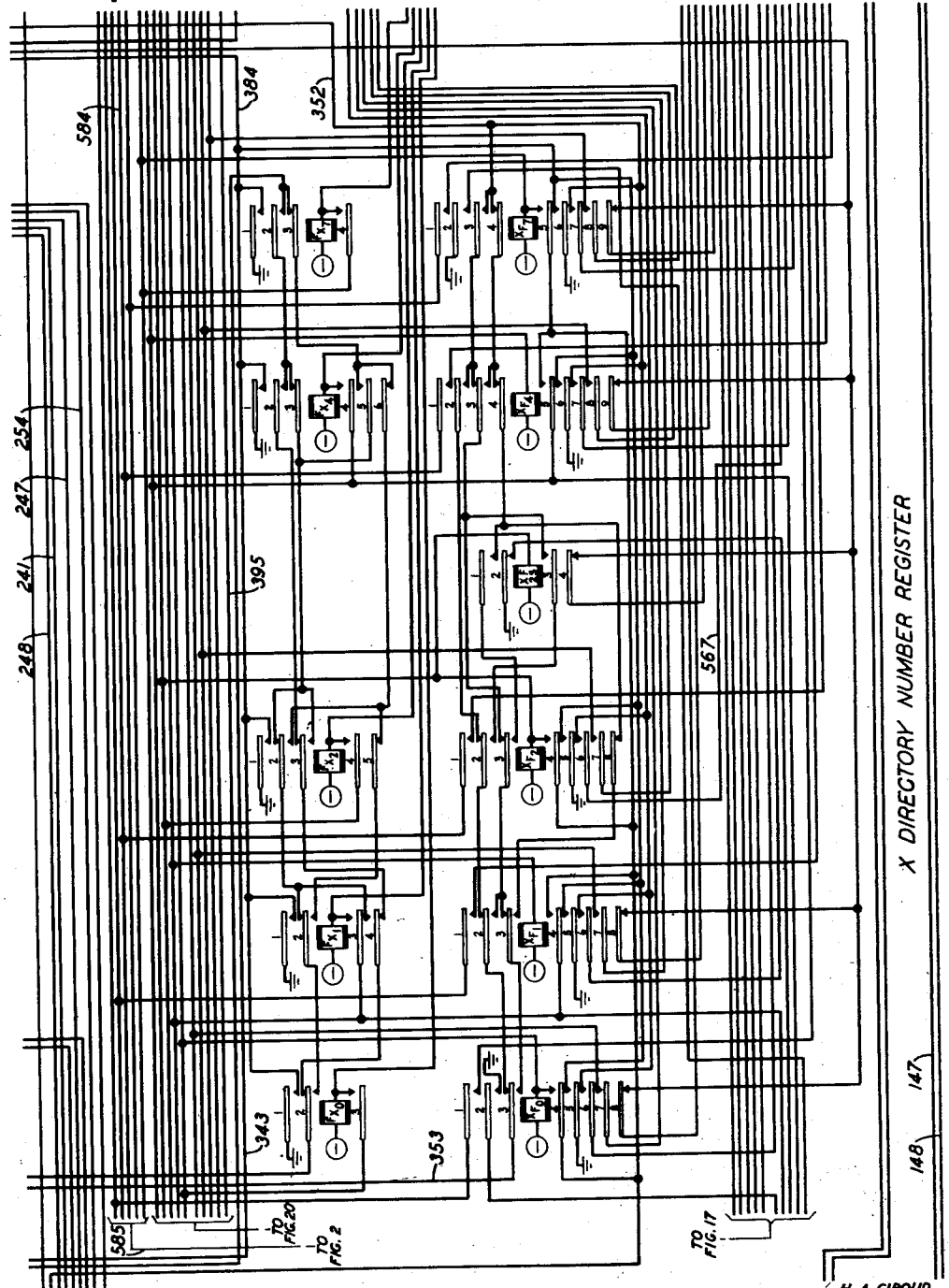
Figure 66:
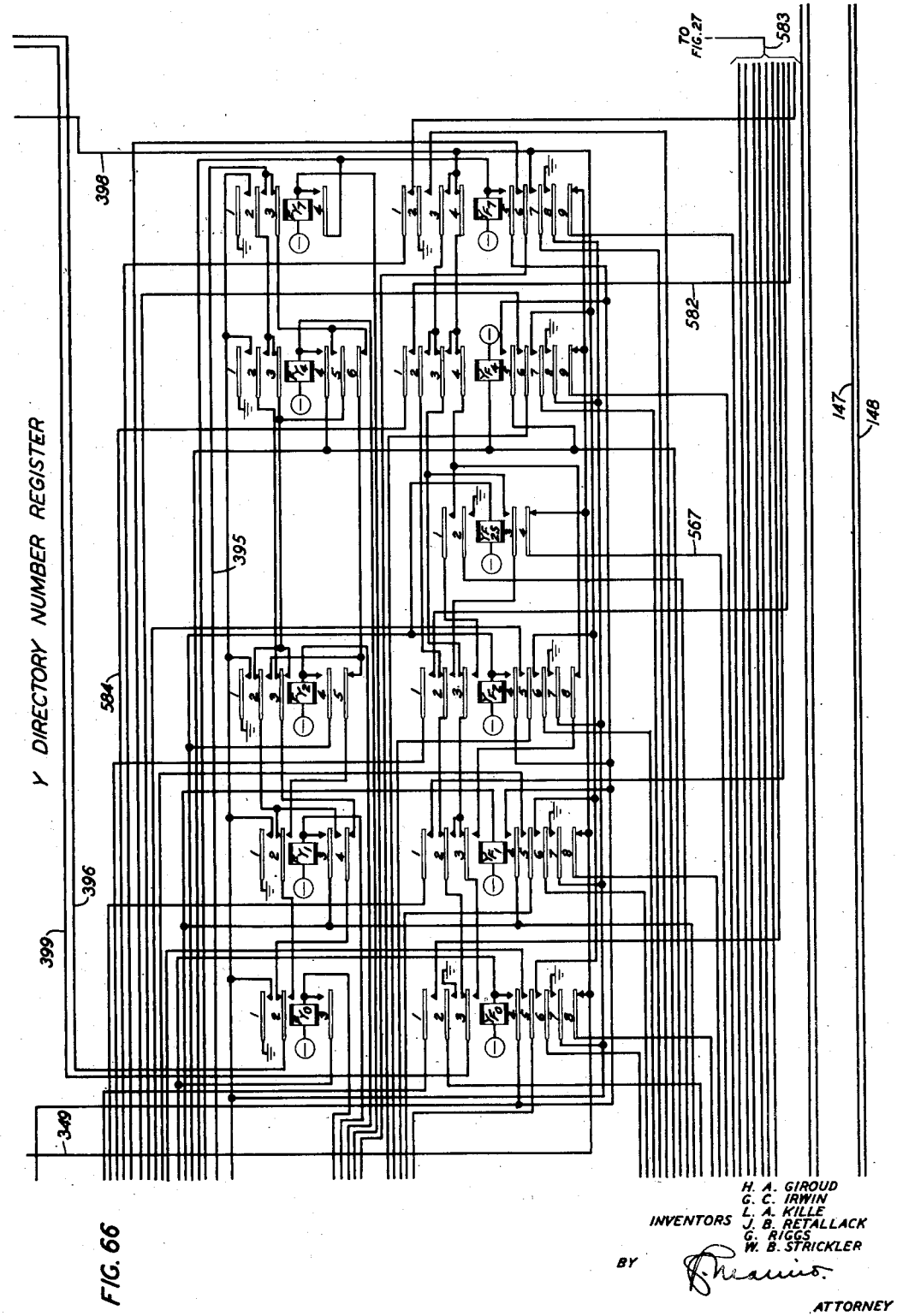

When the sensing fingers of the reader fall on a line of tape T in the splice pattern at the beginning of said tape, they encounter depressions representing the digits "081010." Reading relays A0, B1, B7, C0, C1, D4, D7, E0, E1, F4, and F7 then operate in the manner described above, the combination of relays operated corresponding, according to the code previously given, to said digits. Said relays are provided with contacts arranged similarly to the contacts of the check relays (KA0, KB0 ... KB7, etc.), previously described, so that a circuit is closed through said contacts if, and only if, one of the relays A0 ... A2, and two of the relays in each of the groups B0 ... B7, C0 ... C7, etc. are operated. When said relays are properly operated in response to the sensing fingers, a circuit is closed from battery through the winding of relay SKP (Fig. 60), conductor 202, No. 5 contacts of relay LAS (which is operated, as described later), conductor 167, No. 2 contacts of relay MLK, conductor 168 within bracket 169, No. 4 contacts of relay A0, conductor 178 within bracket 179, No. 1 contacts of relay B1, No. 4 contacts of relay B7, conductor 181 within bracket 182, No. 3 contacts of relay MUY, No. 3 contacts of relay MUX, conductor 183, No. 2 contacts of relay F0, No. 2 contacts of relay F1, No. 2 contacts of relay F2, No. 5 contacts of relay F4, No. 3 contacts of relay F7, No. 3 contacts of relay E0, No. 5 contacts of relay E1, No. 6 contacts of relay E2, No. 2 contacts of relay E4, No. 2 contacts of relay E7, conductor 203, No. 2 contacts of relay D0, No. 2 contacts of relay D1, No. 2 contacts of relay D2, No. 5 contacts of relay D4, No. 3 contacts of relay D7, No. 3 contacts of relay C0, No. 5 contacts of relay C1, No. 6 contacts of relay C2, No. 2 contacts of relay C4, No. 2 contacts of relay C7, conductor 204, No. 1 contacts of relay B0, No. 3 contacts of relay B1, No. 3 contacts of relay B2, No. 4 back contacts of relay B4, No. 3 contacts of relay B7, conductor 189 within bracket 179, No. 2 contacts of relay A0, No. 3 contacts of relay A2, No. 3 contacts of relay A1, conductor 191, No. 8 contacts of relay RCD, conductor 193 within bracket 92, No. 8 contacts of relay ST3, conductor 172, thence either through back contacts of relay RKA, conductor 180, and contacts of finger G1 to ground, or through front contacts of relay RKB, conductor 174, and contacts of finger G2 to ground, depending upon the position of the reader drum. It will be observed that this circuit includes contacts of all of the reading relays A0 ... A2, B0 ... B7, C0 ... C7, D0 ... D7, E0 ... E7, and F0 ... F7 as well as contacts of finger G1 or G2 and of the associated relay RKA or RKB, as a check that the proper number of reading relays has been operated and the drum of the reader is stepping normally.

Figure 46:
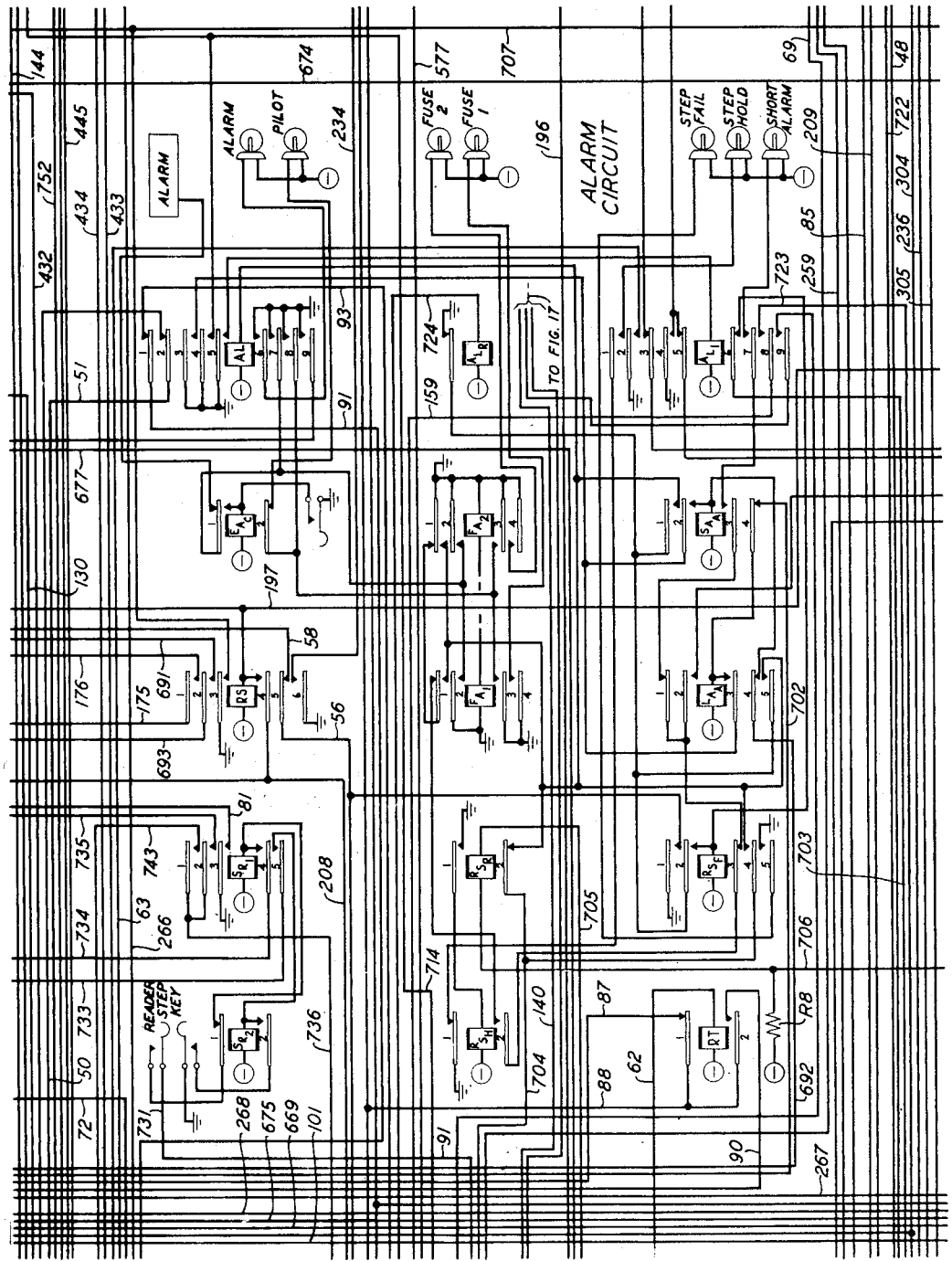
Fig. 46 shows the alarm circuits.

When relay SKP operates, as described above, it locks up through its No. 3 contacts, No. 2 contacts of relay WE, conductor 194 within bracket 195, No. 7 contacts of relay L1, conductor 196 within bracket 195, and No. 2 contacts of relay ST5 to ground, and operates relay SKA over an obvious circuit. Relay RS (Fig. 46) then operates over a circuit extending from battery through the winding of said relay, conductor 197, No. 4 contacts of relay SKP, conductor 198 within bracket 205, No. 2 contacts of relay A2, No. 2 contacts of relay A1, conductor 206 within bracket 169, No. 9 contacts of relay ST3, conductor 207 within bracket 57, and contacts K2 (when closed) to ground, and locks up through its No. 4 contacts, conductor 208 within bracket 57, and contacts H3C to ground during the time when the latter contacts are closed.

If relay RS does not operate at this time, the step magnet M2 remains energized over a circuit extending from battery through No. 1 contacts of relay RON, conductor 54, the winding of magnet M2, contacts of key TF, conductor 56 within bracket 57, No. 5 contacts of relay RS, conductor 58, No. 2 contacts of relay S2Y, No. 2 contacts of relay S1Y, No. 2 contacts of relay S2X, and No. 2 contacts of relay S2Y to ground, arresting the reader drum. Relay RS operating, opens this path. Magnet M2 is not then energized, and the reader drum step to the next line.

It will be observed that the operating path of relay RS is through contacts of relays A1 and A2. Relay RS can only operate over this path, therefore, when relays A1 and A2 are not operated, which is the case when the reader senses a line, the first digit of which is "0."

Figure 44:
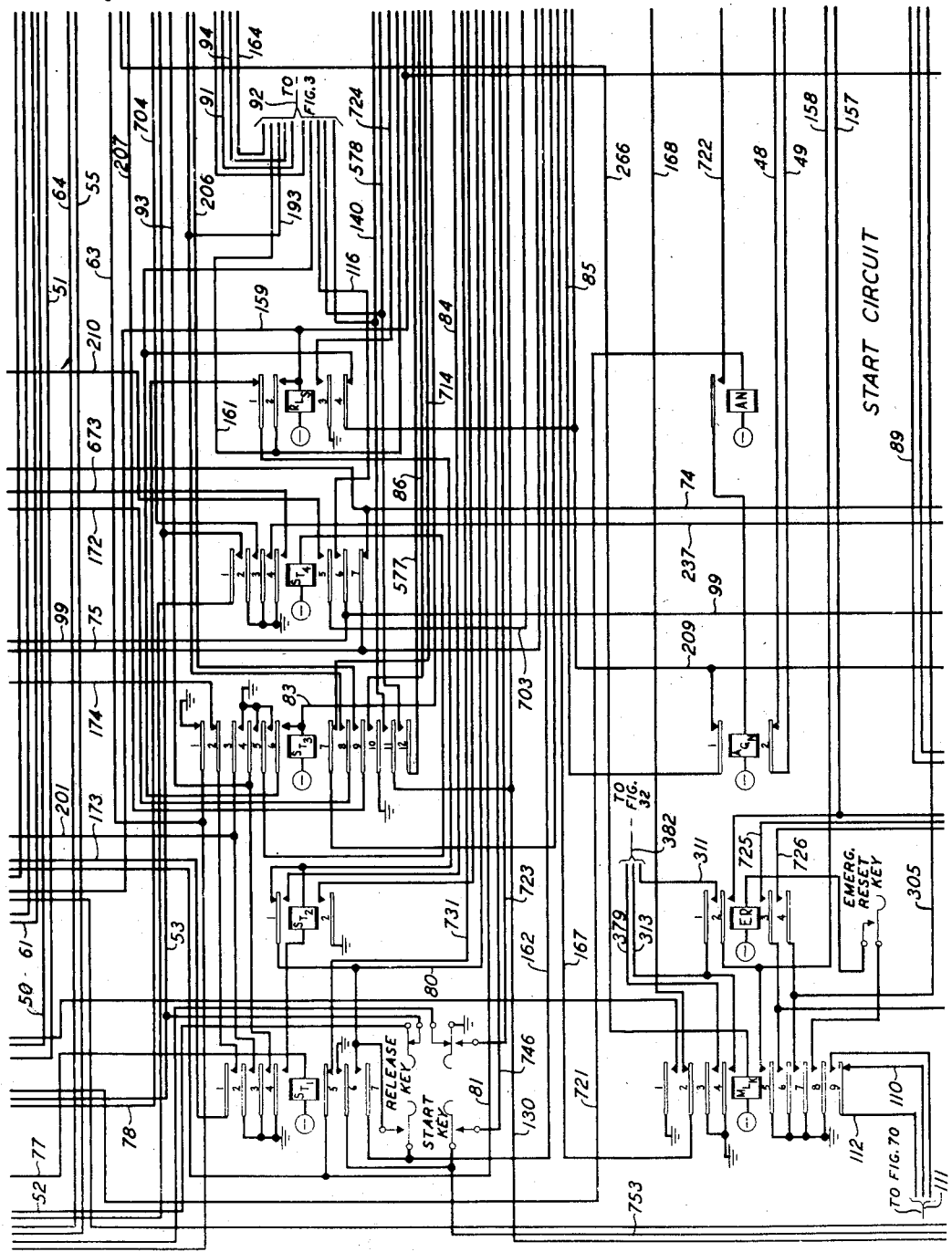
Figs. 44 and 45 show the start circuit.

With relay SKP operated, as described above, relay ST3 is locked up over a circuit extending from battery through the winding and No. 6 contacts of said relay, No. 4 contacts of relay RLS, conductor 209, and No. 6 contacts of relay SKP to ground and cannot now be released by operation of the Release key (Fig. 44). Relay RS is held operated so long as the first digit of the line sensed is "0," either through contacts of relays A1 and A2 and contacts K2 to ground, or through contacts H3C to ground. The reader, therefore, passes over each of the lines of the splice pattern in succession.

READING AND RECORDING TAPE IDENTITY

Figure 51:
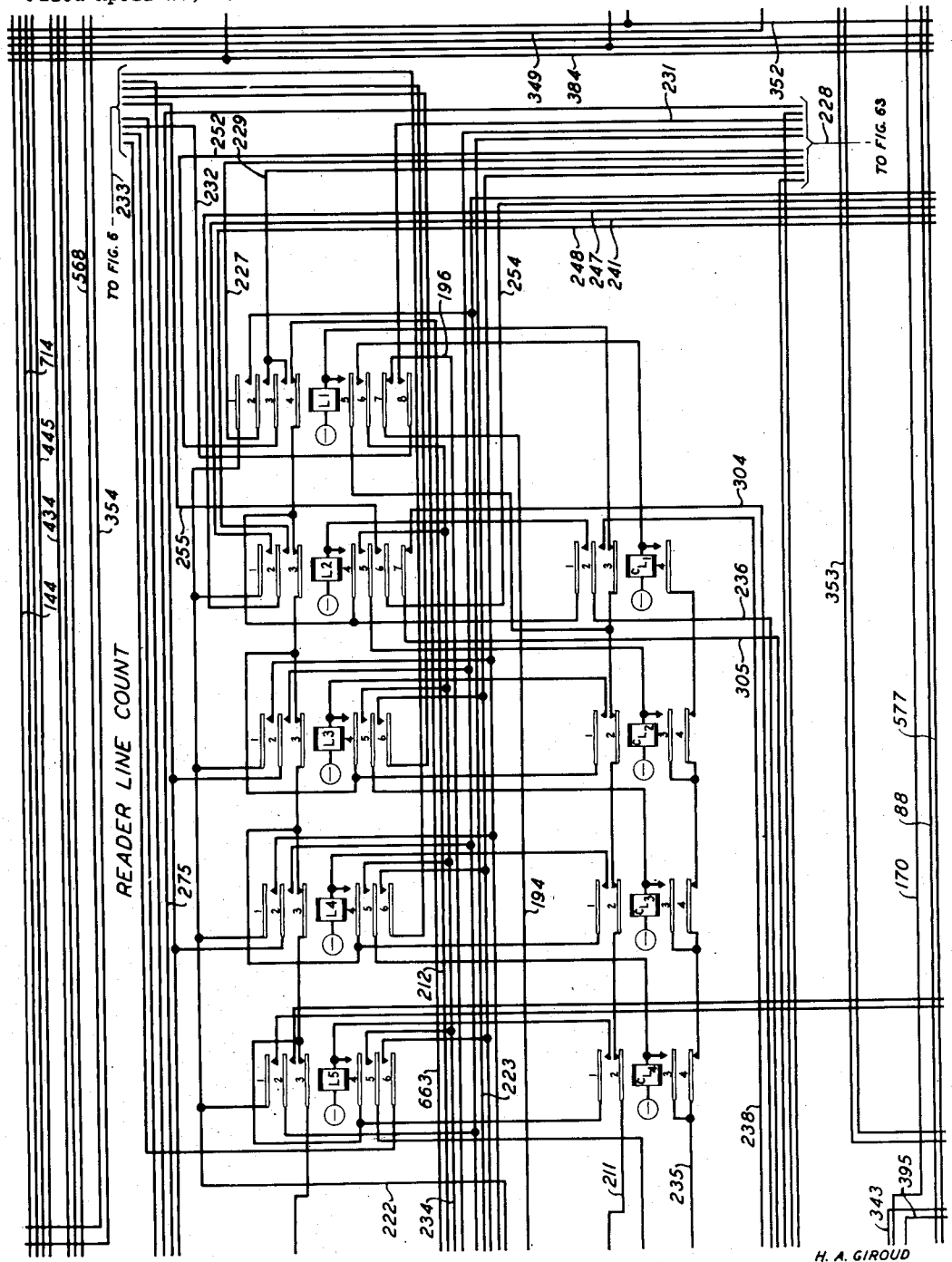
Figure 52:
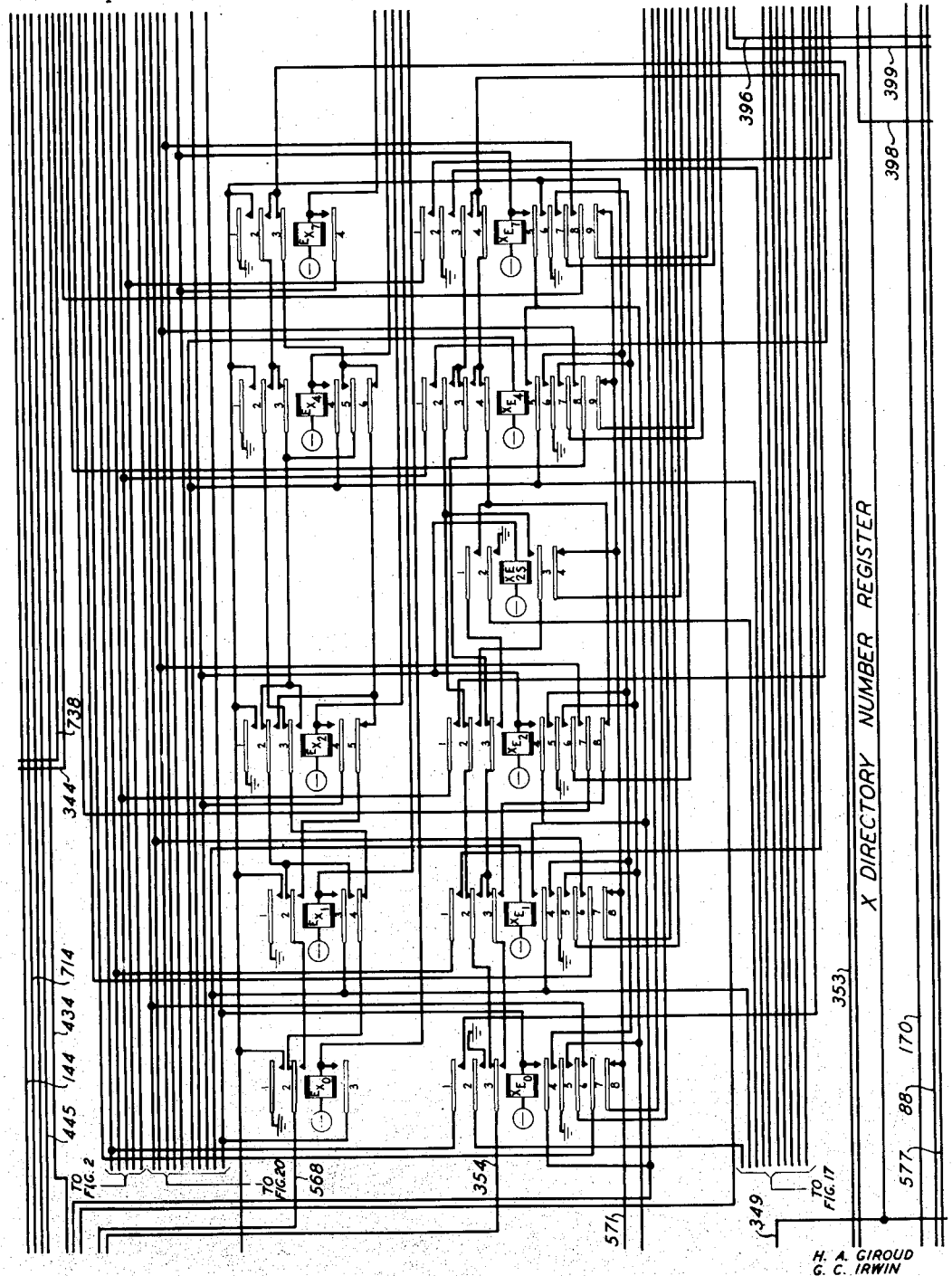
Figure 53:
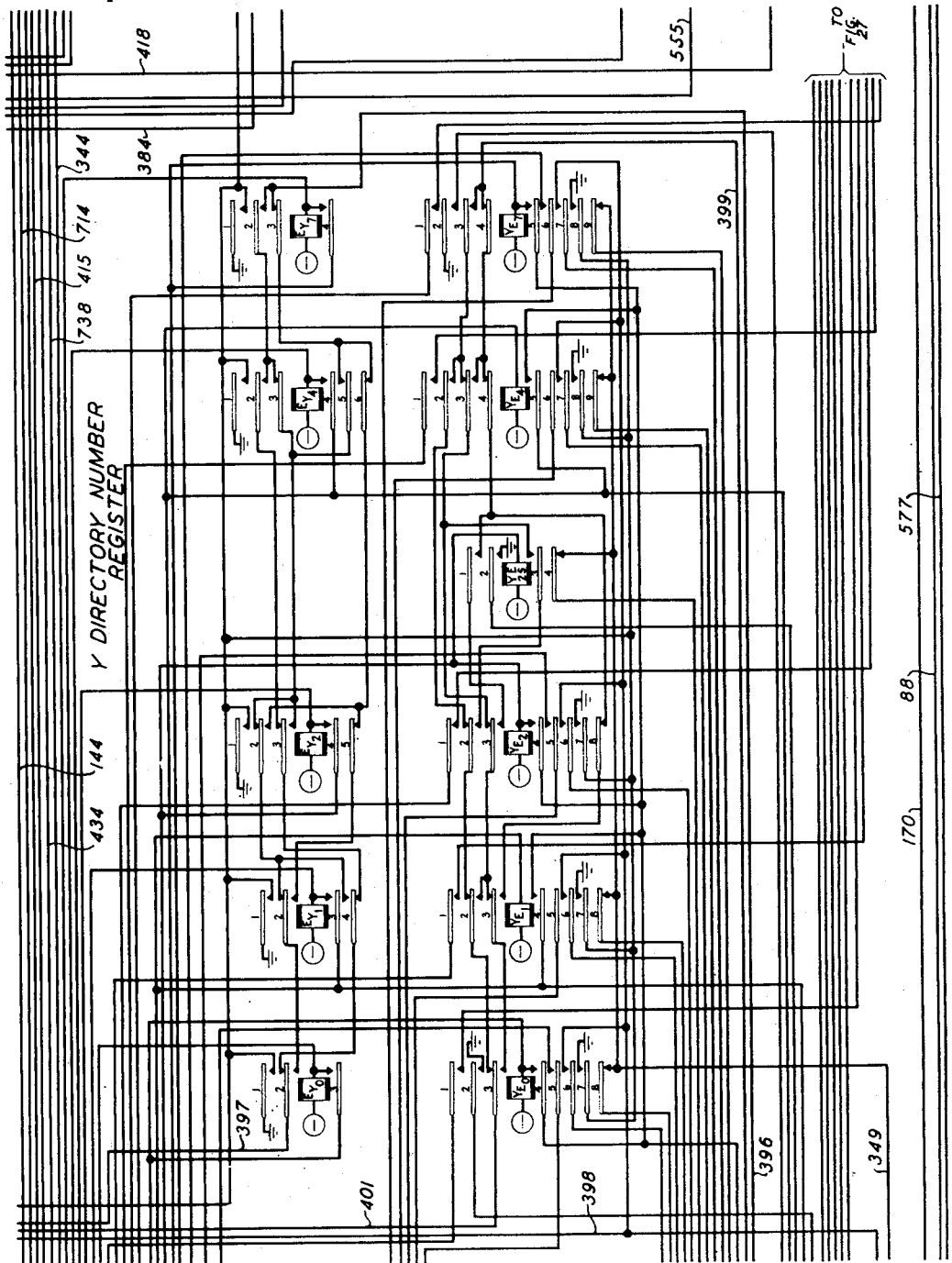

When the reader senses the first line of the tape identity following the splice pattern on tape T, in which are recorded the digits "289116," reading relays A2, B1, B7, C2, C7, D0, D1, E0, E1, F2 and F4 operate in response to the closure of contacts of the sensing fingers, in the manner previously described. By the operation of relay A2, the operating circuit of relay RS is opened and, with contacts H3C open, said relay releases. Relay L1 (Fig. 51) operates over a circuit extending from battery through the winding of said relay, No. 3 contacts of relay CL1, No. 2 contacts of relays CL2 ... CL4, conductor 211, No. 2 contacts of relays CL5 ... CL8, conductor 212 within brackets 195 and 150, No. 5 contacts of relay T1P, conductor 213 within bracket 214, No. 5 contacts of relay C7, No. 8 contacts of relay C2, conductor 215 within bracket 179, No. 8 contacts of relay A2, conductor 178 within bracket 179, No. 1 contacts of relay B1, No. 4 contacts of relay B7, conductor 181 within bracket 182, No. 3 contacts of relay MUY, No. 3 contacts of relay MUX, conductor 183, No. 2 contacts of relay F0, No. 2 contacts of relay F1, No. 3 contacts of relay F2, No. 3 contacts of relay F4, No. 2 contacts of relay F7, No. 3 contacts of relay E0, No. 5 contacts of relay E1, No. 6 contacts of relay E2, No. 2 contacts of relay E4, No. 2 contacts of relay E7, conductor 203, No. 3 contacts of relay D0, No. 5 contacts of relay D1, No. 6 contacts of relay D2, No. 2 contacts of relay D4, No. 2 contacts of relay D7, No. 2 contacts of relay C0, No. 2 contacts of relay C1, No. 3 contacts of relay C2, No. 4 contacts of relay C4, No. 3 contacts of relay C7, conductor 204, No. 1 contacts of relay B0, No. 3 contacts of relay B1, No. 3 contacts of relay B2, No. 4 contacts of relay B4, No. 3 contacts of relay B7, conductor 189 within bracket 179, No. 3 contacts of relay A0, No. 4 contacts of relay A2, No. 3 contacts of relay A1, conductor 191, No. 8 contacts of relay RCD, conductor 193 within bracket 92, No. 8 contacts of relay ST3, conductor 172, thence through back contacts of relay RKA, conductor 180, and contacts of finger G1 to ground, or through front contacts of relay RKB, conductor 174, and contacts of finger G2 to ground, depending upon the position of the reader drum. Operation of relay L1 checks that the combination of the reading relays A0 . . . A2, B0 . . . B7, C0 . . . C7, etc. operated is that corresponding to the digits "289116" and, therefore, that the line of record T read is the first line of the tape-identity entry of said record. It also checks that relays MUX, MUY and T1P are not operated and that the reader drum is operating normally, as evidenced by relays RKA and RKB and contacts G1 and G2. Relay L1, when operated, locks up through its No. 5 contacts to its operating path exclusive of the contacts of relay CL1. By the operation of relay L1, the locking circuit of relay SKP, traced above, is opened and said relay released, releasing relay SKA.

By the operation of relays D0, D1, E0, E1, F2 and F4 described above, the corresponding translator relays TD1, TE1 and TF6 are operated. Relay THS (Fig. 60) operated when relay ON4 operated, over a circuit extending from battery through the winding of relay THS, conductor 199, contacts of the Tape Type switch, conductor 191, and No. 1 contacts of relay ON4 to ground. Relay RS now reoperates over a circuit extending from battery through the winding of said relay, conductor 197, No. 5 contacts of relay SKP, conductor 222 within bracket 195, No. 1 contacts of relay L1, conductor 223 within bracket 195, No. 3 contacts of relay THS, No. 5 contacts of relay HS, conductor 224 within brackets 225 and 226, No. 3 contacts of relay TF6, conductor 227 within brackets 226 and 228, No. 2 contacts of relay L1, conductor 229 within brackets 228 and 226, No. 2 contacts of relay TE1, conductor 231 within brackets 226 and 228, No. 8 contacts of relay L1, conductor 232 within bracket 233, and No. 2 contacts of relay TD1 to ground. Operation of relay RS over this circuit checks that the last three digits of the line sensed by the reader correspond to the setting of the Tape Type switch.

Figure 50:
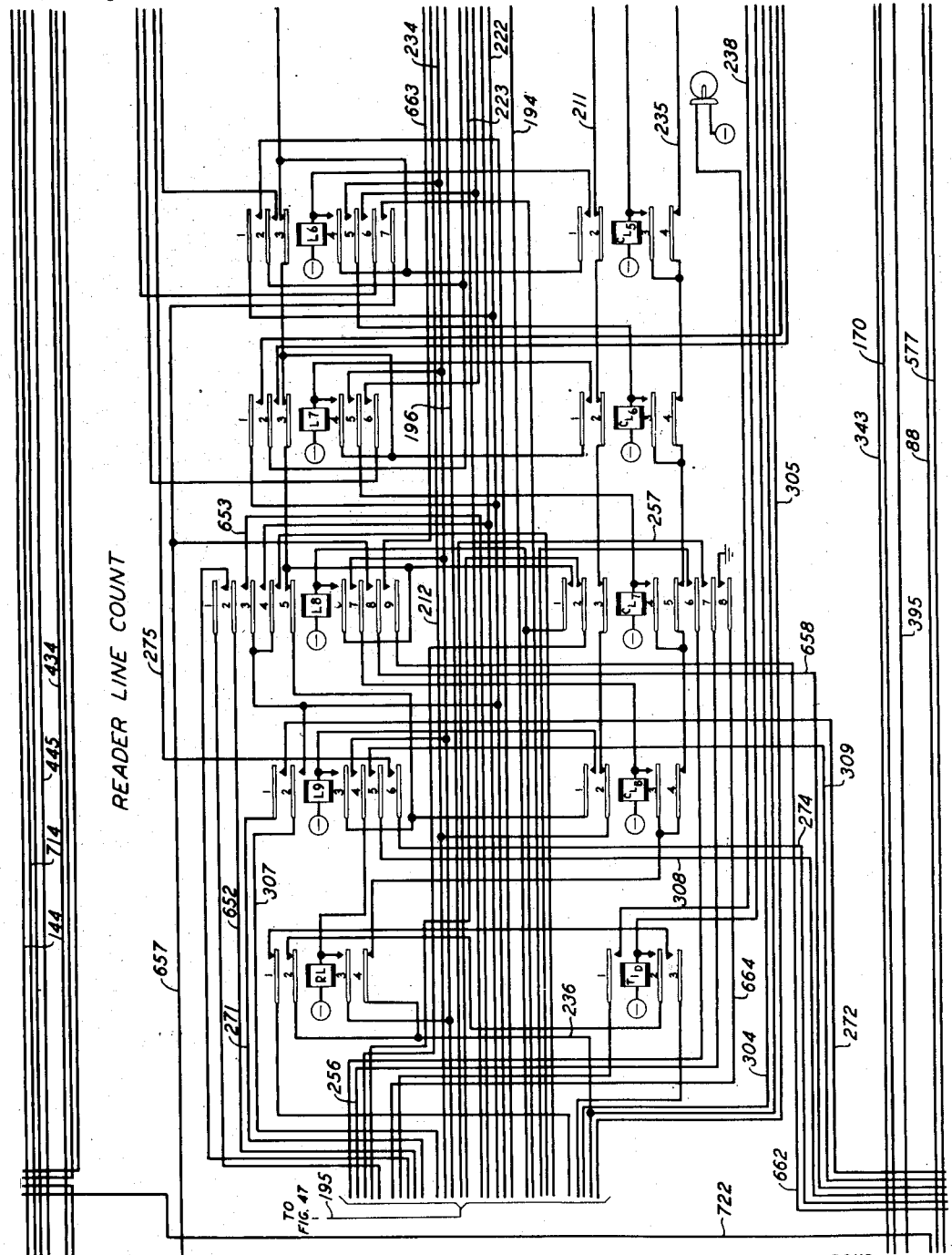
Figs. 50 and 51 show the reader line-count circuit.

Operation of relay RS allows the reader drum to continue to step and operates relay CL1 (Fig. 51) over a circuit extending from battery through the winding of said relay, No. 6 contacts of relay L1, conductor 234 within bracket 195, and No. 6 contacts of relay RS to ground. Relay CL1 locks up through its No. 4 contacts, No. 4 contacts of relays CL2 . . . CL4, conductor 235, No. 4 contacts of relay CL5 . . . CL6, No. 5 contacts of relay CL7, No. 4 contacts of relay CL8, No. 4 contacts of relay RL, conductor 236 within bracket 195, No. 4 contacts of relay MT2, conductor 237, and No. 3 contacts of relay ST4 to ground. Relay T1D (Fig. 50) operates over a circuit extending from battery through the winding of said relay, conductor 238, and No. 2 contacts of relay C11 to the above-traced ground on conductor 236, and locks up to the same ground through its No. 2 contacts and No. 2 contacts of relay RL. Relay L1 releases when its circuit is opened by the raising of the sensing fingers of the reader.

SECOND LINE OF TAPE IDENTITY

The digits recorded on the second line of the tape identity on tape T are "289225," the last two digits being the number of the marker group. When the sensing fingers of the reader fall on this line, reading relays A2, B1, B7, C2, C7, D0, D2, E0, E2, F1, and F4 and translator relays TD2, TE2, and TF5 operate in the manner already described. Relay L2 then operates over a circuit similar to that traced above for relay L1. Having traced the circuit of relay L1 in connection with the first line of the tape identity, it is believed unnecessary to trace the similar circuits of relays L2 . . . L9, one of which operates for each succeeding line, which would unduly lengthen the description. The operation of these relays will be apparent from the description already given. Upon the operation of relay L2, relay RS operates over a circuit extending from battery through the winding of said relay, conductor 197, No. 5 contacts of relay SKP, conductor 222 within bracket 195, No. 1 contacts of relay L2, conductor 241, contacts of the No. 2 arc of the Marker-Group Tens switch, conductor 242 within brackets 243 and 244, No. 2 contacts of relay TE2, conductor 245 within brackets 226 and 246, contacts of the No. 1 arc of the Marker-Group Tens switch, conductor 247, No. 2 contacts of relay L2, conductor 248, contacts of the No. 2 arc of the Marker-Group Units switch, conductor 249 within brackets 251 and 226, No. 3 contacts of relay TF5, conductor 252 within brackets 226 and 253, contacts of the No. 1 arc of the Marker-Group Units switch, conductor 254, No. 6 contacts of relay L2, conductor 255 within bracket 233, and No. 2 contacts of relay TD2 to ground. Operation of relay RS over this circuit checks that the recorded marker-group number agrees with the number set on the marker-group tens and units switches. Relay CL2 operates in a manner similar to that already described for relay CL1 and releases relay CL1. Relay L2 releases when the reading relays release.

SUCCEEDING LINES OF TAPE IDENTITY

The operations in connection with the succeeding lines of the tape identity on tape T are similar to the operations already described for the first and second lines. In each case, the sensing fingers operate, in the manner described above, a combination of the reading relays and translator relays corresponding to the digits of the line read which, in turn, operate one of the relays L1 . . . L9 corresponding to the number of the line. When these relays are operated, a circuit, similar to the circuits already traced, is closed for the operation of relay RS (or, on the last line, relay AS, as described below). On the fifth line, this circuit includes contacts of the Office switch; on the eighth line it includes contacts of switch TH and of the Round switch; and on the ninth line, it includes contacts of the Months Tens and Months Units switches. The successive operations of relay RS (or relay AS) serve, therefore, to check not only the correctness of the digits recorded in each line, but also their agreement with the settings of the tape-identity switches.

Figure 48:
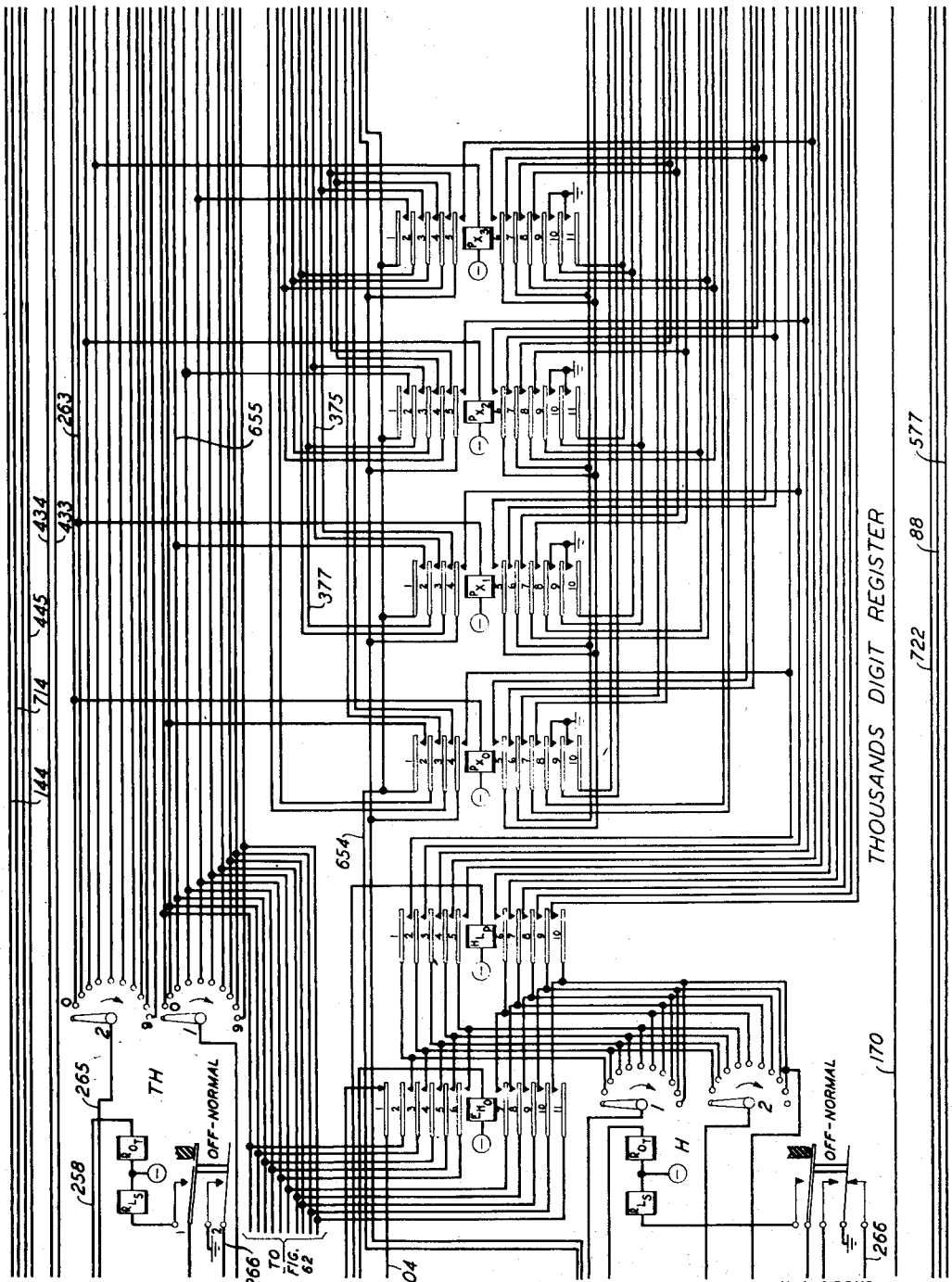
Figure 49:
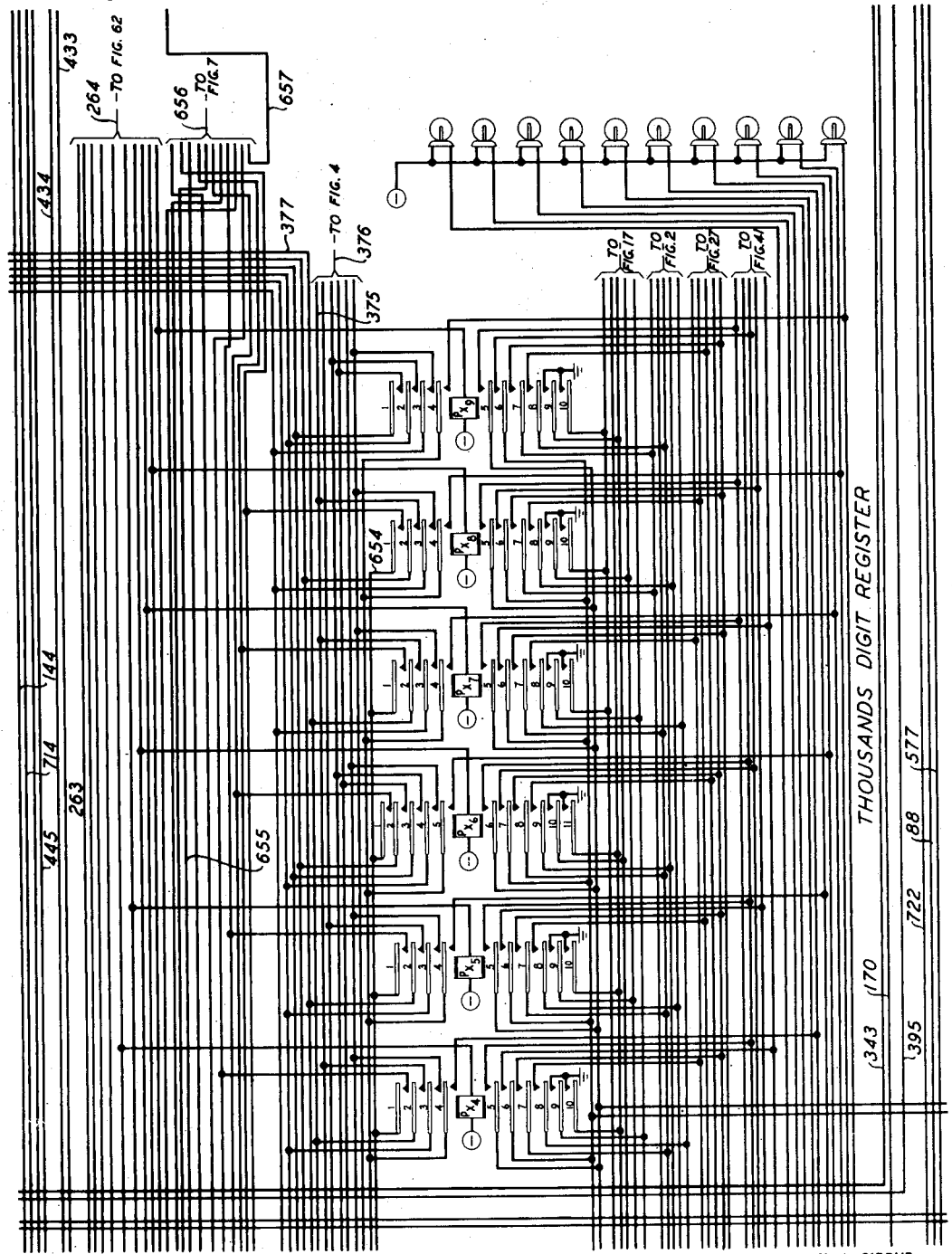

On the reading of the eighth line, however, switch TH is set in the following manner:

When relay RS operates, operating relay CL7 in the manner described above for relays CL1 and CL2, relay TSA (Fig. 47) operates over a circuit extending from battery through the winding of said relay, No. 1 contacts of relay THA, conductor 256 within bracket 195, No. 7 contacts of relay CL7, conductor 257 within bracket 195, and No. 2 contacts of relay THS to ground. The winding of the rotary magnet ROT of switch TH (Fig. 48) is now connected over conductor 258, No. 1 contacts of relay FTH, No. 2 contacts of relay TSA, conductor 259, No. 2 contacts of relay RCD, and conductor 261 to contacts J1 of the reader. Each time said contacts close and open, said rotary magnet is energized and released, stepping the arms of switch TH one terminal. When said arms reach the second terminals of the switch, relay FTH (Fig. 47) operates over a circuit extending from battery through the winding of said relay, conductor 262, the arm and second terminal of the No. 3 arc of the First-Thousands switch, conductor 263 within bracket 264, the second terminal and arm of the No. 2 arc of switch TH, conductor 265, and No. 2 contacts of relay ON4 to ground, opening the circuit of the rotary magnet of switch TH, arresting said switch and also opening the locking circuit of and releasing relay THA, which releases relay TSA. Switch TH is thus set to agree with the setting of the First-Thousands switch which, in the present example, is "1." Relay PA1 (Fig. 48) of the relays PA0 . . . PA9 also operates over the circuit traced above for the operation of relay FTH, registering the digit "1" as the thousands digit of directory numbers on the first input tape.

Relay MLK (Fig. 44) operates over a circuit extending from battery through the winding of said relay, conductor 266, and No. 2 contacts of the off-normal contacts of switch TH to ground.

In connection with the ninth and last line of the tape-identity entry, the check is performed by relay AS (Fig. 59) instead of relay RS. Translator relay TD9 having been operated in accordance with the fourth digit of this line and relay L9 operated in the manner previously described for relay L1, the circuit of relay AS may be traced from battery through the winding of said relay, conductor 267, No. 4 contacts of relay WS3, No. 5 contacts of relay WS5, conductor 268, No. 6 contacts of relay LAS (now operated, as described later), conductor 269, No. 2 contacts of relay CP1, conductor 271 within brackets 150 and 195, No. 1 contacts of relay L9, conductor 272, arm and second contact of the No. 1 arc of the Month-Tens switch, conductor 229 within bracket 226, No. 2 contacts of relay TE1, conductor 231 within bracket 226, second contact and arm of the No. 1 arc of the Month-Tens switch, conductor 308, No. 5 contacts of relay L9, conductor 309, arm and third contact of the Month-Units switch, conductor 290 within brackets 225 and 244, No. 2 contacts of relay TF2, conductor 289 within brackets 226 and 270, third contact and arm of the Month-Units switch, conductor 274, No. 6 contacts of relay L9, conductor 275 within bracket 233, and No. 3 contacts of relay TD9 to ground. Relay PT1 (Fig. 59) then operates over a circuit extending from battery through the winding of said relay, conductor 276, No. 12 contacts of relay T1E, No. 1 front contacts of relay DRN, and No. 5 contacts of relay AS to ground.

RECORDING FIRST LINE OF TAPE-IDENTITY ENTRY

When relay PT1 operates, as described above, relays PCA, PCB and PCC (Fig. 42) operate over a circuit extending from battery through the windings of said relays in series, conductor 106 within bracket 107, No. 9 contacts of relay RCD, conductor 108 within bracket 277, and No. 1 contacts of relay PT1 to ground. When contacts K7 now close, relay W1 (Fig. 71) operates over a circuit extending from battery through the winding of said relay, No. 2 contacts of relays CW1 . . . CW9, conductor 278 within bracket 279, No. 3 contacts of relay PT1, conductor 99, No. 6 contacts of relay ST4, conductor 116 within bracket 92, No. 3 contacts of relay RCD, conductor 117, and contacts K7 to ground, and locks up through its No. 1 contacts, No. 2 contacts of relays W2 . . . W9, conductor 281 within bracket 279, No. 6 contacts of relay PT1, conductor 282, and No. 4 contacts of relay ON2 to ground.

When contacts P0 now close, relays PL and PL1 (Fig. 69) operate over a circuit extending from battery through the windings of said relays in series, conductor 283, No. 2 contacts of relay W1, No. 4 contacts of relays W2 . . . W9, conductor 284 within bracket 279, No. 2 contacts of relay T1P, No. 2 contacts of relay PT1, conductor 130, No. 11 contacts of relay ST3, conductor 140 within bracket 92, No. 1 contacts of relay RCD, conductor 150, and contacts P0 to ground.

Relays PL and PL1 connect eleven cam contacts of the reader to the appropriate punch magnets MA0 . . . MF7 of the recorder to record on tape TT the digits "289116," when said contacts close. For example, punch magnet MA2 is connected over conductor 285, No. 3 contacts of relay PCA, conductor 286, the winding of relay KA2, conductor 287 within bracket 125, No. 1 contacts of relay PL, and conductor 126 within bracket 127, to contacts PA2. The other magnets are connected over similar circuits.

When contacts J0 close, relay J (Fig. 41) operates over a circuit extending from battery through the winding of said relay, conductor 137 within bracket 125, No. 4 contacts of relay PL1, conductor 138 within bracket 127, and contacts J0 to ground. The paper advance magnet PAM of the recorder and relay PK then operate over a circuit extending from battery through the winding of said magnet, conductor 139, the winding of relay PK, conductor 141, No. 1 contacts of relay PCA, conductor 142, contacts of relay J, conductor 143 within bracket 107, and contacts J4 to ground, and lock up through No. 3 contacts of relay PK, No. 3 contacts of relay PS, conductor 144, and No. 9 contacts of relay ON1 to ground. When the recorder punch magnets and their associated check relays have operated, relay PS (Fig. 41) operates through No. 2 contacts of relay PK and over the check circuit previously traced to ground, and locks up through its No. 5 contacts to ground. Relay CW1 (Fig. 71) operates over a circuit extending from battery through the winding of said relay, No. 3 contacts of relay W1, No. 6 contacts of relays W2 . . . W9, conductor 288, No. 4 contacts of relay PL, conductor 289 within bracket 279, No. 7 contacts of relay PT1, conductor 148, No. 2 contacts of relay PS, and No. 1 contacts of relay PK to ground, and locks up through its No. 3 contacts, No. 3 contacts of relays CW2 . . . CW9, conductor 281 within bracket 279, No. 6 contacts of relay PT1, conductor 282, and No. 4 contacts of relay ON2 to ground.

When the cam contacts of the reader controlling the punch magnets of the recorder open, said magnets and the associated check relays are thereby released. When contacts P0 open, relays PL and PL1 are thereby released, releasing relay J. When contacts K7 close, relay W2

(Fig. 71) operates over a circuit extending from battery through the winding of said relay, No. 1 contacts of relay CW1, and No. 2 contacts of relays CW2 . . . CW9 to the ground, traced above, on conductor 278, and locks up through its No. 1 contacts, and No. 2 contacts of relays W3 . . . W9 to the ground, traced above, on conductor 281, opening the locking circuit of and releasing relay W1. When contacts J4 open, magnet PAM and relay PK are thereby released, magnet PAM advancing tape TT one line.

RECORDING SECOND LINE OF TAPE-IDENTITY ENTRY

When contacts P0 again close, relays PL and PL2 operate in series, the circuit extending from battery through the windings of said relays in series, conductor 292, No. 3 contacts of relay W2, and thence, over the circuit traced above for the operation of relays PL and PL1, to ground. Relays PL and PL2 connect cam contacts of the reader to punch magnets of the recorder to record the second line of the tape identity in the manner described for the first line. The second line consists of the digits "2892" followed by the number of the maker group. The latter number is obtained from the marker-group tens and units switches. For example, punch magnet MF4 is operated over a circuit extending from battery through the winding of said magnet, conductor 293, No. 9 contacts of relay PCC, the winding of relay KF4, conductor 294 within bracket 295, the seventh terminal and arm of the No. 3 arc of the Marker-Group Units switch, conductor 296 within bracket 297, No. 6 contacts of relay PL2, conductor 298 within bracket 127, and contacts PF0 to ground. Other punch magnets of the recorder operate over similar circuits through contacts of the marker-group tens and units switches so that the marker-group number recorded is in accordance with the setting of said switches.

RECORDING SUBSEQUENT LINES OF TAPE-IDENTITY ENTRY

Subsequent lines of the tape identity are recorded on tape TT in a manner similar to that described above for the first and second lines. The office number in the fifth line, the "thousand" and "round" numbers in the eighth line, and the number of the month in the ninth line are recorded in accordance with the setting of the office, thousands, round, and month switches, respectively, the circuits for the punch magnets to be operated being similar to the circuit traced above for punch magnet MF4, and relays W1 . . . W9, CW1 . . . CW9, and PL1 . . . PL9 being operated successively.

When relay CW9 is operated, in connection with the ninth line, in the manner described above for relay CW1, relay T1P (Fig. 59) operates over a circuit extending from battery through the winding of said relay, conductor 301 within bracket 279, No. 1 contacts of relay CW9, conductor 278 within bracket 279, No. 3 contacts of relay PT1, conductor 99, No. 6 contacts of relay ST4, conductor 116 within bracket 92, No. 3 contacts of relay RCD, conductor 117, and contacts K7 to ground, when said contacts close, and locks up through its No. 3 contacts and No. 4 contacts of relay PT1 to ground. Relay CP1 then operates over an obvious circuit and locks up through its No. 6 contacts, conductor 302, No. 1 contacts of relay SPT, No. 3 contacts of relay MT1, conductor 304 within bracket 195, No. 7 contacts of relay L2, conductor 305 within bracket 195, and No. 7 contacts of relay MLK to ground. Relay CP1 operates relay T1E over an obvious circuit and the latter relay locks up through its No. 6 contacts, conductor 306, and No. 6 contacts of relay MLK to ground. Relay CP1 opens the circuit of and releases relay AS (operated in connection with the reading of the last line of the tape identity in the manner previously described) which, in turn, opens the circuit of and releases relay PT1. Release of relay PT1 releases relay T1P.

Relay RS then operates over a circuit extending from battery through the winding of said relay, conductor 197, No. 5 contacts of relay SKP, conductor 222 within bracket 195, No. 2 contacts of relay L9, conductor 307 within brackets 195 and 150, No. 1 contacts of relay T1P, No. 3 contacts of relay CP1, conductor 271, and thence, over the circuit traced above for the operation of relay AS, to ground, and locks up through its No. 4 contacts, conductor 208 within bracket 57, and contacts H3C of the reader while said contacts are closed. Operation of relay RS allows the drum of the reader to step to the next line of the record on tape T.

READING AND REGISTERING MESSAGE-UNIT ENTRY

When the reader drum steps after having read the last line of the tape-identity entry, as described above, the next line encountered by the sensing fingers of the reader is a line of a message-unit entry. This entry may be any one of the four types of such entries previously described and may consist of one or of two lines. Assuming that it consists of but one line, as shown in line 14 of Fig. 73, the first digit of the line is "1." The next digit is the number of message units and the last four digits are the directory number to which the message units are chargeable. Since it was assumed that the tape T now being processed contains the records for directory number 1000 . . . 1999, the first digit of the directory number in the present entry should be "1." It will be assumed, for the purpose of illustration, that the number of message units recorded in this entry is seven and that the directory number is "1234," as shown in line 14 of Fig. 73.

As previously explained, the first digit of the directory number in this entry will be compared with the setting of switch TH to assure that said directory number is a proper one to appear on the tape being read; the last three digits of said directory number will be registered in the X directory number register and the number of message units will be registered in the X message units register, as described below.

Figure 32:
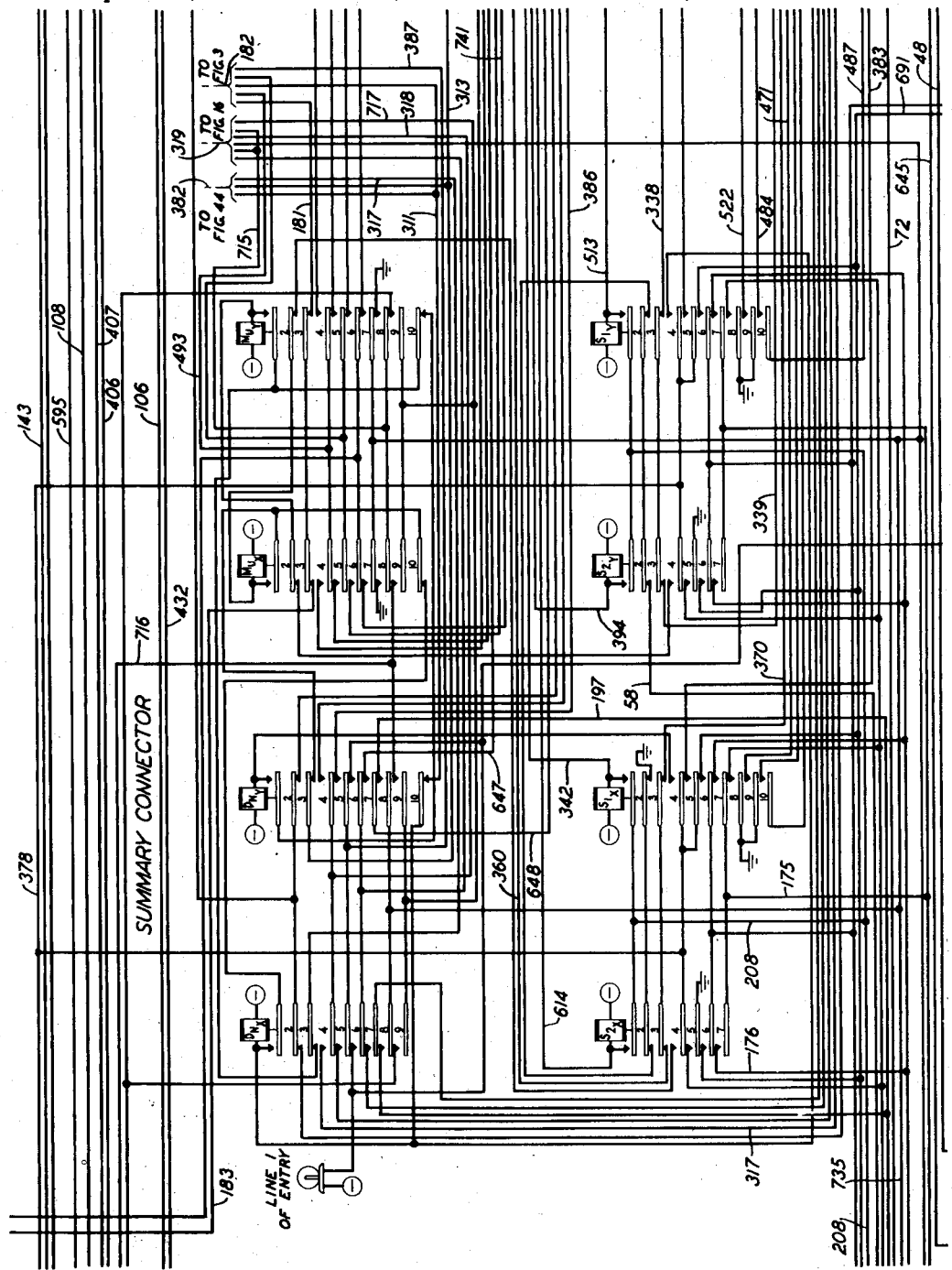
Fig. 32 shows the summary connector circuit.

When relay MON operates, as described above, relay DNX (Fig. 32) operates over a circuit extending from battery through the winding of said relay, No. 10 contacts of relay DNY, conductor 311 within bracket 182, No. 1 contacts of relay RCA, conductor 312 within bracket 277, and No. 2 contacts of relay T1E to ground, and locks up through its No. 1 contacts, No. 10 contacts of relay MUX, No. 3 contacts of relay DNY, conductor 313, and No. 3 contacts of relay ON3 to ground. Operation of relay DNX selects the X registers for use with this entry.

Figure 19:
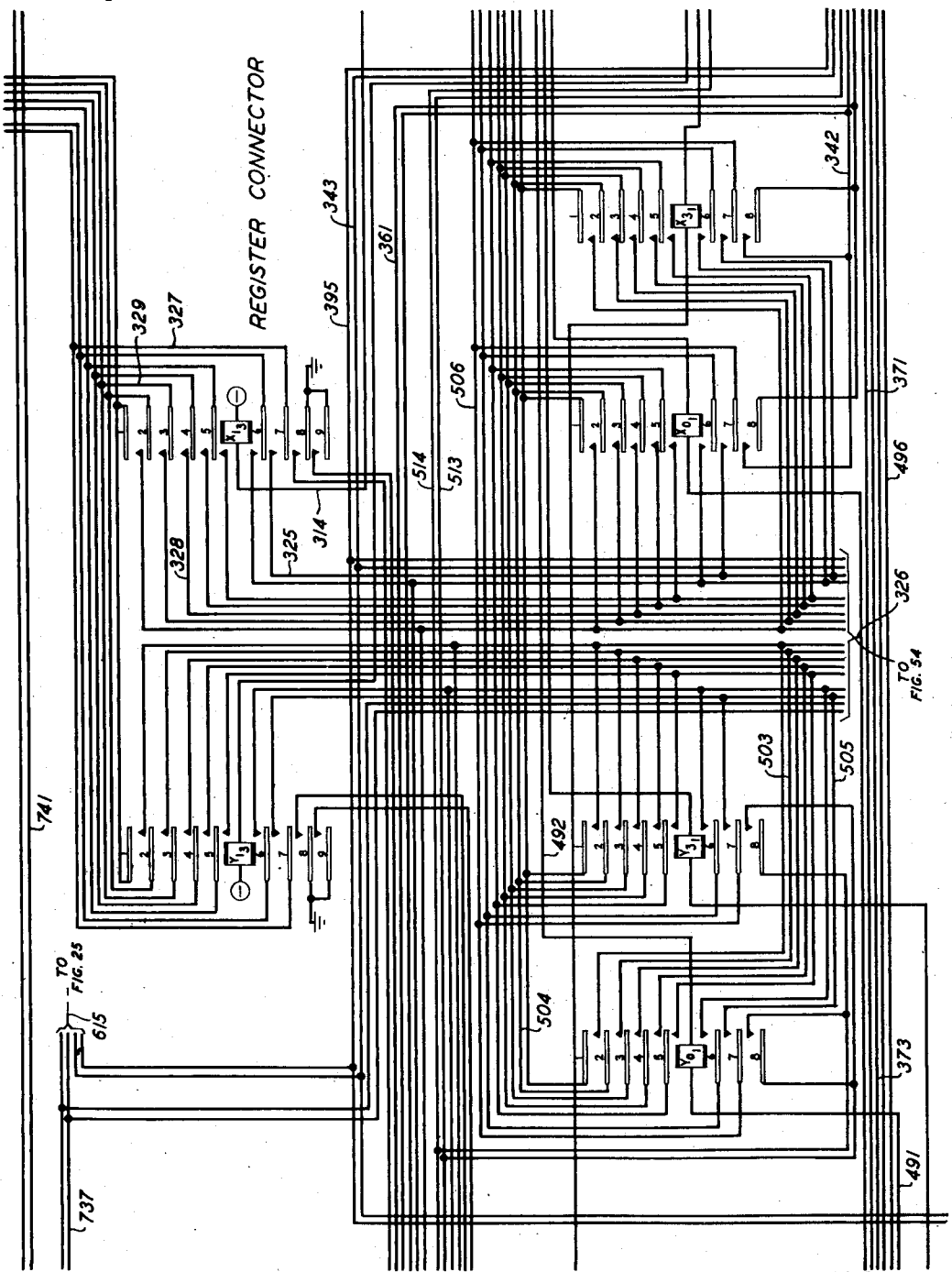
Figure 20:
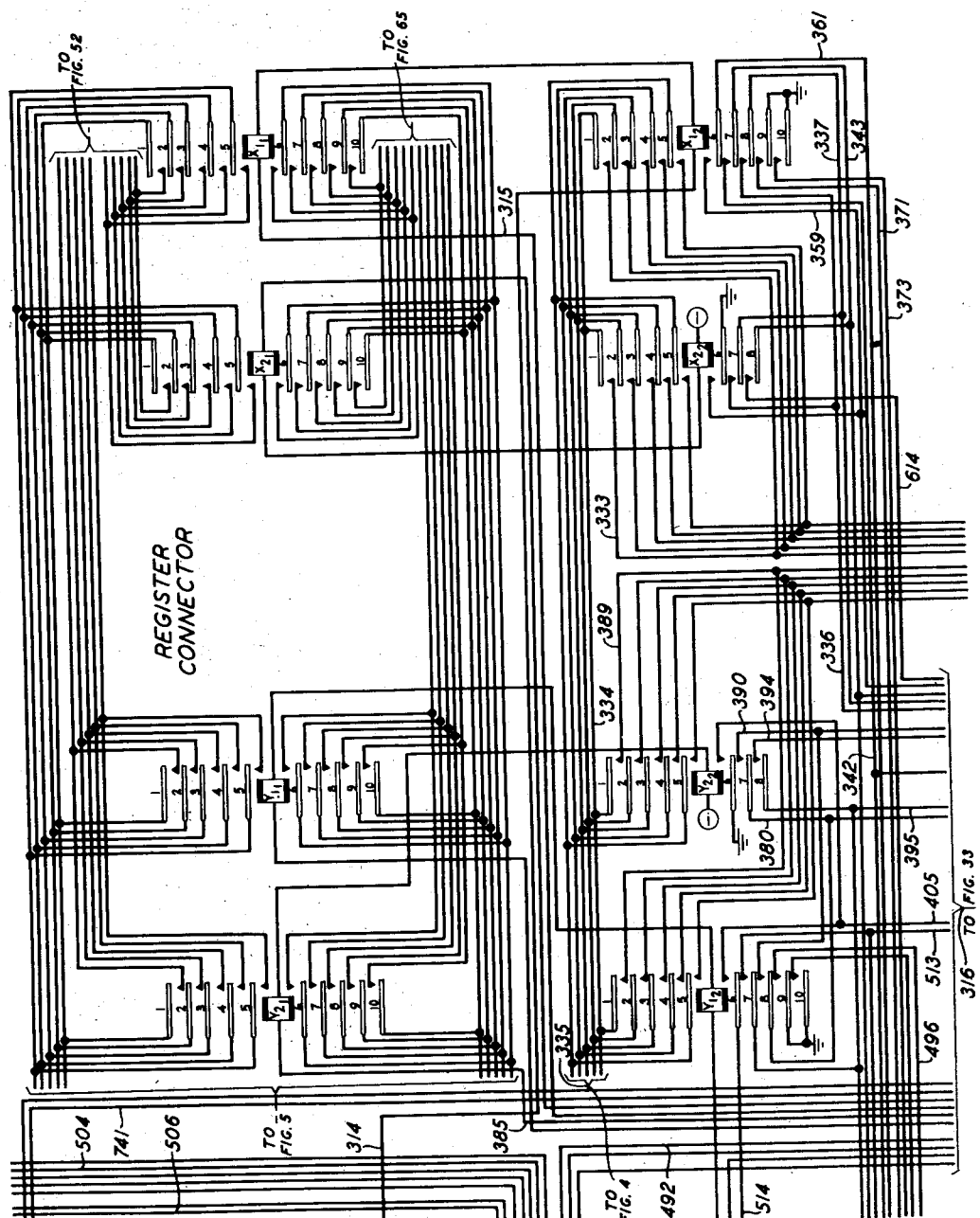
Figure 34:
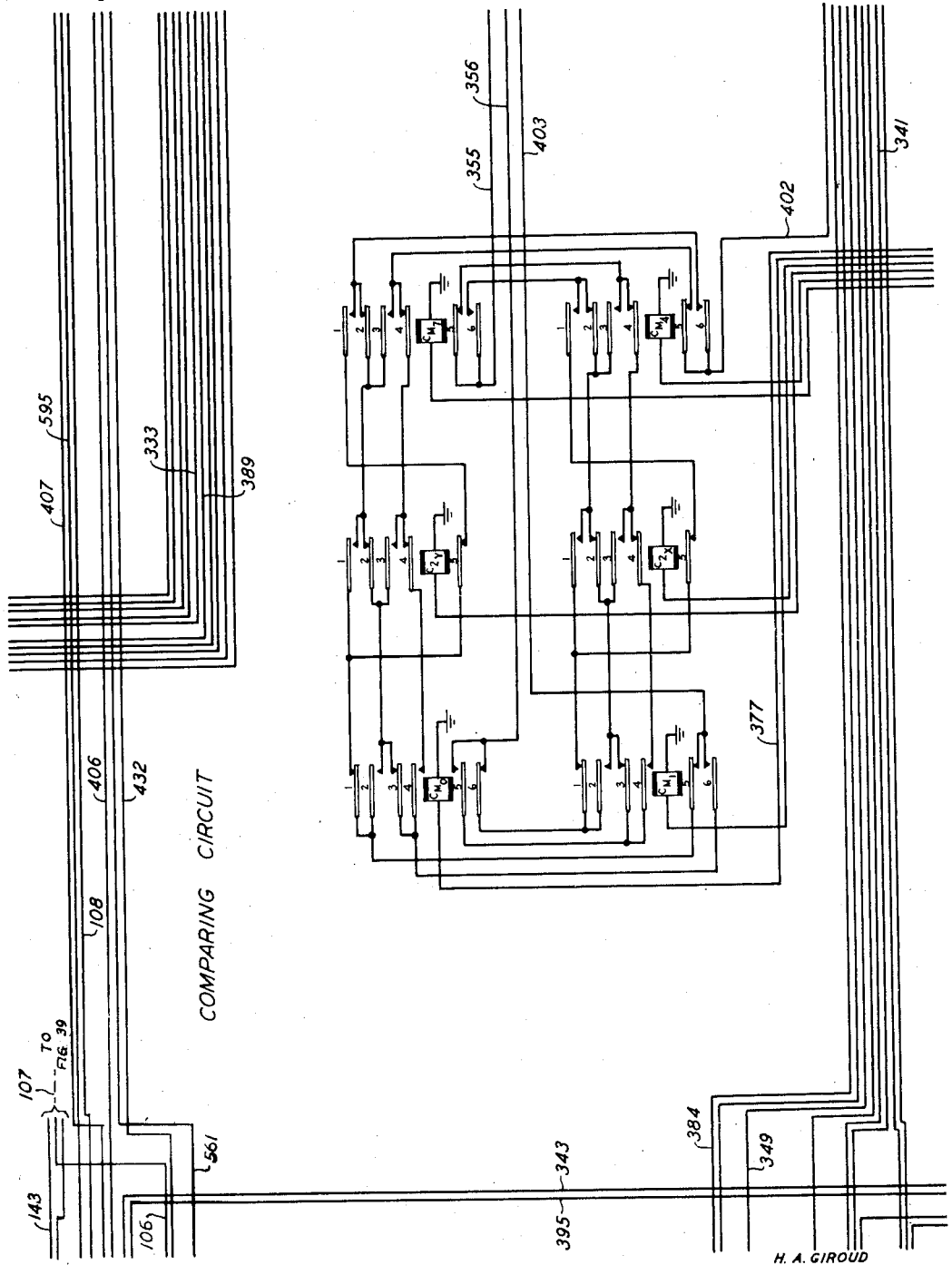
Fig. 34 shows the comparing circuit.

When the sensing fingers of the reader fall on the line of this entry, a combination of reading relays and reading translator relays corresponding to the digits recorded operates in the manner previously described. For this entry the reading relays operated are A1, B0, B7, C0, C1, D0, D2, E1, E2, F0, and F4, and the translator relays are TB7, TD2, TE3, and TF4. Relay X13 (Fig. 19) and relays X11 and X12 (Fig. 20) then operate over a circuit extending from battery through the winding of relay X13, conductor 314, the winding of relay X12, the winding of relay X11, conductor 315 within bracket 316, No. 2 contacts of relay XON, No. 4 contacts of relay DNX, conductor 318 within bracket 319, No. 1 contacts of relay A1, conductor 321 within bracket 205, No. 12 contacts of relay CP1, conductor 322, No. 2 contacts of relay SKA, conductor 183 within bracket 214, No. 3 contacts of relay F0, No. 4 contacts of relay F1, No. 4 contacts of relay F2, No. 3 contacts of relay F4, No. 2 contacts of relay F7, No. 2 contacts of relay E0, No. 3 contacts of relay E1, No. 5 contacts of relay E2, No. 2 contacts of relay E4, No. 2 contacts of relay E7, conductor 203, No. 3 contacts of relay D0, No. 4 contacts of relay D1, No. 5 contacts of relay D2, No. 2 contacts of relay D4, No. 2 contacts of relay D7, No. 3 contacts of relay C0, No. 5 contacts of relay C1, No. 6 contacts of relay C2, No. 2 contacts of relay C4, No. 2 contacts of relay C7, conductor 204, No. 2 contacts of relay B0, No. 4 contacts of relay B1, No. 3 contacts of relay B2, No. 4 contacts of relay B4, No. 3 contacts of relay B7, conductor 189 within bracket 179, No. 3 contacts of relay A0, No. 4 contacts of relay A2, No. 3 contacts of relay A4, conductor 191, No. 8 contacts of relay RCD, conductor 193 within bracket 92, No. 3 contacts of relay ST3, conductor 172, thence through back contacts of relay RKA, conductor 180, and contacts G1 to ground, or through front contacts of relay RKB, conductor 174, and contacts G2 to ground, depending upon the position of the reader drum. Operation of relays X11, X12, and X13 over this circuit checks that the proper number of reading relays is operated and that the reader drum is stepping normally. Relays CM0 and CM1 (Fig. 34) now operate relay CM0 over a circuit extending from battery through No. 1 contacts of relay C0 (Fig. 4), conductor 375 within bracket 376, No. 2 contacts of relay PA1, conductor 377, and the winding of relay CM0 to ground, and relay CM1 over a parallel circuit through No. 1 contacts of relay C1 (Fig. 4). Operation of relays CM0 and CM1 checks that the third digit of the entry, which is the thousands digit of the directory number, agrees with the setting of switch TH, by which relay PA1 was operated.

Figure 35:
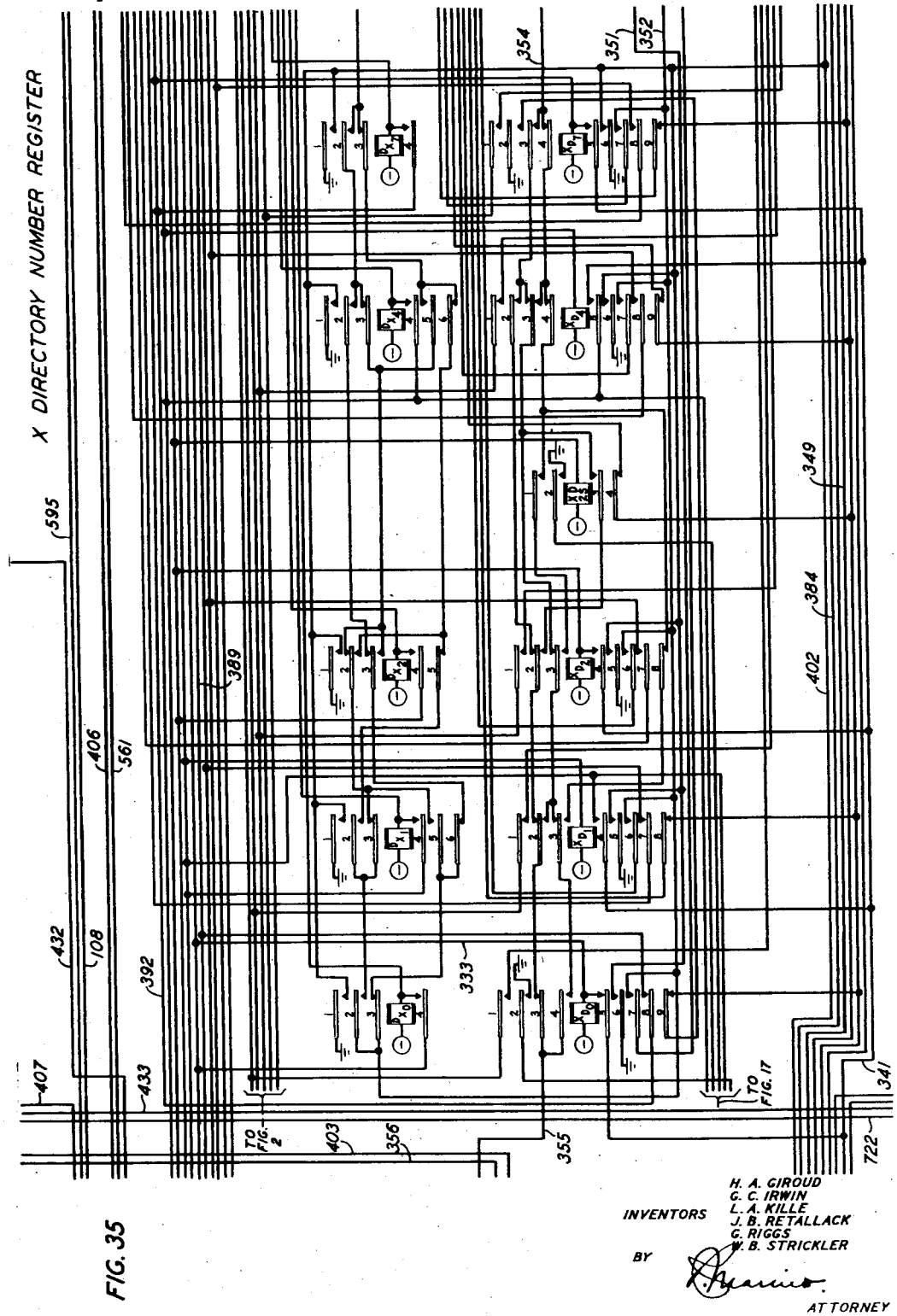
Figs. 35, 52 and 65 show the one directory number register.

When relays X11, X12, and X13 operate, as described above, relays XD0, XD2, XE1, XE2, XF0, and XF4 of the X directory number register operate to register the last three digits of the directory number in the entry. Relay XD0 (Fig. 35) operates over a circuit extending from battery through the winding of said relay, conductor 333, No. 1 contacts of relay X12, conductor 334 within bracket 335, and No. 1 contacts of relay XD0 to ground. The other register relays named operate over similar circuits. Relay XLK (Fig. 33) also operates over a circuit extending from battery through the winding of said relay, conductor 336 within bracket 316, No. 8 contacts of relay X12, conductor 337 within bracket 316, No. 2 contacts of relay PFX, No. 3 contacts of relay S1Y, No. 3 contacts of relay S1X, conductor 339, and No. 6 contacts of relay ON3 to ground, and locks up to the same ground on conductor 338 through its No. 1 contacts. The register relays XD0, XD2, etc. are now locked up through their locking contacts, conductor 341, and No. 4 contacts of relay XLK to ground.

The X directory number register now has a directory number registered therein while no number is registered in the Y directory number register. It will be recalled that, in the description of the general operation of the system, it was stated that the registration of the message units for a registered directory number would be retained, and the message units in succeeding entries added thereto only if the same directory number is registered in both the X and Y directory number registers. This is not the case when the first entry is read and the directory number therein is registered, but the circuits are so arranged that the comparison of registered directory numbers is omitted for the first entry, as will be apparent from the description below.

Figure 25:
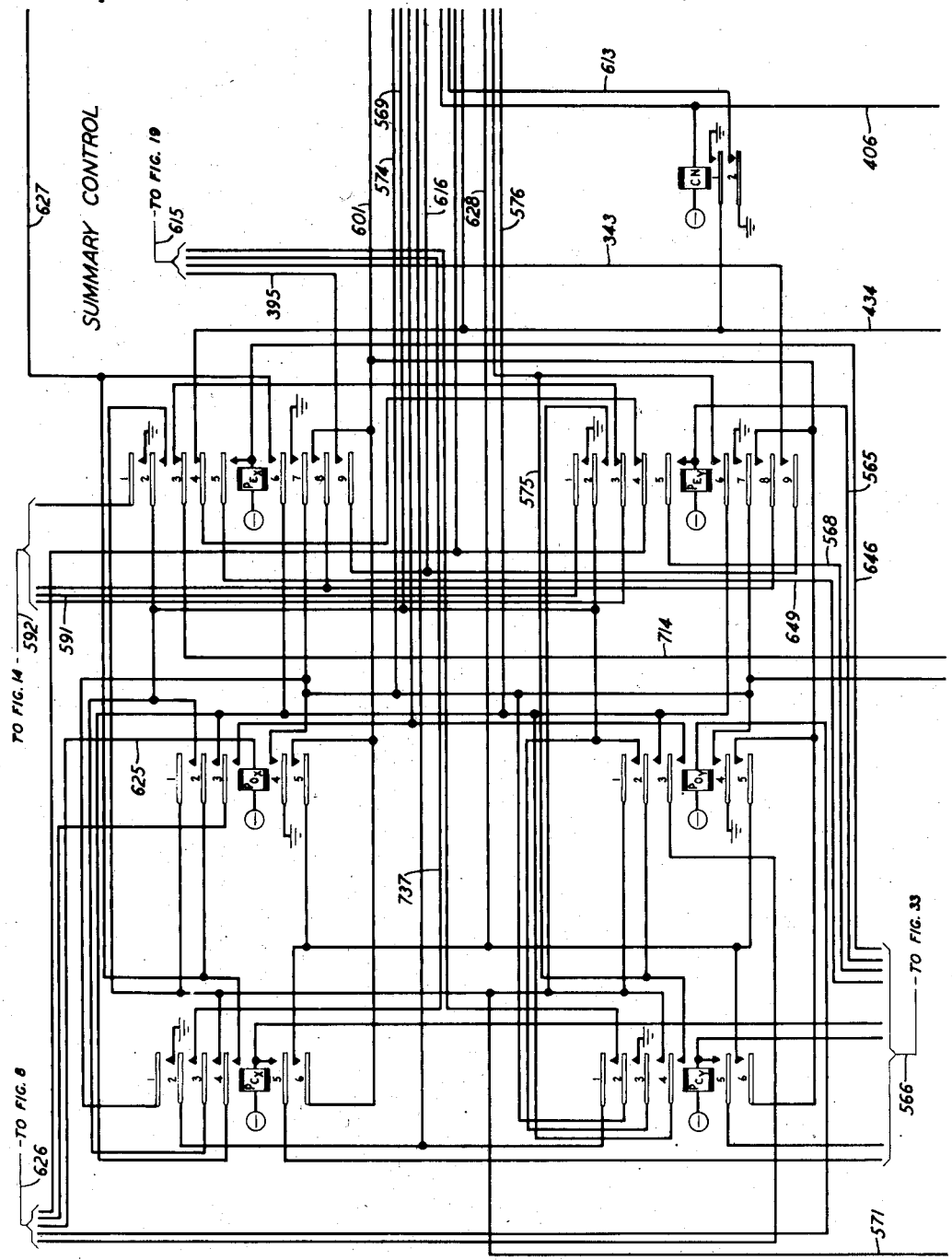
Figs. 25 through 27 show the summary control circuit.

While the above operations are taking place, the number of message units in the first entry is registered in the X message units register and transferred to the X sum register, as described below. The register circuits have been previously prepared, as follows: When relay A0N operated, as previously described, relay CN (Fig. 25) operated over a circuit extending from battery through the winding of said relay, conductor 406, No. 1 contacts of relay RLM, conductor 407, No. 1 contacts of relay OF, conductor 408, No. 9 contacts of relay PYH, No. 11 contacts of relay PXH, No. 1 contacts of relay OY, No. 2 contacts of relay OX, conductor 411, No. 10 contacts of relay PYT, No. 6 contacts of relay PXT, conductor 412, No. 10 contacts of relay PYU, No. 10 contacts of relay PXU, conductor 413 within bracket 381, No. 3 contacts of relay AX, No. 3 contacts of relay AY, No. 1 contacts of relay CCY, conductor 414, No. 6 contacts of relay HYL, No. 6 contacts of relay HYH, conductor 415, No. 1 contacts of relays HY0 ... HY4, conductor 416 within bracket 346, No. 6 contacts of relay TYL, No. 6 contacts of relay TYH, conductor 417, No. 1 contacts of relay TY0 ... TY4, conductor 418, No. 6 contacts of relay UYL, No. 6 contacts of relay UYH, conductor 418, No. 1 contacts of relays UY0 ... UY4, conductor 421 within brackets 332 and 422, No. 3 contacts of relay CCY, No. 2 contacts of relay CCX, conductor 423 within brackets 389 and 332, No. 1 contacts of relays UX4 ... UX0, No. 6 contacts of relay UXH, No. 6 contacts of relay UXL, conductor 425, No. 1 contacts of relays TX4 ... TX0, conductor 426 within bracket 427, No. 6 contacts of relay TXH, No. 6 contacts of relay TXL, conductor 428 within bracket 364, No. 1 contacts of relays HX4 ... HX0, conductor 429 within bracket 431, No. 6 contacts of relay HXH, No. 6 contacts of relay HXL, conductor 432, and No. 10 contacts of relay MON to ground.

Figure 9:
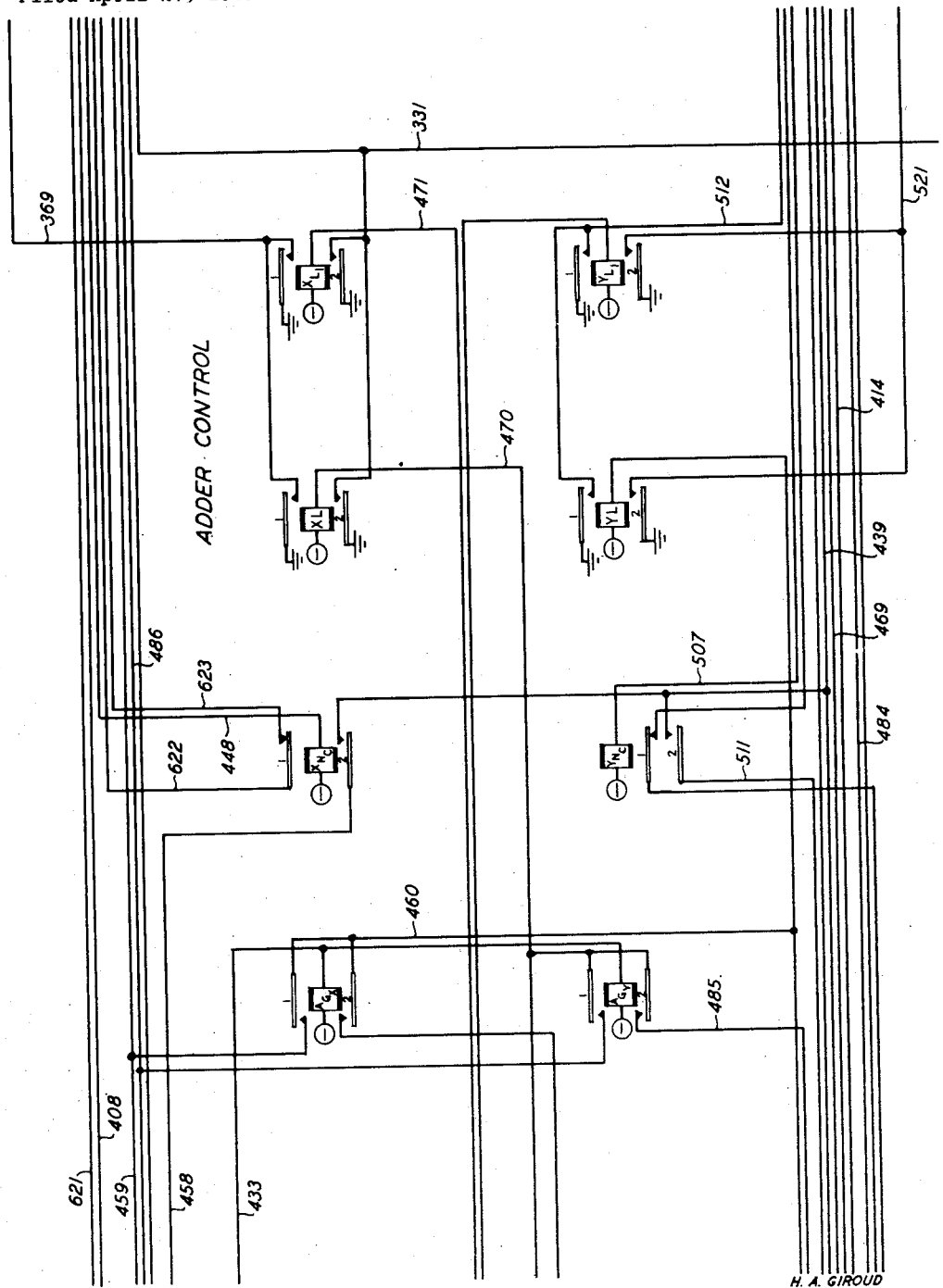
Figure 10:
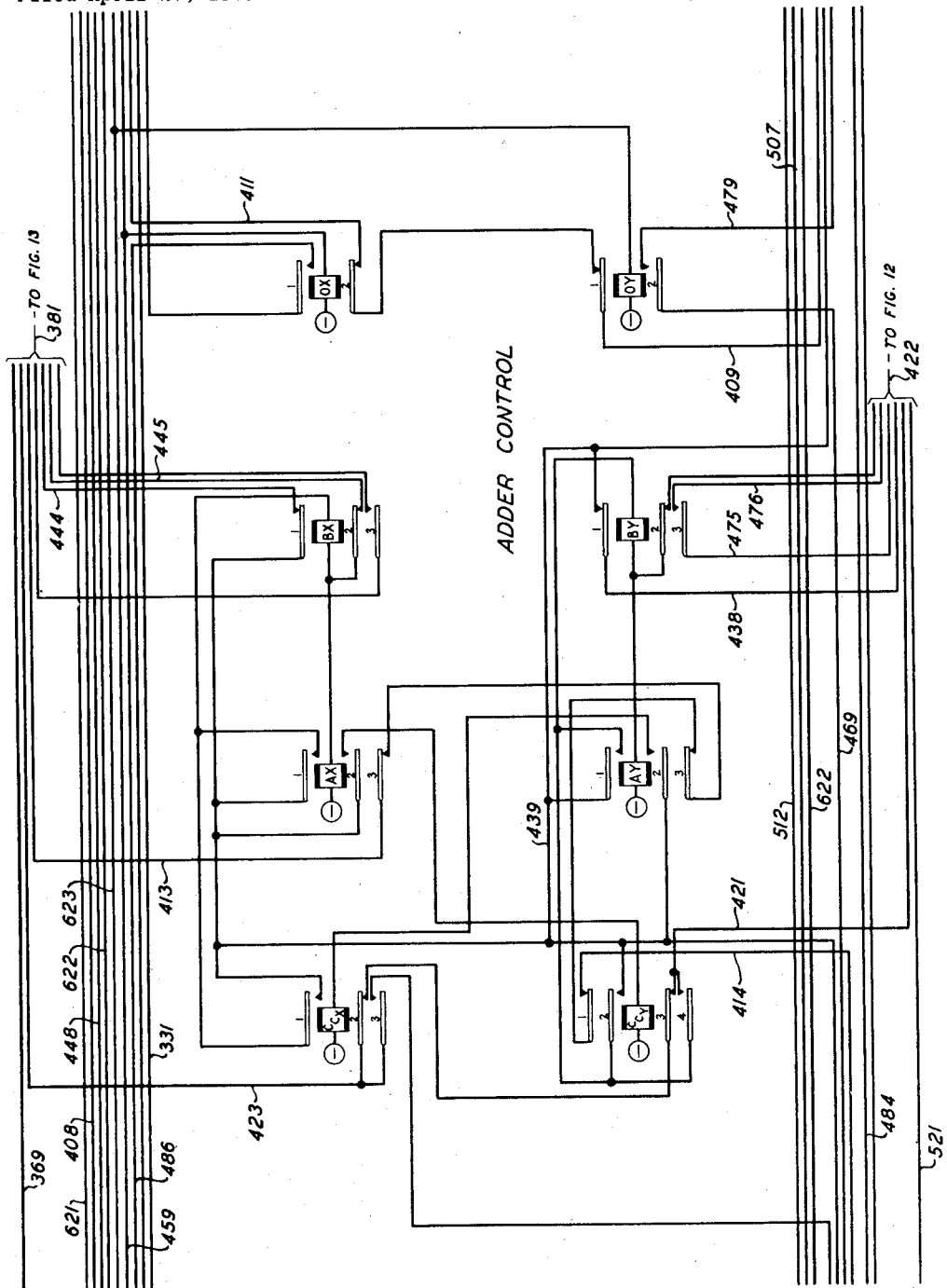
Figure 11:
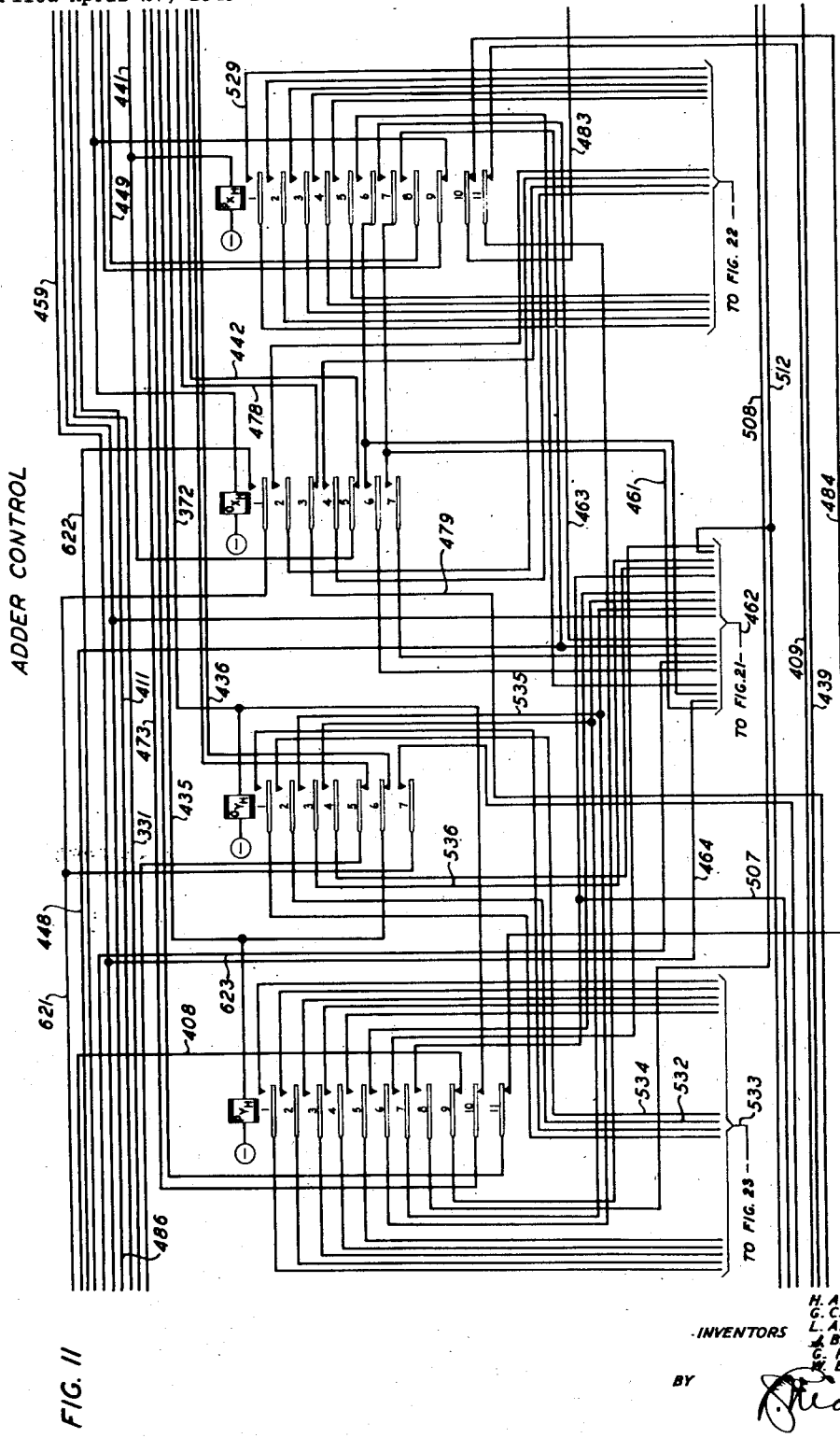
Figure 12:
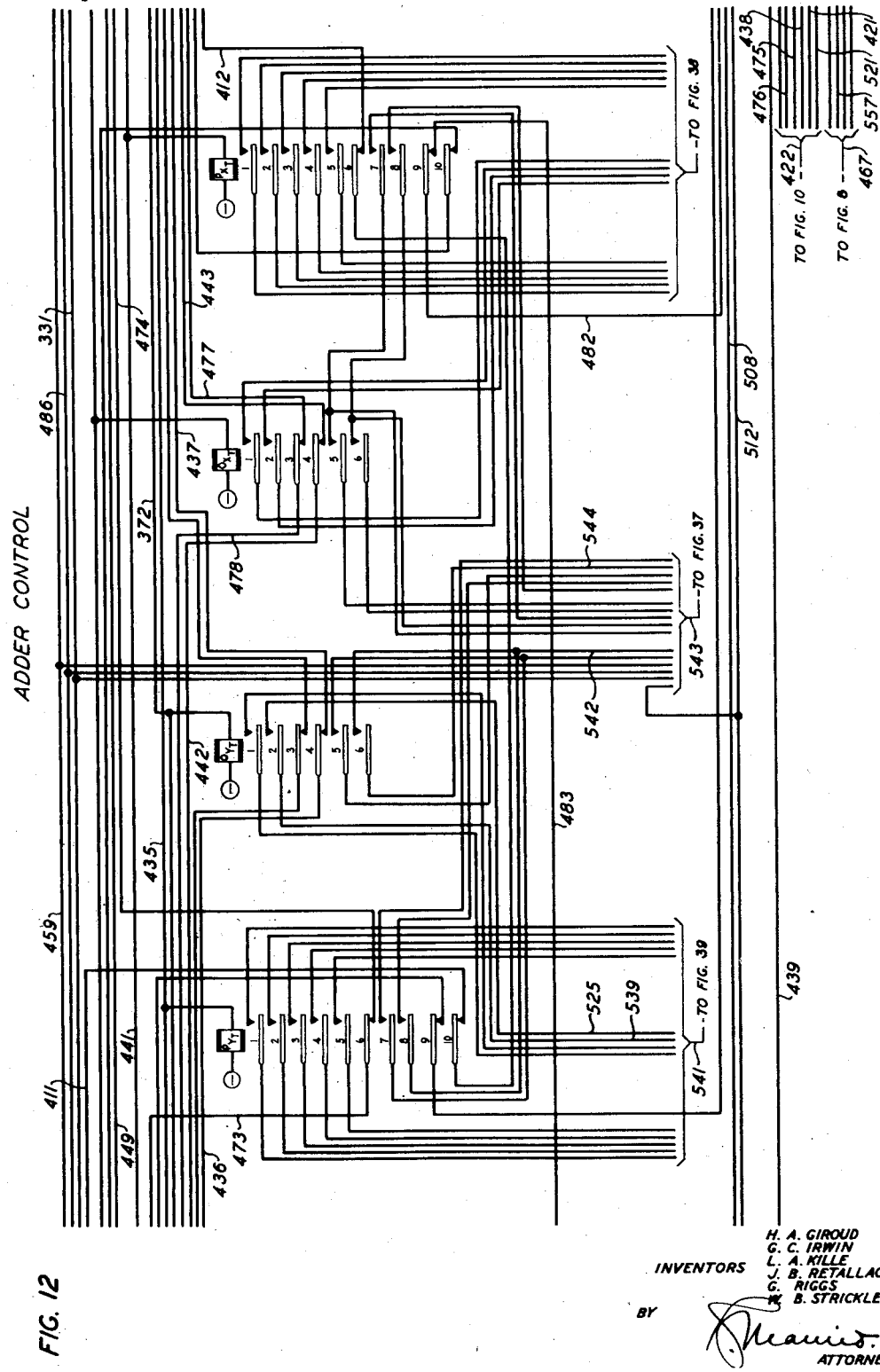
Figure 13:
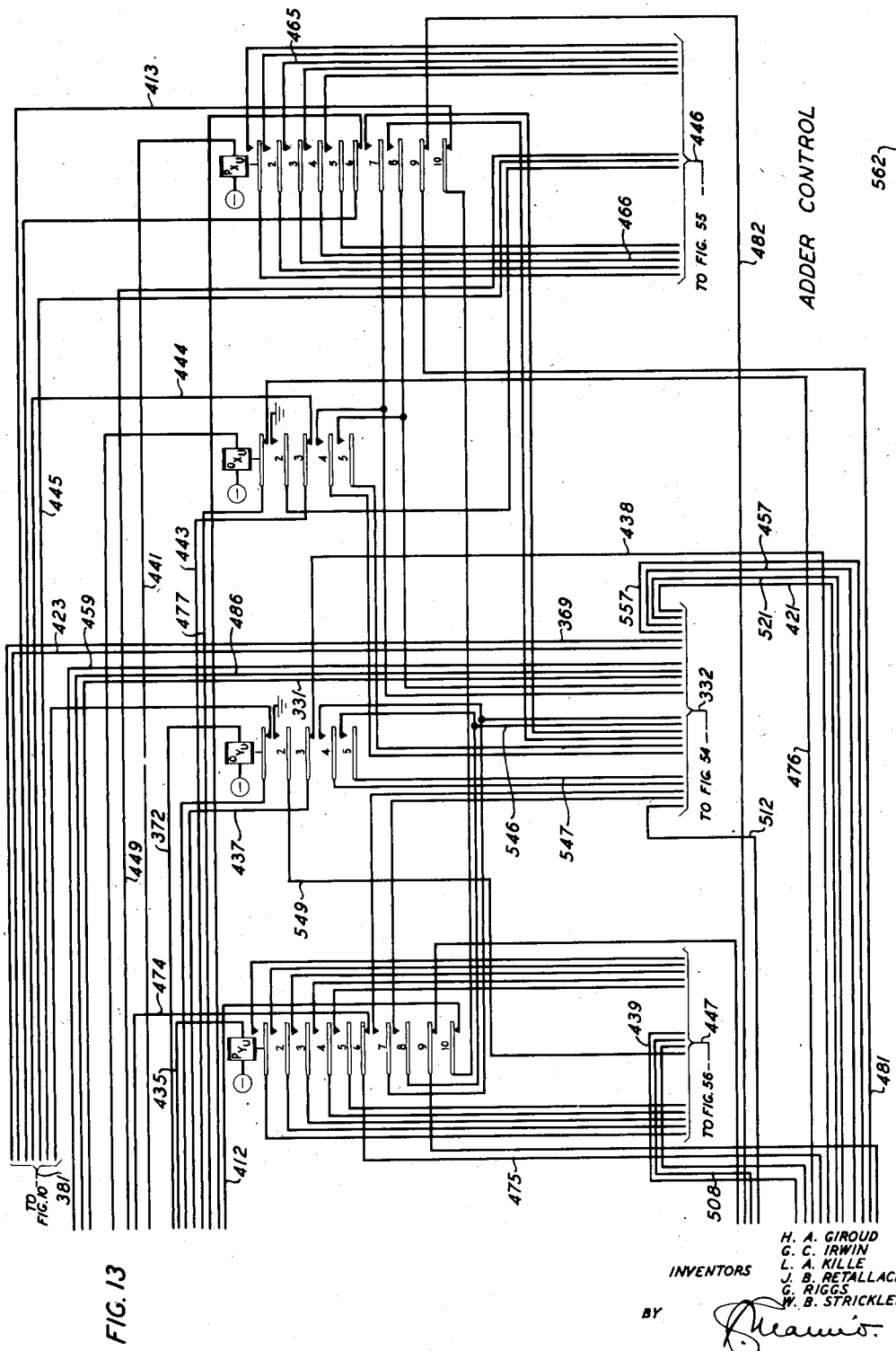

Operation of relay CN over this circuit checks that the relays of the sum registers are normal. Relays AGX and AGY (Fig. 9) together with relay AG (Fig. 8) operate over a circuit extending from battery through the windings of said relays in parallel, conductor 433, No. 12 contacts of relay MON, conductor 434, and No. 1 contacts of relay CN to ground. Relays PHY, PYT and PYU (Figs. 11, 12 and 13) then operate over a circuit extending from battery through the windings of said relays in parallel, conductor 435, No. 6 contacts of relay OYH, conductor 436, No. 4 contacts of relay OYT, No. 3 contacts of relay OYU, conductor 438 within bracket 422, No. 1 contacts of relay BY, conductor 439, and No. 2 contacts of relay AG to ground. Relays PXH, PXT and PXU (Figs. 11, 12 and 13) operate over a circuit extending from battery through the windings of said relays in parallel, conductor 441, No. 5 contacts of relay OXH, conductor 442, No. 4 contacts of relay OXT, conductor 443, No. 3 contacts of relay OXU, conductor 444 within bracket 381, No. 1 contacts of relay BX, conductor 439, and No. 2 contacts of relay AG to ground. Relays XL and YL (Fig. 9), OX and OY (Fig. 10) operate, relay XL over a circuit from battery through the winding of said relay, conductor 470, No. 1 contacts of relay CX, and No. 2 contacts of relay AON to ground; relay OX through No. 1 contacts of relay AGX to this same ground; relay YL over a similar circuit comprising conductor 460, No. 1 contacts of relay CY, and No. 1 contacts of relay AON to ground; and relay OY through No. 1 contacts of relay AGY to this same ground.

Figure 21:
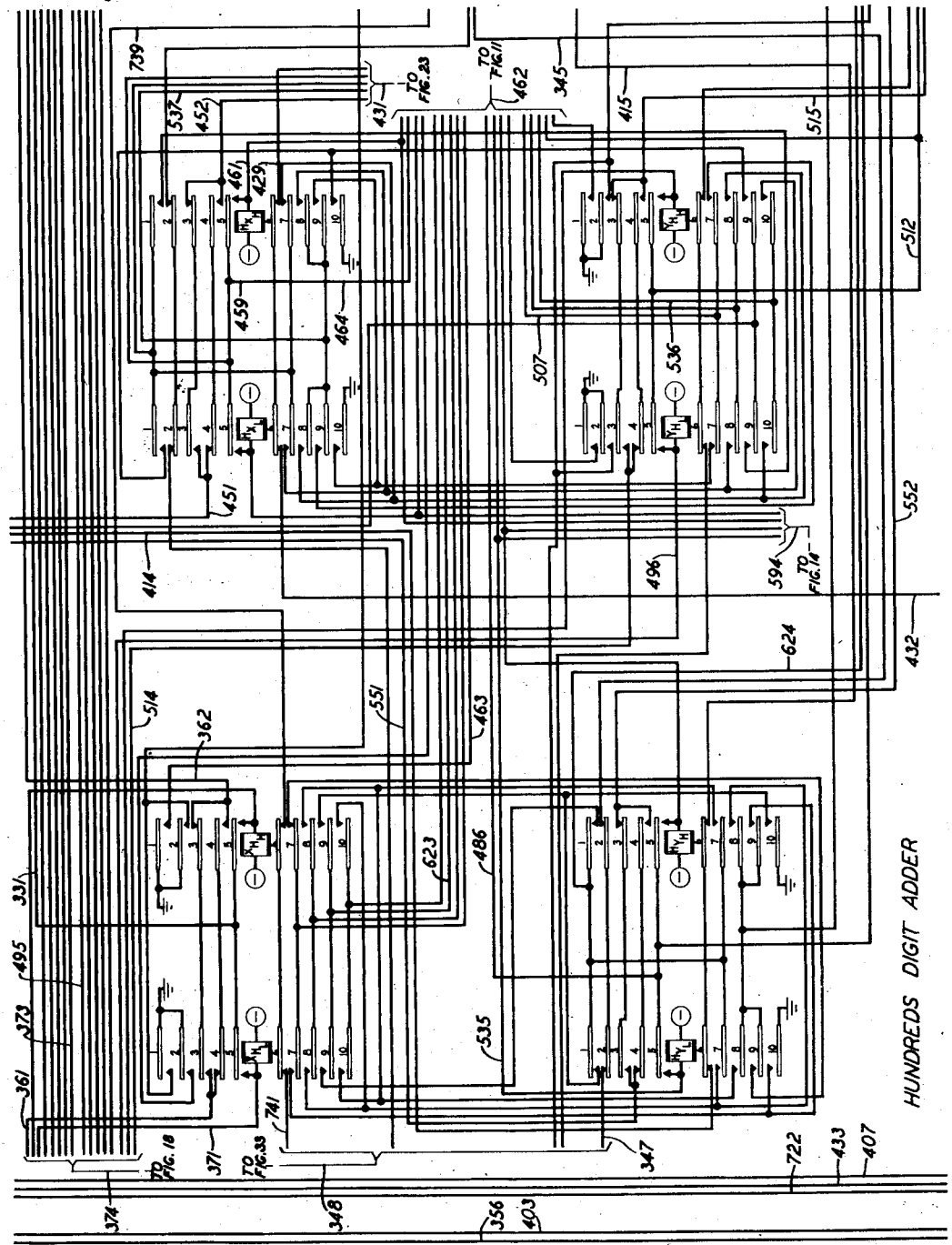
Figs. 21 through 24 show the hundreds-digit adder circuit.
Figure 22:
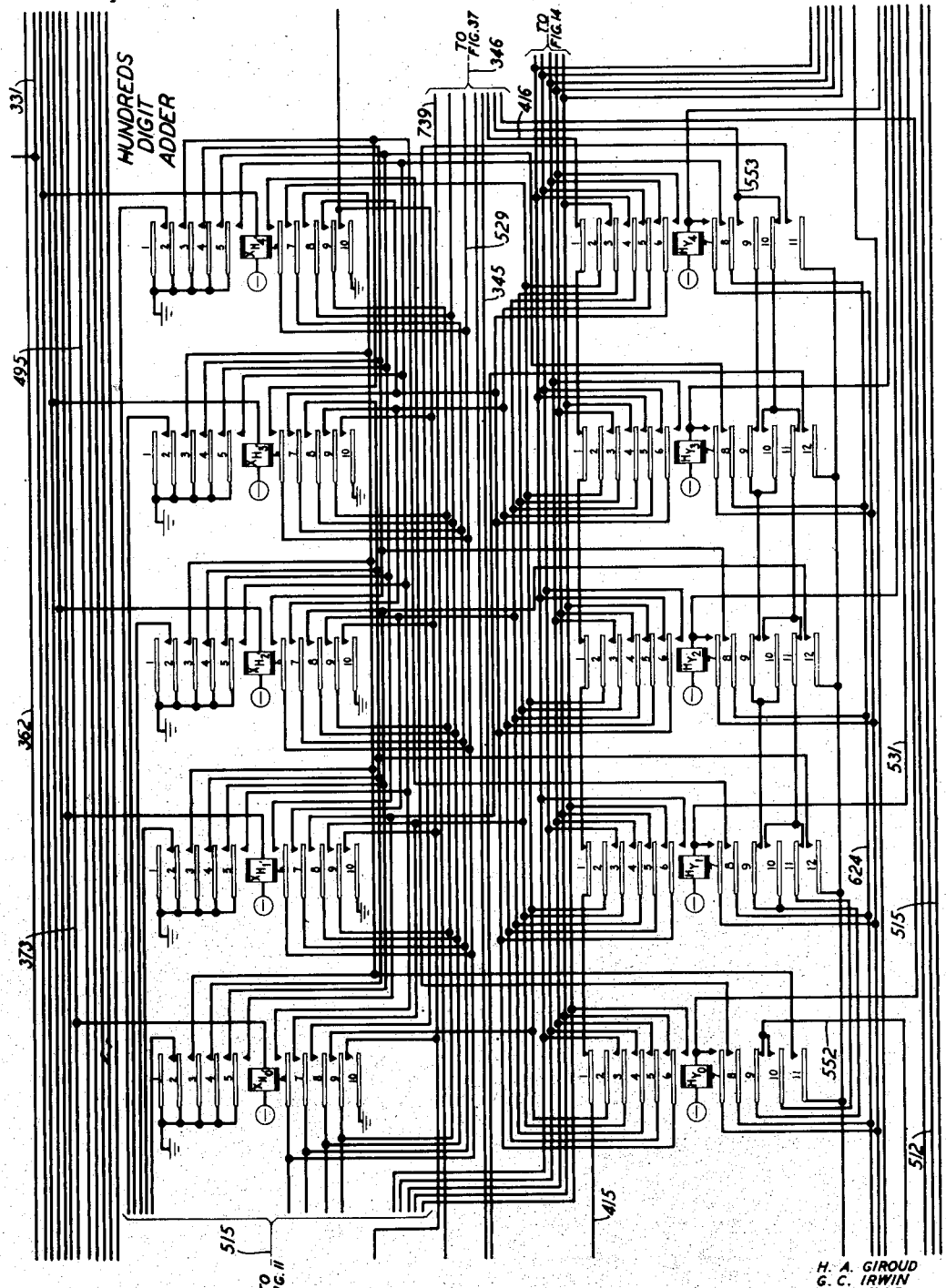
Figure 24:
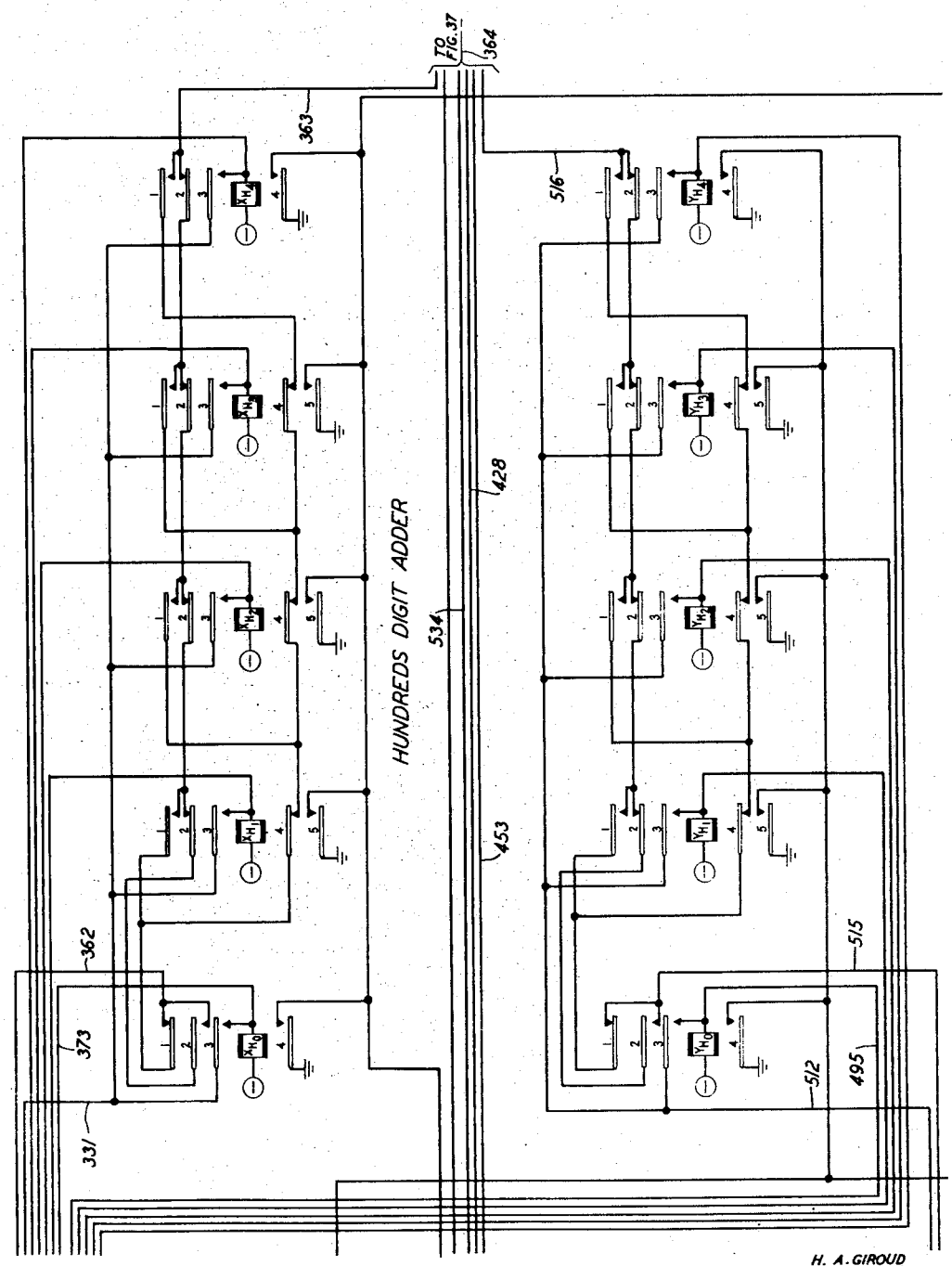
Figure 54:
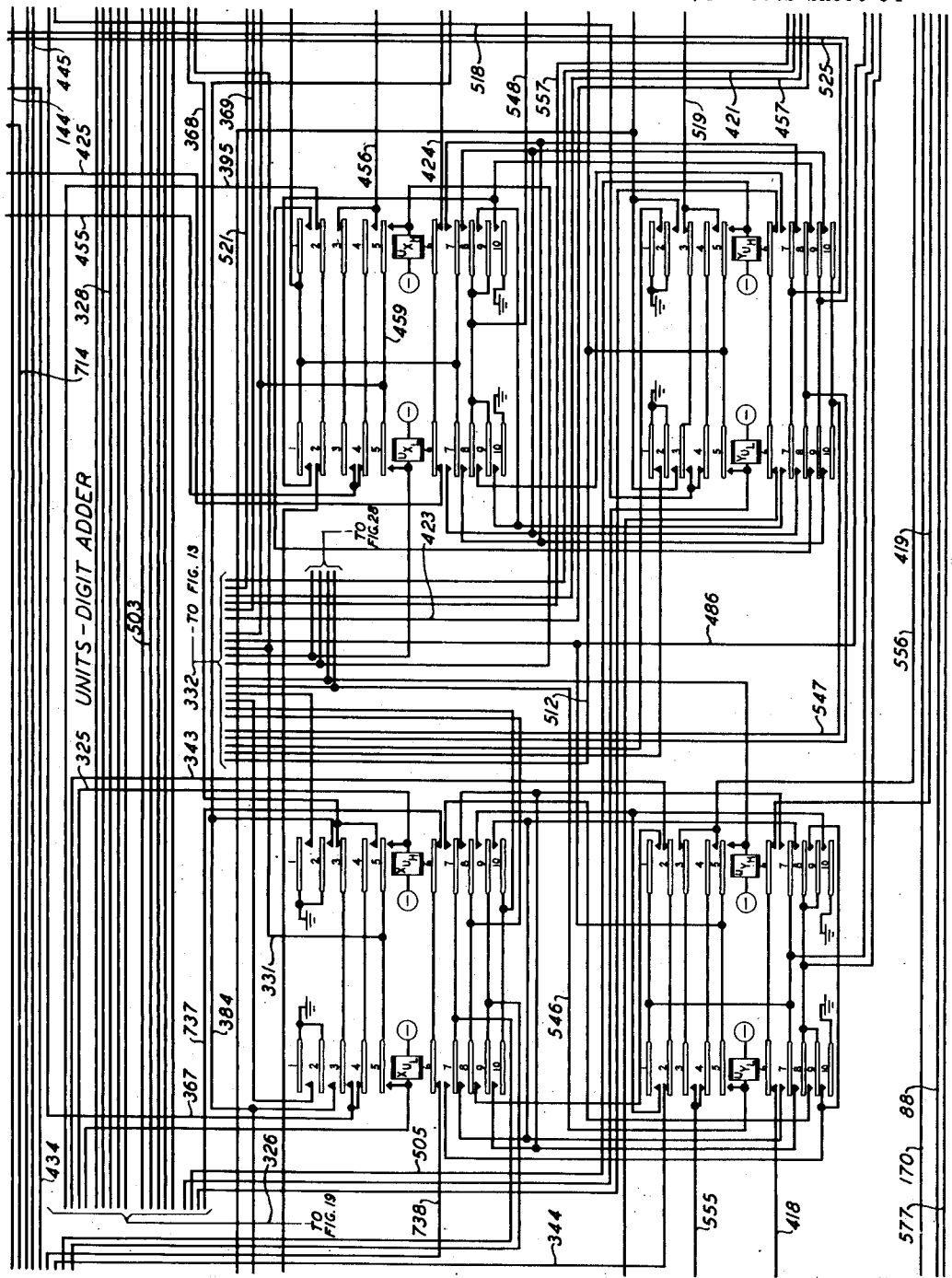
Figs. 54 through 57 show the units-digit adder circuit.
Figure 55:
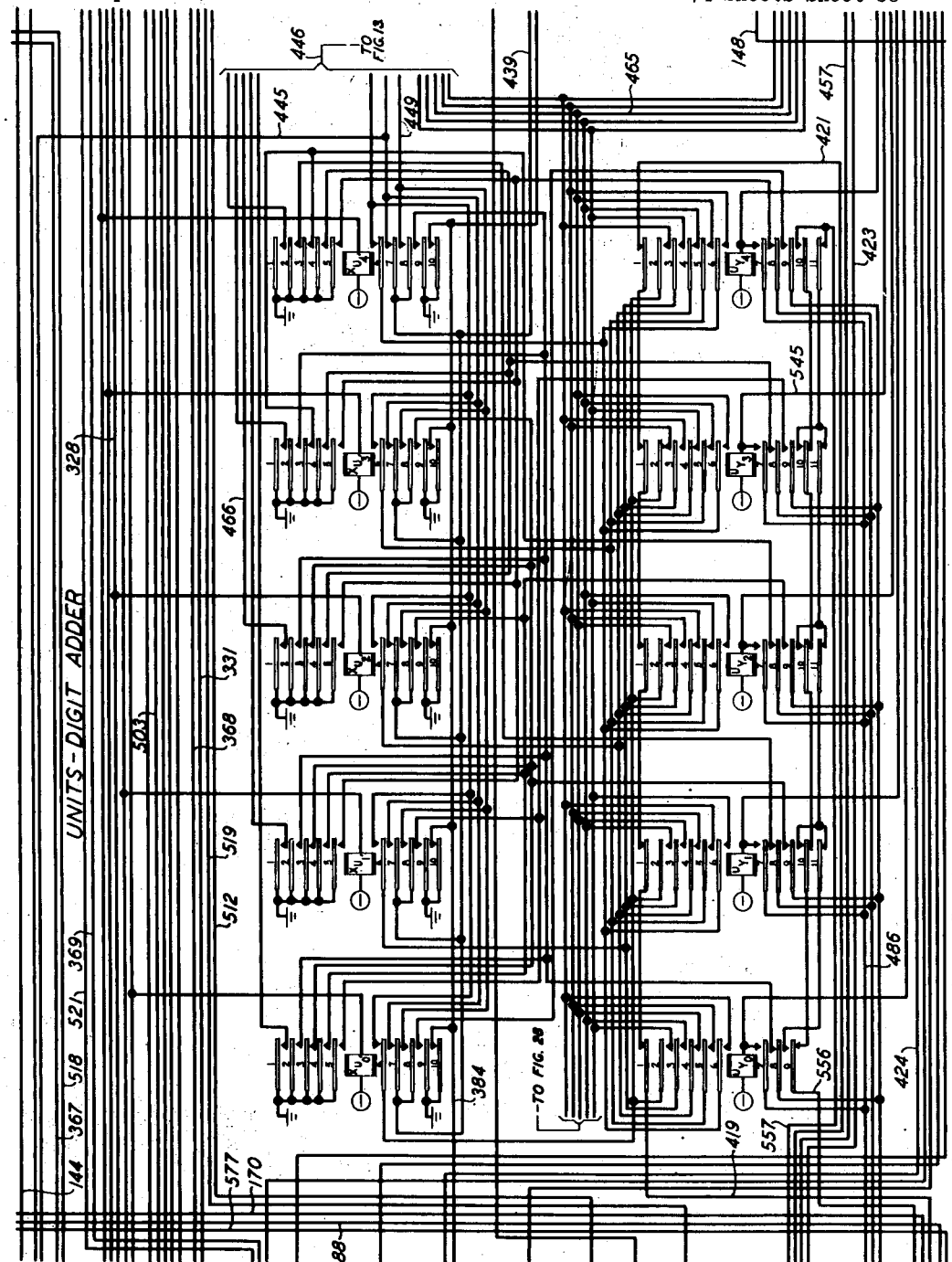
Figure 57:
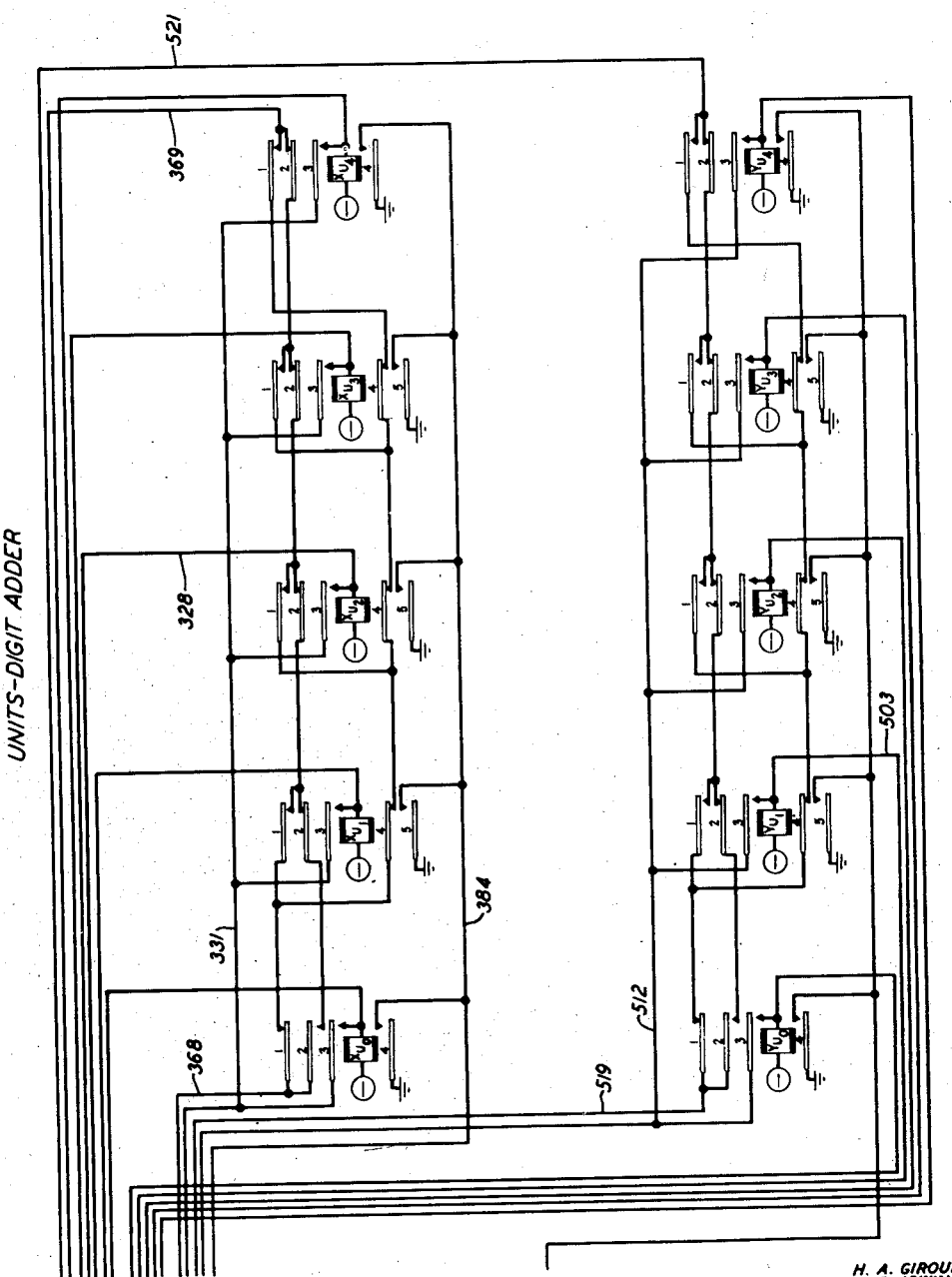

Relays XH0, XH0', XHL, XT0, TX0', XTL, XU2, XU2', and XUH of the X message-units register operate to register therein the number "007" of message units in the entry sensed. Relay XH0 (Fig. 24) and relay XH0' (Fig. 22) operate over a circuit extending from battery through the windings of said relays in parallel, conductor 373 within bracket 374, and No. 10 contacts of relay X12 to ground. Relays XT0 and XT0' operate over a similar circuit. Relay XHL (Fig. 21) operates over a circuit extending from battery through the winding of said relay, conductors 371 within bracket 374, and No. 9 contacts of relay X12 to ground. Similar circuits may be readily traced for relays XT0, XT0', and XTL. Relay XU2 (Fig. 57) and relay XU2' (Fig. 55) operate over a circuit extending from battery through the windings of said relays in parallel, conductor 328 within bracket 326, No. 3 contacts of relay X13, conductor 329, and No. 1 contacts of relay TB7 to ground. Relay XUH (Fig. 54) operates over a circuit extending from battery through the winding of said relay, conductor 325 within bracket 326, No. 7 contacts of relay X13, conductor 327, and No. 2 contacts of relay TB7 to ground. All of said relays lock up through their own locking contacts, conductor 331, and No. 2 contacts of relay XL to ground.

Relay AX (Fig. 10) now operates over a circuit extending from battery through the winding of said relay, No. 2 contacts of relay BX, conductor 445 within brackets 381 and 446, No. 7 contacts of relay XU2', to the previously traced ground on conductor 439, and No. 2 contacts of relay AG to ground, completing a circuit from battery through the winding of relay CCY (Fig. 10) and No. 2 contacts of relay AX to the same ground on conductor 439, over which relay CCY operates. Relays AY and BY (Fig. 10) operate over a circuit extending from battery through the windings of said relays in series, and No. 2 contacts of relay CCY to the ground on conductor 439, and lock up to the same ground through No. 1 contacts of relay AY. Relay AY completes a circuit from battery through the winding of relay CCX and No. 2 contacts of relay AY to the same ground on conductor 439, over which relay CCX operates. Operation of relay BY opens the circuit of and releases relays PYH, PYT, and PYU. Relay XNC (Fig. 9) operates over a circuit extending from battery through the winding of said relay, conductor 448, No. 8 contacts of relay PXH, conductor 449 within bracket 446, and No. 8 contacts of relay XU2' to the ground on conductor 439. Relay CX1 (Fig. 8) operates over a circuit extending from battery through the lower winding of said relay, conductor 458, and No. 2 contacts of relay XNC to the ground on conductor 439, and locks up through its upper winding and its own contacts, conductor 459, No. 1 contacts of relay AGX, conductor 460, No. 1 contacts of relay CY, and No. 1 contacts of relay AON to ground.

Relays HXH, HX0, TXH, TX0, UXH and UX2 of the X sum register now operate. These relays correspond to the relays operated in the X message-units register and they therefore register in the X sum register the number "007" of message units registered in the X message-units register. Relay HXH (Fig. 21), for example, operates over a circuit extending from battery through the winding of said relay, conductor 461 within bracket 462, No. 7 contacts of relay PXH, conductor 463 within bracket 462, and No. 1 contacts of relay XHH to ground. Relay UX2 operates over a circuit extending from battery through the winding of said relay, conductor 465 within bracket 446, No. 3 contacts of relay PXU, conductor 466 within bracket 446, and No. 1 contacts of relay XU2' to ground. The other relays named operate over similar circuits. All of these relays lock up through their own locking contacts, conductor 459, No. 1 contacts of relay AGX, conductor 460, No. 1 contacts of relay CY, and No. 1 contacts of relay AON to ground. When all of these relays have operated, relay CX (Fig. 8) operates over a circuit extending from battery through the winding of said relay, conductor 451, No. 4 contacts of relay HXL, No. 4 contacts of relay HXH, conductor 452 within bracket 431, No. 10 contacts of relay HX0, No. 11 contacts of relays HX1 . . . HX3, No. 10 contacts of relay HX4, conductor 453 within bracket 364, No. 4 contacts of relay TXL, No. 4 contacts of relay TXH, conductor 454 within bracket 427, No. 10 front contacts of relay TX0, No. 11 contacts of relays TX1 . . . TX4, conductor 455, No. 4 contacts of relay UXL, No. 4 contacts of relay UXH, conductor 456, No. 9 back contacts of relay UX0, No. 10 back contacts of relay UX1, No. 10 front contacts of relay UX2, No. 11 contacts of relays UX3 and UX4, conductor 457 within brackets 332 and 467, and contacts of relay CX1 to the above-traced ground on conductor 459. Operation of relay CX over the above circuit checks that the proper number of relays have operated in the X sum register and opens the circuit, previously traced, of relays XL and OX, releasing said relays.

When the first entry is thus registered, relay S1X (Fig. 32) operates over a circuit extending from battery through winding of said relay, conductor 342 within bracket 316, No. 7 contacts of relay X12, conductor 343 within bracket 326, No. 2 contacts of relay UYH, No. 2 contacts of relay UYL, conductor 344, No. 2 contacts of relay TYH, No. 2 contacts of relay TYL, conductor 345 within bracket 346, No. 2 contacts of relay HYH, No. 2 contacts of relay HYL, conductor 347 within bracket 348, No. 8 contacts of relay YLK, conductor 349, No. 8 contacts of relay YD0, conductor 351, No. 7 contacts of relay XD0, conductor 352, No. 4 contacts of relay XF7, No. 3 front contacts of relay XF4, No. 3 back contacts of relay XF2, No. 3 back contacts of relay XF1, No. 3 front contacts of relay XF0, conductor 353, No. 4 contacts of relay XE7, No. 4 contacts of relay XE4, No. 1 contacts of relay XE2S, No. 3 contacts of relay XE2, No. 2 front contacts of relay XE1, No. 3 back contacts of relay XE0, conductor 354, No. 4 contacts of relay XD7, No. 4 contacts of relay XD4, No. 1 contacts of relay XD2S, No. 3 contacts of relay XD2, No. 3 back contacts of relay XD1, No. 4 contacts of relay XD0, conductor 355, No. 5 contacts of relay CM7, No. 4 contacts of relay CM4, No. 4 contacts of relay C2X, No. 4 contacts of relay CM1, No. 5 contacts of relay CM0, conductor 356, No. 7 contacts of relay OF, conductor 357 within bracket 358, No. 2 contacts of relay XLK, conductor 359 within bracket 316, No. 6 contacts of relay X12, conductor 361 within bracket 374, No. 3 contacts of relay XHL, No. 3 contacts of relay XHH, conductor 362, No. 2 contacts of relays XH0 . . . XH4, conductor 363 within brackets 364, No. 3 contacts of relay XTL, No. 3 contacts of relay XTH, conductor 365 within bracket 366, No. 2 contacts of relays XT0 . . . XT4, conductor 367, No. 4 contacts of relay XUL, No. 4 contacts of relay XUH, conductor 368, No. 1 contacts of relay XU0, No. 4 contacts of relay XU1, No. 1 contacts of relay XU2, No. 2 contacts of relay XU3, No. 2 contacts of relay XU4, conductor 369 within brackets 332 and 381, and No. 1 contacts of relay XL to ground. Operation of relay S1X over this circuit checks that the proper number of relays in the X directory number register are operated and that corresponding relays in the Y directory number register are not operated. It also permits the reader drum to continue to step. Said relay locks up through its No. 1 contacts, conductor 208, and contacts H3C to ground, while said contacts are closed. Relay XL1 (Fig. 9) operates over a circuit extending from battery through the winding of said relay, conductor 471 within bracket 358, and No. 9 contacts of relay S1X to ground.

When contacts K3 now close, relay DNY (Fig. 32) operates over a circuit extending from battery through the winding of said relay, No. 4 contacts of relay S1X, conductor 378, and contacts K3 to ground, opening the locking circuit of and releasing relay DNX. Relay DNY is now locked up through its No. 1 contacts, No. 10 contacts of relay MUY, No. 3 contacts of relay DNX, conductor 379 within bracket 382, and No. 3 contacts of relay MLK to ground. Relay DNY prepares for the registration of the next entry in the Y registers. Relay XON (Fig. 33) also operates over a circuit extending from battery through the winding of said relay, conductor 383, and No. 5 contacts of relay S1X to the above-traced ground on conductor 378, and locks up through its No. 1 contacts, conductor 384, and No. 5 contacts of relay XD2 to ground, opening the circuit of and releasing relays X11, X12 and X13. The operated relays of the X message-units register were locked up through No. 1 contacts of relay XL and now remain locked up through No. 1 contacts of relay XL1. The release of relays X11, X12 and X13 described above, however, opens the operating circuit of relay S1X and when contacts H3C open, said relay releases, releasing relay XL1. The operated register relays of the X message-units register are thereby released and said register restored to its normal condition ready for the registration of another entry.

When the sensing fingers of the reader are raised, the operated reading relays and translator relays are thereby released. Release of relays C0 and C1 opens the circuits of and releases relays CM0 and CM1. By the release of relay XU2', the operating circuit traced above of relay AX is opened, but this relay is held operated and relay BX operates over a circuit extending from battery through the winding of relay AX, winding of relay BX, No. 1 contacts of relay AX, conductor 439 and No. 2 contacts of relay AG to ground. Operation of relay BX opens the circuit of and releases relays PXH, PXT and PXU.

READING AND REGISTERING SECOND MESSAGE-UNIT ENTRY

The sensing fingers of the reader now fall on a line of the next message-unit entry on tape T. It will be assumed that this is a two-line entry, as shown in lines 15 and 16 of Fig. 73, and contains the same directory number "1234" as in the first entry. Reading relays A2, B4, B7, C0, C1, D0, D2, E1, E2, F0, and F4 and translator relays TB0, TD2, TE3, and TF4 are operated when this line is read, in the manner previously described.

By the operation of relays C0 and C1, relays CM0 and CM1 are again operated over the circuits previously traced, checking that the first digit "1" of the directory number in the second entry agrees with the setting of switch TH.

Relays Y22 and Y21 (Fig. 20) operate over a circuit extending from battery through the winding of said relays in series, conductor 385 within bracket 316, No. 2 contacts of relay YON, conductor 386, No. 5 contacts of relay DNY, conductor 387 within bracket 182, No. 1 contacts of relay B4, No. 1 contacts of relay B7, conductor 388 within bracket 179, No. 1 contacts of relay A2, conductor 321 within bracket 205, No. 12 contacts of relay CP1, conductor 322, No. 2 contacts of relay SKA, conductor 183 within bracket 214, No. 3 contacts of relay F4, No. 4 contacts of relay F1, No. 4 contacts of relay F2, No. 3 contacts of relay F3, No. 2 contacts of relay F7, No. 2 contacts of relay E0, No. 3 contacts of relay E1, No. 5 contacts of relay E2, No. 2 contacts of relay E4, No. 2 contacts of relay E7, conductor 203, No. 3 contacts of relay D0, No. 4 contacts of relay D1, No. 5 contacts of relay D2, No. 2 contacts of relay D4, No. 2 contacts of relay D7, No. 3 contacts of relay C0, No. 5 contacts of relay C1, No. 6 contacts of relay C2, No. 2 contacts of relay C4, No. 2 contacts of relay C7, conductor 204, No. 2 contacts of relay B0, No. 4 contacts of relay B1, No. 3 contacts of relay B2, No. 4 contacts of relay B4, No. 3 contacts of relay B7, conductor 189 within bracket 179, No. 3 contacts of relay A0, No. 4 contacts of relay A2, No. 3 contacts of relay A1, conductor 191, No. 8 contacts of relay RCD, conductor 193 within bracket 92, No. 8 contacts of relay ST3, conductor 172, thence through back contacts of relay RKA, conductor 180 and contacts G1 to ground or through front contacts of relay RKB, conductor 174 and contacts G2 to ground, depending upon the position of the reader drum. Operation of relays Y22 and Y21 over this circuit checks that relay A2 is operated, but not relay A0 or relay A1 (that is, that the first digit of the line is "2," indicating an entry of two lines); that exactly two of each other group of reading relays is operated; and that the reader drum is stepping normally. Relay YLK (Fig. 33) operates over a circuit extending from battery through the winding of said relay, conductor 390 within bracket 316, No. 7 contacts of relay Y22, conductor 380 within bracket 316, No. 2 contacts of relay PFY, conductor 370, No. 3 contacts of relay S1X, No. 3 contacts of relay S2X, conductor 360, and No. 4 contacts of relay ON3 to ground, and locks up through its No. 1 contacts to said ground on conductor 380.

Figure 36:
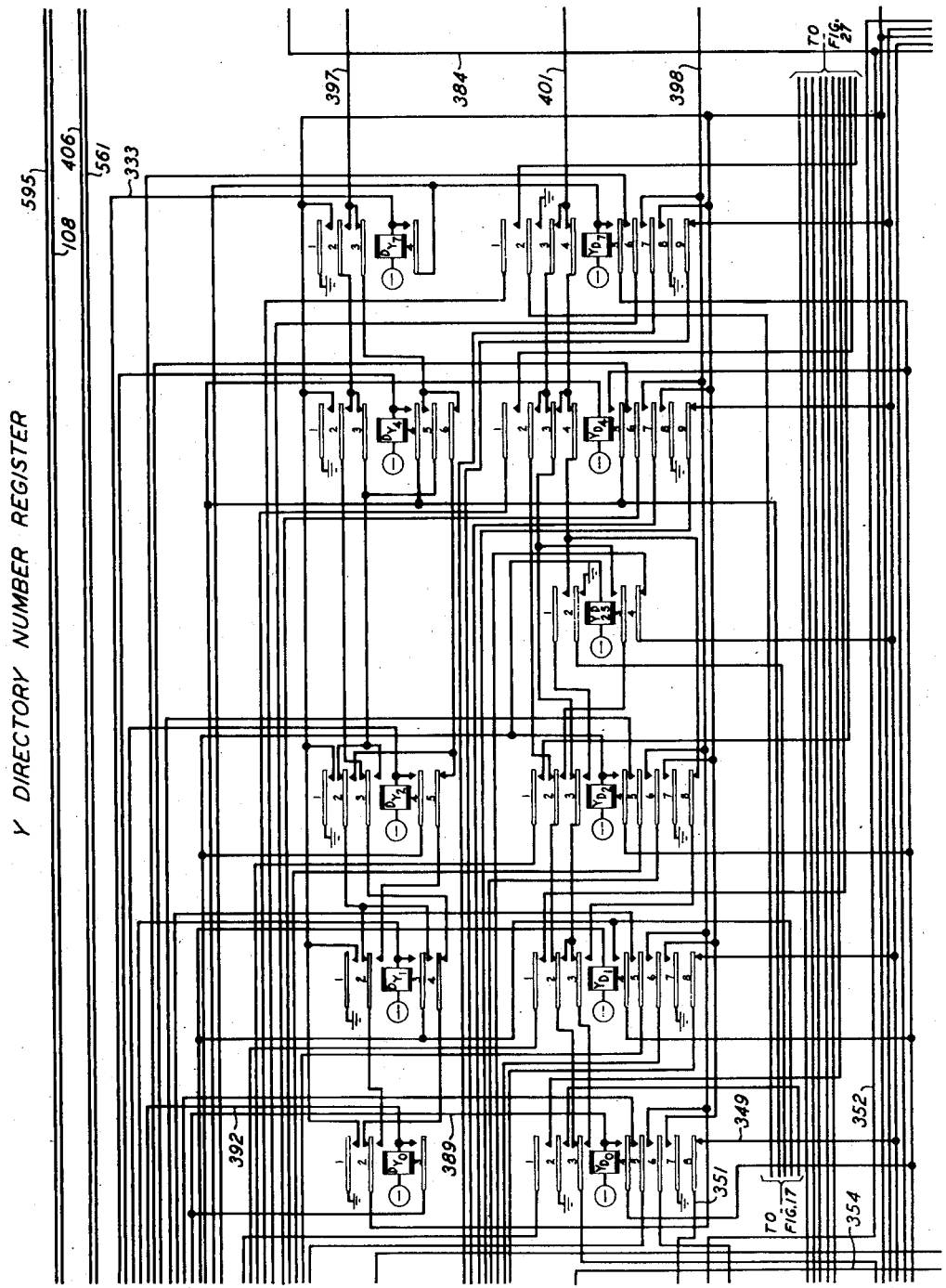
Figs. 36, 53 and 66 show another directory number register.

The last three digits "234" of the directory number found in this entry are registered in the Y directory-number register in a manner similar to that already described for the registration of this number in the X directory-number register, resulting in the operation and locking up of relays YD0, YD2, YD2S, YE1, YE2, YE2S, YF0 and YF4. Relay YD0 (Fig. 36), for example, operates over a circuit extending from battery through the winding of said relay, conductor 389, No. 1 contacts of relay Y22, conductor 334 within bracket 335, and No. 1 contacts of relay D0 to ground, and locks up through its No. 5 contacts, conductor 341, and No. 4 contacts of relay YLK to ground. The other relays named operate and lock up over similar circuits. Relays DY0, DY2, EY1, EY2, FY0 and FY4 also operate and lock up, relay DY0, for example, operating over a circuit extending from battery through the winding of said relay, conductor 392, and No. 8 contacts of relay XD0 to the ground traced above on conductor 389, and locking up to the same ground through its No. 3 contacts. The other relays named operate and lock up over similar circuits. It will be observed that relays DY0, DY2, etc. are operated in accordance with the directory number registered in the X directory number register.

Relay S2Y (Fig. 32) then operates over a circuit extending from battery through the winding of said relay, conductor 394 within bracket 316, No. 8 contacts of relay Y22, conductor 395, No. 3 contacts of relay FY7, No. 5 contacts of relay FY4, No. 2 contacts of relay FY2, No. 2 back contacts of relay FY1, No. 2 front contacts of relay FY0, conductor 396, No. 3 contacts of relay EY7, No. 6 contacts of relay EY4, No. 2 front contacts of relay EY2, No. 4 front contacts of relay EY1, No. 2 contacts of relay EY0, No. 3 contacts of relay DY7, No. 6 contacts of relay DY4, No. 2 front contacts of relay DY2, No. 2 back contacts of relay DY1, No. 2 front contacts of relay DY0, conductor 398, No. 4 contacts of relay YF7, No. 3 front contacts of relay YF4, No. 3 back contacts of relay YF2, No. 3 back contacts of relay YF1, No. 3 front contacts of relay YF0, conductor 399, No. 4 contacts of relay YE7, No. 4 contacts of relay YE4, No. 1 contacts of relay YE2S, No. 3 front contacts of relay YE2, No. 2 front contacts of relay YE1, No. 3 back contacts of relay YE0, conductor 401, No. 4 contacts of relay YD7, No. 4 contacts of relay YD4, No. 1 contacts of relay YD2S, No. 3 front contacts of relay YD2, No. 3 back contacts of relay YD1, No. 3 front contacts of relay YD0, conductor 402, No. 5 contacts of relay CM4, No. 4 contacts of relay CM7, No. 4 contacts of relay C2Y, No. 4 contacts of relay CM0, No. 6 contacts of relay CM1, conductor 403, No. 4 contacts of relay OF, conductor 404 within bracket 358, No. 2 contacts of relay YLK, conductor 504 within bracket 316, and No. 6 contacts of relay Y22 to ground, and locks up through its No. 1 contacts, conductor 208 within bracket 57, and contacts H3C to ground.

Operation of relay S2Y over this circuit checks that the proper number of relays in each group of register relays of the Y directory number register is operated and that the same directory number is registered in both the X and the Y directory number registers. Operation of relay S2Y also allows the reader drum to step to the next line of the record in tape T. Relay MUY (Fig. 32) operates over a circuit extending from battery through the winding of said relay, No. 2 contacts of relay MUX, No. 4 contacts of relay S2Y, conductor 378, and contacts K3 to ground, and locks up through its No. 1 contacts, No. 3 contacts of relay DNX, conductor 379, within bracket 382, and No. 3 contacts of relay MLK to ground.

Figure 18:
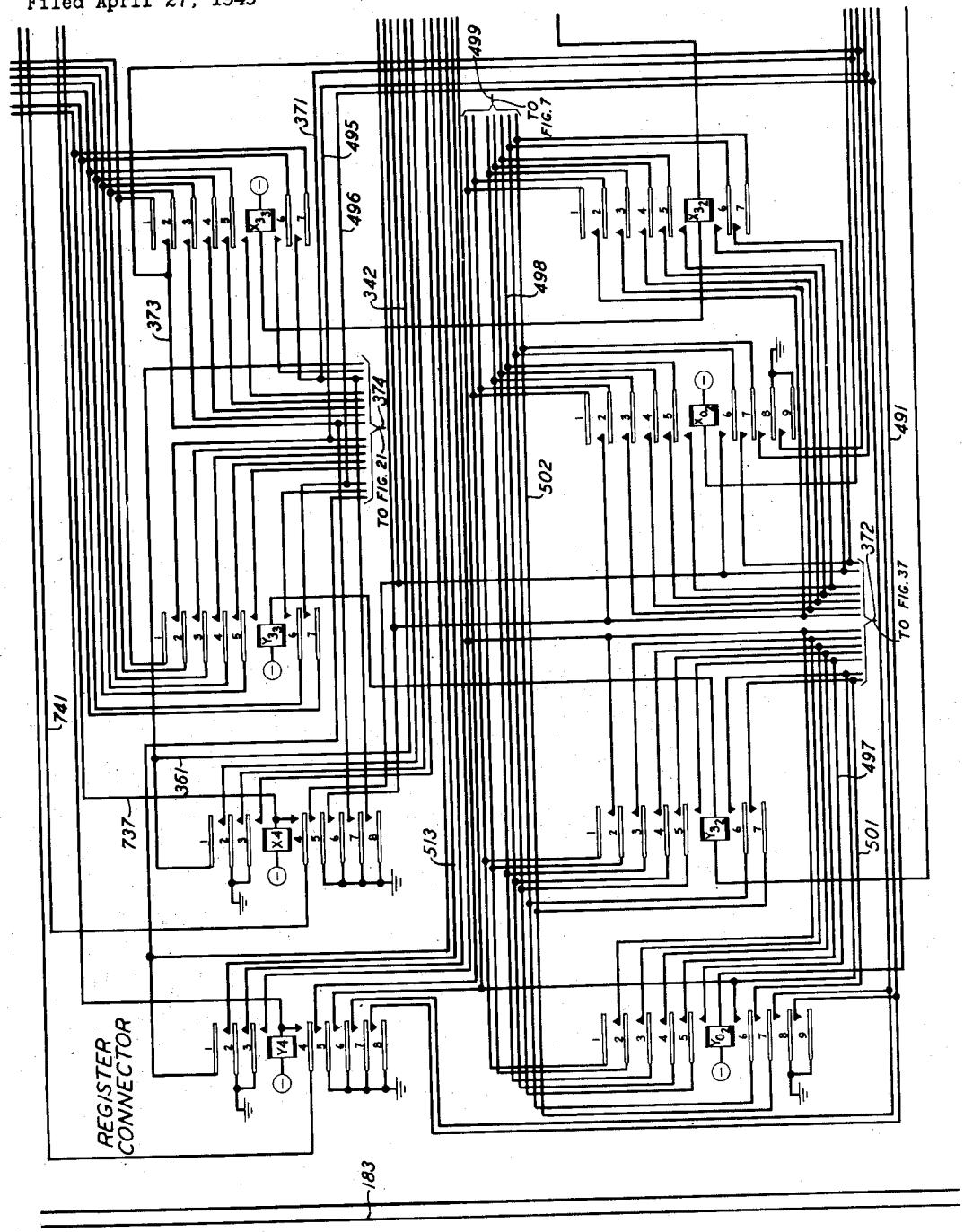
Figs. 18 through 20 show the register connector circuit.

When the sensing fingers of the reader are raised, the operated reading relays and translator relays are released, thereby releasing relays Y21 and Y22. When the sensing fingers fall on the second line of the entry, relay S2Y releases and reading relays A0, B4, B7, C4, C7, D4, D7, E2, E7, F2 and F4 and the corresponding translator relays TB0, TD0, TE9 and TF6 operate in the manner previously described. Relay Y02 (Fig. 18) and Y01 (Fig. 19) then operate over a circuit extending from battery through the winding of relay Y02, conductor 491, winding of relay Y01, conductor 492 within bracket 316, No. 4 contacts of relay MUY, conductor 493 within bracket 182, No. 8 contacts of relay B7, No. 8 contacts of relay B4, conductor 494, No. 4 contacts of relay C7, No. 6 contacts of relay C4, conductor 495 within bracket 179, No. 1 contacts of relay A0, conductor 321 within bracket 205, No. 12 contacts of relay CP1, conductor 322, No. 2 contacts of relay SKA, conductor 183 within bracket 214, No. 2 contacts of relay F0, No. 2 contacts of relay F1, No. 3 contacts relay F2, No. 3 contacts of relay F4, No. 2 contacts of relay F7, No. 2 contacts of relay E0, No. 2 contacts of relay E1, No. 3 contacts of relay E2, No. 4 contacts of relay E4, No. 3 contacts of relay E7, conductor 203, No. 2 contacts of relay D0, No. 2 contacts of relay D1, No. 2 contacts of relay D2, No. 5 contacts of relay D4, No. 3 contacts of relay D7, No. 2 contacts of relay C0, No. 2 contacts of relay C1, No. 2 contacts of relay C2, No. 5 contacts of relay C4, No. 3 contacts of relay C7, conductor 204, No. 1 contacts of relay B0, No. 2 contacts of relay B1, No. 1 contacts of relay B2, No. 4 front contacts of relay B4, No. 3 contacts of relay B7, conductor 189 within bracket 179, No. 2 contacts of relay A0, No. 3 contacts of relay A2, No. 3 contacts of relay A1, conductor 191, No. 8 contacts of relay RCD, conductor 193 within bracket 92, No. 8 contacts of relay ST3, and conductor 172, thence either through back contacts of relay RKA, conductor 180, and contacts G1 to ground, or through front contacts of relay RKB, conductor 174, and contacts G2 to ground, depending upon the position of the reader drum. Operation of relays Y01 and Y02 over this circuit checks that the proper combination of reading relays is operated and that the reader drum is stepping normally.

Figure 23:
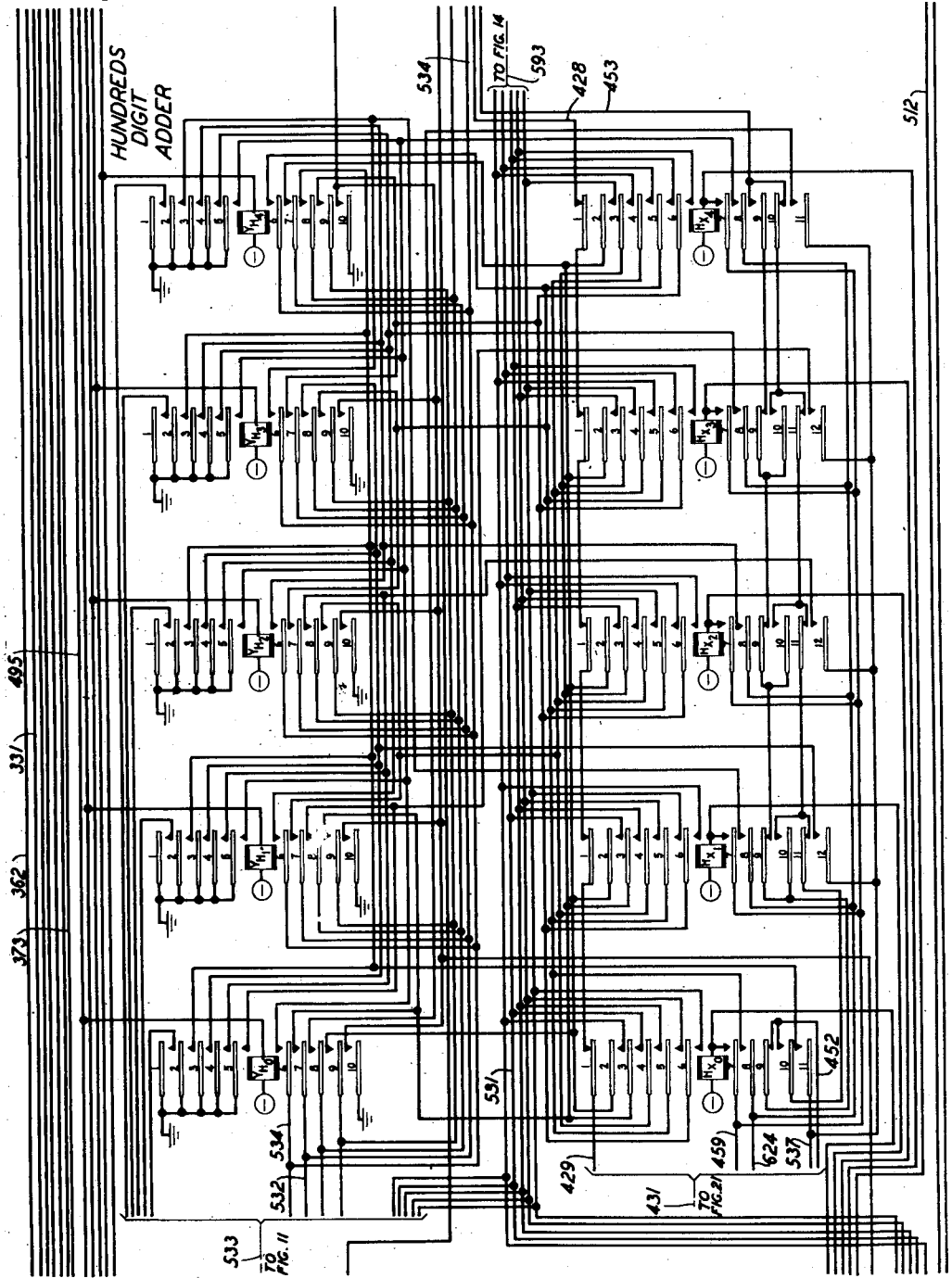
Figure 37:
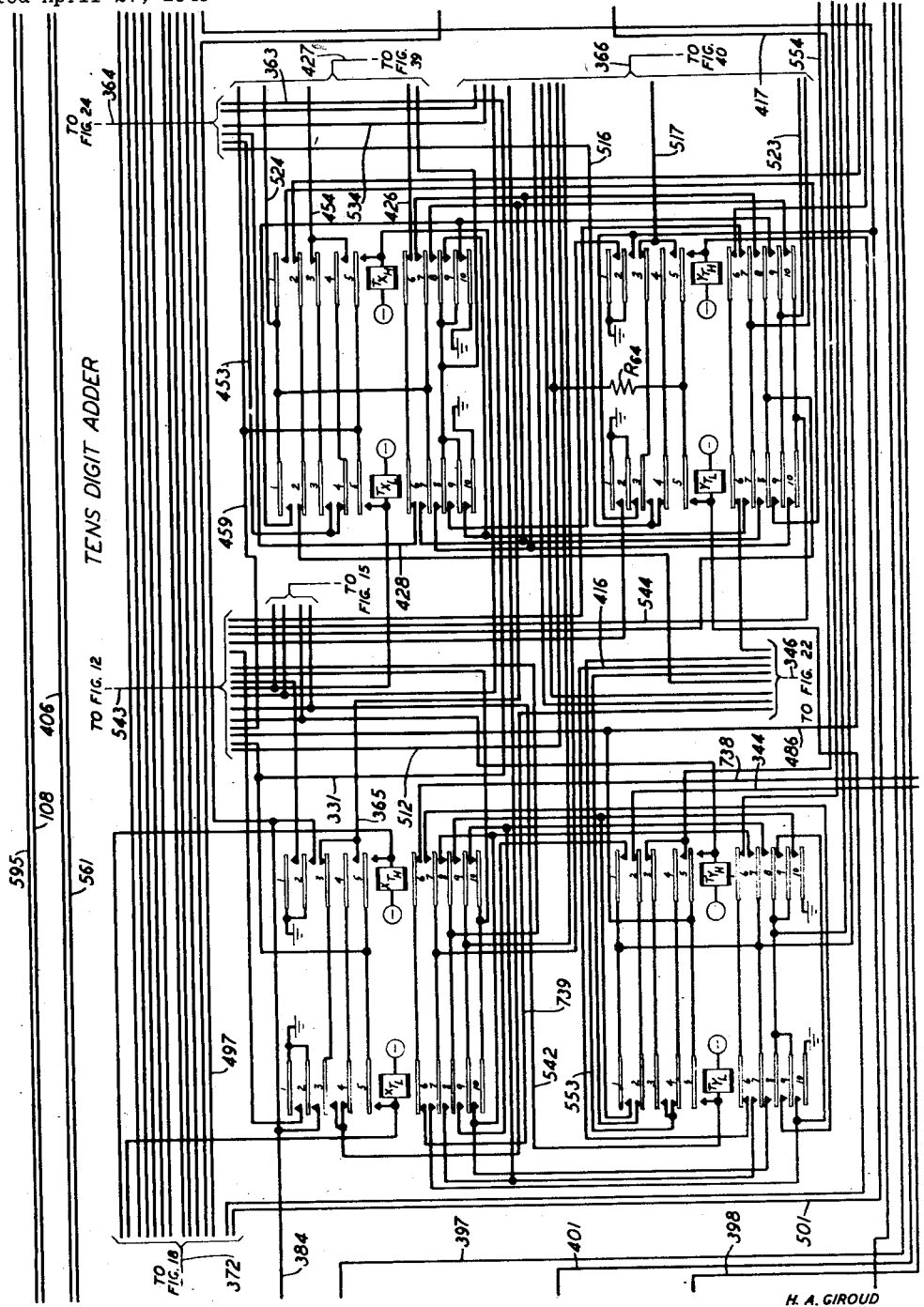
Figs. 37 through 40 show the tens-digit adder circuit.
Figure 39:
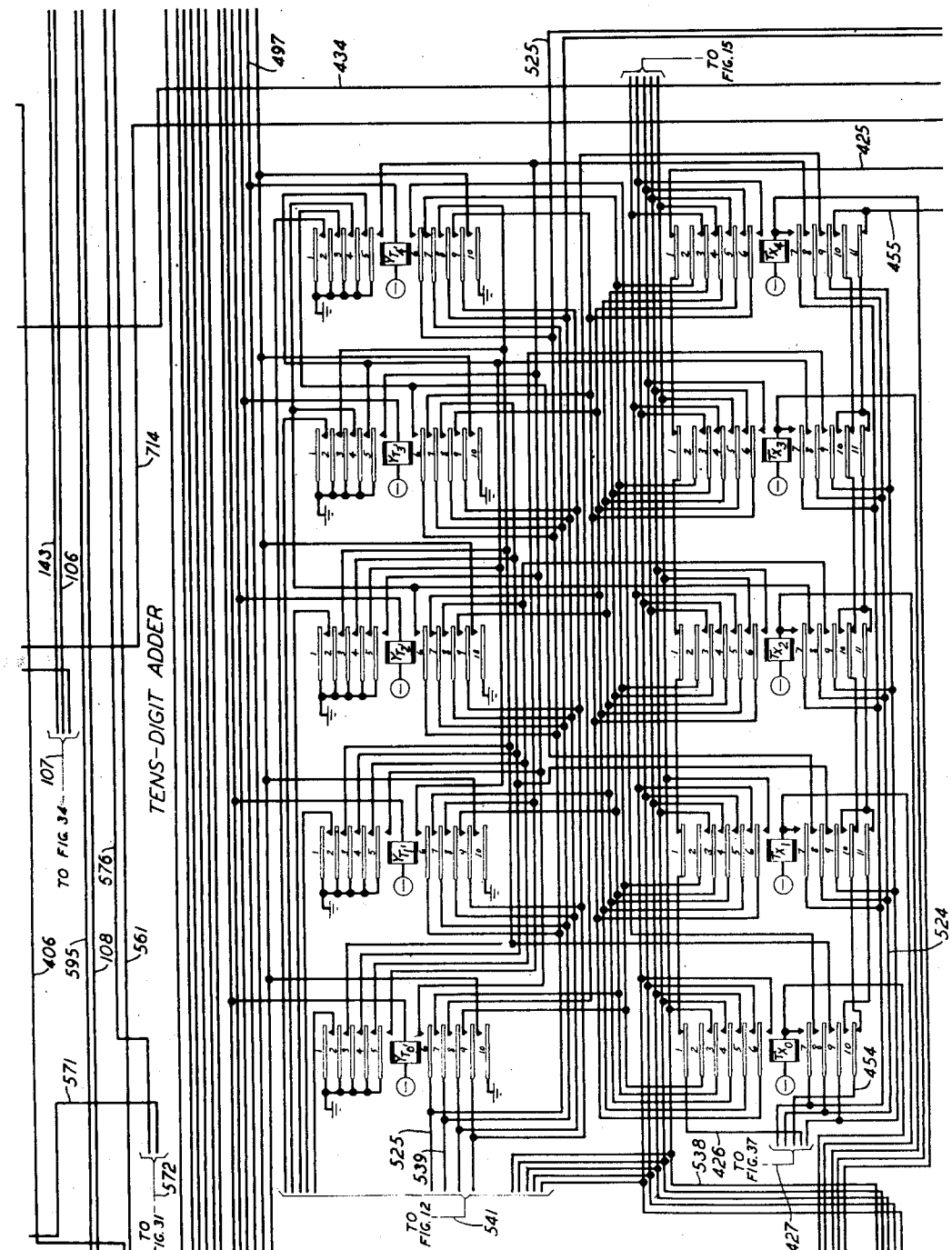
Figure 40:
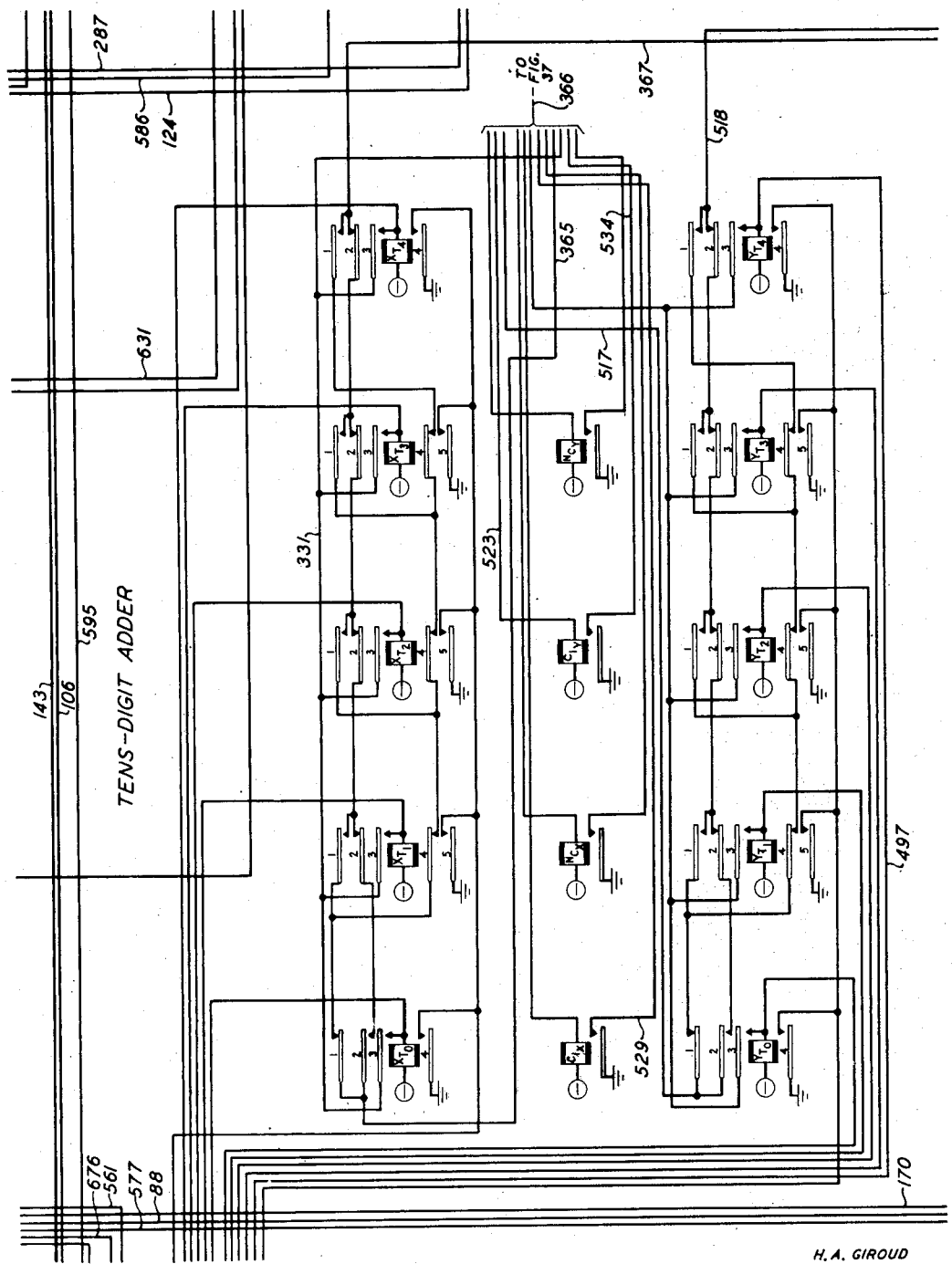
Figure 56:
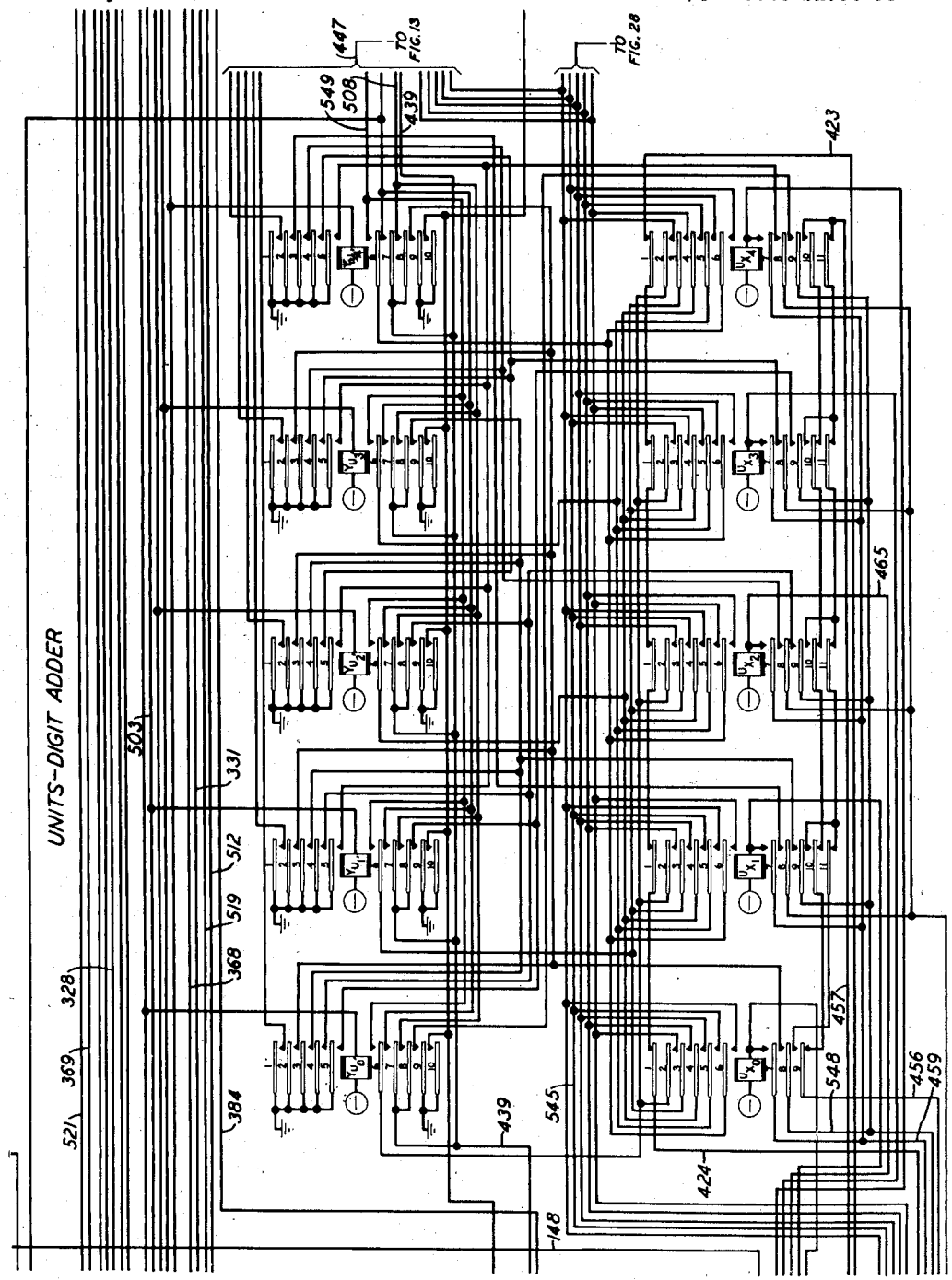

Relays YH0, YH0', YHL, YT4, YT4', YTH, YU1, YU1' and YUH now operate to register in the Y message-units register the number "096" of message units in the second entry. Relays YH0 (Fig. 24) and YH0' (Fig. 23) operate over a circuit extending from battery through the windings of said relays, in parallel, conductor 495 within bracket 374, and No. 8 contacts of relay Y02 to ground. The circuit of relay YHL (Fig. 21) extends from battery through the winding of said relay, conductor 496 within bracket 374, and No. 9 contacts of relay Y02 to ground. Relays YT4 (Fig. 40) and YT4' (Fig. 39) operate over a circuit extending from battery through the windings of said relays, in parallel, conductor 497 within bracket 372, No. 5 contacts of relay Y02, conductor 498 within bracket 499, and No. 1 contacts of relay TE9 to ground. Relay YTH (Fig. 37) operates over a circuit extending from battery through the winding of said relay, conductor 501 within bracket 372, No. 7 contacts of relay Y02, conductor 502 within bracket 499, and No. 2 contacts of relay TE9 to ground. Relays YU1 (Fig. 57) and YU1' (Fig. 56) operate over a circuit extending from battery through the windings of said relays in parallel, conductor 503 within bracket 326, No. 2 contacts of relay YO1, conductor 504, and No. 1 contacts of relay TF6 to ground. Relay YUH (Fig. 54) operates over a circuit extending from battery through the winding of said relay, conductor 505 within bracket 326, No. 7 contacts of relay YO1, conductor 506, and No. 2 contacts of relay TF6 to ground. These relays all lock up through their own locking contacts, conductor 512, and No. 1 contacts of relay YL to ground.

Relay YNC (Fig. 9) operates over a circuit extending from battery through the winding of said relay, conductor 507 within bracket 462, No. 7 contacts of relay YHL, and No. 10 contacts of relay HXL to ground, indicating that the sum of the two quantities of message units registered in both the X and Y message unit registers will not exceed 999. Relay CY1 (Fig. 8) operates over a circuit extending from battery through the lower winding of said relay, conductor 511, No. 2 contacts of relay YNC, conductor 439, and No. 2 contacts of relay AG to ground, and locks up over a circuit extending from battery through its upper winding and contacts, conductor 486, No. 1 contacts of relay AGY, conductor 470, and No. 1 contacts of relay CX to ground. Relay S1Y (Fig. 32) operates over a circuit extending from battery through the winding of said relay, conductor 513 within bracket 316, No. 8 contacts of relay YO1, conductor 514 within bracket 374, No. 3 contacts of relay YHL, No. 3 contacts of relay YHH, No. 2 contacts of relays YH0 ... YH4 in series, conductor 516 within bracket 364, No. 4 contacts of relay YTL, No. 4 contacts of relay YTH, conductor 517 within bracket 366, No. 1 contacts of relay YT0, No. 4 contacts of relay YT1, No. 4 contacts of relay YT2, No. 4 contacts of relay YT3, No. 1 contacts of relay YT4, conductor 518, No. 4 contacts of relay YUH, conductor 519, No. 1 contacts of relay YU0, No. 2 contacts of relays YU1 ... YU4 in series, conductor 521 within brackets 332 and 422, and No. 2 contacts of relay YL to ground, and locks up through its No. 1 contacts, conductor 208 within bracket 57, and contacts H3C to ground. Operation of relay S1Y over this circuit checks that the proper number of relays of the Y message-units register are operated. Relay YL1 (Fig. 9) then operates over a circuit extending from battery through the winding of said relay, conductor 522 within bracket 358, and No. 9 contacts of relay S1Y to ground.

Relay Y (Fig. 8) operates over a circuit extending from battery through the winding of said relay, conductor 481 within bracket 467, No. 9 contacts of relay PXU, conductor 482, No. 9 contacts of relay PXT, conductor 483, No. 10 contacts of relay PXH, conductor 484 within bracket 358, No. 10 contacts of relay S1Y, conductor 487 within bracket 358, No. 2 contacts of relay CX, conductor 414, No. 6 contacts of relay HYL, No. 6 contacts of relay HYH, conductor 415, No. 1 contacts of relays HY0 ... HY4 in series, conductor 416 within bracket 346, No. 6 contacts of relay TYL, No. 6 contacts of relay TYH, conductor 417, No. 1 contacts of relays TY0 ... TY4 in series, conductor 418, No. 1 contacts of relays UY0 ... UY4 in series, conductor 421 within brackets 332 and 422, and No. 4 and No. 2 contacts of relay CCY, conductor 439, and No. 2 contacts of relay AG to ground, and locks up from conductor 484 through No. 1 back contacts of relay X and its own No. 1 front contacts to the same ground. Operation of relay Y over this circuit checks that the relays of the Y sum register are normal.

Relays OYH (Fig. 11), OYT (Fig. 12), and OYU (Fig. 13) operate over a circuit extending from battery through the windings of said relays in parallel over conductor 472, No. 10 contacts of relay PYH, conductor 473, No. 6 contacts of relay PYT, conductor 474, No. 6 contacts of relay PYU, conductor 475 within bracket 422, No. 3 contacts of relay BY, conductor 476 within bracket 422, No. 1 contacts of relay OXU, conductor 477, No. 3 contacts of relay OXT, conductor 478, No. 3 contacts of relay OXH, conductor 479, No. 2 contacts of relay OY, conductor 469, No. 2 and No. 1 front contacts of relay Y, conductor 439, and No. 2 contacts of relay AG to ground.

Relay C1Y (Fig. 40) operates over a circuit extending from battery through the winding of said relay, conductor 523 within bracket 366, No. 9 contacts of relay YTH, No. 1 contacts of relay TXL, conductor 524 within bracket 427, No. 8 contacts of relay TX0, No. 6 contacts of relay YT4', conductor 525, No. 9 contacts of relay YUH, and No. 10 contacts of relay UXH to ground.

ADDING

Figure 38:
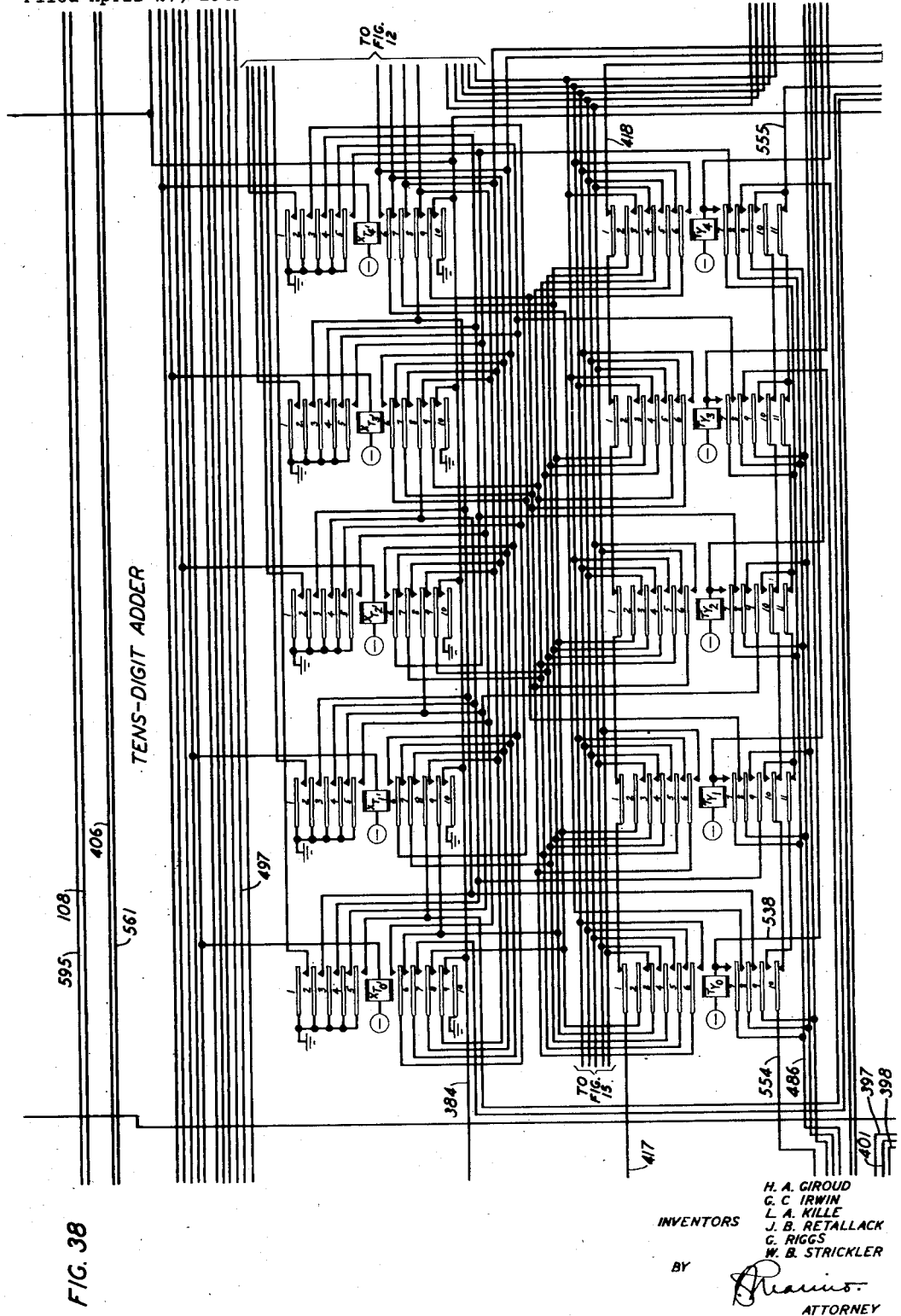

Relays HY1, HYL, TY0, TYL, UY3 and UYL now operate to register in the Y sum register the sum "103" of the seven message units registered in the X sum register by the operated relays HX0, HXL, TX0, TXL, UX2, and UXH and the ninety-six message units registered in the Y message-units register by the operated relays YH0, YH0', YHL, YT4, YT4', YTH, YU1, YU1', and YUH. Relay HY1 (Fig. 22) operates over a circuit extending from battery through the winding of said relay, conductor 531, No. 3 contacts of relay HX0, No. 7 contacts of relay YH0', conductor 532 within bracket 533, No. 2 contacts of relay OYH, conductor 534 within brackets 533, 364, and 366, and contacts of relay C1Y to ground. Relay HYL (Fig. 21) operates over a circuit extending from battery through the winding of said relay, conductor 535 within bracket 462, No. 3 contacts of relay OYH, conductor 536 within bracket 462, No. 10 contacts of relay HXL, conductor 537 within bracket 431, No. 11 contacts of relay HX0, and No. 2 contacts of relay YH0' to ground. Relay TY0 (Fig. 38) operates over a circuit extending from battery through the winding of said relay, conductor 538, No. 2 contacts of relay TX0, No. 7 contacts of relay YT4', conductor 539 within bracket 541, No. 2 contacts of relay OYT, conductor 525 within bracket 541, No. 9 contacts of relay UYH, and No. 10 contacts of relay UXH to ground. Relay TYL (Fig. 37) operates over a circuit extending from battery through the winding of said relay, conductor 542 within bracket 543, No. 6 contacts of relay OYT, conductor 544 within bracket 543, No. 10 contacts of relay YTH, and No. 7 contacts of relay TXL to the above-traced ground on conductor 524. Relay UY3 (Fig. 55) operates over a circuit extending from battery through the winding of said relay, conductor 545, No. 3 contacts of relay UX2, and No. 6 contacts of relay YU1', conductor 549 within bracket 447, and No. 2 contacts of relay OYU to ground. Relay UYL (Fig. 54) operates over a circuit extending from battery through the winding of said relay, conductor 546 within bracket 332, No. 5 contacts of relay OYU, conductor 547 within bracket 332, No. 10 contacts of relay YUH, No. 8 contacts of relay UXH, conductor 548, No. 9 contacts of relay UX2, and No. 3 contacts of relay UYI' to ground. All of said relays lock up through their own locking contacts, conductor 486, No. 1 and No. 2 contacts of relay AGY, conductor 485, No. 2 back contacts of relay X, No. 1 front contacts of relay Y, conductor 439, and No. 2 contacts of relay AG to ground.

When these relays have operated and locked up, relay CY (Fig. 8) operates over a circuit extending from battery through the winding of said relay, conductor 551, No. 3 contacts of relay HYL, No. 3 contacts of relay HYH, conductor 552, No. 9 contacts of relay HY0, No. 10 contacts of relay HYI, No. 11 contacts of relay HY2, No. 11 contacts of relay HY3, No. 10 contacts of relay HY4, conductor 553 within bracket 346, No. 3 contacts of relay TYL, No. 3 contacts of relay TYH, conductor 554, No. 10 front contacts of relay TY0, No. 11 contacts of relays TYI . . . TY4 in series, conductor 555, No. 3 contacts of relay UYL, No. 3 contacts of relay UYH, conductor 556, No. 9 contacts of relay UY0, No. 10 back contacts of relays UYI and UY2 in series, No. 10 front contacts of relay UY3, No. 11 contacts of relay UY4, conductor 557 within brackets 332 and 467, and contacts of relay CYI to the above-traced ground on conductor 486. Operation of relay CY over this circuit checks that the proper number of relays in the Y sum register is operated and opens the circuits of relays CX and CXI, which are thereby released, releasing relays OY and YL. Release of relay OY releases relays OYH, OYT, and OYU. Operation of relay CY also opens the locking circuits of and releases the operated relays of the X sum register, which is thereby returned to normal. Release of said relays releases relay YNC. The operated relays of the Y message-units register were locked up through No. 1 contacts of relay YL and are now locked up through No. 1 contacts of relay YLI. When contacts H3C open, relay SIY is thereby released, releasing relay YLI. The relays of the Y message-units register are thereby released and said register returned to normal. Relays XL and OX now reoperate over the circuits previously traced for these relays, and the circuits are ready for the next entry.

By these operations, the sum of the message units in two entries for the same directory number recorded on tape T has been obtained and registered.

ENTRY WITH NEW DIRECTORY NUMBER

The operation of relay SIY, described above, allowed the reader drum to advance and the sensing fingers of the reader now fall on a line of the next entry. It will be assumed that this entry is a two-line entry similar to the previous entry (lines 15 and 16 of Fig. 73) but containing the directory number "1236" instead of "1234." As previously explained, the entries are recorded on tape T in ascending order of directory numbers and this entry, containing a new directory number, indicates that all of the entries on tape T for the directory number "1234" have been read. The directory number "1234" has been registered in the Y directory number register and the total "103" of message units chargeable to that directory number has been registered in the Y sum register, as described above. The new directory number "1236" will be registered in the X directory number register and the message units chargeable to it will be registered in the X message-units register and in the X sum register in the same manner as described for the first entry, while the registrations in the Y directory number register and the Y sum register will be wiped out. At the same time, an entry will be made on tape TT containing the old directory number "1234" and the total "103" of message units chargeable to it. The registrations in the sum registers are, however, in biquinary code while the record on tape TT is made in two-out-of-five code. The registration in the Y sum register will, therefore, be translated to two-out-of-five code for recording. These operations are described below.

Figure 14:
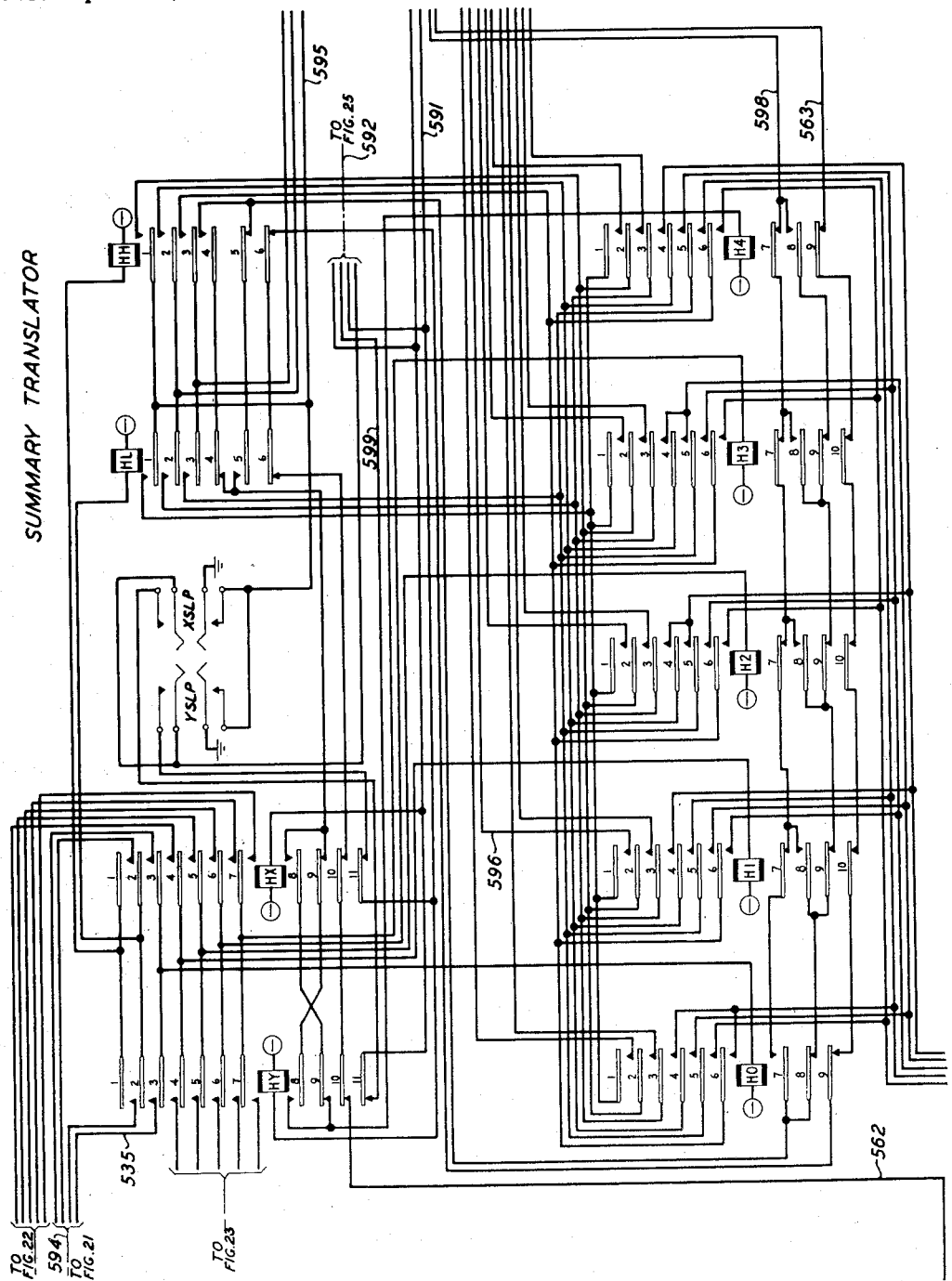
Figs. 14, 15 and 28 show the summary translator circuit.

When the sensing fingers of the reader fall on the first line of the new entry, which line contains the digits "201236," reading relays A2, B4, B7, C0, CI, D0, D2, EI, E2, F2, and F4 and translator relays TB0, TD2, TE3, and TF6 operate in the manner previously described. By the operation of relays C0 and CI, relays CM0 and CMI are again operated and check the agreement of the first digit "1" of the directory number with the setting of switch TH in the same way as described for previous entries. Relay DNX being operated, the last three digits "236" of the directory number are registered in the X directory number register by the operation of relays XD0, XD2, XD2S, XEI, XE2, XE2S, XF2, XF2S, and XF4, relays X2I, X22, and XLK also operating, as described for previous entries. If the relays of the summary translator (Figs. 14, 15 and 28) are normal, as they should be, relay ODC (Fig. 33) is operated over a circuit extending from battery through the winding of said relay, No. 1 contacts of relay ON3, conductor 561, No. 4 contacts of relay RP2, conductor 562, No. 10 contacts of relays HY and HX, No. 6 contacts of relays HL and HH, No. 9 contacts of relay H0, No. 10 contacts of relay HI . . . H3, No. 9 contacts of relay H4, conductor 563, No. 11 contacts of relays TY and TX, No. 6 contacts of relays TL and TH, No. 9 contacts of relay T0, No. 10 contacts of relay TI—T3, No. 9 contacts of relay T4, conductor 564, No. 10 contacts of relays UY and UX, No. 6 contacts of relays UL and UH, No. 9 contacts of relay U0, No. 10 contacts of relays UI . . . U3, and No. 9 contacts of relay U4 to ground.

Figure 26:
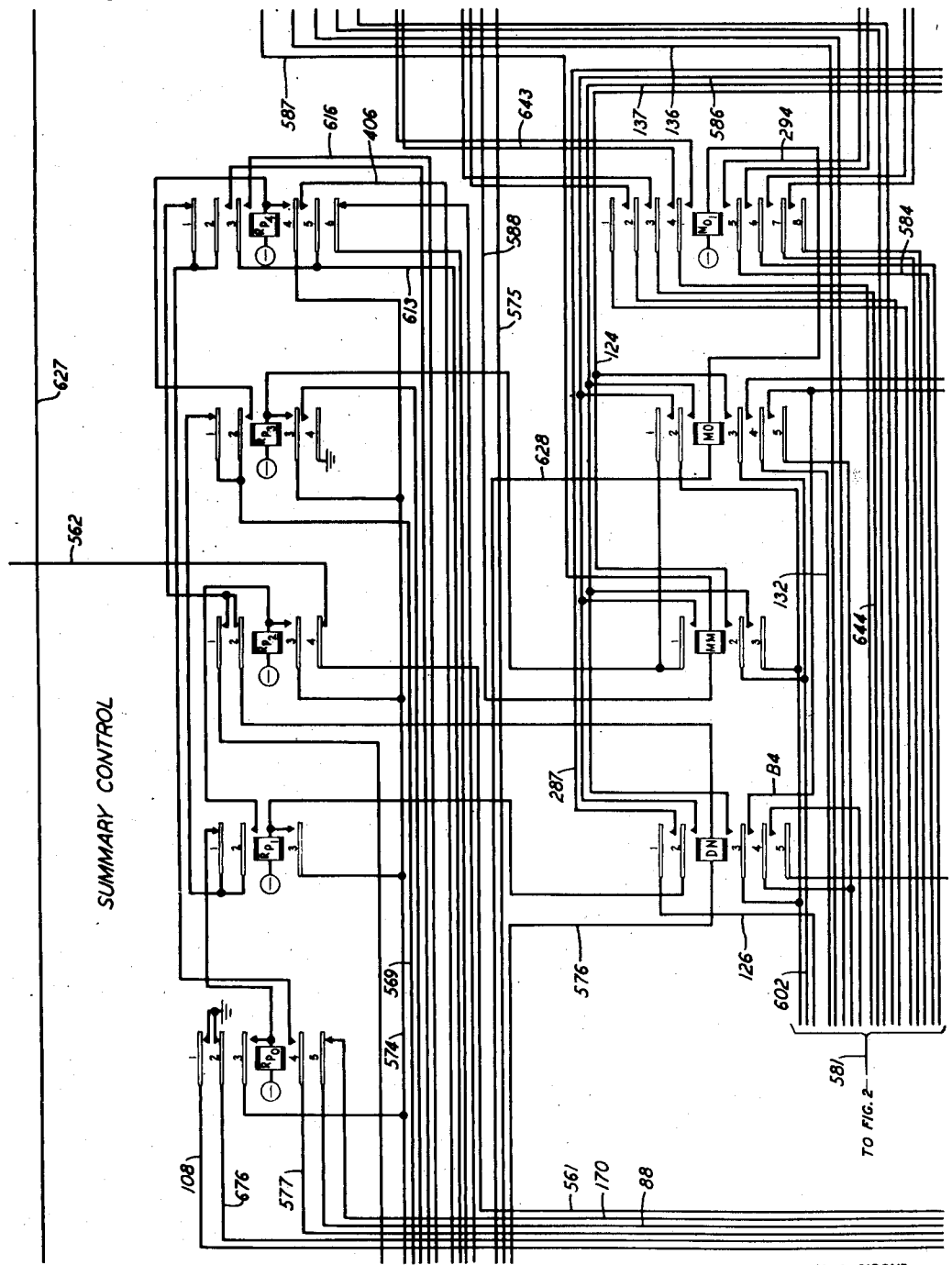
Figure 27:
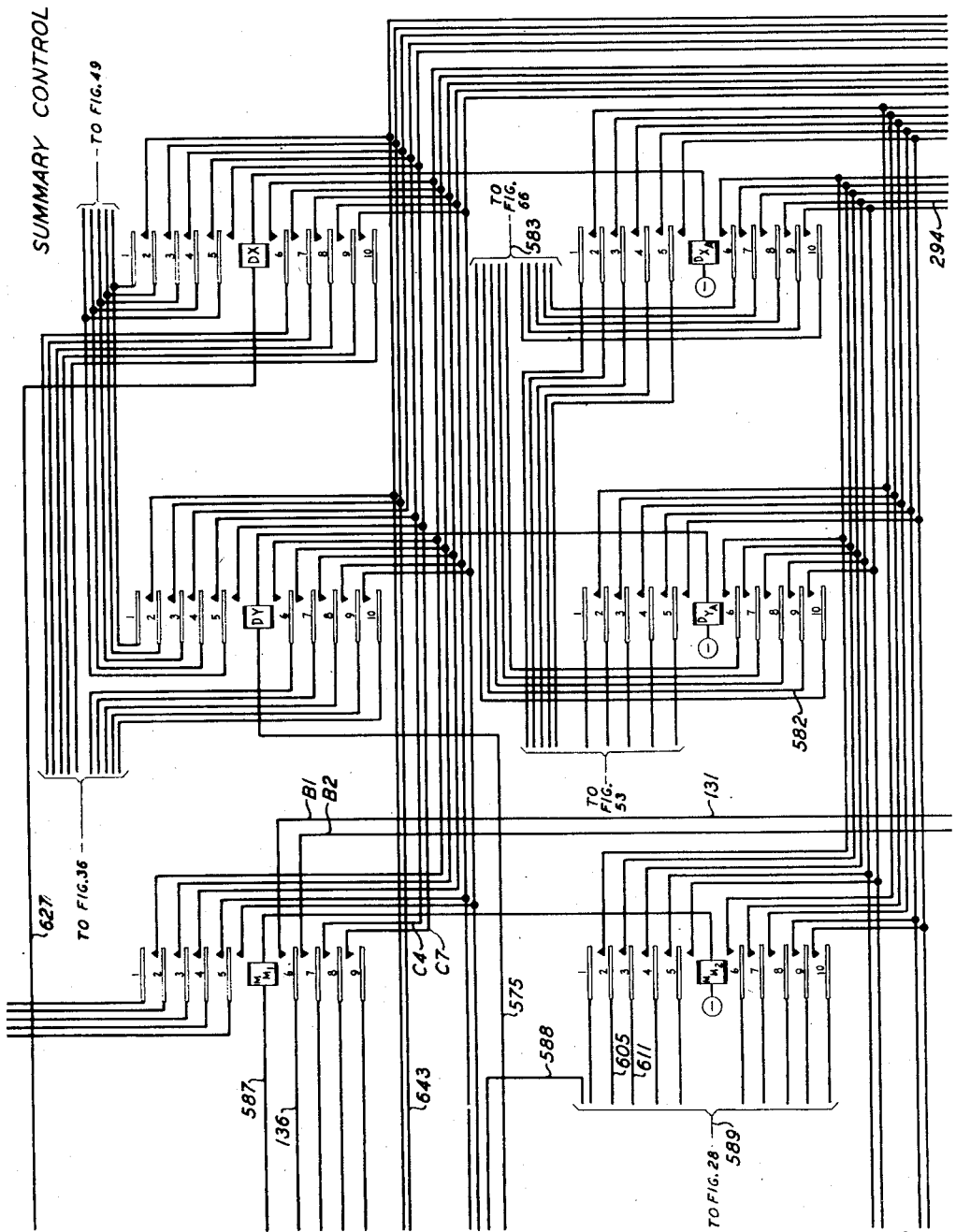

Relay PEY (Fig. 25) then operates over a circuit extending from battery through the winding of said relay, conductor 565 within bracket 566, No. 2 contacts of relay ODC, No. 7 contacts of relay YLK, conductor 349, No. 4 contacts of relay YF2S, conductor 567, No. 6 contacts of relay XF2, No. 4 contacts of relay XF7, No. 3 front contacts of relay XF4, No. 3 contacts of relay XF2S, No. 2 front contacts of relay XF2, No. 2 back contacts of relay XFI, No. 3 back contacts of relay XF0, conductor 353, No. 4 contacts of relay XE7, No. 4 contacts of relay XE4, No. 1 contacts of relay XE2S, No. 3 front contacts of relay XE2, No. 2 front contacts of relay SEI, No. 3 back contacts of relay XE0, conductor 354, No. 4 contacts of relay XD7, No. 4 contacts of relay XD4, No. 1 contacts of relay XD2S, No. 3 front contacts of relay XD2, No. 3 back contacts of relay XDI, No. 4 contacts of relay XD0, conductor 355, No. 5 contacts of relay CM7, No. 4 contacts of relay CM4, No. 4 contacts of relay C2X, No. 4 contacts of relay CMI, No. 5 contacts of relay CM0, conductor 356, No. 7 contacts of relay OF, conductor 357 within bracket 358, No. 2 contacts of relay XLK, conductor 359 within bracket 316, and No. 6 contacts of relay X22 to ground, and locks up through its No. 5 contacts, conductor 568 within bracket 566, and No. 3 contacts of relay YLK to ground. When contacts K7 of the reader close, relay RP0 (Fig. 26) operates over a circuit extending from battery through the winding of said relay, No. 1 contacts of relay RP1, No. 1 contacts of relay RP3, conductor 569, No. 2 contacts of relay PEY, conductor 571 within bracket 572, No. 2 contacts of relay WS4, No. 2 contacts of relay WS5, conductor 573, No. 6 contacts of relay ST4, conductor 116 within bracket 92, No. 3 contacts of relay RCD, conductor 117, and contacts K7 to ground and locks up through its No. 3 contacts, conductor 574, and No. 7 contacts of relay PEY to ground. Relays PCA, PCB, and PCC (Fig. 42) then operate over a circuit extending from battery through the windings of said relays in series, conductor 106 within bracket 107, No. 9 contacts of relay RCD, conductor 108, and No. 1 contacts of relay RP0 to ground. Relays DN, DY, and DYA (Figs. 26 and 27) operate over a circuit extending from battery through the winding of relay DYA, winding of relay DY, conductor 575, No. 6 contacts of relay PEY, conductor 576, winding of relay DN, No. 2 contacts of relay RP2, No. 1 contacts of relay RP4, No. 4 contacts of relay RP0, conductor 577, No. 12 contacts of relay ST3, conductor 578 within bracket 92, No. 6 contacts of relay RCD, conductor 579, and contacts H1C to ground, when said latter contacts close.

Punch magnets MA2, MB4, MB7, MC0, MC1, MD0, MD2, ME1, ME2, MF0 and MF4 are thereby connected to cam contacts of the reader and operate when said contacts close to record on tape TT the digits "201234." Magnet MA2 operates over a circuit extending from battery through the winding of said magnet, conductor 285, No. 3 contacts of relay PCA, conductor 286, winding of relay KA2, conductor 287, No. 1 contacts of relay DN, conductor 126 within bracket 581, and contacts PA2 to ground. Magnets MB4 and MB7 operate over similar circuits. Magnet MF4 operates over a circuit extending from battery through the winding of said magnet, conductor 293, No. 9 contacts of relay PCC, winding of relay KF4, conductor 294, No. 9 contacts of relay DYA, conductor 582 within bracket 583, No. 1 contacts of relay YF4, conductor 584 within bracket 585, and contacts PF4 to ground. Magnets MC0, MC1, MD0, MD2, ME1, ME2, and MF0 operate over similar circuits. The checking relays KA2, KB4, KB7, etc. also operate over these circuits, checking that the correct number of punch magnets is energized, in the manner previously described. The paper-advance magnet PAM and relays PK and PS are also operated in the manner previously described. When said relays are operated, relay RP1 (Fig. 26) operates over a circuit extending from battery through the winding of said relay, No. 2 contacts of relay DN, conductor 586, No. 1 contacts of relay PS, and No. 1 contacts of relay PK to ground, and locks up through its No. 3 contacts to the ground on conductor 574.

When the sensing finger contacts of the reader open, the reading relays, reading translator relays, relays DN, DY and DYA, and the operated punch magnets are thereby released. The paper-advance magnet PAM is also released, as previously described, and moves tape TT one line.

When contacts K7 of the reader again close, relay RP2 (Fig. 26) operates over a circuit extending from battery through the winding of said relay, No. 2 contacts of relay RP1 and No. 1 contacts of relay RP3, to the previously-traced ground on conductor 569, and locks up through its No. 3 contacts to the ground on conductor 574.

When relay PEY operates, as described above, relays HY, TY and UY (Figs. 14, 15 and 28) operate over a circuit extending from battery through the windings of said relays in parallel, conductor 591 within bracket 592, and No. 1 contacts of relay PEY to ground. Relays H1, HL, T0, TL, U3 and UL (Figs. 14, 15 and 28) of the summary translator then operate to register in biquinary code, the message units "103" registered in the Y sum register. Relay H1, for example, operates over a circuit extending from battery through the winding of said relay, No. 4 contacts of relay HY, conductor 531 within bracket 593, No. 7 contacts of relay HY1 and thence, over the locking path of relay HY1 to ground. Relay HL operates over a circuit extending from battery through the winding of said relay, No. 2 contacts of relay HY, conductor 535 within bracket 594, No. 5 contacts of relay HYL and thence, over the locking path of relay HYL to ground. The other relays named operate over similar circuits.

These relays are provided with associated lamps LX0, LY0, LH0 . . . LH9, LT0 . . . LT9, and LU0 . . . LU9. (Figs. 15 and 28.) If key YSLP (Fig. 14) is operated, lamp LY0 lights over a circuit extending from battery through said lamp, No. 10 contacts of relay TY, conductor 595, and lower contacts of said key to ground, to indicate that the registered number was obtained from the Y sum register. Lamps LH1, LT0, and LU3 also light, lamp LH1, for example, lighting over a circuit extending from battery through said lamp, conductor 596, No. 1 contacts of relay H1, No. 1 contacts of relay HL, and lower contacts of key YSLP to ground, indicating in decimal code the number "103" registered. By means of the lamps and key, the correctness of the registered number may be visually checked.

When contacts H1C of the reader now close, relays MM, MM1 and MM2 (Figs. 26 and 27) operate over a circuit extending from battery through the winding of relay MM2, winding of relay MM1, conductor 587, winding of relay MM, conductor 588 within bracket 589, No. 7 contacts of relay U4, No. 8 contacts of relay U3, No. 9 contacts of relays U2 and U1, No. 8 contacts of relay U0, No. 5 contacts of relays UH and UL, No. 8 contacts of relays UX and UY, conductor 597, No. 7 contacts of relays T4—T0, No. 5 contacts of relays TH and TL, No. 8 contacts of relays TX and TY, conductor 598, No. 7 contacts of relays H4 . . . H2, No. 8 contacts of relays H1 and H0, No. 5 contacts of relays HH and HL, No. 9 contacts of relays HX and HY, conductor 599 within bracket 502, No. 8 contacts of relay PEY, conductor 601, No. 1 contacts of relay RP2, No. 1 contacts of relay RP4, No. 4 contacts of relay RP0, conductor 577, No. 12 contacts of relay ST3, conductor 578 within bracket 92, No. 6 contacts of relay RCD, conductor 579, and contacts H1C to ground. It will be observed that relays MM, MM1 and MM2 cannot operate over this circuit unless the proper number and selection of relays in the summary translator is operated.

Punch magnets MA0, MB1, MB2, MC4, MC7, MD0, MD1, ME4, ME7, MF1 and MF2 now operate to record on tape TT the digits "030103" representing 103 message units chargeable to the directory number "1234" recorded in the previous line. The second digit "3" indicates that this is a summary of the message units chargeable to said directory number. Magnet MA0 operates over a circuit extending from battery through the winding of said magnet, conductor 122, No. 2 contacts of relay PCA, conductor 123, winding of relay KA0, conductor 124, No. 2 contacts of relay M, conductor 602 within bracket 581, and contacts PA0 to ground. Magnets MB1 and MB2 operate over similar circuits. Magnet MF1 operates over a circuit extending from battery through the winding of said magnet, conductor 603, No. 7 contacts of relay PCC, winding of relay KF1, conductor 604, No. 2 contacts of relay M2, conductor 605 within bracket 589, No. 3 contacts of relay U3, No. 2 contacts of relay UL, conductor 606 within bracket 607, and contacts PF1 to ground. Magnet MF2 operates over a circuit extending from battery through the winding of said magnet, conductor 608, No. 8 contacts of relay PCC, winding of relay KF2, conductor 609, No. 3 contacts of relay M2, conductor 611 within bracket 589, No. 5 contacts of relay U3, No. 3 contacts of relay UL, conductor 612 within bracket 607, and PF2 to ground. It will be observed that, by the operation of magnets MF1 and MF2, the digit "3" registered by relays U3 and UL in biquinary code is recorded in two-out-of-five code. Magnets MC4, MC7, MD0, MD1, ME4, and ME7 operate over similar circuits and similarly record the other digits.

Operation of the checking relays, paper-advance magnet PAM, relay PK, and relay PS takes place as previously described. When relays PK and PS are operated, relay RP3 (Fig. 26) operates over a circuit extending from battery through the winding of said relay, No. 1 contacts of relay MM, conductor 586, No. 1 contacts of relay PS, and No. 1 contacts of relay PK to ground, and locks up through its No. 3 contacts to the previously-traced ground on conductor 574. The operated punch magnets and associated relays are released by the opening of the reader contacts. Paper-advance magnet PAM, when released, advances tape TT one line.

When reader contacts K7 again close, relay RP4 (Fig. 26) operates over a circuit extending from battery through the winding of said relay and No. 2 contacts of relay RP3 to the previously-traced ground on conductor 569, and locks up through its No. 4 contacts of the previously-traced ground on conductor 574. Relay RP4 opens the circuit of relays MM, MM1, and MM2 to reader contacts H1C, and opens the circuit of and releases relays AG, AGX, and AGY. The locking circuits of the relays of the sum registers are thereby opened and all operated relays of said registers released, and in turn, the operated relays of the summary translator. Relay CN (Fig. 25), which was released by the operation of relays in the sum registers, then reoperates over the circuit previously traced for its operation, and locks up over conductor 406, No. 5 contacts of relay RP4, conductor 613, and its own No. 2 contacts to ground. Relay S2X (Fig. 32) then operates over a circuit extending from battery through the winding of said relay, conductor 614 within bracket 316, No. 8 contacts of relay X22, conductor 343 within bracket 615, No. 9 contacts of relay PEY, conductor 616, No. 3 contacts of relay RP4, conductor 613, and No. 2 contacts of relay CN to ground, and locks up through its No. 1 contacts, conductor 298 within bracket 57, and reader contacts H3C to ground. Relay S2X opens the circuit, previously traced, of the step magnet M2 thereby allowing the reader drum to advance to the next line of the record on tape T. Relay S2X also opens the locking circuit of and releases relay YLK which, in turn, releases the operated relays of the Y directory number register. Release of relay YLK also opens the locking circuit of and releases relay PEY which, in turn, releases relay RP0 . . . RP4. Relay RP0 releases relays PCA, PCB, and PCC. Relay CN in operating causes the reoperation of relays AG, AGX, and AGY, preparing the circuits for the next line of the entry, which contains the first item of message units chargeable to the directory number "1236," and is handled in the manner already described for the first entry.

OVERFLOW

Each of the sum registers has a capacity for registering up to 999 message units. If the sum of the message units registered in one of the sum registers and the message units in the next entry for the same directory number exceeds 999, an entry is recorded on tape TT for 1000 message units and the excess over 1000 is registered in the other sum register for addition to the message units in succeeding entries for the same directory number. For example, assume that the directory number "1236" is registered in the Y directory number register and "096" message units chargeable to that number are registered in the Y sum register, and that the next entry encountered is similar to lines 15 and 16 of Fig. 73, but contains the directory number "1236" and "996" message units. The directory number "1236" in this latter entry is registered in the X directory number register when the first line of this entry is read, in the manner previously described. Since the two registered directory numbers are the same, relay S2X operates and the reader proceeds to the next line of the entry. The number "996" of message units in this line is then registered in the X message-units register in the usual manner. The relays operated and locked up to register message units are then as follows: in the Y sum register, relays HY0, HYL, TY4, TYH, UY1 and UYH, registering "096" message units, and in the X message-units register, relays XH4, XH4', XHH, XT4, XT4', XTH, XU1, XU1' and XUH, registering "996" message units.

These two quantities are now added, in the manner already described, and the sum registered in the X sum register by the operation of relays HX0, HXL, TX4, TXH, UX2 and UXL. These relays represent the quantity "092" which is the excess above 1000 of the sum of "996" and "096." Relay XNC (the operation of which indicates "no carry," that is, that the sum does not exceed 1000) is, however, not operated.

Relay OF (Fig. 8) then operates over a circuit extending from battery through the winding of said relay, conductor 621, No. 1 contacts of relay OXH, conductor 622, No. 1 contacts of relay XNC, conductor 623 within bracket 462, No. 9 contacts of relay XHH, No. 1 contacts of relay HYL, conductor 624, No. 8 contacts of relay HY0, No. 6 contacts of relay XH4', conductor 529 within brackets 346 and 366, and contacts of relay C1X to ground, completing a circuit from battery through the winding of relay POX (Fig. 25), conductor 625 within bracket 626, No. 5 contacts of relay OF, No. 2 back contacts of relay Y, No. 2 front contacts of relay X, conductor 439, and No. 2 contacts of relay AG to ground, over which relay POX operates. When contacts K7 close, relay RP0 (Fig. 26) operates over a circuit extending from battery through the winding of said relay, No. 1 contacts of relay RP1, No. 1 contacts of relay RP3, conductor 569, No. 1 contacts of relay POX, conductor 571 within bracket 572, No. 2 contacts of relay WS4, No. 2 contacts of relay WS5, conductor 99, No. 6 contacts of relay ST4, conductor 116 within bracket 92, No. 3 contacts of relay RCD, conductor 117, and contacts K7 to ground, and locks up through its No. 3 contacts, conductor 574, and No. 4 contacts of relay POX to ground, operating relays PCA, PCB and PCC over the circuit previously traced for these relays. Relays DN, DX and DXA (Figs. 26 and 27) then operate over a circuit extending from battery through the winding of relay DXA, winding of relay DX, conductor 627, No. 2 contacts of relay POX, conductor 576, winding of relay DN, No. 2 contacts of relay RP2, No. 1 contacts of relay RP4, No. 4 contacts of relay RP0, conductor 577, No. 12 contacts of relay ST3, conductor 578 within bracket 92, No. 6 contacts of relay RCD, conductor 579, and contacts H1C to ground. Relays DN, DX, and DXA operate punch magnets MA2, MB4, MB7, MC0, MC1, MD0, MD2, ME1, ME2, MF2 and MF4 of the recorder to record on tape TT the digits "201236," the last four digits being the directory number in the present entry. Punch magnet MA2, for example, operates over a circuit extending from battery through the winding of said magnet, conductor 285, No. 3 contacts of relay PCA, conductor 286, the winding of relay KA2, conductor 287, No. 1 contacts of relay DN, conductor 126 within bracket 581, and contacts PA2 to ground, when said contacts close. The other punch magnets operate over similar circuits. The paper-advance magnet PAM and the associated relays operate and release in the manner previously described, releasing the operated punch magnets. The release of the paper-advance magnet advances the tape TT to a position for recording another line.

When relay RP2 now operates in the cycle of recording operations, as already described, and contacts H1C close, relays M01 and M02 (Fig. 26) operate in series over a circuit extending from battery through the winding of relay M01, winding of relay M0, conductor 628, No. 5 contacts of relay POX, conductor 601, No. 1 contacts of relay RP2, No. 1 contacts of relay RP4, No. 4 contacts of relay RP0, conductor 577, No. 12 contacts of relay ST3, conductor 578 within bracket 92, No. 6 contacts of relay RCD, conductor 579, and contacts H1C to ground. Relays M01 and M02 operate punch magnets of the recorder to record 1000 message units independently of any sum registered in the sum registers. For example, punch magnet MC1 (not shown) operates over a circuit extending from battery through the winding of said magnet, conductor 641, No. 2 contacts of relay PCB, conductor 642, the winding of relay KC1 (not shown), conductor 643, No. 3 contacts of relay M01, conductor 644 within bracket 581, and contacts PC1 of the reader to ground, when said contacts close. Punch magnets MC0, MD4, MD7, ME4, ME7, MF4 and MF7 operate over similar circuits to record the number "1000." Punch magnets MB0 and MB4 similarly operate to record the digit "4" as the second digit of the line, and punch magnet MA0 operates over a similar circuit to record the digit "0" as the first digit of the line. The second digit "4" recorded indicates that this record does not show all of the message units chargeable to the directory number "1236."

The control relays operate in the manner already described (beginning with relay CX1), and operation of relay CX releases the operated relays of the Y sum register and relay XL. Release of the latter relay releases the operated relays of the X message-units register.

Relays of the X sum register remain operated, registering the amount "092" in said register. The operation then proceeds for the next entry encountered by the reader, the message units in said entry being added to the quantity "092," if the same directory number is again encountered. Thus, 1000 message units are recorded for directory number "1236" and "092" message units retained for the subsequent accumulation of additional message units chargeable to that directory number.

ENTRY OF 1000 MESSAGE UNITS

A similar entry for 1000 message units is made on the output tape TT when an entry containing 1000 message units is encountered on the input tape T. If the directory number in the first line of the entry on tape T does not agree with the directory number in the previous entry, the operation is the same as that described above. If the directory number in the entry on tape T does agree with that in the previous entry, it is registered and the reader advances to the second line of the entry in the normal manner. However, when this line is read, the combination of reading relays operated, which are A0, B0, B4, C0, C1, D4, D7, E4, E7, F4, and F7, completes a circuit for relay PCX or relay PCY (Fig. 25), the operation of which causes the recording on tape TT of an entry for 1000 message units, in a similar manner to the operation of relay POX or relay POY, as described above. The number of message units in the entry on tape T appears, so far as the adding circuits are concerned, to be "000" and this number is duly registered and added to the sum already accumulated in one of the sum registers. This operation does not, of course, change the value of the sum, but it serves to maintain the proper sequence of the use of the X and Y registers.

RECORDING AT END OF INPUT TAPE

When the last entry on an input tape has been handled, the next line encountered by the reader is the first line of the tape-identity entry. This is handled in the same manner as already described for the similar tape-identity entry at the beginning of the input tape. When, in the course of this operation, relay AS operates, as previously described, relay PF (Fig. 33) operates over a circuit extending from battery through the winding of said relay, conductor 645, No. 1 contacts of relay DRN, and No. 5 contacts of relay AS to ground. At this time, relays DNX and YLK, or relays DNY and XLK, are operated, depending upon the registers used for the previous entry, and a circuit is closed for the operation of either relay PEX or relay PEY. Assuming that relays DNY and XLK are operated, relay PEX (Fig. 25) operates over a circuit extending from battery through the winding of said relay, conductor 646 within bracket 566, No. 1 contacts of relay ODC, conductor 647, No. 7 contacts of relay DNY, conductor 648, No. 3 contacts of relay PF, and No. 3 contacts of relay XLK to ground, and locks up through its No. 5 contacts, conductor 649 within bracket 566, and No. 3 contacts of relay XLK to ground. The operation of relay PEX (or PEY) has the same result as its operation, previously described, when two registered directory numbers do not agree; that is, it causes the recording of an entry containing the previously registered directory number and the total of the message units accumulated in one of the sum registers. In the present case, the directory number is that of the last message-unit entry read on the input tape and the message units are those accumulated for that directory number up to and including said last entry.

When relay CN then operates, as previously described, relay PFX (Fig. 33) operates over a circuit extending from battery through the winding of said relay, No. 1 contacts of relay PF, conductor 395 within brackets 316 and 615, No. 9 contacts of relay PEX, conductor 616, No. 3 contacts of relay RP4, conductor 613, and No. 2 contacts of relay CN to ground, and locks up through No. 1 contacts of relay PF and its own No. 1 contacts to ground, opening the circuit of and releasing relay XLK which, in turn, releases the locked up relays of the X directory number register and relay PEX. Release of relay PEX releases relays RP0 ... RP4 and relay RP4 releases relay CN. Release of the relays of the X directory number register releases relay XON, and relay DRN (Fig. 59) then operates over a circuit extending from battery through the winding of said relay, conductor 71, No. 8 contacts of relay ON1, conductor 72, No. 4 contacts of relay YON, and No. 4 contacts of relay XON to ground. Relay DRN opens the circuit of and releases relay PF which releases relay PFX. The recording of the tape-identity entry, which follows the last message-unit entry on tape T, then proceeds in the manner previously described.

SECOND TAPE

The tape-identity entry at the end of the first input tape T is followed by a splice pattern, as previously mentioned, and this is passed over by the reader in the manner described for the leading splice pattern. The next entry encountered by the reader is the tape-identity entry at the beginning of the second tape. This is read and recorded in the same way as the first tape-identity entry previously described. However, the message-unit entries which follow thereafter relate to directory numbers in another thousands group and the next to last line of this tape-identity entry (see line 12 of Fig. 73) contains in the fifth digit, a different thousands number. It was assumed that the first tape read was for directory numbers in the group 1000 to 1999 and the second tape for directory numbers in the group 2000 to 2999. The tape-identity entry of the second tape, therefore, has the digit "2" as the fifth digit of the eighth line of the entry. When this line is read, reading relays E0 and E2 and translator relay TE2 operate in response to this digit, in the manner previously described.

Relay TMM (Fig. 47) then operates over a circuit extending from battery through the winding of said relay, conductor 651 within bracket 150, No. 3 contacts of relay T1E, conductor 652 within brackets 150 and 195, No. 2 contacts of relay L8, conductor 653 within bracket 195, No. 4 contacts of relay THS, conductor 654, No. 1 contacts of relay PX1, conductor 655 within bracket 656, No. 1 contacts of relay TE2, conductor 657 within bracket 656, No. 8 contacts of relay L8, and No. 7 contact of arc No. 2 of the Round switch (assuming the "round" digit to be "7"), conductor 659 within brackets 225 and 244, No. 3 contacts of relay TF7, conductor 661 within bracket 226, No. 7 contact and arm of arc No. 1 of the Round switch, conductor 662, No. 9 contacts of relay L8, conductor 663 within bracket 233, and No. 3 contacts of relay TD8 to ground, and locks up through its No. 2 contacts, conductor 664 within bracket 195, and No. 8 contacts of relay CL1 to ground. The rotary magnet ROT of switch TH (Fig. 48) operates over a circuit extending from battery through the winding of said magnet, conductor 256, No. 1 contacts of relay LTH, and No. 1 contacts of relay TMM to ground, moving the arms of switch TH one step to the No. 2 contacts of said switch.

The setting of switch TH is thus changed to agree with the thousands digit recorded in the tape-identity entry of the new tape and the thousands digit in each entry encountered in this tape is compared with the setting of this switch in the manner previously described for the first tape. When relay CL1 releases in the course of further operations, as previously described, it opens the locking circuit of and releases relay TMM, which releases the rotary magnet ROT of switch TH.

END OF INPUT TAPE

The system thus proceeds, in the manner described above, to read, summarize, and transcribe all the entries on the tapes fed into the reader. When the sensing fingers of the reader fall beyond the end of the last tape, the contacts of all of said fingers close and all of the reading relays operate. The check circuit through the contacts of said relays is then not completed and relay RS fails to operate. The reader, therefore, fails to advance and the timing circuit, described later, functions to give an alarm.

The alarm circuits may now be restored to normal in the manner described later and a splice pattern may be impressed on the output tape TT in the manner described above for the beginning of said tape. The record on the output tape TT is thus completed in the same form as that on the input tape T.

SPLICED INPUT TAPE

Where there is a splice in the input tape which interferes with proper recording on said tape, the machine which makes the record on said tape records a line of the digits "287020" followed by a splice pattern, which serves to feed the tape through the machine until the spliced portion has been passed over, and thereafter records another line of the digits "287020." When such a record is encountered by the reader, the reading relays respond in the usual manner to the first line "287020." Relay WE (Fig. 60) then operates over a circuit extending from battery through the winding of said relay, conductor 665 within bracket 214, and thence over the checking circuit, previously described, through the contacts of the reading relays and the reader drum advance check, to ground at contacts G1 or G2, the combination of reading relays operated for the digits "287020" closing said circuit through to conductor 665. Relay SPE (Fig. 60) then operates over a circuit extending from battery through the winding of said relay and No. 3 contacts of relay WE to ground, and locks up through its No. 3 contacts, conductor 666, No. 2 contacts of relay AS, conductor 667, and No. 3 contacts of relay ON2 to ground. Relay RS (Fig. 46) operates over a circuit extending from battery through the winding of said relay, conductor 197, No. 5 contacts of relay SKP, No. 1 contacts of relay SPE, and No. 1 contacts of relay WE to ground. Operation of relay RS permits the reader to advance to the next line, as previously described. This line is a line of the splice pattern and, as previously described, relay SKP operates to permit the reader to pass over the splice pattern.

Relay WE releases when its circuit is opened by the release of the reading relays which caused its operation, and relay SKP is then locked up over a circuit extending from battery through the winding and No. 3 contacts of said relay, No. 2 contacts of relay WE, conductor 194 within bracket 195, No. 7 contacts of relay LI, conductor 196 within bracket 195, and No. 2 contacts of relay ST3 to ground. When the succeeding line of digits "287020" is reached, relay WE again operates over the circuit traced above, opening the locking circuit of and releasing relay SKP, and releases when the reading relays release. The circuit is thereby returned to normal and normal operation thereof in connection with succeeding entries on tape T is resumed. The first line of digits "287020," therefore, serves as an indication to the reader to pass over the splice pattern which follows, while the second line of digits "287020" restores normal operation.

SPLICED OUTPUT TAPE

A finger F (Fig. 43) is arranged to bear upon a portion of the output tape TT and the contacts of said finger remain open so long as said finger rests upon the tape. If, however, the finger encounters an opening in the tape, its contacts close. Should there be a portion of the output tape TT on which, for any reason, it is not desired to record significant information, a suitable opening is cut in the tape where it will be encountered by the finger F.

Figure 31:
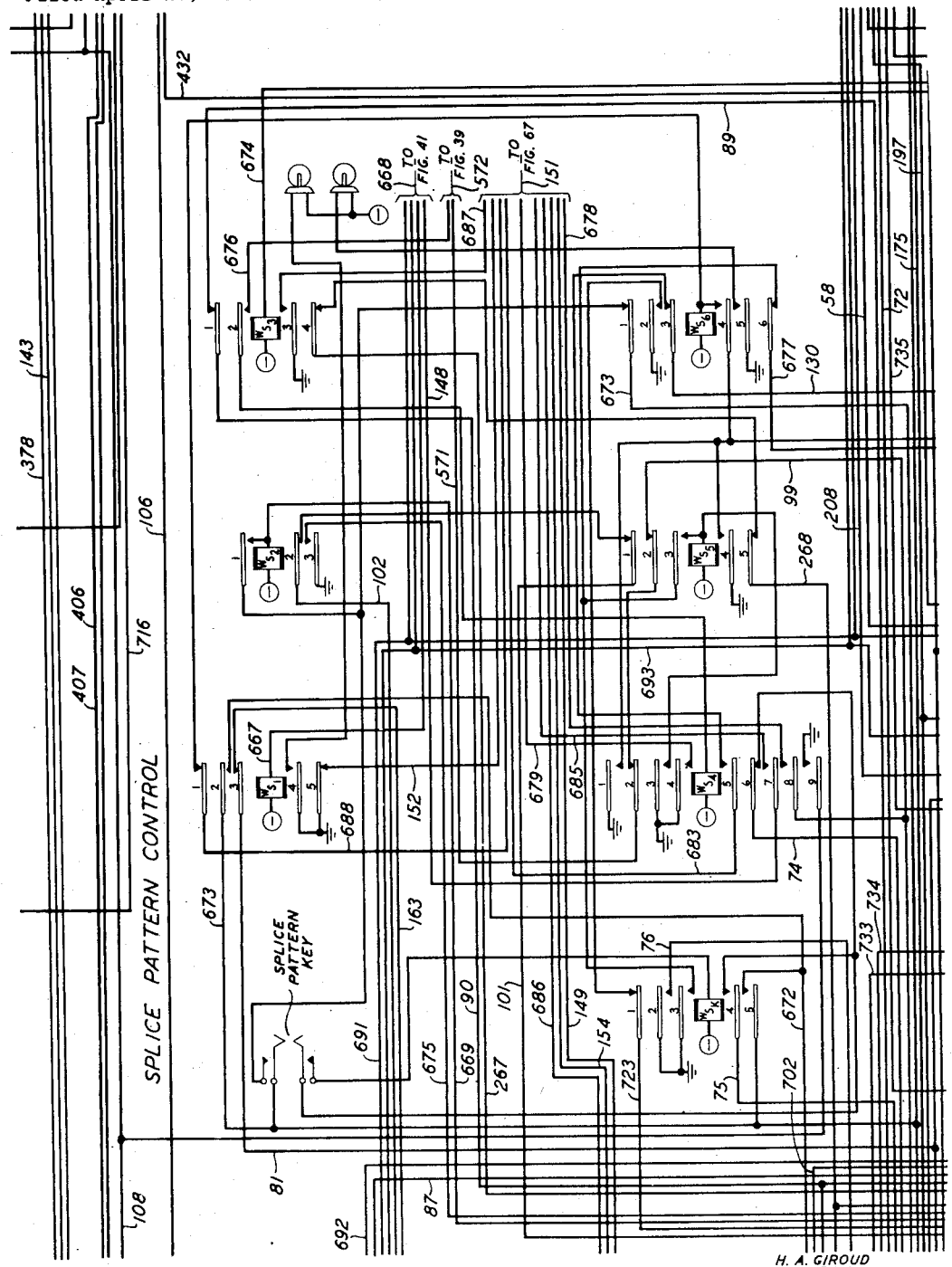

When the finger F encounters such an opening, its contacts close and relay WSI (Fig. 31) operates over a circuit extending from battery through the winding of said relay, conductor 667 within bracket 668, and contacts of finger F to ground. Lamp WS (Fig. 31) then lights over an obvious circuit to indicate that an opening has been encountered in tape TT. Relay WS2 operates over a circuit extending from battery through the winding of said relay, conductor 669, No. 6 contacts of relay SP3, conductor 671, No. 7 contacts of relay LAS, conductor 672, No. 2 contacts of relay WSI, conductor 673, and No. 4 contacts of relay ST4 to ground, and locks up through its No. 1 contacts and No. 1 contacts of relay WS6 to the same ground on conductor 673. Relay WS3 then operates over a circuit extending from battery through the winding of said relay, conductor 674, No. 1 contacts of relay AS, conductor 675, and No. 3 contacts of relay WS3 to ground. Relay WS3 releases relay LAS to control the timing circuit described later, and completes a circuit from battery through the winding of relay WS4, No. 2 contacts of relay WS3, conductor 676 within bracket 572, and No. 2 contacts of relay RP0 to ground, over which relay WS4 operates, operating relay WS5 over an obvious circuit. The latter relay locks up through its No. 3 contacts, No. 6 contacts of relay WS6, conductor 677, and No. 6 contacts of relay ON2 to ground.

Figure 67:
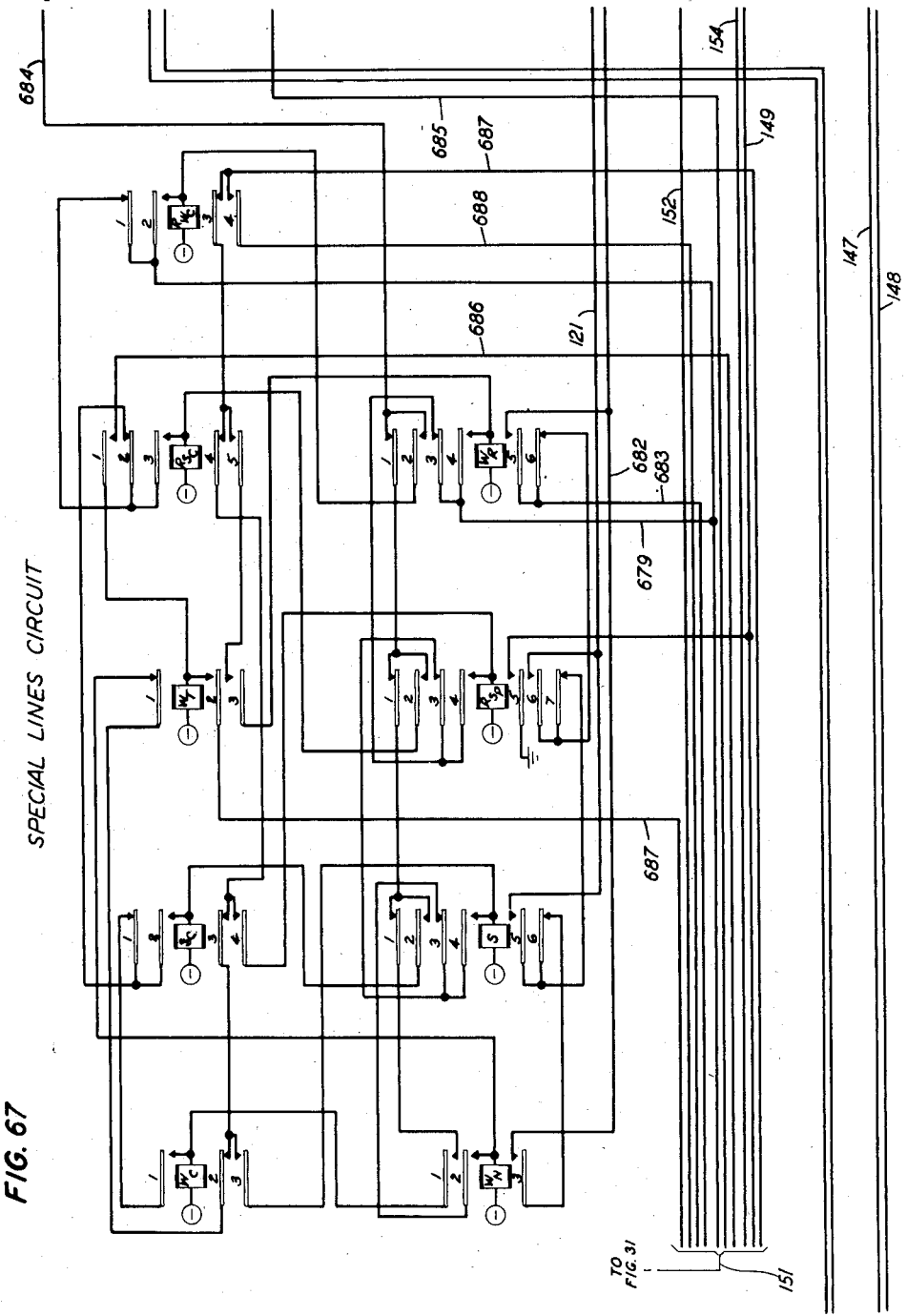
Figs. 67 through 69 show the special lines circuits.

Relays PCA, PCB and PCC (Fig. 42) now operate over a circuit extending from battery through the windings of said relays in series, conductor 106 within bracket 107, No. 9 contacts of relay RCD, conductor 108, and No. 9 contacts of relay WS4 to ground. When the contacts K7 of the reader close, relay WN (Fig. 67) operates over a circuit extending from battery through the winding of said relay, No. 1 contacts of relay WT, No. 2 contacts of relay WC, No. 3 contacts of relay SC, No. 4 contacts of relay RSC, No. 3 contacts of relay RWC, conductor 678 within bracket 151, No. 8 contacts of relay WS4, conductor 99, No. 6 contacts of relay ST4, conductor 116 within bracket 92, No. 3 contacts of relay RCD, conductor 117, and contacts K7 to ground, and locks up through its No. 2 contacts, No. 3 contacts of relay S, No. 3 contacts of relay RSP, No. 3 contacts of relay WR, conductor 679 within bracket 151, and No. 4 contacts of relay WS4 to ground.

When contacts P0 of the reader now close, relays PWE (Fig. 68) and PWEI (Fig. 69) operate in series over a circuit extending from battery through the winding of relay PWE, conductor 681, the winding of relay PWEI, conductor 682, No. 3 contacts of relay WN, No. 6 contacts of relay S, No. 7 contacts of relay RSP, No. 6 contacts of relay WR, conductor 683 within bracket 151, No. 5 contacts of relay WS4, No. 3 contacts of relay WS6, conductor 130, No. 11 contacts of relay ST3, conductor 140 within bracket 92, No. 1 contacts of relay RCD, conductor 150, and contacts P0 to ground. Relays PWE and PWEI connect punch magnets of the recorder to cam contacts of the reader to record on tape TT the digits "287020." Punch magnet MB1, for example, operates over a circuit extending from battery through the winding of said magnet, conductor 128, No. 5 contacts of relay PCA, the winding of relay KB1, conductor 131 within bracket 125, No. 3 contacts of relay PWEI, conductor 132 within bracket 127, and contacts PB0 to ground, when said contacts close. The other punch magnets operate over similar circuits.

The checking circuit for the operated punch magnets is effective and relays PS and PK and the paper-advance magnet PAM operate in the manner previously described. Relay WC (Fig. 67) then operates over a circuit extending from battery through the winding of said relay, No. 1 contacts of relay WN, No. 1 contacts of relays S, RSP and WR, conductor 684, No. 4 contacts of relay PWEI, conductor 685 within bracket 151, No. 7 contacts of relay WS4, conductor 148 within bracket 668, No. 2 contacts of relay PS and No. 1 contacts of relay PK to ground, and locks up through its No. 1 contacts, No. 1 contacts of relay SC, No. 2 contacts of relay RSC, No. 1 contacts of relay RWC, conductor 679 within bracket 151, and No. 4 contacts of relay WS4 to ground. When the cam contacts of the reader open, the operated punch magnets of the recorder, relays PWE and PWEI, and the paper advance magnet PAM release, the latter advancing the tape TT. When the reader contacts K7 again close, relay S (Fig. 67) operates over a circuit extending from battery through the winding of said relay, No. 3 contacts of relay WC, No. 3 contacts of relay SC, No. 4 contacts of relay RSC, No. 3 contacts of relay RWC, conductor 678 within bracket 151, No. 8 contacts of relay WS4, conductor 115, No. 6 contacts of relay ST4, conductor 116 within bracket 92, No. 3 contacts of relay RCD, conductor 117, and contacts K7 to ground, and locks up through its No. 4 contacts, No. 3 contacts of relays RSP and WR, conductor 679, and No. 4 contacts of relay WS4 to ground.

When the reader contacts P0 now reclose, relays PP (Fig. 68) and PPI (Fig. 69) operate in series over a circuit extending from battery through the winding of relay PPI, conductor 119, the winding of relay PP, conductor 121, No. 5 contacts of relay S, No. 7 contacts of relay RSP, No. 6 contacts of relay WR, conductor 683 with bracket 151, No. 5 contacts of relay WS4, No. 3 contacts of relay WS6, conductor 130, No. 11 contacts of relay ST3, conductor 140 within bracket 92, No. 1 contacts of relay RCD, conductor 150, and contacts P0 to ground. Relays PP and PP1 connect punch magnets of the recorder to cam contacts of the reader to record the digits "081010." These are the digits of the splice pattern, the recording of which has been already described. When this line has been recorded and contacts K7 again close, relay RSP (Fig. 67) operates over a circuit extending from battery through the winding of said relay, No. 4 contacts of relay SC, No. 4 contacts of relay RSC, No. 3 contacts of relay RWC, conductor 678 within bracket 151, and thence over the circuit traced above through contacts K7 to ground, and locks up through its No. 4 contacts, and No. 3 contacts of relay WR to the previously-traced ground on conductor 679. Relay RSP opens the locking circuit of and releases relay S. Relay STS (Fig. 30) operates over a circuit extending from battery through the winding of said relay, conductor 149 within bracket 151, and No. 5 contacts of relay RSP to ground. Relay RSC (Fig. 67) operates over a circuit extending from battery through the winding of said relay, No. 2 contacts of relay RSP, No. 1 contacts of relay WR, conductor 684, No. 5 contacts of relay PP1, conductor 685 and thence over the circuit traced above through contacts P0 to ground, and locks up through its No. 3 contacts and No. 1 contacts of relay RWC to the previously-traced ground on conductor 679. Relay RSC releases relay SC.

It will be remembered that relay STS controls a timing circuit for the recording of splice pattern. This circuit is now effective, in the manner previously described, to cause the recording on tape TT of approximately 40 lines of the digits "081010" forming the splice pattern. The recording of the splice pattern is terminated by the operation of relay STE, as previously described. Relay WT (Fig. 67) then operates over a circuit extending from battery through the winding of said relay, No. 1 contacts of relay RSC, conductor 686 within bracket 151, and No. 2 contacts of relay STE to ground, and locks up through its No. 2 contacts, conductor 687 within bracket 151, and No. 3 contacts of relay WS3 to ground. When contacts K7 now again close, relay WR (Fig. 67) operates over a circuit extending from battery through the winding of said relay, No. 3 contacts of relay WT, No. 5 contacts of relay RSC, No. 3 contacts of relay RWC, conductor 678 within bracket 151, and thence over the circuit traced above through contacts K7 to ground, and locks up through its No. 4 contacts to the previously-traced ground on conductor 679. Relay WR opens the locking circuit of and releases relay RSP, which releases relay STS. The latter relay releases relay STE.

When now the contacts P0 of the reader again close, relays PWE and PWE1 again operate and cause the recording of a line of the digits "287020" in the manner described above. When this line has been recorded, relay RWC (Fig. 67) operates over a circuit extending from battery through the winding of said relay, No. 2 contacts of relay WR, conductor 684, No. 4 contacts of relay PWE1, conductor 685 within bracket 151, No. 7 contacts of relay WS4, conductor 148 within bracket 668, No. 2 contacts of relay PS and No. 1 contacts of relay PK to ground, and locks up through its No. 2 contacts to the previously-traced ground on conductor 679. Relays PWE and PWE1 are released by the opening of the cam contacts of the reader and when contacts K7 again close, relay WS6 operates over a circuit extending from battery through the winding of said relay, No. 1 contacts of relay WS1 (which has been released by the opening of the contacts of finger F), conductor 688 within bracket 151, No. 4 contacts of relay RWC, conductor 678 within bracket 151, and thence over the circuit traced above through contacts K7 to ground, and locks up through its No. 4 contacts, and No. 1 contacts of relay WS4 to ground. Relay WS6 releases relay WS2. Relays WS3, WT, WS4, WR, RWC, WS5, and relay WS6 itself then releases in turn, restoring the circuits to normal.

The opening made in the tape TT and encountered by the finger F, therefor, causes a splice pattern, preceded and followed by a line of the digits "287020," to be recorded on tape TT. The splice pattern serves to feed the tape TT through the recorder so that no significant information is recorded on the spliced or unsuitable portion of said tape, while the lines of digits "287020" are indications to a reader, if this tape is fed into the reader of a system of the type herein described, for skipping the splice pattern.

Should an opening in tape TT be encountered by the finger F while the recorder is recording a splice pattern under the control of the timing circuit, as previously described, relay WS1 operates as described above. However, at this time relay SP3 is operated, which prevents operation of relay WS2. Relay WS1, however, in operating, opens the circuit of and releases relay STS, disabling the timing circuit controlled by said relay. The recorder continues to record lines of splice pattern but when the opening in tape TT passes from under finger F, the contacts of said finger open, releasing relay WS1. Relay STS then re-operates restarting the timing circuit. This extends the splice pattern to a more than normal length, which ensures passing any unsuitable portion of the tape TT indicated by the opening encountered by the finger F. Since relay WS2 does not, in this case, operate, the lines of digits "287020" are not recorded.

It may be noted that if the tape runs out of the recorder, the effect is the same as if an opening had been encountered in the tape, and splice pattern is recorded. However, finger F is not restored and the recording of or attempts to record, the digits "287020" continue until the alarm circuits function. When a new tape is inserted in the recorder, finger F is restored. The splice pattern may then be continued on the new tape by operating the Splice Pattern key (Fig. 31) which operates relay WSK to start recording of splice pattern in a manner similar to that described above.

ALARMS AND SIGNALS

Alarms are provided for indicating various types of failure, some of the alarm signals being controlled by two timing circuits, one of which has a shorter period of operation than the other. The "short" alarm circuit gives an alarm if the reader or the recorder fails to advance, when required to do so, within approximately 0.35 second. The "long" alarm circuit gives an alarm if the recorder control fails, which would result in repeated recording of the same information, or if switch TH, which registers the digit for comparison with the thousands digits of directory numbers, fails to step to the first terminal.

In addition, alarms are provided to signal failure of the reader to advance where required to do so, to signal failure of the relays which control the advance of the reader to release, and to give a signal if a fuse blows.

Short alarm

When the Motor Start key is operated to start operation of the reader motor, and relay ON1 operates as previously described, relay RT (Fig. 46) operates over a circuit extending from battery through the winding of said relay, conductor 62, No. 2 contacts of relay ON1, conductor 63, and No. 1 contacts of relay ST3 to ground, to prevent operation of the short-alarm timing circuit. When thereafter the Start key is operated and relay ST3 operates, as also described above, the circuit of relay RT is thereby opened and the latter relay is released. Relay SAS (Fig. 30) then operates over a circuit extending from battery through the winding of said relay, conductor 87, No. 1 contacts of relay RT, conductor 88, and No. 3 contacts of relay ON1 to ground. Relay SAS opens the short circuit around capacitor CP3 and said capacitor charges from battery through resistor R3. When the potential at capacitor CP3 and, through resistor R4, at the starting element of tube SA, reaches the starting potential of said tube, said tube fires to its starting element and then across its anode-cathode path. Relay SAE then operates over a circuit extending from battery through the anode-cathode space of tube SA, No. 1 front contacts of relay SAS, and the winding of relay SAE to ground. The characteristics of capacitor CP3, resistor R3, and relay SAE are so chosen that relay SAE operates approximately 0.35 second after relay SAS operates.

When relay SAE operates, relay SAA (Fig. 46) operates over a circuit extending from battery through the winding of said relay, No. 4 contacts of relay LAA (assuming relay LAA is not operated), conductor 692, and contacts of relay SAE to ground. Relay AL then operates over a circuit extending from battery through the winding of said relay, No. 8 contacts of relay SAA, and contacts of relay ALR, the No. 7 contacts of relay AL, grounding the alarm through No. 1 back contacts of relay EAC. Relay SAA is locked up through its No. 2 contacts and No. 3 contacts of relay AL, holding relay AL operated to maintain the alarm. Relay AL also opens the circuit of and releases relay RCD, thus preventing further processing, and opens the circuit of and releases relay MST, which stops the reader motor. Relay AL1 operates over an obvious circuit through No. 5 contacts of relay AL, and relay RT thereupon operates over a circuit extending from battery through the winding of said relay, conductor 62, No. 2 contacts of relay ON1, conductor 63, and No. 2 contacts of relay AL1 to ground, opening the circuit of and releasing relay SAS. The latter relay opens the circuit of relay SAE and tube SA, releasing relay SAE and extinguishing said tube.

If after relay SAS operates and before relay SAE operates, any of the relays S1X, S2X, S1Y, S2Y, RS, PS, or TSA operates, capacitor CP3 is thereby short-circuited and discharged, stopping the timing. The short circuit may be traced, for example, from the lower terminal of capacitor CP3 through resistor R5, No. 2 contacts of relay SAS, conductor 691, No. 2 contacts of relay RS, to the upper terminal of capacitor CP3. Operation of relay S1X, S2X, S1Y, S2Y, or RS indicates that the reader is advancing. Operation of relay PS indicates that the recorder is advancing. Relay TSA is operated while the switch TH is advancing to the first terminal. The timing for the alarm is stopped, therefore, when the reader, the recorder, or switch TH is advancing, but recommences when said relays release.

When relays SAA and AL1 operate to actuate the alarm, the Short Alarm lamp lights over a circuit through No. 7 contacts of relay AL1, No. 3 contacts of relay SAA, No. 1 contacts of relay LAA, No. 3 contacts of relay RSF, No. 2 contacts of relay RSH (operated as described below), No. 1 back contacts of relay FA1, and No. 1 back contacts of relay FA2 to ground.

Long alarm

Relay LAS (Fig. 30) controls the long alarm. When this relay is released, the timing functions are operative and when this relay is operated, timing is canceled.

When relay RT operates, as described above, relay LAS operates over a circuit extending from battery through the winding of said relay, conductor 90, No. 2 contacts of relay RT, conductor 88, and No. 3 contacts of relay ON1 to ground. There is also a circuit for the operation of relay LAS over conductor 90, through No. 1 contacts of relay WS3, conductor 89, No. 4 contacts of relay SP3, conductor 109, No. 5 contacts of relay PT1, conductor 79 within bracket 150, No. 4 contacts of relay TSA, conductor 170, No. 5 contacts of relay RP0, conductor 88, and No. 3 contacts of relay ON1 to ground. Upon the release of relay RT, therefore, relay LAS remains operated so long as all of relays WS3, SP3, PT1, TSA, and RP0 remain normal, and the long alarm timing is ineffective. Upon the operation of any one of these relays, however, the circuit of relay LAS is opened and said relay released, starting the timing described below.

Operation of relay WS3 indicates the start of recording due to an opening in the output tape TT; operation of relay SP3 indicates the start of the recording of splice pattern; operation of relay PT1 indicates the start of the recording of tape identity; operation of relay TSA indicates that switch TH is being advanced; and operation of relay RP0 indicates the start of the recording of a summary. During all of these operations, which are described above, the long-alarm timing is, therefore, effective and if any of these operations is not completed with the period of the timing circuit operation, an alarm is produced as described below.

When relay LAS releases, as described above, relay LAB (Fig. 30) operates over a circuit extending from battery through the winding of said relay, No. 3 contacts of relay LAS, conductor 701, and No. 5 contacts of relay ON2 to ground, operating relay RCY over an obvious circuit. The No. 1 back contacts of relay LAB open the short circuit around capacitor CP4 through resistor R6, and the No. 1 front contacts of said relay connect the winding of relay LAE to the cathode of the gas-filled tube LA. Capacitor CP4 then charges from battery through resistor R7. When the potential at capacitor CP4 and at the starting element of tube LA reaches the starting potential of said tube, said tube fires to its starting element and then across its main gap, operating relay LAE. The characteristics of capacitor CP4, resistor R7, tube LA, and relay LAE are so chosen that relay LAE operates approximately six seconds after the release of relay LAS. Relay LAA (Fig. 46) then operates over a circuit extending from battery through the winding of said relay, No. 4 contacts of relay SAA, conductor 702, and contacts of relay LAE to ground. It should be observed that relay LAA cannot operate over this circuit if relay SAA is operated and, if relay LAA operates, it opens the operating circuit of relay SAA. The long alarm and the short alarm cannot, therefore, both produce an alarm signal at the same time.

When relay LAA operates, relay AL operates over a circuit extending from battery through the winding of said relay, No. 5 contacts of relay LAA, and contacts of relay ALR to ground, actuating the alarm, as described above. Relay LAA is then locked up through its No. 3 contacts and No. 3 contacts of relay AL to ground, maintaining the alarm signal. Relay AL, in operating, releases relays MST and RCD, arresting recording operations and stopping the reader motor. Relay ALI operates over an obvious circuit, operating relay RT which operates relay LAS over the circuit previously traced, the latter relay releasing relay LAB, which, in turn, releases relays LAE and RCY. Relays LAS and LAB reclose the short circuit around and discharge capacitor CP4, and extinguish tube LA.

If, during the charging of capacitor CP4, as described above, the operating circuit of relay LAS is closed and said relay operates, releasing relays LAB and RCY, capacitor CP4 is short-circuited and discharged, as described above, stopping the timing. Relay RCY is a slow-release relay and maintains a locking circuit for relay LAS through the No. 4 contacts of the latter relay so that relay LAS, when operated, cannot immediately thereafter release and restart the timing.

Reader-advance failure alarm

When the reader drum fails to advance when it should do so, the normal sequence of operation of contacts G1 and G2 with respect to relays RKA and RKB is changed and relay RSF (Fig. 46) operates over a circuit extending from battery through the winding of said relay, No. 6 contacts of relay ALI, conductor 703, No. 5 contacts of relay ST4, conductor 210, and back contacts of relay RKB, conductor 174, and contacts G2 to ground, or through front contacts of relay RKA, conductor 180, and contacts G1 to ground, and locks up through its No. 2 contacts and contacts of relay ALR to ground. Relay RSF, when operated, operates relay AL over a circuit extending from battery through the winding of relay AL, No. 4 contacts of relay RSF, conductor 704, and No. 2 contacts of relay ST4 to ground, actuating the alarm, and lights the Step Fail lamp over an obvious circuit.

Reader-advance release failure alarm

When relay ON2 operates in the normal operation of the system, as previously described, relay RSR (Fig. 46) operates over a circuit extending from battery through resistor R8, the winding of relay RSR, conductor 705, and No. 7 contacts of relay ON2 to ground, operating relay RSH over an obvious circuit. When any of the relays S1X, S2X, S1Y, S2Y and RS, which cause the reader to advance, operates, the winding of relay RSR is shunted. For example, when relay RS operates, resistor R8 is connected over conductor 706, No. 1 contacts of relay SKP, conductor 707, and No. 3 contacts of relay RS to ground. Approximately 0.25 second is required for relay RSR to release after its winding is shunted. If the shunt remains for this period, which is the case if relay S1X, S2X, S1Y, S2Y or RS fails to release promptly, relay RSR releases, releasing relay RSH. Relay AL then operates over a circuit extending from battery through the winding of said relay, No. 2 contacts of relay RSR, conductor 704, and No. 2 contacts of relay ST4 to ground, actuating the alarm. When relay ALI then operates, the Step Hold lamp is lighted through No. 1 contacts of relay ALI, No. 2 contacts of relay RSH, No. 1 back contacts of relay FA1 and No. 1 back contacts of relay FA2 to ground.

Fuse alarms and alarm cut-off

Relays FA1 and FA2 are fuse-alarm relays which operate when a fuse blows, operating relay AL and the Fuse 1 or Fuse 2 lamp over obvious circuits.

When relay AL operates, the alarm is actuated and the Alarm and Pilot lamps light over obvious circuits. Closure of the alarm Cut-off key operates relay EAC over an obvious circuit, deenergizing the alarm and extinguishing said lamps. Relay EAC locks up through its No. 1 front contacts and No. 7 contacts of relay AL to ground, so that it is not necessary to maintain the Alarm Cut-off key operated.

Reader lamps

Figure 17:
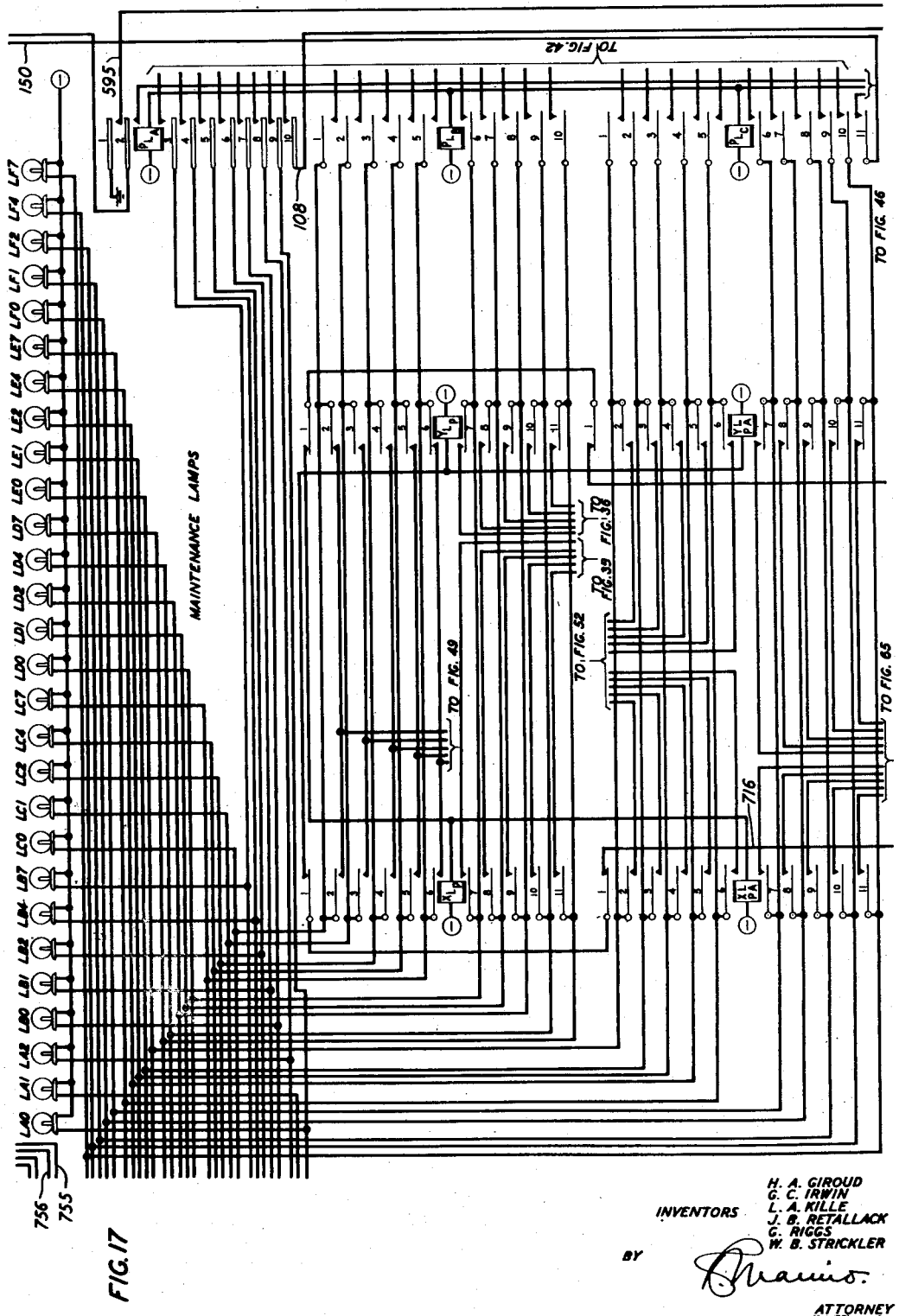

When the reader stops due to trouble or other causes, the lamps shown in Figs. 16 and 17 may be used to give a visual indication of the line of tape T on which the sensing fingers rest, by operating the RDR LPS key. When this key is operated, relays RLA, RLB and RLC operate over a circuit extending from battery through the windings of said relays in parallel, No. 3 contacts of Maintenance Lamps key, No. 2 front contacts of RDR LPS key, No. 2 contacts of DIR NO. LPS key, conductor 711 within bracket 169, and No. 5 contacts of relay ON1 to ground, connecting the lamps of Fig. 17 through contacts of said relays and conductors within bracket 712 to the respective sensing-finger contacts of the reader. Each sensing-finger contact which is closed lights the associated lamp indicating the digits of the line on which the sensing fingers rest. Lamp POS is also connected through No. 11 contacts of relay RLC and conductor 713 to contacts J5 of the reader and lights whenever said contacts are closed to indicate the position of the reader drum in which reading takes place. By turning the reader drum manually until lamp POS lights, the position is found when the sensing fingers are reading a line of the record.

The lamps of Fig. 17 may also be used to give a visual indication of the directory number registered in the directory-number registers, when the system is stopped by an alarm. When the DIR NO. LPS key is operated, relays XLP and XLPA operate, if the directory number is registered in the X register. Assuming that the directory number is registered in the Y register, when the DIR NO. LPS key is operated, relays YLP and YLPA (Fig. 17) operate over a circuit extending from battery through the windings of said relays in parallel, No. 1 contacts of relay XLP, No. 1 contacts of relay XLPA, conductor 716, No. 9 contacts of relay DNX, or No. 9 contacts of relay MUY, conductor 717 within bracket 319, No. 2 contacts of Maintenance lamps key, No. 1 contacts of DIR NO. LPS key, conductor 714 within bracket 169, and No. 4 contacts of relay AL to ground. Relays YLP and YLPA connect lamps D0 . . . D7, E0 . . . E7 and F0 . . .

F1 of Fig. 17 to contacts of relays YD0 . . . YD7, YE0 . . . YE7 and YF0 . . . YF7 of the Y directory-number register, each of said relays operated lighting a corresponding lamp to display the directory number registered by said relays. Relays YLP and YLPA also connect lamps C0 . . . C7 of Fig. 17 to contacts of relays PX0 . . . PX9, the one of the latter relays operated lighting two of said lamps to display the thousands digit of the directory number.

Progress lamps

Lamps LP1 . . . LP6 (Fig. 16) are provided to give a visual indication of the progress of the system when an alarm occurs. When the RDR LPS key is operated and relay AL is also operated, relay PRG operates over a circuit extending from battery through the winding of said relay, No. 1 contacts of RDR LPS key, conductor 714 within bracket 169, and No. 4 contacts of relay AL to ground. One of the lamps LP1 . . . LP6 then lights to indicate the point reached when operation of the system was suspended by the operation of relay AL. For example, if relay MUX or relay MUY has operated, lamp LP1 lights over a circuit extending from battery through said lamp, No. 1 contacts of relay PRG, conductor 715 within bracket 319, and No. 8 contacts of relay MUX or MUY to ground.

If the operation of the system is arrested while the reader is reading the first line of a two-line entry, relays A2 and TB0 are operated in accordance with the first two digits "20" of said line. When relay CP1 then operates, as described later, relay 2L (Fig. 16) operates over a circuit extending from battery through the winding of said relay, conductor 755, No. 2 contacts or relay TB0, conductor 756, No. 9 contacts of relay A2, No. 5 contacts of relay A0, No. 7 contacts of relay A1, conductor 757 within bracket 205, No. 5 contacts of relay CP1 to ground, and locks up through its No. 2 contacts and No. 7 contacts of relay A1 to the above-traced ground on conductor 757. Relay 2L lights the Two-line lamp over an obvious circuit, giving a visual indication that the system is conditioned to receive another line of a two-line entry.

Shutdown and Restart

If the Release key, Master Release key, and Stop key are all operated relays MON, RLM, ST1, ST2, ST3, ST4, ST5, MST, RDR, RCA, RCB, RCC, RCD, ON1, ON2, ON3, ON4, and AON are all thereby released. Any register relays operated are released by the release of relays ON1, ON2, ON3, ON4, and AON. However, if it is desired to shut down the system without losing a total of message units already accumulated in one of the sum registers, the Release key (Fig. 44) is alone operated.

Operation of the Release key (Fig. 44) opens the locking circuit of and releases relay RLM which, in turn, releases relays ST1 and ST2. The system continues to operate, however, until a summary has been recorded and relay RP4 operates and releases relay AG, as previously described. When the relays of the sum registers are thereafter normal, relay AN (Fig. 44) operates over a circuit extending from battery through the winding of said relay, conductor 721, No. 2 contacts of relay RLM, conductor 407, No. 1 contacts of relay OF, conductor 408, No. 9 contacts of relay PYH, No. 11 contacts of relay PXH, conductor 409, No. 1 contacts of relay OY, No. 2 contacts of relay OX, conductor 411, No. 10 contacts of relay PYT, No. 6 contacts of relay PXT, conductor 412, No. 10 contacts of relay PYU, No. 10 contacts of relay PXU, conductor 413 within bracket 381, No. 3 contacts of relay AX, No. 3 contacts of relay AY, No. 1 contacts of relay CCY, conductor 414, No. 6 contacts of relays HYL and HYH, conductor 415, No. 1 contacts of relays HY0 . . . HY4, conductor 416 within bracket 346, No. 6 contacts of relays TYL and TYH, conductor 417, No. 1 contacts of relays TY0 . . . TY4, conductor 418, No. 6 contacts of relays UYL and UYH, conductor 419, No. 1 contacts of relays UY0 . . . UY4, conductor 421 within brackets 332 and 422, No. 3 contacts of relay CCY, No. 2 contacts of relay CCX, conductor 423 within brackets 381 and 332, No. 1 contacts of relays UX4 . . . UX0, conductor 424, No. 6 contacts of relays UXH and UXL, conductor 425, No. 1 contacts of relays TX4 . . . TX0, conductor 426 within bracket 427, No. 6 contacts of relays TXH and TXL, conductor 428 within bracket 364, No. 1 contacts of relays HX4 . . . HX0, conductor 429 within bracket 431, No. 6 contacts of relays HXH and HXL, conductor 432, and No. 10 contacts of relay MON to ground. Relay AGN then operates over a circuit extending from battery through the winding of said relay, contacts of relay AN, conductor 722, and No. 1 contacts of relay AG to ground, opening the circuits of and releasing relays ON3 and ST3, which, in turn, release relays ST4, ST5, RCA, RCB, RCC, and RCD. Release of relay ST4 releases relay MST, which stops the reader motor. The reader drum remains with the last line read under the sensing fingers of the reader. Release of relay ON3 opens the operating circuit of relay AON and the locking circuits of relays XLK and YLK. These relays release, relay AON releasing relays XL and YL, which in turn, release any operated relays of the message-units registers. Relays XLK and YLK release any operated relays of the directory-number registers and relays PEX and PEY. Release of relay ST5 releases relay MON which, in turn, releases relays ON1, ON2, and ON4.

Upon the release of relay RLM, as described above, if the alarm is actuated, relay RLS (Fig. 44) operates over a circuit extending from battery through the winding of said relay, conductor 159, No. 8 contacts of relay AL1, conductor 723, and lower contacts of Release key to ground, and locks up through its No. 2 contacts, conductor 161 within bracket 92, and No. 1 contacts of relay RCC to ground. Relay ALR then operates over a circuit extending from battery through the winding of said relay, conductor 724, and No. 3 contacts of relay RLS to ground. Relay RLS releases relays ST1, ST2, and ST3, which release relays ST4, ST5, RCA, RCB, RCC, and RCD. Relay ALR opens the locking circuit of and releases any of the relays LAA, SAA, and RSF operated, which release relays AL and AL1, suppressing the alarm. Release of relay RCC releases relay RLS, which releases relay ALR, restoring the alarm circuits to normal. In any case, relay MLK remains operated over a circuit extending from battery through the winding of said relay, conductor 266, and No. 2 off-normal contacts of switch TH to ground. Any operated relays locked up through contacts of relay MLK are also held operated.

If power is now removed from the system, relay MLK releases, of course, but reoperates over the circuit traced above when power is restored. The relays which were held operated by relay MLK do not, however, reoperate. The Emerg. Reset key (Fig. 44) should now be momentarily operated, which operates relay ER (Fig. 44) over a circuit extending from battery through the winding of said relay, contacts of the Emerg. Reset key, and No. 8 contacts of relay MLK to ground. Relays TIE, SPA, and DNX then operate and lock up through contacts of relay MLK. Relay TIE (Fig. 59) operates over a circuit extending from battery through the winding of said relay, conductor 725, No. 3 contacts of relay ER, and No. 6 contacts of relay MLK to ground, and locks up through its No. 6 contacts, conductor 306, and No. 6 contacts of relay MLK to ground. Relay SPA (Fig. 45) operates over a circuit extending from battery through the winding of said relay, conductor 157, No. 2 contacts of relay ER, and No. 5 contacts of relay MLK to ground, and locks up through its No. 2 contacts, conductor 158, and No. 5 contacts of relay MLK to ground. Relay DNX (Fig. 32) operates over a circuit extending from battery through the winding of said relay, No. 10 contacts of relay DNY, conductor 311 within bracket 382, No. 1 contacts of relay ER, and No. 4 contacts of relay MLK to ground, and locks up through its No. 1 contacts, No. 10 contacts of relay MUX, No. 3 contacts of relay DNY, conductor 313 within bracket 382, and No. 4 contacts of relay MLK to ground. Relay CP1 (Fig. 59) also operates over a circuit extending from battery through the winding of said relay, conductor 726, No. 4 contacts of relay ER, and No. 7 contacts of relay MLK to ground.

The circuits are thus restored to their operating condition and the system may be restarted, as previously described, by operation of the Motor Start and Start keys. The total of message units accumulated for a directory number up to the time the Release key was operated, together with all other message units recorded on tape T as chargeable to that directory number, and the directory number itself, have been recorded. All of the entries relating to that directory number have been read. The entry encountered when the system is thus restarted must, therefore, be for a new directory number and, since relay DNX is operated, the X registers will be used for this entry. All of the directory-number, message-units and sum registers have been restored to normal and the resumed operation of the system will be the same as previously described for the first entry.

*Mutilated entries*

If a line of the record on the input tape T is so mutilated that an improper number of sensing fingers close their contacts when said line is read by the reader, the checking circuit through the contacts of the reading relays, which has been previously described, is not closed, resulting in the stopping of the reader and an alarm, as described above. The sensing-finger contacts which are closed may be determined by the maintenance lamps, as described above, but in order to continue the operation of the system, the reader must be advanced to a line of the record tape T which is not mutilated.

This is accomplished, after the alarm has been released and the reader motor restarted, as described above, by operating the Reader Step key (Fig. 46). Relay SR1 then operates over a circuit extending from battery through the winding of said relay, No. 1 contacts of relay SR2, upper contacts of Reader Step key, conductor 731, No. 5 contacts of relay ST1, conductor 81, No. 2 contacts of relay RON, conductor 82, and contacts H1C to ground. When reader contacts H2C close, relay RA (Fig. 29) operates over a circuit extending from battery through the winding of said relay, conductor 732, No. 9 contacts of relay MON, conductor 578 within bracket 57, and contacts H2C to ground. Relay SR2 then operates over a circuit extending from battery through the winding of said relay, No. 5 contacts of relay SR1, conductor 733, and No. 2 contacts of relay RA to ground, and locks up through its No. 2 contacts and lower contacts of Reader Step key to ground, opening the operating circuit of relay SR1. The latter relay is, however, locked up through its No. 4 contacts, conductor 734, and No. 1 contacts of relay RA to ground.

If relay DNX or relay DNY is operated, relay RS operates over a circuit extending from battery through the winding of said relay, conductor 197, No. 8 contacts of relay DNX or relay DNY, conductor 735, No. 2 contacts of relay SR1, conductor 736 within bracket 57, and contacts K4 of the reader to ground, and locks up through its No. 4 contacts, conductor 208 within bracket 57, and contacts H3C to ground, while said contacts are closed. Operation of relay RS allows the reader to advance to the next line, as previously described. When contacts H2C open, relay RA is thereby released, releasing relay SR1.

If relay MUX or relay MUY, for example, relay MUX, is operated instead of relay DNX or relay DNY (second line of a two-line entry) when the Reader Step key is operated, relay X4 (Fig. 18) operates over a circuit extending from battery through the winding of said relay, conductor 737 within bracket 326, No. 6 contacts of relays XUH and XUL, conductor 738, No. 6 contacts of relays XTH and XTL, conductor 739 within bracket 346, No. 6 contacts of relays XHH and XHL, conductor 741 within bracket 348, No. 7 contacts of relay MUX, conductor 735, No. 2 contacts of relay SR1, conductor 736 within bracket 57, and contacts K4 of the reader to ground, and locks up through its No. 4 contacts to the above-traced ground on conductor 741. Operation of relay X4 over this circuit checks that the relays of the X message-units register are normal.

Relays XH0, XH0', XHL, XT0, XT0', XTL, XU0, XU0', and XUL of the X message-units register now operate, registering in said register the number "000." Relay XH0, for example, operates over a circuit extending from battery through the winding of said relay, conductor 373 within bracket 374, and No. 7 contacts of relay X4 to ground. The other relays named operate over similar circuits. The number "000" thus registered in the X message-units register is then added to the quantity registered in the Y sum register, in the manner previously described, and relay SIX operates, as previously described, allowing the reader to advance to the next line. The quantity "000" added in the Y sum register does not change the amount registered therein, but the operation serves to advance the reader to another line while maintaining the proper order of use of the sum registers.

*Missing or repeated lines*

It will be apparent from the above description that the first digit of a line of impressions in the tape T indicates whether said line is a single-line entry or a line of a two-line entry. If a line of a two-line entry is missing or a line of the entry is repeated, the reader will encounter a line beginning with "0" when the system is prepared for a line beginning with "1" or "2," or the reader will encounter a line beginning with "1" or "2" when the system is prepared for a line beginning with "0." In any case the checking circuit, previously described, through the contacts of the reading relays is then not closed and the reader is arrested and an alarm given, in the manner already described. In the case where the second line of a two-line entry is missing, the system is left in condition to receive the second line of a two-line entry but, to continue operations with succeeding entries, the system should be prepared to receive a single-line entry or the first line of a two-line entry. Under these conditions, the Reader Step key should not be operated but the Start key should be operated after starting the reader motor. Relay ST1 then operates over a circuit extending from battery through the winding of said relay, conductor 77, No. 5 contacts of relay RLM, conductor 78, No. 1 contacts of relay RLS, No. 1 contacts of relay ST2, upper contacts of Start key, conductor 162, No. 3 contacts of relay SPA, conductor 163, No. 3 contacts of relay WS1, conductor 81, No. 2 contacts of relay RON, conductor 82, and contacts H7C to ground. When said contacts open, relay ST2 operates in series with relay ST1, holding the latter relay operated.

Prior to the alarm operation, relay MSL (Fig. 45) operated over a circuit extending from battery through the winding of said relay, conductor 742 within bracket 169, No. 5 contacts of relay A1 or relay A2 (one of which is operated), No. 4 contacts of relay A0 (which is not operated), conductor 715 within bracket 319, and No. 8 contacts of relay MUX or MUY (whichever is operated) to ground, and locked up through its No. 1 contacts, conductor 744, and No. 4 contacts of relay A0 to the above-traced ground on conductor 715. Assuming that relay MUX is operated, relay X4 operates over the circuit traced above for this relay to conductor 735, thence over said conductor within bracket 319, No. 6 contacts of relay A1 or relay A2, conductor 745 within bracket 169, No. 4 contacts of relay MSL, No. 4 contacts of relay ST5, conductor 746, lower contacts of Start key, and No. 6 contacts of relay ST1 to ground. Relay X4 causes the registration and addition of the quantity "000," as described above, which prepares the system for the next entry and preserves the order in which the X and Y registers are used.

*Mutilated tape-identity entry*

If a line of a tape-identity entry on the tape T is mutilated and the system blocks when reading said line, the Reader Step key should be operated repeatedly to pass the whole of the tape-identity entry through the reader by advancing the reader, as described above. If switch TH has not advanced at all (first tape), the Thous. Reset key (Fig. 47) should be operated to advance switch TH to the proper terminal. Each operation of said key operates the rotary magnet ROT of said switch over a circuit extending from battery through the winding of said magnet, conductor 258, No. 8 contacts of relay THS, conductor 751, left-hand contacts of Thous. Reset key, conductor 752, and No. 4 contacts of relay PRG to ground.

The MUT IDENT key (Fig. 59) is then operated and relay MT1 operates over a circuit extending from battery through the winding of said relay, contacts of said key, conductor 67, and No. 8 contacts of relay ON2 to ground, operating relay MT2 over a circuit extending from battery through the winding of said relay, No. 2 contacts of relay MT1, conductor 74, No. 7 contacts of relay ST4, conductor 75, and No. 4 contacts of relay ON1 to ground, and relay MT2 locks up through its No. 3 contacts, conductor 753, and No. 6 contacts of relay ST1 to ground when the latter relay operates. Relay ME (Fig. 45) operates over a circuit extending from battery through the winding of said relay, conductor 76, and No. 1 contacts of relay MT2 to ground, and causes the operation of relays ST1 . . . ST5, as previously described. Relay AS then operates over a circuit extending from battery through the winding of said relay, conductor 267, No. 4 contacts of relay WS3, No. 5 contacts of relay WS5, conductor 268, No. 5 contacts of relay MT2, conductor 237, and No. 3 contacts of relay ST4 to ground.

If relay DRN is not operated, indicating that a summary is still registered in the system, relay PF (Fig. 33) operates over a circuit extending from battery through the winding of said relay, conductor 645, No. 1 back contacts of relay DRN, and No. 5 contacts of relay AS to ground. Relay PF causes the recording of the registered summary together with the registered directory number, as previously described, and this operation operates relay DRN which releases relay PF.

When relay DRN operates, or if it is already operated, relay PT1 (Fig. 59) operates over a circuit extending from battery through the winding of said relay, conductor 276, No. 2 contacts of relay TS1, conductor 754, No. 1 front contacts of relay DRN, and No. 5 contacts of relay AS to ground. Operation of relay PT1 starts the recording of a tape-identity entry on tape TT, as previously described.

When the recording of the tape-identity entry is completed and relay CW9 has operated, as previously described, relay TIP (Fig. 59) operates over a circuit extending from battery through the winding of said relay, conductor 301 within bracket 279, No. 1 contacts of relay CW9, conductor 278 within bracket 279, No. 3 contacts of relay PT1, conductor 99, No. 6 contacts of relay ST4, conductor 116 within bracket 92, No. 3 contacts of relay RCD, conductor 117, and contacts K7 of the reader to ground, and locks up through its No. 3 contacts and No. 4 contacts of relay PT1 to ground, operating relay CP1 over an obvious circuit.

When, now, the MUT IDENT key is restored, relay MT1 releases and provides a locking path for relay CP1 through No. 6 contacts of the latter relay, conductor 302, No. 1 contacts of relay SPT, conductor 303, No. 3 contacts of relay MT1, conductor 304 within bracket 195, No. 7 contacts of relay L2, conductor 305 within bracket 195, and No. 7 contacts of relay MLK to ground. Relay RLS (Fig. 44) then operates over a circuit extending from battery through the winding of said relay, conductor 159, No. 2 contacts of relay MT2, No. 1 contacts of relay MT1, and No. 4 contacts of relay CP1 to ground, and locks up through its No. 2 contacts, conductor 161, and No. 3 contacts of relay ME to ground, releasing relays ST1 . . . ST5. Relay ST1 opens the locking circuit of and releases relay MT2, which releases relays ME and AS. Release of relay ME releases relay RLS. Release of relay AS releases relay PT1 and, in turn, relay TIP.

The tape-identity entry having thus been recorded on tape TT, the operations in connection with other entries on tape T may now continue in the manner previously described.

While we have illustrated and described our invention in its application to records of telephone service and in one particular arrangement, the invention is not limited to the particular application and the particular form illustrated and described herein. It will be obvious to one skilled in the art that various other applications and modifications of the structure shown and described are within the scope of the invention.

The terms and expressions which we have used to describe our invention and the parts thereof, are used as terms of description and not of limitation. We have no intention in the use of such terms and expressions of excluding thereby equivalents or modifications of the structure shown and described or any part theerof, but, on the contrary, intend to include in such terms and expressions any and all equivalents which may be employed without departing from the spirit of the invention.

What is claimed is:

1. A transcribing and summarizing system comprising in combination a record having entries recorded thereon, each entry comprising an index and a quantity, means for reading said record, means responsive to said reading means for registering two of said entries, means for comparing the two indices in said two registered entries, means responsive to said comparing means for adding the two quantities in said two registered entries if said two compared indices are alike, and means responsive to said comparing means for recording one of said entries if said two compared indices are unlike.

2. A transcribing and summarizing system comprising in combination a record having successive entries recorded thereon, each entry comprising an index and a quantity, means for reading said entries successively, means responsive to said reading means for registering said entries successively, means responsive to said registering means for comparing the index of each of said registered entries with the index of the succeeding entry, means responsive to said comparing means for totaling the quantities in successive entries which have the same index, and means responsive to said comparing means for recording said index and the total of said quantities.

3. A transcribing and summarizing system comprising in combination a record having entries recorded thereon, each entry comprising an index and a quantity, means for reading said record, a first register responsive to said reading means for registering one of said entries, a second register responsive to said reading means for registering another of said entries, means responsive to said first register and to said second register for comparing the two indices registered therein, a third register, means responsive to said comparing means for setting said third register to the sum of the two quantities registered in said first and said second registers if the two compared indices are alike, and means responsive to said comparing means for recording one of said entries if the two compared indices are unlike.

4. A transcribing and summarizing system comprising in combination a record having successive entries recorded thereon, each entry comprising an index and a quantity, means for reading said entries successively, a first register responsive to said reading means for registering said entries successively, a second and a third register alternately responsive to said first register for registering indices registered therein, a fourth and a fifth register alternately responsive to said first register for registering quantities registered therein, means responsive to said second and to said third register for comparing indices registered therein, two total registers settable to amounts, means responsive to said comparing means for setting each of said total registers alternately to the total of the quantity registered in one of said fourth and fifth registers and the amount registered in the other of said total registers when the indices compared by said comparing means are alike, and means responsive to said comparing means for recording the index registered in one of said second and third registers and the total registered in one of said total registers when the indices compared by said comparing means are not alike.

5. A transcribing and summarizing system comprising in combination a record having successive entries recorded thereon, each entry comprising an index and a quantity recorded in a first code, means for reading said entries successively, a first register responsive to said reading means for registering successive entries successively in said first code, a second and a third register alternately responsive to said first register for registering in said first code indices registered in said first register, means responsive to said second and to said third register for comparing indices registered therein, a first translator responsive to said first register for translating the registrations of quantities registered therein to a second code, a fourth and a fifth register alternately responsive to said first translator for registering in a third code quantities registered in said first register, means responsive to said fourth and to said fifth register for totaling quantities registered therein, two total registers alternately responsive to said total means for registering totals in said third code, a second translator responsive to said total registers for translating totals registered therein to said first code, and means responsive to said comparing means and to said second translator for recording in said first code an index registered in said second or said third register and a total registered in one of said total registers.

6. A transcribing and summarizing system comprising in combination a record having successive entries recorded in lines thereon, each entry comprising an index and a quantity recorded in one line or an index recorded in one line and a quantity recorded in another line, means for reading the lines of said record successively, means responsive to said reading means for comparing the indices in successive entries of said record, means responsive to said comparing means for totaling the quantities for the same index in successive entries of said record, and means responsive to said comparing means and to said totaling means for recording one of said indices and a total.

7. A transcribing and summarizing system comprising in combination a record having successive entries recorded in lines thereon, each entry comprising an index and a quantity recorded in one line or an index recorded in one line and a quantity recorded in another line, means for reading the lines of said record successively, a first register responsive to said reading means for successively registering the data in successive lines of said record, a second and a third register alternately responsive to said first register for registering indices registered therein, means responsive to said second and to said third register for comparing indices registered therein, a fourth and a fifth register alternately responsive to said first register for registering quantities registered therein, means responsive to said fourth and to said fifth register for totaling quantities registered therein, two total registers alternately responsive to said totaling means for registering totals, and means responsive to said comparing means for recording an index registered in said second or said third register and a total registered in one of said total registers.

8. A transcribing and summarizing system comprising in combination a record having successive entries recorded in lines thereon, each entry comprising an index and a quantity recorded in one line or an index recorded in one line and a quantity recorded in another line, means for reading the lines of said record successively, means responsive to said reading means for comparing the indices in successive entries of said record, means responsive to said comparing means for totaling the quantities in successive entries of said record, and means responsive to said comparing means and to said totaling means for recording one of said indices in one line and a total in another line.

9. A transcribing and summarizing system comprising in combination a record having successive entries recorded thereon, each entry comprising an index and a quantity, means for reading said entries successively, means responsive to said reading means for comparing the indices in successive entries of said record, means responsive to said comparing means for totaling the quantities in successive entries of said record, and means responsive to said totaling means for recording a predetermined amount and one of said indices when the total obtained by said totaling means equals or exceeds said predetermined amount.

10. A transcribing and summarizing system comprising in combination a record having successive entries recorded thereon, each entry comprising an index and a quantity, means for reading said entries successively, means responsive to said reading means for comparing the indices in successive entries of said record, means responsive to said comparing means for totaling the quantities in successive entries of said record, means responsive to said totaling means for recording a predetermined amount and one of said indices when the total obtained by said totaling means equals or exceeds said predetermined amount, a settable register, and means responsive to said totaling means for setting said register to the difference between said predetermined amount and said total.

11. A transcribing and summarizing system comprising in combination a record having successive entries recorded thereon, each entry comprising an index and a quantity, means for reading said entries successively, means responsive to said reading means for comparing the indices in successive entries of said record, means responsive to said comparing means for totaling the quantities in successive entries of said record, means responsive to said totaling means for recording a predetermined amount and one of said indices when the total obtained by said totaling means equals or exceeds said predetermined amount, a settable register, means responsive to said totaling means for setting said register to an amount equal to the difference between said predetermined amount and said total, and means responsive to said comparing means for totaling the quantities in succeeding entries of said record and the amount set in said register.

12. In a record transcribing and summarizing system, in combination, a record having successive entries recorded thereon, each entry comprising an index, means for reading said entries successively, a settable register, means responsive to said reading means for setting said register to the index of the first entry, means responsive to said reading means for comparing the index of each of the suceeding entries with the setting of said register, and means responsive to said comparing means for arresting said reading means when the index of an entry does not agree with the setting of said register.

13. In a record transcribing and summarizing system, in combination, a record having successive entries recorded thereon, each entry comprising an index, means for reading said entries successively, a settable register, means responsive to the reading of one of said entries for setting said register to the index in said entry, means responsive to the reading of a second entry for comparing the index in said second entry with the setting of said register, and means responsive to said comparing means for advancing said reading means to a third entry.

14. In a record transcribing and summarizing system, in combination, a record having successive groups of successive entries recorded thereon, each entry comprising an index, means for reading said entries successively, a settable register, means responsive to the reading of the first entry of the first group for setting said register to the index of said entry, means responsive to the reading of succeeding entries for comparing the index in each of said entries with the setting of said register, means responsive to the reading of the first entry of each succeeding group for resetting said register to the indices of said entries, and means for arresting said reading means when the index of an entry read does not agree with the setting of said register.

15. In a record transcribing and summarizing system, in combination, a record having successive entries recorded thereon, each entry comprising an index and a quantity, means for reading said entries successively, means responsive to said reading means for comparing the indices in successive entries, means responsive to said comparing means for totaling the quantities in successive entries which have the same index, means responsive to said comparing means for recording said index and said total, means for arresting the operation of said system, means for actuating said arresting means, and means for delaying the operation of said arresting means after the operation of said actuating means until said index and said total have been recorded.

16. A record transcribing and summarizing system comprising in combination a record having successive groups of successive data entries recorded in lines thereon, each entry comprising an index and a quantity recorded on one line or an index recorded on one line and a quantity recorded on another line, means for reading the lines of said record successively, a settable first register, means responsive to the reading of the first entry of the first group for setting said first register to the index in said entry, means responsive to the reading of succeeding entries for comparing the index in each of said entries with the setting of said first register, means responsive to the reading of the first entry of each of the succeeding groups for resetting said first register to the indices in said entries, means responsive to said comparing means for arresting said reading means if the index of an entry does not agree with the setting of said first register, a second register responsive to said reading means for registering the data in each of the lines of said record successively, a third and a fourth register alternately responsive to said second register for registering indices registered therein, a fifth and a sixth register alternately responsive to said second register for registering quantities registered therein, means responsive to said third and to said fourth register for comparing indices registered therein, two total registers alternately responsive to said comparing means for registering the totals of the quantities registered in said third and said fourth registers so long as the indices compared by said latter comparing means are the same, means responsive to said two total registers for recording the index registered in said third or said fourth register and a predetermined amount when the total registered in either of said total registers equals or exceeds said amount, means responsive to said recording for setting one of said total registers to the difference between said predetermined amount and said total, means responsive to said latter comparing means for totaling the quantities in succeeding entries of said record and said difference, and means responsive to said latter comparing means for recording the index registered in one of said third and fourth registers and the total registered in one of said total registers when the indices compared by said latter comparing means do not agree.

17. A summarizing system comprising in combination, a first and a second register settable alternately to amounts, a third and a fourth settable register, means responsive to the setting of said first register to an amount for setting said third register to the same amount, means responsive to the setting of said second register to an amount for setting said fourth register to the sum of the amounts set in said second and said third registers, means responsive to the setting of said second register to another amount for setting said fourth register to the same amount, and means responsive to the setting of said first register to another amount for setting said third register to the sum of the amounts set in said first and said fourth registers.

18. A summarizing system comprising in combination, a first and a second register settable alternately to amounts, a third and a fourth register each settable to amounts and to no amount, means responsive to the setting of said first register to an amount for setting said third register to the same amount, means responsive to the setting of said second register to an amount for setting said fourth register to the sum of the amounts set in said second and said third registers and for setting said third register to no amount, means responsive to the setting of said first register to another amount for setting said third register to the sum of the amounts set in said first and said fourth registers and for setting said fourth register to no amount, and means responsive to the setting of said second register to another amount for setting said fourth register to the same amount.

19. In a summarizing system, in combination, a first, a second, a third, and a fourth register each settable to amounts and to no amount, means responsive to the setting of said first and said fourth registers for setting said third register, means responsive to the setting of said second and said third registers for setting said fourth register, means responsive to the setting of said first register to an amount for checking that said third register is set to no amount and is thereafter set to an amount, and means responsive to the setting of said second register to an amount for checking that said fourth register is set to no amount and is thereafter set to an amount.

20. In a summarizing system, in combination, a first and a second register settable alternately to amounts, a third and a fourth register each settable to amounts and to no amount, means responsive to the setting of said first register to an amount for checking that said third register is set to no amount, means for thereafter setting said third register to the amount set in said first register, means for thereafter checking that said third register is set to an amount, means responsive to the setting of said second register to an amount for checking that said fourth register is set to no amount, means for thereafter setting said fourth register to the sum of the amounts set in said second and said third registers, and for setting said third register to no amount, means for thereafter checking that said fourth register is set to an amount, means responsive to the setting of said first register to another amount for checking that said third register is set to no amount, means for setting said third register to the sum of the amounts set in said first and said fourth registers and for setting said fourth register to no amount, means for thereafter checking that said third register is set to an amount, means responsive to the setting of said second register to another amount for checking that said fourth register is set to no amount, means for setting said fourth register to the amount set in said second register, and means for thereafter checking that said fourth register is set to an amount.

HENRY A. GIROUD.
GORDON C. IRWIN.
LINDLEY A. KILLE.
JOHN B. RETALLACK.
GEORGE RIGGS.
WALTER B. STRICKLER.

REFERENCES CITED

The following references are of record in the file of this patent:

UNITED STATES PATENTS

| Number | Name | Date |
|---|---|---|
| 1,972,977 | Carroll et al. | Sept. 11, 1934 |
| 2,112,951 | Carpenter | Apr. 5, 1938 |
| 2,359,616 | Bryce | Oct. 3, 1944 |